US012596470B2

(12) United States Patent　(10) Patent No.:　US 12,596,470 B2
Burckel　(45) Date of Patent:　Apr. 7, 2026

(54) GESTURE-BASED MENULESS COMMAND INTERFACE

(71) Applicant: William Martin Burckel, Colorado Springs, CO (US)

(72) Inventor: William Martin Burckel, Colorado Springs, CO (US)

( * ) Notice: Subject to any disclaimer, the term of this patent is extended or adjusted under 35 U.S.C. 154(b) by 0 days.

(21) Appl. No.: 17/573,954

(22) Filed: Jan. 12, 2022

(65) Prior Publication Data

US 2022/0179552 A1　　Jun. 9, 2022

Related U.S. Application Data

(63) Continuation-in-part of application No. 16/016,157, filed on Jun. 22, 2018, now Pat. No. 11,262,885.

(60) Provisional application No. 62/525,205, filed on Jun. 27, 2017.

(51) Int. Cl.
*G06F 3/04883*　(2022.01)
*G06F 3/16*　(2006.01)
*G10L 15/22*　(2006.01)
*G06F 3/01*　(2006.01)

(52) U.S. Cl.
CPC .......... *G06F 3/04883* (2013.01); *G06F 3/167* (2013.01); *G10L 15/22* (2013.01); *G06F 3/017* (2013.01); *G06F 2203/04808* (2013.01); *G10L 2015/223* (2013.01)

(58) Field of Classification Search
CPC ...... G06F 3/04883; G06F 3/167; G06F 3/017; G06F 2203/04808; G10L 15/22; G10L 2015/223

USPC .......................................................... 715/761
See application file for complete search history.

(56) References Cited

U.S. PATENT DOCUMENTS

| | | |
|---|---|---|
| 9,990,059 B2 | 6/2018 | Vong |
| 10,871,880 B2 | 12/2020 | Hatfield et al. |
| 2004/0172254 A1* | 9/2004 | Sharma ................. G06F 16/957 |
| | | 704/270.1 |

(Continued)

OTHER PUBLICATIONS

Gordon Kurtenbach and William Buxton, Issues in Combining Marking and Direct Manipulation Techniques, UIST 1991; Proceedings of the 4th annual Association for Computing Machinery (ACM) Symposium on User Interface Software and Technology (UIST); Nov. 1991, pp. 137-144; ISBN: 0897914511; DOI: 10.1145/120782; https://dl.acm.org/doi/10.1145/120782.120797.

*Primary Examiner* — Stephen S Hong
*Assistant Examiner* — Tionna M Burke

(57) ABSTRACT

The present invention extends to methods, systems, and computer program products for triggering application commands using a gesture-based approach that replaces the need for menu and toolbar graphical interface elements. Significant challenges arise when using a gesture only approach to implement a command interface given that navigation, annotation, and content manipulation must contend equally for the same limited set of distinct gesture interactions. The present invention addresses these challenges using a transitory Tracer mode, integrated directly into the gesture system. The Tracer mode produces temporary annotation strokes, graphical traces, that fade away as soon as activity ceases. These Tracer strokes are optionally activated with a trigger gesture to recognize unique Tap-Symbols, executing application commands associated with each symbol.

16 Claims, 72 Drawing Sheets

(56) References Cited

U.S. PATENT DOCUMENTS

| | | | |
|---|---|---|---|
| 2007/0152984 A1* | 7/2007 | Ording | G06F 3/04883 |
| | | | 345/173 |
| 2013/0120279 A1* | 5/2013 | Plichta | G06F 3/04883 |
| | | | 345/173 |
| 2014/0363083 A1* | 12/2014 | Xia | G06F 40/166 |
| | | | 382/189 |
| 2016/0048318 A1 | 2/2016 | Markiewicz | |
| 2019/0155394 A1 | 5/2019 | Bedikian et al. | |

* cited by examiner

3D-Brainstorming

Lecture-Palette

3D-Lecturing / 3D-Notetaking

3D-Forum

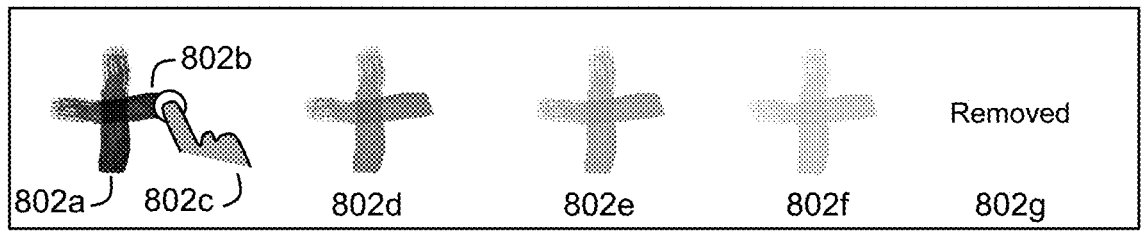
804 Tap-Trigger
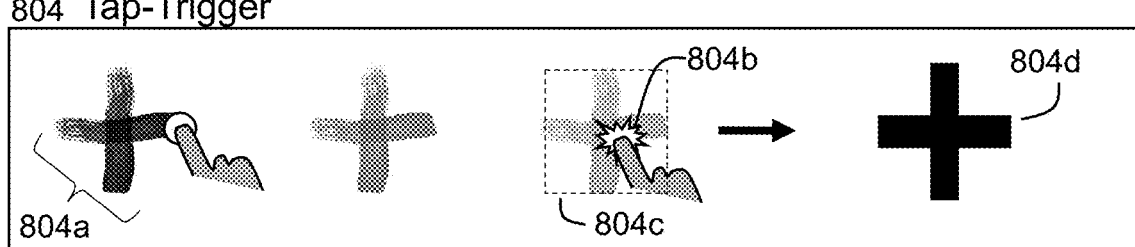
806 Drip-Trigger
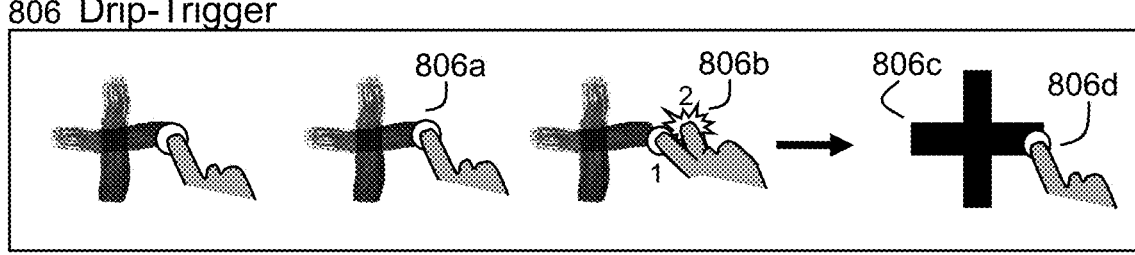
808 Hold-Trigger
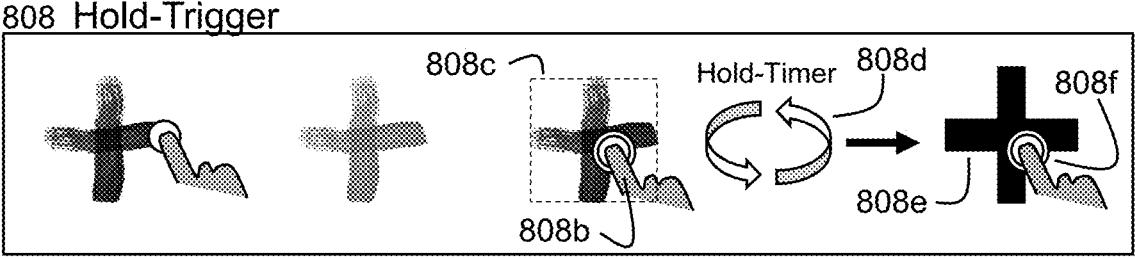
810 Pause-Trigger
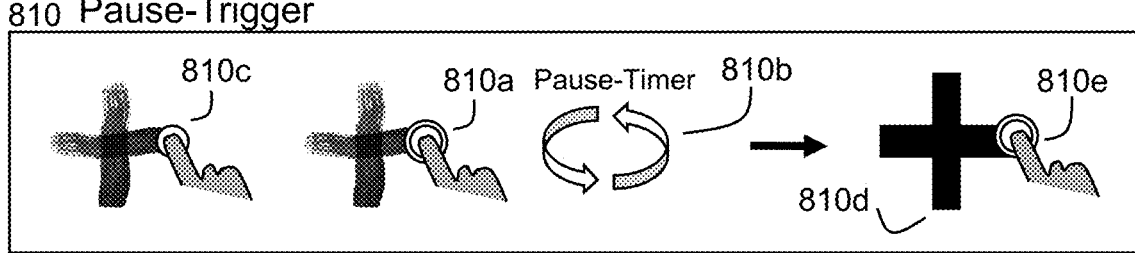
FIG. 8A

1002

VOCAL

[ 1-Finger HOLD /
Left mouse HOLD ]

1004

TRACE / MARK

[ DRAG Single Finger /
Left mouse DRAG ]

1006

SCROLL / ZOOM

[ 2-Finger DRAG / Right
Mouse button DRAG ]

1008

TAP-IN

[ 1-Finger TAP /
Left mouse button CLICK ]

1010

TAP-OUT

[ 2-Finger TAP /
Right mouse button CLICK]

1012

POP-OUT

[ 2-Finger Vertical TAP ]

1014

TOGGLE

[ 3-Finger TAP ]

1016

CAPTURE

[ 3-Finger HOLD ]

1018

PUSH / PULL

[ 5-Finger HOLD ]

FETCH

FLING

Tapisphere

2802

2804

2808

2806

2812

Register Pending Fetch

2810

2814

Match Fetch / Fling

2816

2818

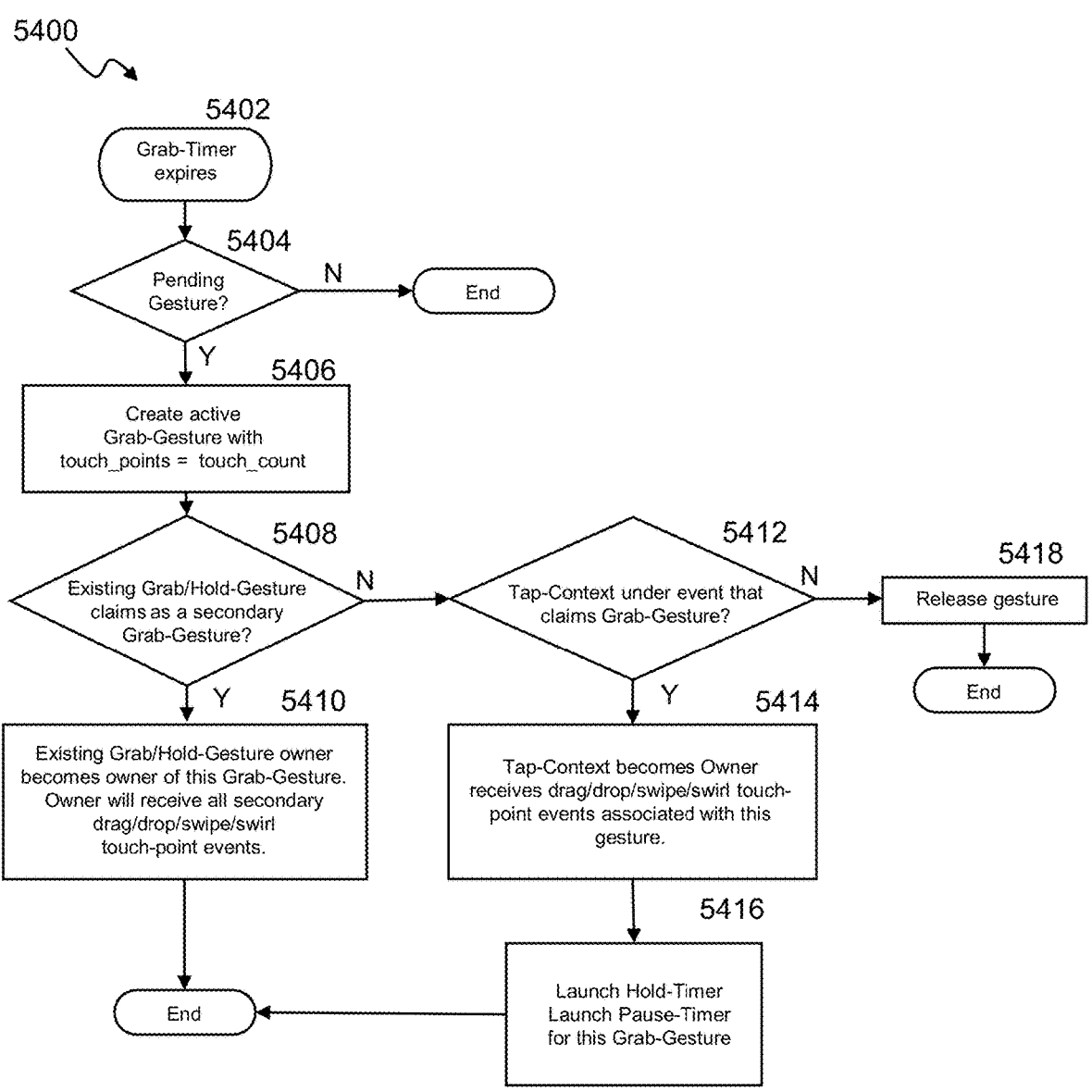

5400

5402
Grab-Timer expires

5404
Pending Gesture? — N → End

Y

5406
Create active Grab-Gesture with touch_points = touch_count

5408
Existing Grab/Hold-Gesture claims as a secondary Grab-Gesture? — N →

5412
Tap-Context under event that claims Grab-Gesture? — N →

5418
Release gesture

End

Y

5410
Existing Grab/Hold-Gesture owner becomes owner of this Grab-Gesture. Owner will receive all secondary drag/drop/swipe/swirl touch-point events.

End

Y

5414
Tap-Context becomes Owner receives drag/drop/swipe/swirl touch-point events associated with this gesture.

5416
Launch Hold-Timer Launch Pause-Timer for this Grab-Gesture

5900 computer system  6000

CPU  6002 memory  6004 persistent storage  6006 computer-readable media drive 6008 network connection  6010

6302 Non-Trigger
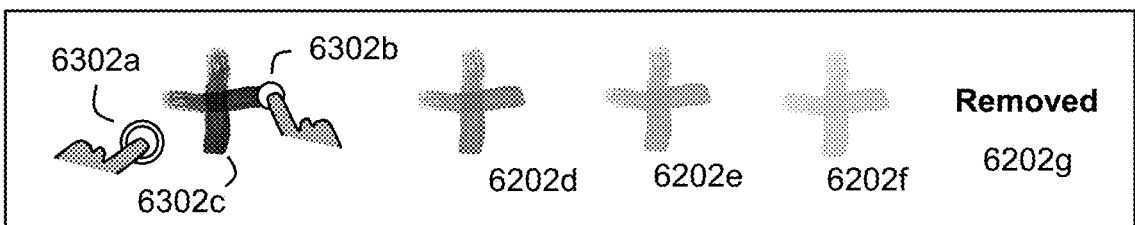
6304 Tap-Trigger
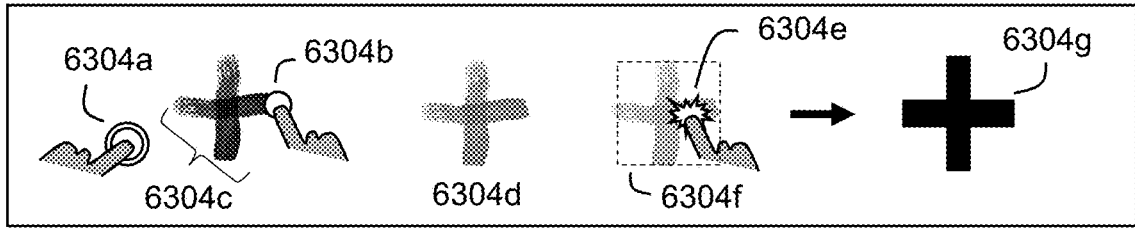
6306 Drip-Trigger
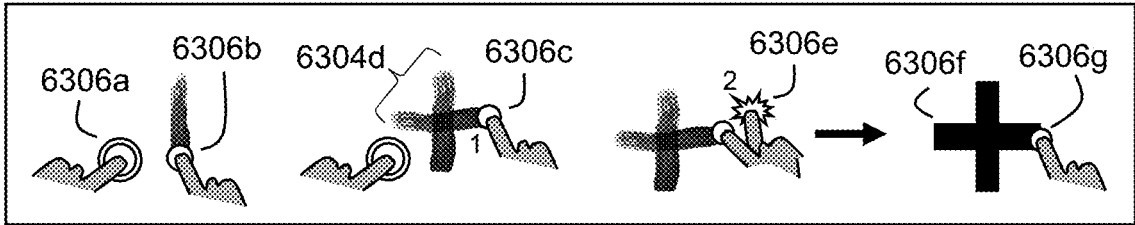
6308 Hold-Trigger
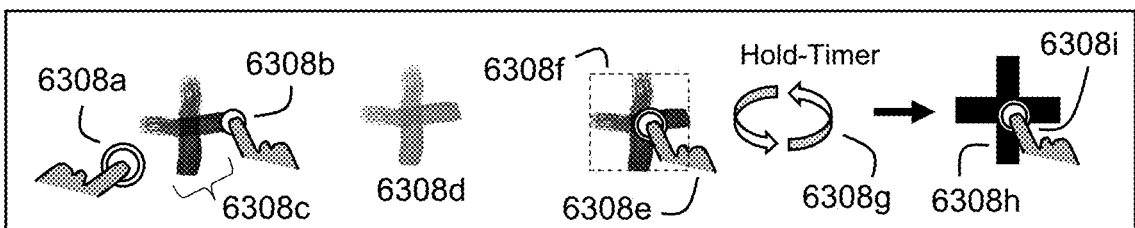
6310 Pause-Trigger
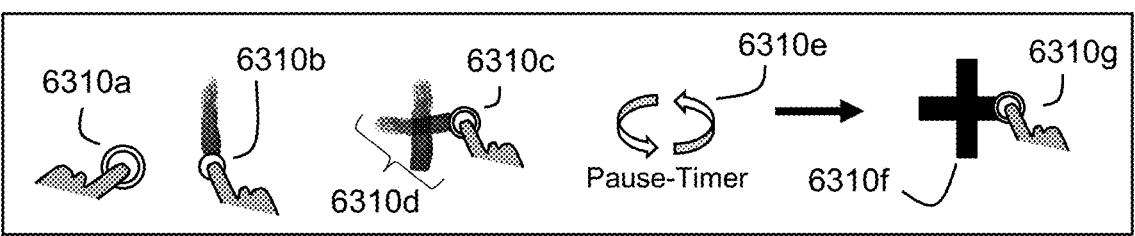
FIG. 63

GESTURE-BASED MENULESS COMMAND INTERFACE

CROSS-REFERENCE TO RELATED APPLICATIONS

This present application is a Continuation-in-Part and claims priority to U.S. Non-Provisional patent application Ser. No. 16/016,157, filed Jun. 6, 2018, with the title "SYSTEM AND METHODS FOR DELIVERING AN UNSTRUCTURED COGNITIVE PLATFORM", and subsequently renamed "MULTI-GESTURE CONTEXT CHAINING", and naming William Martin Burckel as inventor, the entire content of which is hereby incorporated herein by reference in its entirety for all purposes; which claims priority to U.S. Provisional Patent Application Ser. No. 62/525,205, filed on Jun. 27, 2017, entitled "A SYSTEM, PLATFORM AND METHODS FOR DELIVERING 4-DIMENSIONAL LECTURES" and naming William Martin Burckel as inventor, the entire content of which is hereby incorporated herein by reference in its entirety for all purposes. All of the foregoing applications are hereby incorporated herein by reference in their entirety for all purposes.

TECHNICAL FIELD

This patent application relates to software and/or hardware, referred to as Tapistry, or the software/hardware/facility throughout the rest of this application, and more particularly for delivering an unstructured cognitive platform across one or more devices for human-computer interaction and interfaces.

COPYRIGHT NOTICE

BACKGROUND

The ultimate human-computer interface would enable content creation at the pace of human thought, leveraging computational bandwidth to augment human cognitive activities. Attempts to achieve this tight coupling between human and computer have traditionally failed. The obstacles preventing this rest with the interface, and the friction introduced by the need to structure the graphical environment. Instead of shaping application architecture to fit cognitive needs, traditional solutions have instead structured cognitive activities to fit within the computer form-factor. This is exacerbated by two main factors.

The first factor is the diversity of computing devices, and methods of interaction, which generate a variety of non-portable interface structuring techniques. What works for mouse and keyboard does not propagate to touch displays. Even techniques developed for hand-held touch devices do not scale when taken to wall-sized displays, or down to postage stamp sized wearables. For instance, touch-based tablet applications that rely on interface artifacts such as menus and toolbars, result in operation friction when taken to the size of a wall, where the operator may have difficulty reaching controls placed along the top or needs to walk back and forth to access toolbar elements along the side. The opposite problem is encountered at ultra-small scales, such as smartwatches, where limited real estate prevents nearly any kind of interface structuring. Device-centric structuring, so effective at providing form-factor specific interface solutions, creates impediments to universal platform deployment.

The second factor is the impact interface structuring has on the fluidity and scope of applications. Reliance on literal graphical controls tied to screen real estate restricts the number of those controls and thus the functionality of the application. Attempts to force this result in applications with complex stacks of toolbar and menu elements layered across tabbed headers. Thus, traditional solutions are forced to divide-up human activities across a myriad of applications and specialized apps to stitch together functionality in a piecemeal fashion. This impedes the human capacity to move fluidly among disparate mental tasks, spanning many subjects and activities simultaneously. Paper and whiteboards in contrast excel at covering a vast range of subject matter using a simple means of interface. Historically, paper and whiteboards have provided an effective, unstructured free-form medium for the fluid capture of unbounded exposition, doodling, brainstorming, composing, calculating, etc. This is because paper and whiteboards remain unstructured up and until the point the user adds content in the form of annotations that cause the paper to become a graph, a sketch, an equation, a music score, a table, and so on. Paper becomes what you need it to be. This delayed structuring provides immense versatility, and offers distinct advantages for spontaneous lecturing, amorphous brainstorming and collaboration activities for which these analog forms remain dominant. While adequate for the task, paper and whiteboards lack the capacity to leverage the exponentially increasing power of digital computers.

Thus, the deep-seated reliance on legacy interface methods prevents the ultimate achievement of a truly versatile digital medium capable of supporting unstructured cognitive activities. The ever expanding diversity of display interfaces coupled with ubiquitous computer access, provide compelling evidence that these traditional, dated, structured graphical user interface concepts should be abandoned.

BRIEF DESCRIPTION OF THE DRAWINGS

FIG. 8A illustrates the Tracer-Mechanism and the four methods to trigger Tap-Symbols on a touch surface in some embodiments.

FIG. 54 is a flowchart describing the Grab-Timer expiring event processing in some embodiments.

FIG. 60 is a block diagram showing some of the components typically incorporated in at least some of the computer systems and other devices on which the facility operates in some embodiments.

FIG. 63 illustrates the Tracer-Mechanism and the four methods to trigger Tap-Symbols modified to account for the Ad Hoc Tracer-Mode activation gesture in some embodiments.

GLOSSARY

Figure 1:
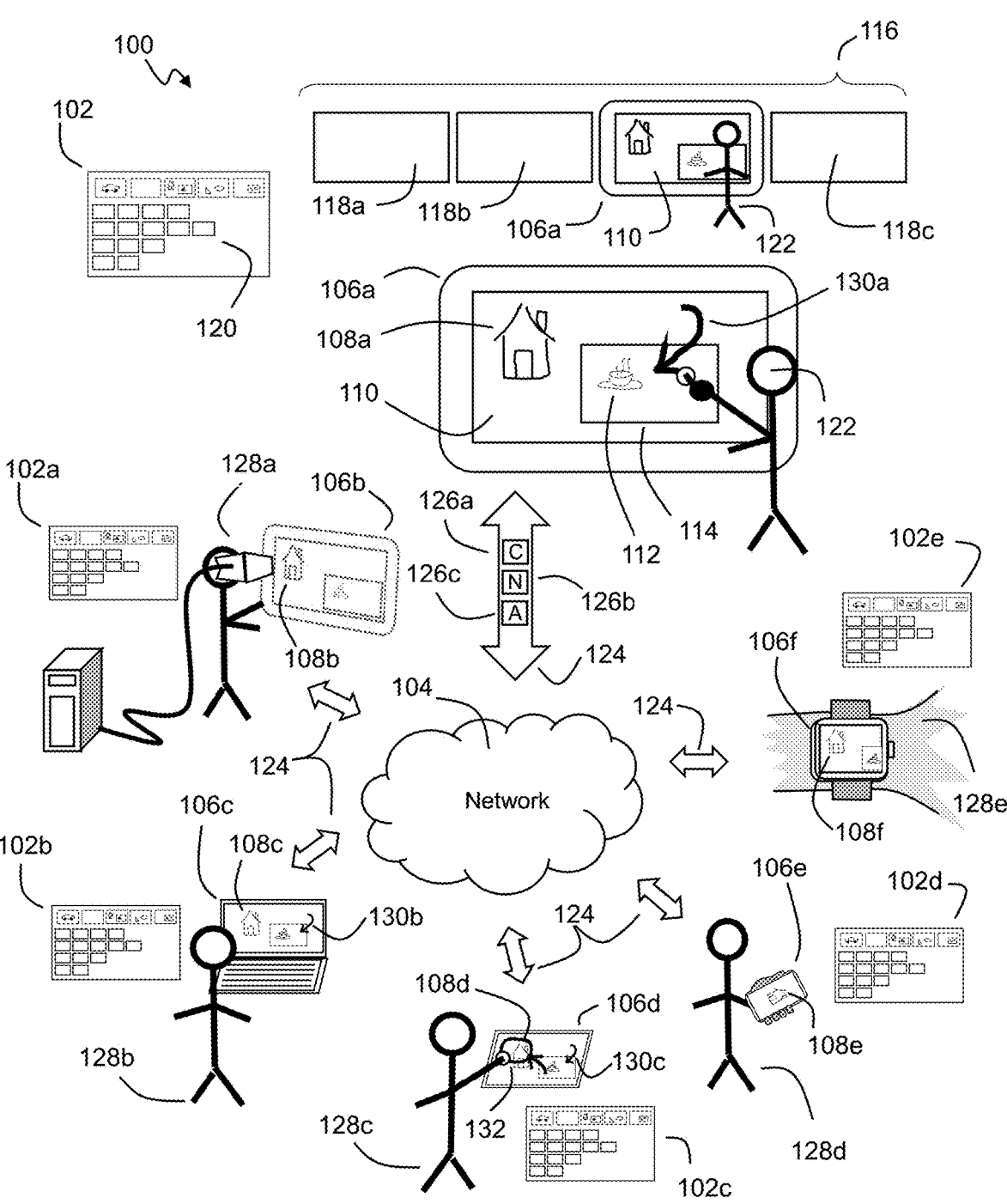
FIG. 1 is a block diagram illustrating a suitable computing environment called a Tapisphere in which the facility operates in some embodiments.

Glyph: Hierarchical element for structuring user content.
Sub-Glyph: A Glyph contained by another Glyph.
Parent-Glyph: Container of a Sub-Glyph.
Tap-Link: A functional connection/trigger/conduit between two Glyphs.
Tap-Port: A connection point on a Glyph for Tap-Links.
Tap-Rig: Two or more Glyphs connected together using Tap-Links.
Tap-Tool: A Glyph that delivers app-like capabilities.
Vignette: Time domain recording of Glyph movements and annotations.
Tap-Board: Infinite canvas holding Glyph content.
Tap-Way: An embedded Tap-Board/Tap-Space.
Tap-Deck: A grouping of Tap-Boards by session.
Working-Deck: Current session Tap-Deck.
Tap-Space: An infinite 3D-Volume in AR/VR environments holding Tap-Forms.
Tap-Surface: A virtual plane in a Tap-Space for defining touch events.

Working-Space: The currently active Tap-Space in AR/VR environments.
Space-Deck: Series of Tap-Spaces scrollable as adjacent spaces.
Tap-Form: Hierarchical 3D element used to structure content in Tap-Spaces.
Tap-Display: A virtual display Tap-Form for interfacing with Tap-Boards.
Tap-Context: A Glyph, Tap-Form, Tap-Board, Tap-Display, Tap-Space.
Tapistry: A consolidation of Tap-Boards into an information space.
Tapisphere: A multi-device topology synchronizing a shared context.
Nexus: Spanning view of multiple Tapistries and Tapispheres.
3D-Whiteboarding: Hierarchical structuring of annotations into the Tap-Board.
3D-Brainstorming: Simultaneous 3D-Whiteboarding on a Tapisphere context.
3D-Lecturing: Live lecturing across a Tapisphere context.
3D-Notetaking: Private annotations overtop of a Tapisphere context.
3D-Forum: Rotating speaker/leader discussion across a Tapisphere context.
3D-Mouse: Smartphone spatially synchronized to interact with a second device.
Lecture-Palette: Tablet or smartphone navigation across a Tapisphere.
Lecture-HUD: Lecture notification overlay.
Tap-Display: Physical or virtual device for showing Tap-Views.
Tap-View: An interface into a Tap-Board.
Tap-Layout: Two or more Tap-Views that divide up a Tap-Display.
VUI: Voice User Interface engine that conducts speech recognition.
Touch-to-Talk: VUI Activation only when touching the surface.
Vocal: Voice command keyword or phrase registered with the VUI.
Tap: One or more fingers making quick contact with the touch surface.
Grab: A gesture of one or more fingers in contact with the touch surface.
Drag: A Grab gesture that moves across the touch surface.
Swirl: Drag gesture moving in a circle.
Hold: Grab gesture that does not move.
Push: Five-finger AR/VR Gesture for pushing a Tap-Form away from the user.
Pull: Five-finger AR/VR Gesture for pulling a Tap-Form toward the user.
Compound-Gesture: Two or more simultaneous Gestures.
Drip: A Compound-Gesture with the second gesture being a Tap.
Drip-Right: Drip gesture with the Tap to the right of the first gesture.
Drip-Left: Drip gesture with the Tap to the left of the first gesture.
Tap-In: One finger tap to zoom into a Tap-Context.
Tap-Out: Two-finger tap that zooms out of a Tap-Context.
Tap-Stack: Structure tracking the Tap-In/Tap-Out contexts.
Pop-Out: Vertical tap that immediately zooms out of a Tap-Tool or Tap-Board.
Bail-Out: Five finger hold that jumps to the Nexus.
Vertical-Tap: A tap with two fingers vertically aligned.

Tracer: Temporary annotation mechanism creating strokes that fade.

Tap-Symbol: Recognized pictograph or pattern made with Tracer strokes.

Tap-Macro: Assignable Tap-Symbol triggering custom functionality.

Tap-Blank: Glyph for creating custom pictograph Tap-Symbols.

Tap-Card: Customized Tap-Blank.

Tap-Trigger: Action triggered by a Tap gesture.

Hold-Trigger: Action triggered by exceeding a Hold-Timer.

Drip-Trigger: Action triggered with a Compound Drip-Gesture.

Pause-Trigger: Action triggered by exceeding a Pause-Timer.

Marker: Permanent annotation tool.

Snap-Shapes: Clean drawing geometries created from freehand annotations.

Tap-Shape: Graphical 2D geometry element produced from annotations.

Tap-Model: Graphical 3D geometry element viewable as a Glyph/Tap-Form.

Stage-Mode: Gestures for staging and sequencing Vignette animations.

Way-Points: Start and end points of Vignette animation paths.

Flow-Mode: Gestures for traversing playable content.

Tap-Marks: User bookmarked points in playable content.

Drop-Through: Gesture for dropping Tap-Tool data onto Tap-Boards.

Tap-Synch: Glyph synchronized with one or more mobile device sensors.

Tap-Map: Geo-located user content.

DETAILED DESCRIPTION

The inventors have conceived and reduced to practice a software and/or hardware facility that can be adapted to provide collaboration of content between a plurality of devices. Examples of these devices include, but are not limited to, interactive digital whiteboards, interactive flat panels, interactive projectors, touch laptops, touch monitors, touch tablets, smartphones, smartwatch, wearables, AR/VR environments and so on.

The facility implements a human-computer interface necessary to address the shortcomings of interface structuring encountered on these traditional platforms and environments. The solution is a Gesture Control System paired with a hierarchically organized information space capable of operating across a wide range of computing devices and environments. The approach delivers an interface with a near zero graphical footprint that rivals the spontaneity and versatility of traditional paper and whiteboard forms, while still delivering advanced information capture, manipulation, and computational processing capabilities that are not available using traditional paper and whiteboard forms. In the facility, the display surface, which can be a physical monitor, touchscreen, interactive whiteboard, or virtual display in an AR or VR environment is completely devoid of structural interface elements. Instead, all content generation and cognitive amplification activities are achieved with a set of universal scale-invariant gesture mechanisms closely coupled with a targeted use of voice recognition commands. By establishing a shared information context across multiple device topologies, the facility delivers collaborative methods for distributed brainstorming, on-line virtual forums, and one-to-many lecture/notetaking scenarios. The result is a human-computer interface facility that spans a wide range of computing forms to empower human cognitive activity.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special purpose hardware (e.g., circuitry), as programmable circuitry appropriately programmed with software and/or firmware, or as a combination of special purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in several embodiments," "in some embodiments," "according to several embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

Facility Architecture

FIGS. 1 through 9 depict the architecture of the facility to achieve an unstructured, frictionless cognitive platform serving as the foundation for operational illustrations throughout the remainder of the application. The architecture is organized around a Tapisphere: a multi-platform Share-Context; Tapistry: a hierarchical structuring of the user content into an information space; and a Gesture Control System: a set of touch-based interface mechanisms for delivering a near zero-footprint graphical interface.

Tapisphere

FIG. 1 is a block diagram illustrating a suitable computing environment called a Tapisphere 100 in which the facility operates in some embodiments. A Tapisphere is a multi-user session that manages the synchronization of a Shared-Context information space 102 and 102a-102e. The Shared-Context is synchronized across a plurality of devices logged into a Tapisphere session linked through a communications network 104, such as a Local Area Network (LAN), Wide Area Network (WAN), the Internet, or the like. A diverse range of interface devices can participate in a Tapisphere session as both presentation/reception devices to include, but not limited to, large format interactive projectors/interactive flat panel displays 106a, Augmented Reality/Virtual Reality (AR/VR) environments 106b, touch laptops/workstations/monitors 106c, touch tablet/pen stylus-based devices 106d, smartphone hand-held devices 106e, and wearable devices, such as a smartwatch 106f. In several embodiments, a Shared-Context is synchronized across a plurality of devices logged into a Tapisphere session based on a synchronization frequency. The synchronization frequency can be based on one or more of the following parameters: elapsed time since last synchronization event, number of touch point events since last synchronization event, bandwidth of a network connection between devices, memory capacity of the one or more devices, a predetermined value, and so on. This synchronization can be initiated on a Glyph-by-Glyph basis, with each Glyph 108*a* that has received a state change caused by user interaction, sending messages to the other Glyphs in the Shared Context 108*b*-108*f* that are the mirrored counterpart on each device logged into the Tapisphere, to update their state to reflect the same state change. Performing this synchronization at a Glyph level, reduces the amount of information bandwidth required to maintain the shared context.

The Shared-Context is an information space 102 that is also called a Tapistry. The Tapistry 102 is built out of individual infinite canvas annotation spaces 110 called a Tap-Board. The Tap-Board 110 serves as an unstructured whiteboard-like medium for generating user content on-the-fly in the form of, but not limited to, digital content, text, drawings, annotations, audio data, video data, image data, Uniform Resource Locators (URLs), social media account data, pictures, sketches, 2D/3D graphical elements, and computing elements called Tap-Tools. All these forms of content are implementations of a generic information container called a Glyph 108*a*-108*f*, 112, and 114.

The Tapisphere session is synchronized around a Working-Deck 116 of one or more Tap-Boards (e.g., 118*a*-118*c* and 110). The Working-Deck 116 is a running record of Tap-Boards created during each Tapisphere session and is automatically stored as a retrievable resource called a Tap-Deck 120. Stored Tap-Decks can be reloaded from previous sessions as the Working-Deck. Other Tap-Boards 118*a*-118*c* in the Working-Deck 116 are maintained virtually off screen and can be navigated back and forth, similar to rolling analog whiteboards side-to-side in a lecture hall.

A single Tap-Board 110 is displayed from the Working-Deck 116 at a time and is replicated across the Tapisphere filling all the current screen displays 106*a*-106*f* logged into the same Tapisphere. All the devices share the same minimalist interface lacking any visible graphical controlling artifacts such as menus, toolbars, or scrollbars. This facilitates operation on small device screens such as 106*e* and 106*f*.

A Tapisphere session can have a principle presenter 122 such as a teacher, or rotating on-line collaborative session leader that is in control of session content generation, and/or in control of session navigation around Tap-Board, Tap-Deck, and Tapistry content. The Shared-Context is synchronized using a set of messaging channels 124 that include context (C), navigation (N), and audio (A) channels. The context (C) messages 126*a*, generated by the Glyphs, synchronize the content among the distributed Tapistries ensuring additions and edits are mirrored across the Tapisphere. The navigation messages (N) 126*b*, synchronize navigation so that all Tapistry sessions are viewing the same content and location within the content. Audio messages (A) 126*c*, broadcast the voice of the speaker/lecturer/presenter/student.

A Tapisphere session may have one or more participants or recipients logged in 128*a*-128*e* that are receiving/watching/listening to the active generation of content materials. In several embodiments, the Tapisphere is responsible for instituting the policies that enforce restrictions, or lack thereof, on who in the session can add content, change content, navigate content, triggering synchronizing events of the Shared-Context across the Tapisphere, and so on.

In several embodiments, the principle mode of interaction with the facility is through a Tracer-Mechanism, that produces temporary annotation strokes called Traces, 130*a*, 130*b*, and 130*c*. The Tracer operates overtop of user content using the whole surface for expression and activation, creating a new channel for software control. The Tracer-Mechanism provides both a passive highlight function to convey emphasis to underlying content, and an active command function to communicate with the software/hardware facility. Tracer annotations are non-destructive to user content and transitory, fading after a period of inaction. The user can optionally interact with the Tracer annotations by explicitly triggering the interpretation of the strokes through one of four gestures (Tap-Trigger, Hold-Trigger, Drip-Trigger, Pause-Trigger). The user's intention is communicated by the type of stroked symbol and the method used to trigger the symbol.

Permanent annotations can be made with the Marker-Mode. The Marker-Mode can both augment a Shared-Context, as well as a Personal-Context. The Personal-Context provides the ability for student/participant notetaking 132 on top of the Shared-Context.

Multi-Device Tapisphere Synchronization Topologies

FIGS. 2A through 2D are block diagrams showing several Tapisphere 100 (FIG. 1) synchronization topologies in some embodiments. The Figures illustrate the differences in the messaging channel patterns within each topology tied to the intended use case. These are not the only topologies available to the facility, but give an idea of the ways the Tapisphere can be configured to take advantage of the Shared-Context synchronization across multi-device Tapisphere sessions.

3D-Brainstorming

Figure 2A:
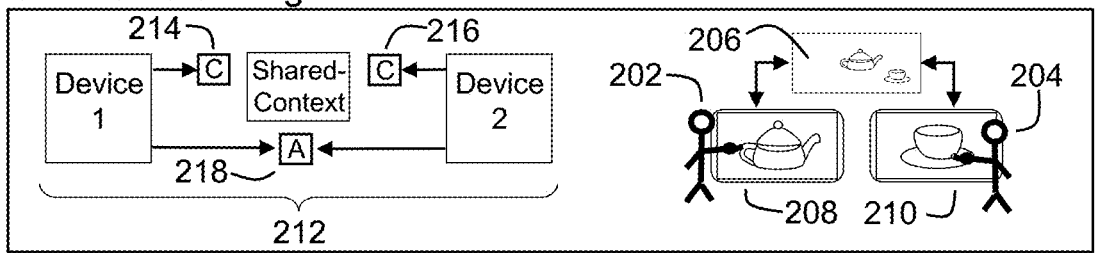
FIG. 2A is a block diagram showing a multi-device Tapisphere synchronization topology called 3D-Brainstorming that allows one or more users to alter a shared context simultaneously from one or more devices in some embodiments.

FIG. 2A is a block diagram showing a multi-device Tapisphere synchronization topology called 3D-Brainstorming that allows one or more users 202, 204 to alter a shared context 206 simultaneously from one or more devices 208, 210 in some embodiments. The Tapisphere synchronization 212 is composed of messages for context synchronization 214, 216 that maintain a replica of the shared information context across all devices in the current Tapisphere session. In the 3D-Brainstorming mode, audio messages 218 are sent between all users to create an open two-way communications channel. In several embodiments, navigation is not synchronized in the 3D-Brainstorming mode, thus allowing users to operate across the Shared-Context at different places in the information space simultaneously. The Tapisphere is responsible for instituting a mutual exclusion locking protocol on a Glyph-by-Glyph basis to ensure no-collisions occur with simultaneous edit race-conditions.

Lecture-Palette

Figure 2B:
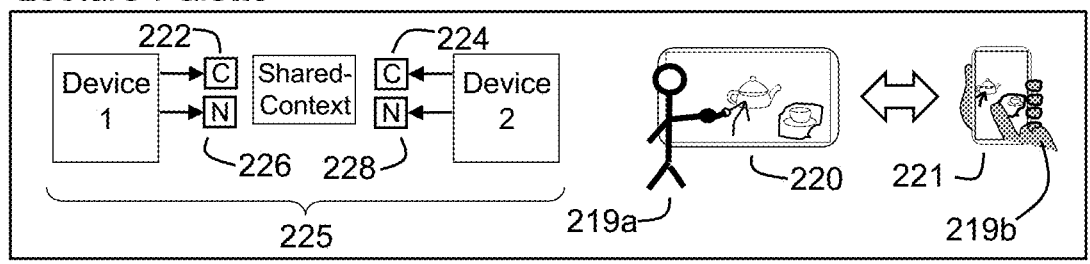
FIG. 2B is a block diagram showing a multi-device Tapisphere synchronization topology called 3-D Mouse/Lecture-Palette configuration in some embodiments.

FIG. 2B is a block diagram showing a multi-device Tapisphere synchronization topology called a Lecture-Palette configuration in some embodiments. This scenario synchronizes one or more devices 220, 221 so that they exactly mirror each other. This allows an auxiliary mobile device 221 to be used for presentation interactions that allow the teacher/presenter/speaker/leader 219*a*, 219*b* to move about the room interacting with the Shared-Context interchangeably through either device 220 or 221. In the Lecture-Palette mode of operation, the Tapisphere synchronization 225 includes content messages 222, 224 as well as navigation messages 226, 228 that cause both devices to exactly mirror one another.

3D-Lecturing/3D-Notetaking

Figure 2C:
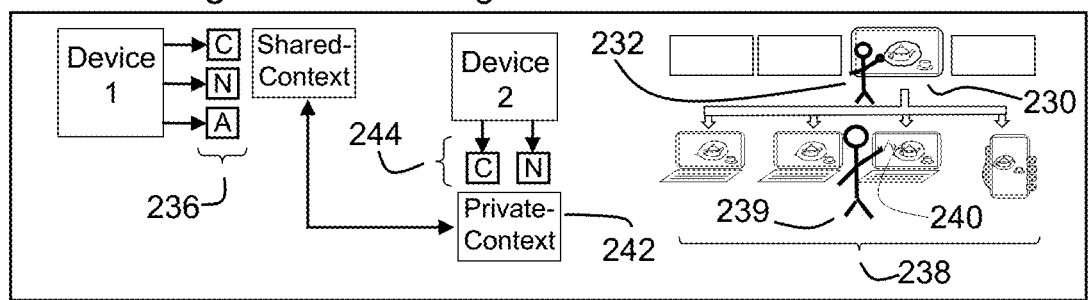
FIG. 2C is a block diagram showing a multi-device Tapisphere synchronization topology called 3D-Lecturing/3D-Notetaking in some embodiments.

FIG. 2C is a block diagram showing a multi-device Tapisphere synchronization topology called 3D-Lecturing/3D-Notetaking in some embodiments. In this configuration, a Tapisphere synchronizes the Shared-Context across one or more devices with one device serving as the principle presentation device 230. This device is operated by a teacher/presenter/speaker/leader 232. This teacher produces content that is distributed (synchronized) to one or more reception devices 238 logged into the Tapisphere session. The Tapisphere synchronization channel messages 236 can be transmitted in one direction and include content, navigation, and audio channel message types. In this scenario, the device of the student/audience/participant/follower 238, tracks the speaker 232, following the presentation and receiving new content as it is produced. The audio messages provide the capacity to conduct virtual classrooms across the internet. The Shared-Context can be augmented 240 by the student 239, creating personal notes that are combined with the Shared-Context material to create a Private-Context 242. This is referred to as 3D-Notetaking. In several embodiments, while 3D-Notetaking, the content editing and navigation 244 are controlled by one or more students, allowing them to break away from teacher/presenter directed navigation in order to dwell at a particular Tapistry location in the information space to add annotations. When the student is done adding notes, they can trigger navigation resynchronization using a Tracer-Gesture causing their device to once again join the lecture presentation.

3D-Forum

Figure 2D:
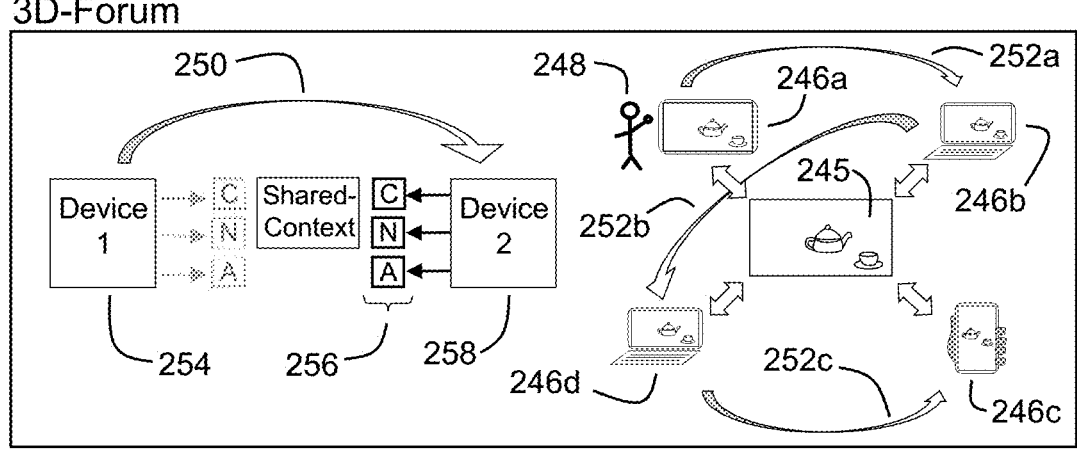
FIG. 2D is a block diagram showing a multi-device Tapisphere synchronization topology called a 3D-Forum in some embodiments.

FIG. 2D is a block diagram showing a multi-device 246a, 246b, 246c, and 246d Tapisphere synchronization topology called a 3D-Forum in some embodiments. In this scenario, there is only one designated speaker/leader 248 at a time controlling the synchronization channel. During the session, the speakership position can change 250, rotating to different participants. The Tapisphere synchronizes the Shared-Context 245 across the devices based on which device is the active speaker. The speakership role can change often 252a, 252b, and 252c. The speakership is transferred to a different device 258, in response to a speaker-request protocol implemented with the Tracer-Mechanism. The device of the new speaker takes charge of the messaging channels 256 until another user requests, and is granted, the 3D-Forum speaker position. The audio channel allows all participants to hear the current speaker. In several embodiments, one or more devices in the Tapisphere session track the navigation of the leader as he/she moves around the Shared-Context.

Information Space Architecture

Figure 3A:
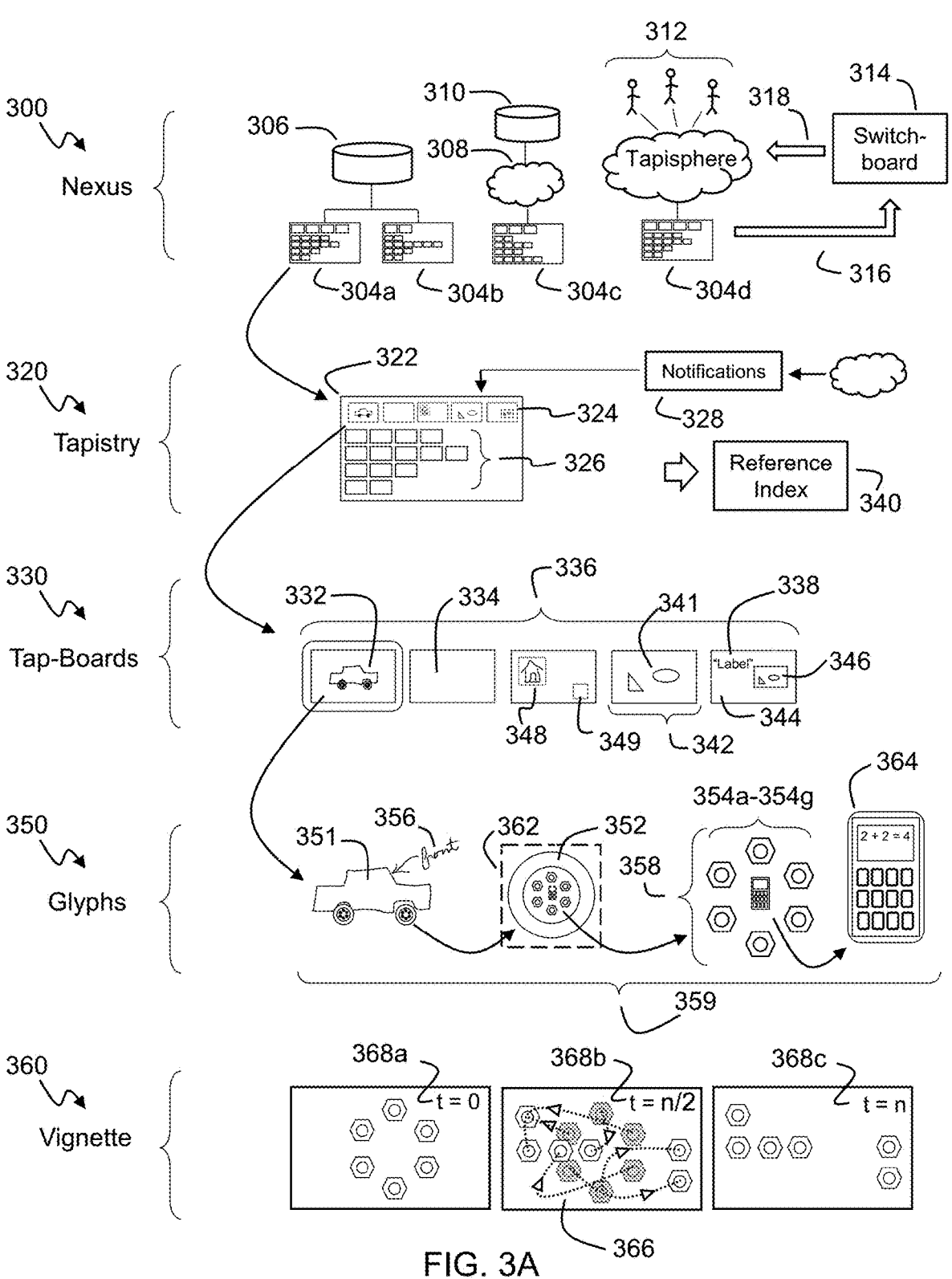
FIGS. 3A and 3B are block diagrams that defines the organizational hierarchy that structures user-generated content into a navigable information space in some embodiments.
Figure 3B:
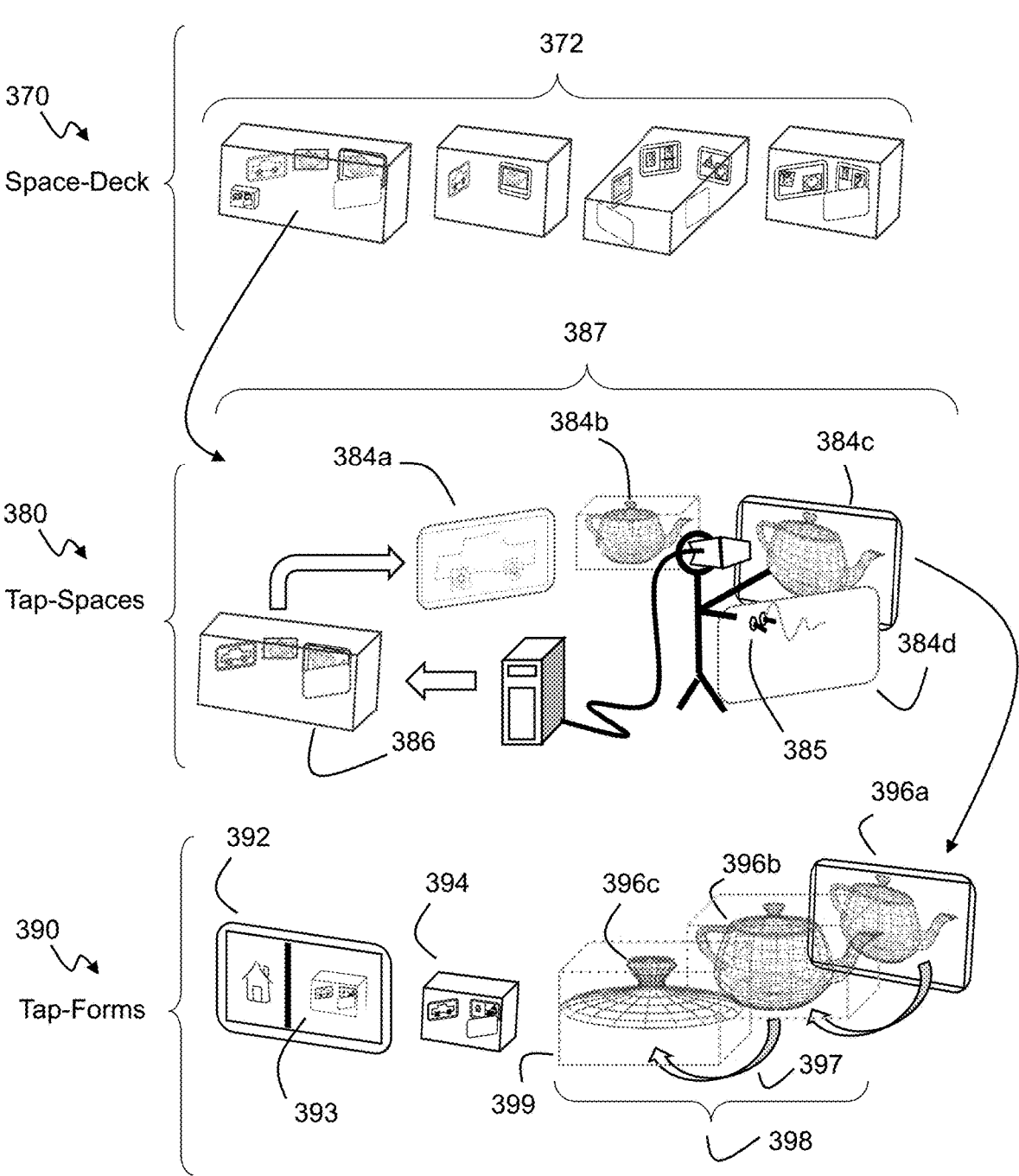

FIGS. 3A and 3B are block diagrams that define the organizational hierarchy that structures user-generated content into a navigable information space in some embodiments. This organization provides the opportunity to implement the navigation gestures described later.

Nexus

The top of the user information space is a spanning level called the Nexus 300 that spans one or more Tapistries 304a, 304b, 304c, 304d. Tapistries can reside on one or more storage devices 306 directly on the users computing device, or stored and accessed through a network 308 connected to a server storage platform 310. The Nexus is the user's start point for entering a Tapistry and presents a thumbnail view 304a-304d of the Tapistry Gallery 322. Tapping one of the Tapistry thumbnails loads the selected Tapistry as the current information space and starts a new session Working-Deck 324. Tapisphere sessions 312 are launched from the Nexus, to create multi-user collaborative sessions such as those illustrated previously in FIG. 2. Tapisphere sessions are formed up using a centralized switchboard directory 314 that allows users to register new Tapisphere sessions 316 or join (log into) ones already in progress 318. The central switchboard 314 can institute access controls based on associations, user groups, institution affiliations, physical locations, etc.

Tapistry

A Tapistry 320 is a virtual collection of user Tap-Board content 330 organized into a single, self-contained information space. This consolidated collection is displayed to the user as a gallery of Tap-Board thumbnails 322. Each Tapistry can maintain a record of previous session Tap-Decks 326 as well as the current Working-Deck 324. The Working-Deck 324 is the active set of Tap-Boards for the session. In a Tapisphere session, the Working-Deck 324 can be synchronized so that each participant sees the same Tap-Board content. Any new Tap-Boards created during the session are added to the current Working-Deck. The Working-Deck serves as an overview of the lecture session and allows quick navigation, returning to previously created Tap-Boards. Working-Decks can be stored on a scrollable stack of Tap-Decks 326. When a Tap-Deck is selected, it is loaded as the new Working-Deck 324 saving the current Deck on the stack 326. A Tapistry can serve as a convenient container for topical information such as a course, project, or topic.

Several resources are maintained across a single Tapistry. This includes a set of Tap-Macros configurable by the user that can operate when logged into the Tapistry. In addition, the user can give Tap-Boards a distinctive name/label/title that allows the Tap-Board to be referred to during several Tracer-Mechanism operations that employ Voice User Interface (VUI) methods. The Tapistry indexes these user-provided name spaces for rapid retrieval.

Tapistry Storage and Addressing

The Tapistry administers the storing of Tap-Boards for the user, and maintains this storage. As mentioned above, storage can be implemented using single file system directory tree or other means such as a database technology (including, but not limited to distributed database technology). This consolidation and management allows the relative references between Tap-Boards to remain stable during relocation of the entire Tapistry storage medium.

Each Tap-Board is given a unique identifier within the Tapistry it belongs. This allows references to be made to a particular Tap-Board from within other Tap-Boards in the same Tapistry. Content on the Tap-Board, in the form of Glyphs 350, continue this unique naming convention creating addressable end-points that create a hierarchical naming reference system, similar to a hierarchal file directory structure. This content addressing provides support for information spanning functionality and content synchronization messages that establish relationships across the information space. A Tapistry can be moved or copied between devices and platforms without disrupting inter-content dependencies. A Tapistry functions as an extended document that continuously grows, can be passed around on storage medium, and transmitted across the network. A unique ID is also assigned to each Tapistry to facilitate routing of notification messages between Tapistries 328.

Tap-Board

Tap-Boards 330 are an unstructured, zoomable digital medium, emulating the blank surface of a whiteboard or sheet of paper. The medium serves as the primary organizational form for captured user content 332. The Tap-Board presents a minimalistic approach to user interface design and is devoid of any visible graphical control elements 334.

The user interacts with the Tap-Boards 330 through a set of finger Gesture-Modes that are used to create and navigate content. These Gesture-Modes include the Navigation, Tracer, Marker, Stage, and Flow Modes. The Tap-Board is a unique storage entity within a Tapistry which maintains data persistence across time. The Tapistry automatically takes care of Tap-Board storage, generating unique naming identifiers for the content files.

Users can revisit Tap-Boards by finding their thumbnails in the Tapistry Gallery 326. Tap-Boards are grouped into previously accessed session Tap-Decks 336. Tap-Boards can belong to one or more Tap-Decks and map to the same file content. Changes to a Tap-Board in one Tap-Deck are reflected in other Tap-Decks. Tap-Decks can be remixed by dragging and dropping Tap-Boards within the Gallery to create new Working-Decks. This allows Tap-Boards to be reused. A Tap-Board 342 can be embedded within another Tap-Board 344 as a Tap-Way 346. The Tap-Way is a Glyph/Tap-Form that allows the user to easily travel among Tap-Boards/Tap-Spaces using a simple Tap-In gesture similar to hyperlinks. This creates the capability for the user to construct custom navigable connectivity within a Tapistry.

Tap-Boards can be tagged 338 by the user with a label or name to provide the ability to reference the Tap-Board by name using speech recognition. Several Tracer-Gesture mechanisms use this feature to build information retrieval/dispositioning capabilities. The Tapistry consolidates these labels into a reference index 340 that is used for look-up. These named/labeled Tap-Boards can serve as both destination and source containers for sending and retrieving content. Related to Tap-Board labeling is the association of a Pictograph 348 that the user provides to create a custom retrieval mechanism based on the Tracer-Mechanism (described under Tap-Macros).

Glyphs

Glyphs 350 are the form of information content on the Tap-Board providing a hierarchical structuring mechanism responsible for delivering a 3D-Whiteboarding like capability. All content on the Tap-Board is embodied as Glyphs. Glyphs 351, 352, 354a-354g, can range from a simple sketch, picture, or shape 349, all the way to complex Tap-Tools 364 such as a calculator, calendar, or browser. Glyphs serve as functional building blocks that can be aggregated and connected using Tap-Links into simulation structures called Tap-Rigs. Glyphs are fetched and placed on the Tap-Board using the Tracer gestures which simultaneously define the Glyph type, position, size, and structuring relationships.

Each Glyph instance serves as a platform for capturing local Marker-Mode annotations 356. These annotations move with the Glyph and are relative to the Glyph's local coordinate frame of reference. Glyphs serve as a recursive container for other Glyphs embedded as Sub-Glyphs 358. This provides the ability to assemble information scaffolding structures called Tap-Trees 359 that organize and span user content. Tap-Trees are navigated using a Tap-In/Tap-Out gesture pair that zooms the Tap-Board based on the Glyph extent 362. The Tap-Board serves as the implied base container for all root Glyphs 348, 349, and aggregates them into a combined extent that serves as the overview.

Glyphs serve a variety of purposes. Some notable Glyph types that will be mentioned in this application are the Tap-Way 346 (an embeddable Tap-Board/Tap-Space link), the Tap-Layout (captured multi-view layouts), the Tap-Shape 341 (2D graphic geometry), the Tap-Model (3D graphic model), the Tap-Macro (customized function), and the Tap-Blank 348 (Pictograph Label). Another important class of Glyphs are Tap-Tools 364 characterized by their app-like quality to deliver functionality. The Tap-Tool brings with it a custom interface that takes over the Tap-View, but closely interacts with the underlying Tap-Board surface. The Tap-Tool stores its information state with the Glyph maintaining data persistence.

Vignettes

A Vignette 360 is an animation of content that can be replayed. Each Glyph/Tap-Form has the capacity to record a Vignette, and maintains a frame of reference timeline 368a, 368b, 368c that timestamps Sub-Glyph/Sub-Form movements 366, and annotation strokes. This captures the act of sketch creation or Sub-Glyph/Sub-Form movement. Vignettes are created and controlled using the Stage and Flow-Gestures described later. Using these Gestures, parallel path animations can be staged and captured at each Glyph/Tap-Form to produce simultaneous movements of content when replayed. Vignettes can be replayed at any hierarchical level, allowing either global replay sequences, or more selective local replay sequences. The user can manually sequence the Vignette through a set of intuitive swirl gestures that sequence the Vignette back and forth through time.

Space-Deck

The Space-Deck 370 is the 3D equivalent of the Tap-Deck in AR/VR for organizing Tap-Spaces and allowing the user to span several active Working-Spaces 372 simultaneously. The Working-Space 387 is the environment that the user is currently immersed in. The Space-Deck creates the illusion of adjacent Tap-Spaces that can be switched-out (scrolled) using the Tracer-Roll Gesture described later, to jump back and forth between two of more Tap-Spaces 372.

Tap-Spaces

The Tap-Space 380 is the 3D equivalent of the Tap-Board in AR/VR virtual environments, and serves to capture user content in an infinite 3D volume. The content in a Tap-Space is displayed as 3D virtual structures called Tap-Forms 384a, 384b, 384c, 384d and 386. A special type of Tap-Form is the Tap-Display 384a, 384c, 384d used to access Tap-Board content while in a Working-Space. The user interacts with the Tap-Displays using the same Gesture-Modes 385 that will be described later. A Tap-Space can be recorded and embedded within a Tap-Space as a Tap-Way 386.

Tap-Forms

The Tap-Form 390 is the 3D equivalent of the Glyph in AR/VR and serves as a hierarchical container for user content 396a, 396b, and 396c. Tap-Displays 392, 396a are a special type of Tap-Form and provide access to Tap-Board information content.

Tap-Spaces can be stored on Tap-Boards as a Tap-Way Glyph showing a thumbnail 393 of the Tap-Space. A Tap-Space can also be embedded in another Tap-Space as a Tap-Way Form 394. A Tap-Display interface with an embedded Tap-Model Glyph 396a, transforms into a Tap-Form equivalent 396b when Tap-Triggered. Tap-Forms are embeddable in other Tap-Forms 398 as Sub-Forms. Using the same Tap-In/Tap-Out Gesture pattern, the Sub-Form zooms 397 to fill the parent volume extent 399.

The Gesture Control System described later capitalizes on this hierarchical structuring of user content to deliver frictionless navigation across the information space.

Display/Control Surface Structuring

Figure 4:
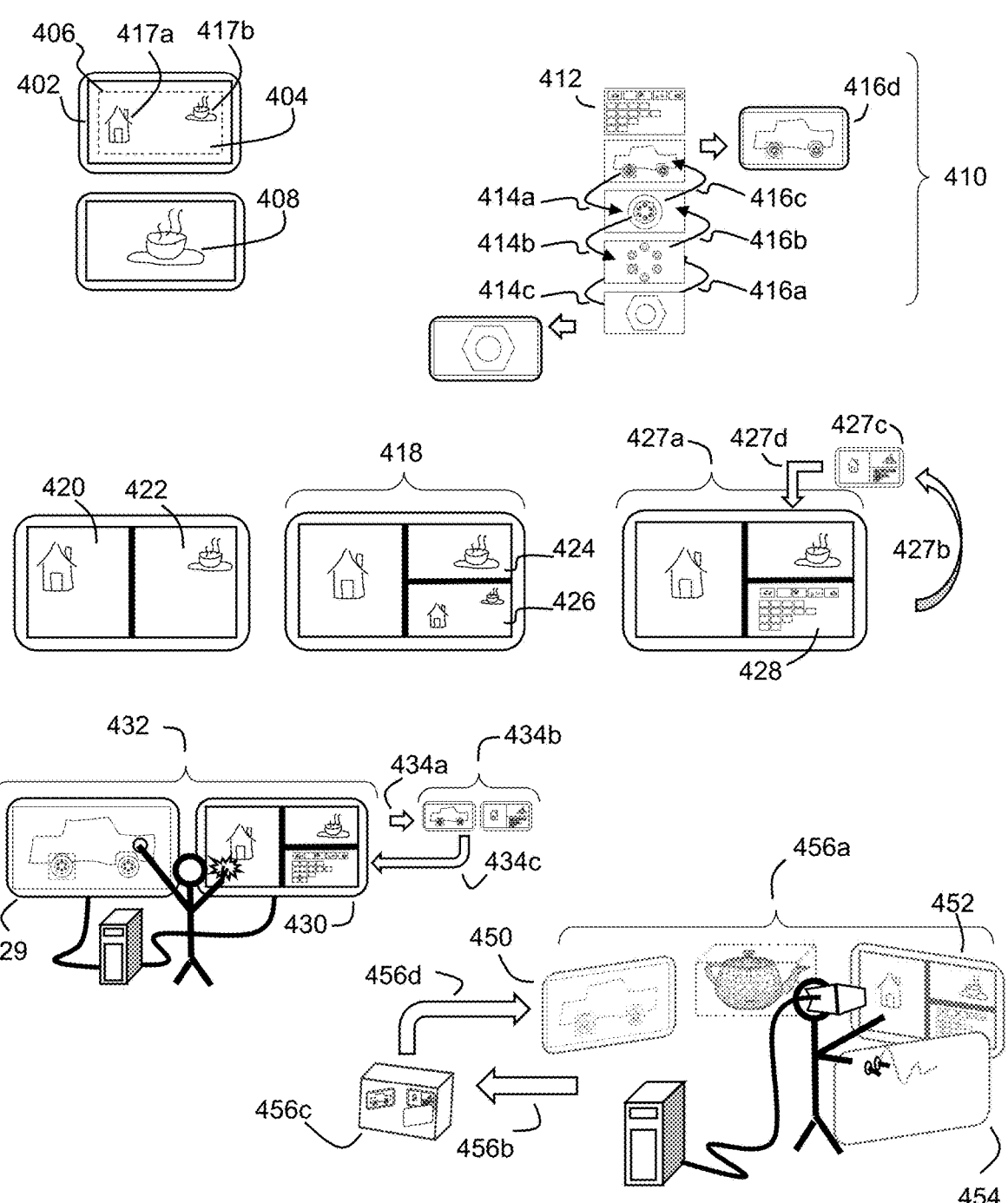
FIG. 4 illustrates the Display/Control Surface Structuring in some embodiments.

FIG. 4 illustrates the display/control surface structuring used to create reusable multi-view information layouts. The main organizational element is the Tap-View 402 which is an area of the display that serves as a controlling surface for viewing and navigating Tap-Board content 404 in some embodiments. A Tap-View can be navigated to any point in a Tap-Board from a birds-eye overview 406 to an individual Glyph extent 408. Each Tap-View is responsible for tracking the context stack 410 generated while navigating content. Each Tap-View keeps track of its own Tapistry context 412 allowing each Tap-View to point to a different location in the Tapistry. Each Tap-View tracks navigation down into Tap-Trees by storing Tap-Board extents 414a, 414b, and 414c with each Tap-In. The Tap-View restores Tap-Board extents on Tap-Out 416a, 416b, 416c, 416d. The overview extent includes all Root-Glyphs 417a, 417b on the Tap-Board. Once the overview is reached, another Tap-Out moves out of the Tap-Board back up to the Tapistry Gallery 412 or a previous Tap-Board.

Tap-Layouts

The display surface can be subdivided into multiple Tap-Views becoming a Tap-Layout. Each Tap-View 402 can be split in two 420, 422, using a vertical or horizontal Tracer gesture. Each of these new Tap-Views manage their own Tap-Stack 410 and, at first, point to the same Tap-Board 404. Each Tap-View 422 can be further split into sub-views 424, 426. This process of sub-division can be repeated many times to create custom multi-panel interfaces 418. Tap-Layouts 427a can be captured 427b as a Glyph 427c (Capture-Gesture described later). The Tap-Layout Glyph can be triggered 427d to reload the Tap-Layout's captured state reconfiguring the display surface. Each view can be navigated to other Tap-Boards or other Tapistries independently 428.

Tap-Layouts can extend to two or more display surfaces 429, 430 on a multi-monitor systems 432. These multi-surface layouts can be recorded 434a as a Glyph 434b which can be Tap-Triggered to reload 434c the multi-monitor layout state.

Tap-Spaces

In a Working-Space of an AR/VR simulation environment 456a, Tap-Views are hosted on virtual Tap-Displays 450, 452, and 454. Each Tap-Display can be subdivide into multi-view Tap-Layouts 452. When a Tap-Space 456a is captured 456b as an embedded Tap-Way 456c, the Tap-View content for each Tap-Display is recorded. When a Tap-Space is reloaded 456d the Working-Space is reloaded with the Tap-Displays and their Tap-Layout content. This creates the ability to rapidly switch back and forth between entire room configurations in an AR/VR environment.

Compound Gesture Structuring

Figure 5:
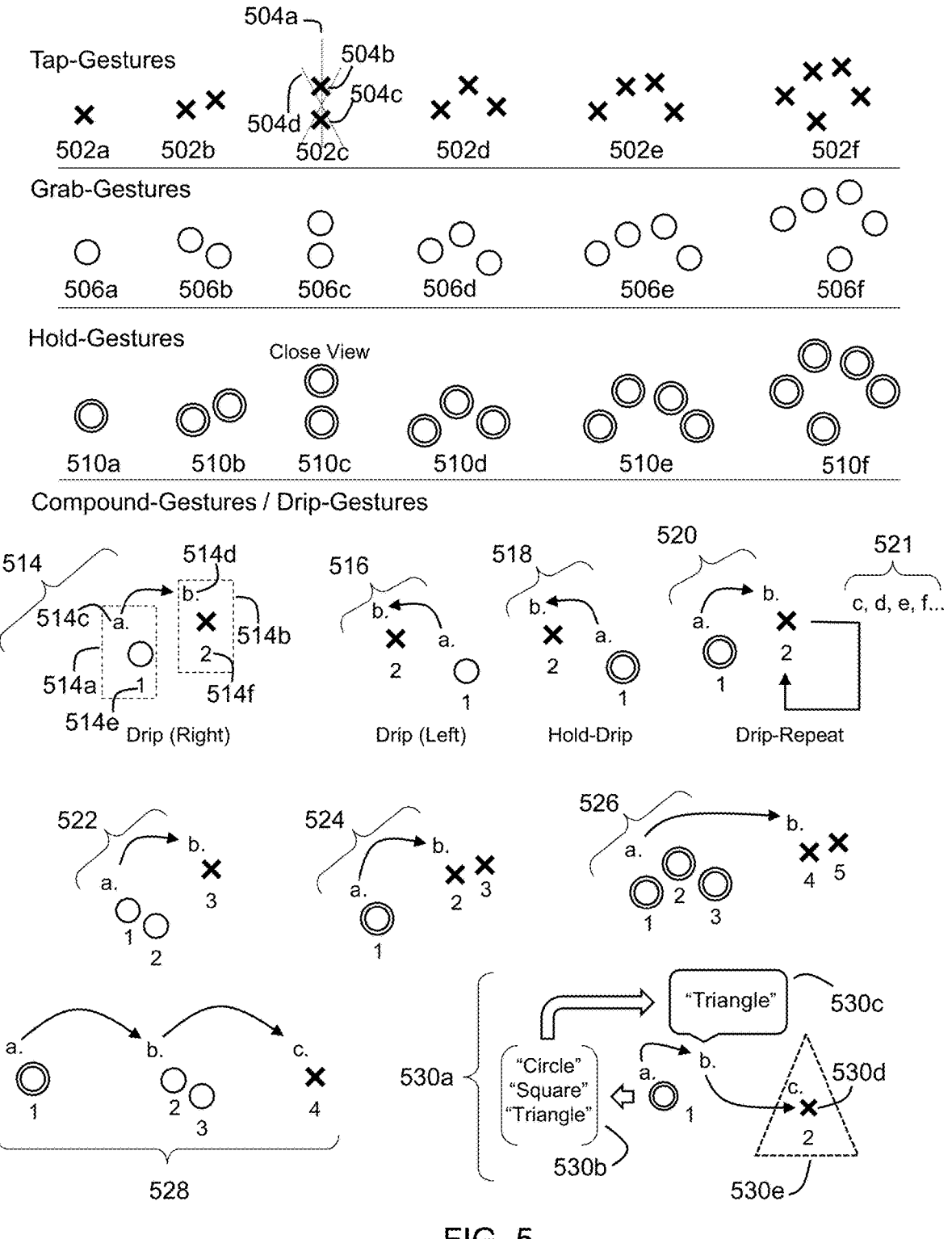
FIG. 5 illustrates the structuring of touch surface events into discrete gestures and compound gestures used to implement the Gesture Control System in some embodiments.

FIG. 5 illustrates the structuring of touch surface events into discrete gestures and compound gestures used to implement the Gesture Control System in some embodiments. Once formed, the Gestures are routed down through the visual hierarchy directly under the Gesture. This routing is done top-down giving each element a chance to claim the Gesture. If claimed, routing is discontinued and the element becomes the owner of the Gesture event for the duration of that Gesture. While the Gesture touchpoints remain in contact with the surface, subsequent events related to the Gesture (e.g. drag, swipe, release, etc.) are routed to the same owner. The owner generates the behaviors in response to the Gesture events. If a Gesture is not claimed by a particular element, the routing continues down through the visual stack. In the case of a Tap-Board, this visual stack is a hierarchal parent/child ancestry structure similar to an inverted Tap-Stack 410. If no Glyphs in the stack claim the Gesture, the Tap-Board is given a chance to claim the Gesture. If the Tap-Board does not claim the Gesture, then the Tap-View, and finally the entire display is given an opportunity to claim the Gesture and respond with behaviors.

Tap-Gestures

Tap events are represented as 'x's positioned at the surface location of each finger touchpoint. Tap-Gestures 502a-502f are collections of individual touchpoint tap events that occur simultaneously and are gathered up into a single gesture. A tap event is defined by a finger touching the tap surface and being lifted before the expiration of a Grab-Timer started with each touch down event. Multiple touchpoints are gathered up into a single Tap-Gesture if they occur in close proximity in time to each other. The flow chart implementation of this process is described in FIGS. 52 through 59. Example Tap-Gesture types include: single-finger Tap 502a, two-finger Tap 502b, three-finger Tap 502d, four-finger Tap 502e, five-finger Tap 502f, and so on. Touch gestures constructed from more than one touchpoint are shown with the symbols grouped closely together. The relative location can, in some instances, be used to further differentiate the gesture. One such Gesture is the Vertical-Tap 502c which is defined by two touchpoints that occur in a vertical line 504a with respect to the display surface's vertical orientation. This vertical is determined by the angle defined by the centers of each touchpoint 504b, 504c with respect to the vertical reference. A Vertical-Tap is generated if this angle is within a threshold value 504d.

Grab-Gestures

Grab events are represented as 'o's positioned at the surface location of each finger touchpoint. Grab-Gestures 506a-506f are collections of individual touchpoint grab events that occur simultaneously and are gathered up into a single gesture. A Grab event is defined by a finger touching the tap surface and remaining in contact with the surface until the expiration of the Grab-Timer. The Grab-Timer is restarted with each down touch event. Multiple touchpoint grab events are gathered up into a single Grab-Gesture if they occur before the Grab-Timer expires. The flow chart implementation of this process is described in FIGS. 48 through 53. Example Grab-Gesture types include: single-finger Grab 506a, two-finger Grab 506b, Vertical-Grab 506c, three-finger Grab 506d, four-finger Grab 506e, five-finger Grab 506f, and so on. Grab gestures constructed from more than one touchpoint are shown with the symbols grouped closely together.

Hold-Gestures

Hold events are represented as two concentric circles positioned at the surface location of each finger touchpoint. Hold-Gestures 510a-510f are triggered from a single Grab-Gesture that does not move significantly for the duration of a Hold-Timer that is launched when the Grab-Gesture is established. If the Grab-Gesture moves further than a maximum threshold, the Hold-Timer is canceled. If the Hold-Timer expires, a Hold-Gesture is generated with the number of touchpoints equal to the Grab-Gesture touchpoints. Example Hold-Gesture types include: single-finger Hold 510a, two-finger Hold 510b, Vertical-Hold 510c, three-finger Hold 510d, four-finger Hold 510e, five-finger Hold 510f, and so on.

Compound-Gestures

Compound-Gestures are formed from a sequence of discrete Tap, Grab and Hold-Gestures. A Compound-Gesture 514 is composed of one or more discrete gestures 514a, 514b. A Compound-Gesture requires that the first gesture be established and still active at the time of the second gesture. Thus, the first gesture can be either a Grab or Hold gesture that is still active (touchpoints down) and owned by a graphical element. When a subsequent Gesture is formed 514b, the first Gesture 514a is given the opportunity to claim this second Gesture 514b. The owner of the first Gesture 514a determines whether to claim the secondary gesture. Once claimed as a secondary Gesture, events associated with the secondary gesture are routed to the first gesture's owner. In the Figures, sequencing of a Compound-Gesture is indicated by the use of lowercase letters 514c, 514d to indicate the order of the Gesture operation. Numbers under the touch point symbols 514e, 514f are used to identify the finger number of the Compound-Gesture indicating the current count of touchpoints involved in the gesture.

Drip-Gestures

A Drip-Gesture is a Compound-Gesture characterized by a Tap event as the secondary Gesture. Several examples of the Drip-Gesture are shown 514, 516, 518, 520, 522, 524, and 526. Drip-Gesture 514, 516 are used extensively in the Gesture Control System. A Drip-Gesture can be repeated 520 while maintaining the same primary gesture, as indicated by the c, d, e, and f taps 521. In some cases, the position of the second gesture is relevant as in Drip-Right Gesture 514 that requires that the secondary Tap-Gesture 514b occur to the right of the first Hold-Gesture 514a and Drip-Left 516 which requires the Tap-Gesture occur to the left of the first Hold-Gesture.

Compound Gesture Variations

Compound-Gestures can communicate variations in meaning based on the number of touchpoints used for establishing the first gesture and the number of touchpoints used to execute the second gesture. Compound-Gestures 522, 524, 526 illustrate touch count modifications to the event. Gestures can be chained together into higher order Compound-Gestures with three or more sequential gestures. Gesture 528 shows a third order version.

Vocal Modification of Compound-Gestures

Voice commands (Vocals) can be used to modify the meaning of Compound-Gestures 530a. A Vocal is defined as a verbal keyword spoken by the user, paired with a command action, or named property. When the first gesture is claimed, the owner of the gesture registers a context dependent list of possible modifier words 530b with the Voice User Interface (VUI) system. The VUI is one or more device/operating system technologies that implement a speech recognition engine to recognize words in the audio stream, collected from the user's device microphone. During the time that the first gesture is active, if a Vocal 530c is recognized by the VUI system, the interpretation of subsequent secondary gestures is modified. In the example, the second Tap-Gesture 530d is modified to create triangle Glyphs 530e with each tap.

AR/VR Fingertip Touch Surface Events

Figure 6:
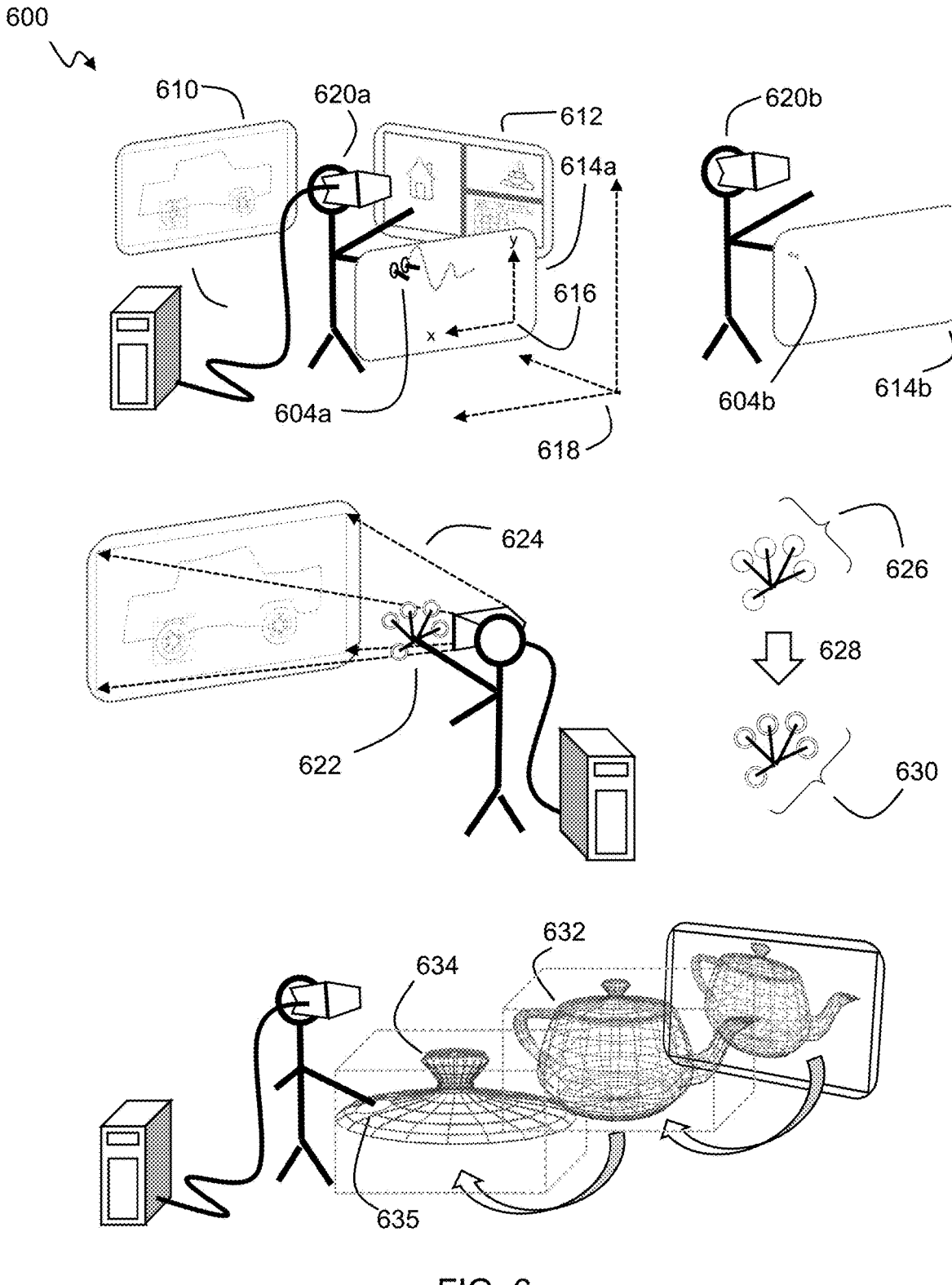
FIG. 6 defines fingertip touch surface events in an AR/VR environment needed to build the navigation and Compound-Gestures of Tapistry in some embodiments.

FIG. 6 defines fingertip touch surface events in an AR/VR environment 600 needed to facilitate navigation and deliver Compound-Gestures in some embodiments. Touch events are defined as intersections of one or more tracked outstretched fingertip locations 604a within a 3D virtual space coordinate system 618, with one or more virtual Tap-Display surfaces 610, 612, 614a, 614b representing 2D planes 616 mapped within the 3D virtual space coordinate system 618. A down touch event is generated when one or more fingertips pass through a Tap-Display 604a defined by the display plane occurring between the user's body 620a and one or more of the out-stretched fingertips 604a. The down touch events are translated into 2D coordinates 616 based on the intersection of the finger structure and the 2D plane 614a defined by the Tap-Display. A touch release event is generated when one or more fingers 604b, that were formerly defined as intersecting the Tap-Display, no longer intersect the display plane, defined as the user 620b and one or more fingertips 604b being located on the same side of the plane 614b.

Grab gestures in an AR/VR environment are defined as one or more outstretched fingers 622 tracked in the user's field of view 624. The recognition of the outstretched finger generates a Grab touch position in 3D space 618 with an x, y, and z coordinate location. One finger outstretched generates a 1-finger Grab event, two outstretched fingers generate a 2-finger Grab, and so on. Multiple fingers are aggregated into a single Grab gesture using the same Grab-Timer that establishes fingers as belonging to the same Gesture. Gesture 626 shows a 5 finger Grab-Gesture.

Grab-Gestures are generated on a Tap-Display through the finger intersections as described above. A Grab-Timer is re-launched with each finger intersection. If the Grab-Timer expires, a Grab-Gesture event is established for the Tap-Display. The 3D Grab-Gesture coordinates are translated into 2D coordinates relative to the Tap-Display's local coordinate system 616.

Hold-Gestures in AR/VR are created when a Grab-Gesture 626 is paused without motion long enough that a Pause-Timer expires. The Pause-Timer is reset every time the Grab-Gesture moves. Holding five fingers up in the user's field of view without motion such that the Pause-Timer is exceeded, generates 628 a 5-finger Hold-Gesture 630 in 3D space. Similarly, a 2D Hold-Gesture event is generated when a 3D Grab-Gesture intersecting a virtual display is held without motion exceeding a Hold-Timer launched when the 2D Grab-Gesture is established on the Tap-Display.

The above Tap-Display intersections are extended to Tap-Forms 632, 634 by treating the 3D shapes as a surface that can be pierced by the fingertips 635. This makes Tap-Forms valid interaction surfaces for all the gesture operations discussed so far. This facilitates the implementation of the Navigation Tap-In/Tap-Out Gestures described later.

Compound-Gesture Spanning Contexts

Figure 7:
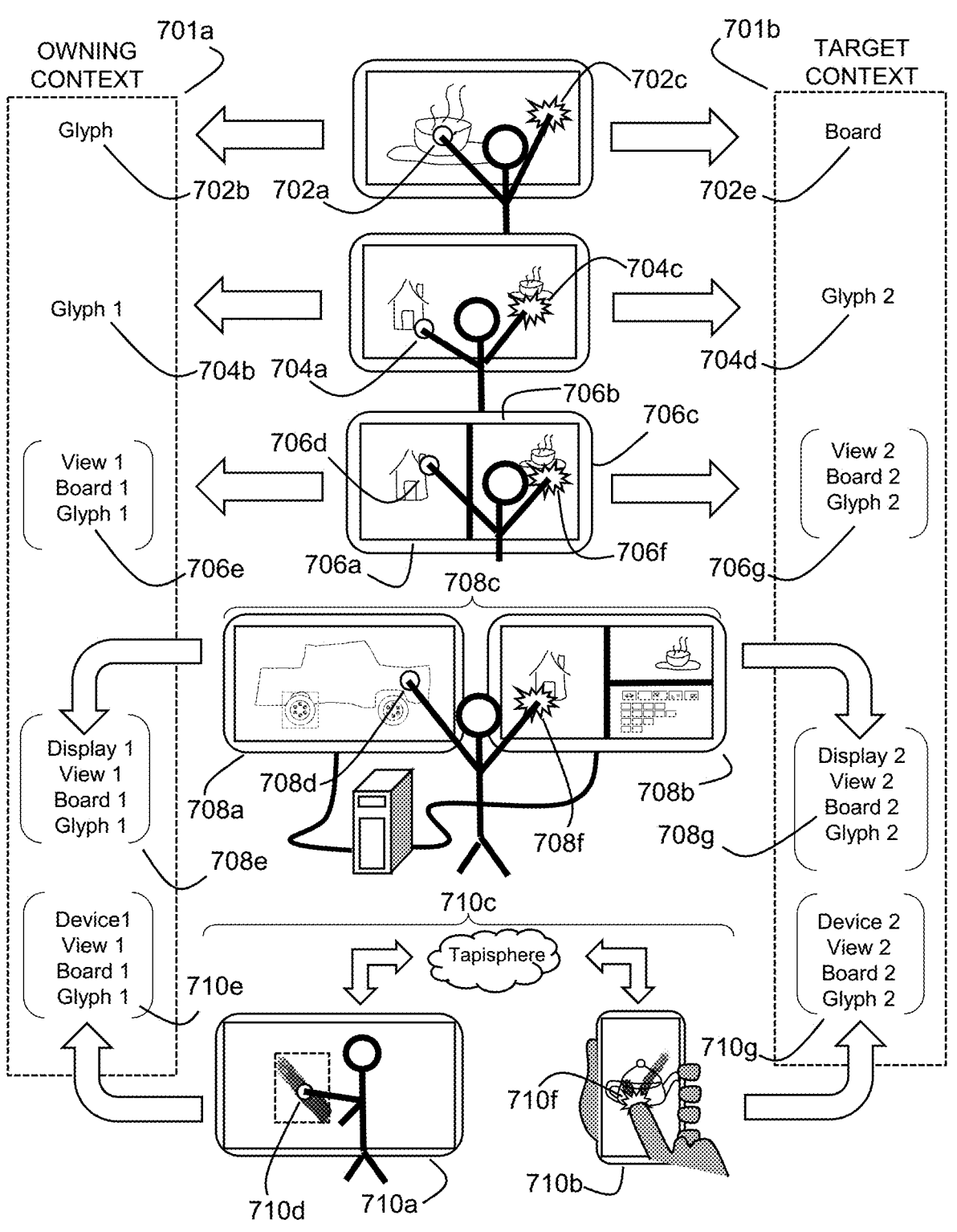
FIG. 7 illustrates several context spanning scenarios using compound gestures in some embodiments.

FIG. 7 illustrates several context spanning scenarios using compound gestures in some embodiments. In a Compound-Gesture, the first gesture establishes an owning context 701a, which is based on the position of the first gesture 702a, and routing to determine which element claims the gesture. Based on the routing this Owning Context can be a Glyph, Tap-Board, Tap-View, Tap-Display, Tap-Form, Tap-Space or Device. While the first gesture is still active, a second gesture is executed 702c. This second gesture can be claimed by the Owning Context 701a established by the first gesture, based on type of gesture, and/or the Target Context 701b over which this gesture was executed. The Target Context is based on the location of the second gesture 702c and can be a Glyph, Tap-Board, Tap-View, Tap-Display, Tap-Form, Tap-Space or Device. If the Owning Context 701a claims the second gesture, it takes control of the gesture, and can perform actions on the Target Context 701b.

In the first scenario, a compound gesture is executed from a Glyph to the Tap-Board. The first gesture 702a is established on a Glyph making it the Owning Context 702b. The second gesture 702c is claimed by the Owning Context 702b based on gesture type and/or the Target Context 702e. The Glyph Owning Context 702b can perform actions on the Tap-Board Target Context 702e in response to the second gesture events 702c.

Glyph-to-Glyph Spanning

In the second scenario, a compound gesture is executed from one Glyph to another Glyph. A first gesture 704a is established on a Glyph making it the Owning Context 704*b*. The second gesture 704*c* is claimed by the Owning Context 704*b* based on the Target Context 704*d* over which the gesture was performed. The Owning Context Glyph 704*b* can now perform actions on the Glyph Target Context 704*d* in response to the second gesture events 704*c*.

View-to-View Spanning

In the next scenario, a compound gesture is executed from one Tap-View 706*a* to another Tap-View 706*b* in a multi-view layout 706*c*. A first gesture 706*d* is established on a Glyph/Board/View within Tap-View 706*a* making it the Owning Context 706*e*. The second gesture 706*f* is claimed by the Owning Context 706*e* based on the Target Context Glyph/Board/View 706*g* over which the gesture 706*f* was performed in Tap-View 706*b*. The Owning Context 706*e* can now perform actions on the Target Context 706*g* in response to the second gesture events 706*f*.

Display-to-Display Spanning

In the next scenario, a compound gesture is executed from one Tap-Display 708*a* to another Tap-Display 708*b* in a multi-monitor system 708*c*. A first gesture 708*d* is established on a Glyph/Board/View/Display within Tap-Display 708*a* making it the Owning Context 708*e*. The second gesture 708*f* is claimed by the Owning Context 708*e* based on the Target Context Glyph/Board/View/Display 708*g* over which the gesture 708*f* was performed on Tap-Display 708*b*. The Owning Context 708*e* can now perform actions on the Target Context 708*g* in response to the second gesture events 708*f*.

Device-to-Device Spanning

In the next scenario, a compound gesture is executed from one Device 710*a* to another Device 710*b* in a Tapisphere multi-device topology 710*c*. A first gesture 710*d* is established on a Glyph/Board/View/Device within Tap-Display 710*a* making it the Owning Context 710*e*. This Owning Context is registered with the coordinating Tapisphere. The second gesture 710*f* is sent to the Tapisphere to determine if there are any currently active Owning Contexts across the networked topology. The second gesture 710*f* is claimed by the Owning Context 710*e* based on the Target Context Glyph/Board/View/Device 710*g* over which the gesture 710*f* was performed on Device 710*b*. The Owning Context 710*e* can now perform actions on the Target Context 710*g* in response to the second gesture events 710*f*.

The spanning ability of Compound-Gestures combined with multi-view layouts create a powerful mechanism for moving content from one point in a Tapistry to another.

Tracer-Mechanism

FIG. 8A illustrates the Tracer-Mechanism and the four methods to trigger Tap-Symbols on a touch surface in some embodiments. The Tracer mechanism is the default mode and generates visible strokes in response to single-finger drags. The strokes are non-destructive and can be made overtop Tap-Board content. The strokes 802*a*, 802*b* are made in response to a single Grab 802*c* touching the surface and dragging. When the finger is lifted from the surface, a repeating Fade-Timer is launched that starts reducing the opacity of the Tracer strokes over a short interval, giving the impression the strokes are fading. Each new stroke, causes all the strokes to be refreshed to full opacity. If additional strokes are not added, the strokes completely fade 802*d*, 802*e*, 802*f*. When the strokes are no longer visible (opacity=0), they are deleted and removed from the interface 802*g*. The user can keep the strokes active by not lifting the drag finger from the surface such that the Fade-Timer is not launched. This mechanism is useful as a presentation aid that assists the speaker in bringing emphasis to content, by circling, underlining, annotating, without regard for having to then erase/delete the annotations.

Tap-Symbols

Tracer strokes can be used to draw shapes on the screen called Tap-Symbols that are triggered by the user to execute actions on the platform. The Tap-Symbols are recognizable pictographs/patterns 804*a* that are tied to specific features. Careful pairing of the Tap-Symbol pictograph with the desired outcome creates a simple mnemonic for remembering the Tap-Symbol functionality. In several embodiments, the Tap-Symbols can be explicitly triggered by the user to avoid inadvertent platform actions in response to casual Tracing, such as highlighting during presentations. Four example methods are shown 804, 806, 808, 810 to trigger the platform to recognize one of the registered Tap-Symbols from the set of strokes currently on screen. All the current strokes are included in the attempt and can be part of the Tap-Symbol. Each trigger method provides the opportunity to have a different interpretation of each Tap-Symbol. Three of the shown trigger methods leave a finger holding the Tap-Symbol after it is triggered 806*d*, 808*f*, 810*e* providing the opportunity to associate further Gesture actions such as dragging or dripping, with functionality tied to the Tap-Symbol. Holding the Tap-Symbol is also used in some cases to register a list of Vocals with the VUI to listen for Tap-Symbol specific commands or references. In such cases, the Vocals remain active while the Tap-Symbol is held, and are deactivated when the symbol is released. This creates a Touch-To-Talk feature that reduces inadvertent, spurious recognition of command words that were not intended by the user. The Touch-To-Talk feature provides an explicit mechanism for cueing VUI abilities. This also has the added benefit of preserving CPU bandwidth by reducing the amount of time the platform spends listening for keywords.

Tap-Trigger

The first example trigger mechanism is the Tap-Trigger which is accomplished by tapping 804*b* somewhere within the extent 804*c* of the drawn symbol 804*a* before it is done fading 802*g*. The Tap-Gesture causes all the strokes currently active on the screen to be used in an attempt to try and recognize the strokes as one of many predefined Tap-Symbols. If a Tap-Symbol is not recognized in response to the tap, the Tracer strokes are cleared. If a Tap-Symbol is recognized, the strokes are cleared and replaced with a clean version of the recognized Tap-Symbol pictograph 804*d* rendered by the platform and sized and positioned to match the user's strokes. This provides feedback to the user that a Tap-Symbol was successfully received and triggered. The platform then executes Tap-Trigger actions defined for the recognized Tap-Symbol. When the actions are complete the pictograph is removed. Variations of the Tap-Trigger can be accomplished using multi-finger Tap-Gestures that can produce differentiated action interpretations.

Drip-Trigger

The Drip-Trigger 806 example is the quickest of the four methods. At the end of the final stroke 806*a*, a Drip-Gesture 806*b* triggers the attempt to recognize a Tap-Symbol. If a Tap-Symbol is recognized, the strokes are cleared and replaced with a clean version of the recognized Tap-Symbol pictograph 806*c* rendered by the platform and sized and positioned to match the user's strokes. The platform then executes Drip-Trigger actions defined for the recognized Tap-Symbol. After the Tap-Symbol is triggered, the drag finger is still holding the Tap-Symbol 806*d* providing the opportunity to define auxiliary functionality around VUI Vocals and/or Compound-Gestures. For instance, while the Tap-Symbol is held, repeated drips can be used to trigger repeated actions. Possible Drip-Trigger variations include executing the Drip-Gesture with multi-fingers, producing more options for action interpretation.

Hold-Trigger

The Hold-Trigger is executed with a Hold-Gesture 808b (a Grab-Gesture that does not move) performed within the extent of the strokes 808c. The Hold is important to ensure that the Grab is not interpreted as an additional Tracer stroke. The strokes are grabbed before they have completely faded. At the expiration of the Hold-Timer 808d, a Hold-Event is triggered causing the platform to attempt to interpret a Tap-Symbol from the set of Tracer strokes. If the set of strokes is recognized, they are cleared and replaced with a clean version of the recognized Tap-Symbol pictograph 808e, rendered by the platform. If no Tap-Symbol is recognized, the strokes are left on the screen assuming the user is only pausing the fade. After the Tap-Symbol is triggered, the Hold-Gesture is still active 806f providing the opportunity to define auxiliary functionality around VUI Vocals and or Compound-Gestures. Possible Hold-Trigger variations include executing the Hold-Gesture with multi-fingers, producing more options for action interpretation.

Pause-Trigger

The Pause-Trigger is executed by pausing at the end of the last stroke 810a of the symbol. A Pause-Timer 810b is constantly reset while Tracer strokes are actively being made 810c. Movements of the Tracer finger constantly reset (restart) the Pause-Timer or, if all touch points are released, the Pause-Timer is canceled. Only if the Pause-Timer is active and the Tracer finger is still, can it expire thus triggering an attempt to recognize a Tap-Symbol from the accumulated Tracer strokes. If the set of strokes is recognized, they are again cleared and replaced with a clean version of the recognized symbol 810d rendered by the platform. If no Tap-Symbol is recognized, the strokes are left on the screen assuming the user is only pausing the fade by holding the stroke. The Pause-Trigger 810e is an effective trigger mechanism in AR/VR because it only requires that the hand/finger stop and pause at the end of a mid-air Tracer stroke.

Tracer-Mechanism in AR/VR Environments

Figure 8B:
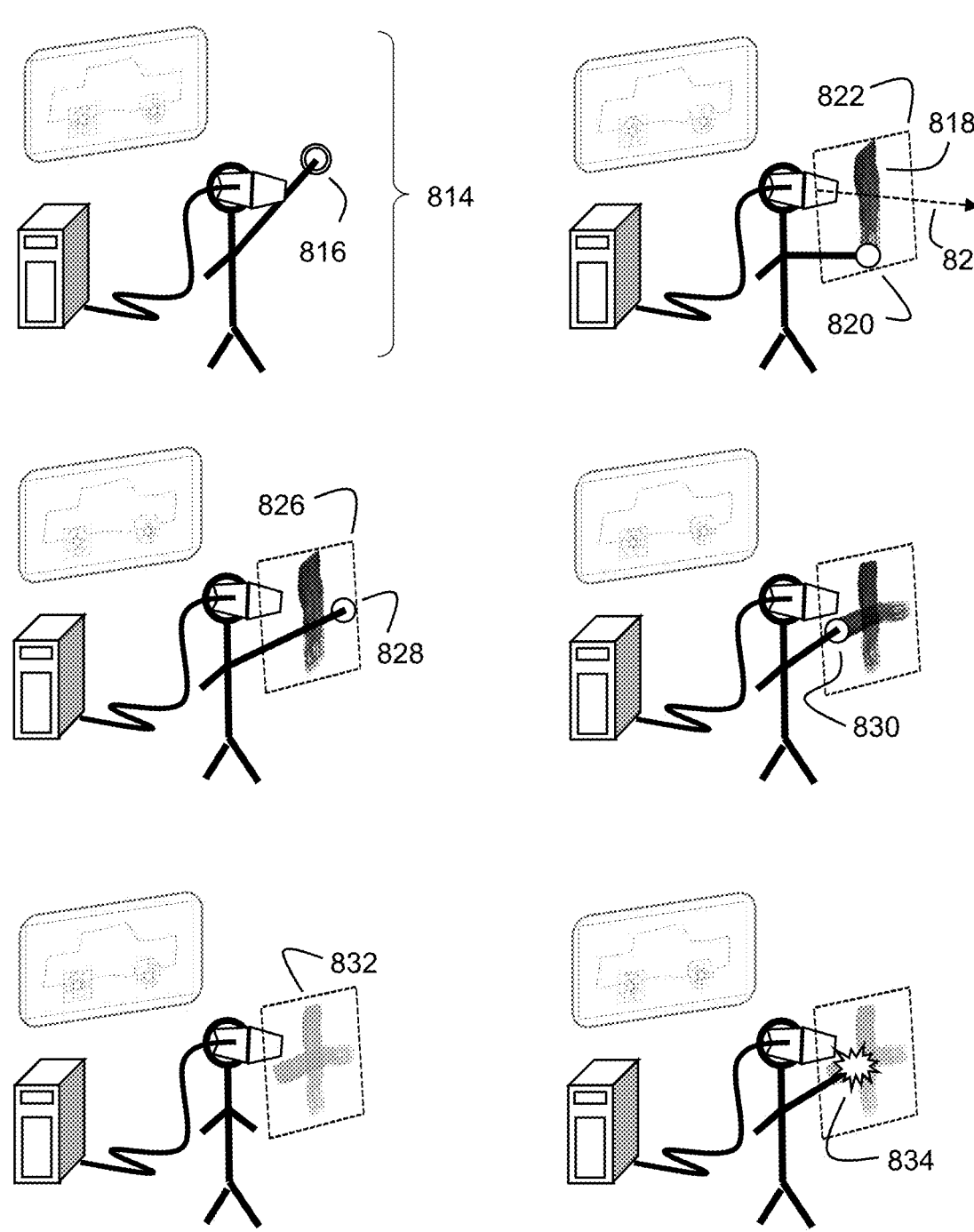
FIG. 8B describes the implementation of the Tracer-Mechanism in AR/VR environments in some embodiments.

FIG. 8B describes the implementation of the Tracer-Mechanism in AR/VR environments 814 in some embodiments. Unlike Tracer operation on a physical touch surface FIG. 8A, AR/VR lacks a physical surface to make and break contact with in order to start and stop each stroke creation. To solve this, a single-finger Pause-Trigger 816 is used to initiate Tracer operations. A single outstretched finger 816 is held up in the user's field of view and held motionless long enough to exceed the Pause-Timer. The Pause-Trigger 816 causes the finger to activate the Tracer-Mechanism 818. Finger translation now produces a mid-air Tracer stroke as it is moved 820. The first stroke is used to define a virtual surface 822 that exists only for the lifetime of the first stroke. The virtual surface is determined by fitting a plane 822 to the first stroke so that it is centered and horizontally perpendicular to the site line 824 between the user and the centroid of the first stroke. This virtual surface once established serves to define the Tap-Gesture, Grab-Gesture 828, and Hold-Gestures described in FIG. 6 for a Tap-Display. By the end of the first stroke a virtual plane has been established. At the end of the stroke, pulling the finger back toward the user disengages from the surface generating a touch release event, thus completing the Tracer stroke. This launches the Fade-Timer to begin fading the Tracer strokes 832. Further strokes are deposited on this surface 826 using finger intersection 828 to define the start and stop 830 touch events for each stroke. Each new intersection event begins a new stroke refreshing any previous strokes already deposited. Triggering of Tap-Symbols 834 can now be performed as in 8A using the virtual surface. If no finger intersections occur for an extended period, the strokes will completely fade taking the virtual surface defined with it.

Recap of Tracer-Mechanism

The Tracer and associated Tap-Symbols provide an important out-of-band command channel to the platform that contributes significantly to achieving a zero-graphical interface footprint. The Tap-Symbols replace traditional graphical artifacts such as menus and toolbars. This method of incorporating functionality is unlimited from a graphical bandwidth point of view. More features can be added by adding more symbols. In addition, each symbol can have numerous interpretations based on trigger method and number of triggering fingers. The Tap-Symbols not only replace menus and toolbars for triggering commands, but deliver powerful context information simultaneously, based on position and size of the Tap-Symbol over the underlying content. Many of these Tap-Symbol variations are demonstrated with use-case scenarios later in this application.

Tap-Symbols provide an effective universal gesture interface that overcomes many of the problems encountered with device form-factor. With large wall-sized displays, the Tap-Symbols can be issued anywhere on the display. Tap-Symbols can be triggered along the bottom of the interface by students that cannot reach high. For small devices the Tap-Symbols provide a means to issue platform commands on small screens. The Tap-Symbol can be drawn using the entire face of a smartwatch and then triggered in one or more different ways. Further, combining the Tap-Symbol with VUI activation provides a means to both guide the VUI context improving accuracy, as well as open up a near limitless capacity to execute actions, and activate tools. For AR/VR environments that already are naturally unstructured, the Tracer delivers an elegant means to interface with the system without introducing awkward graphical constructs that impact the 3D nature of the scene.

Gesture Control System Architecture

Figure 9:
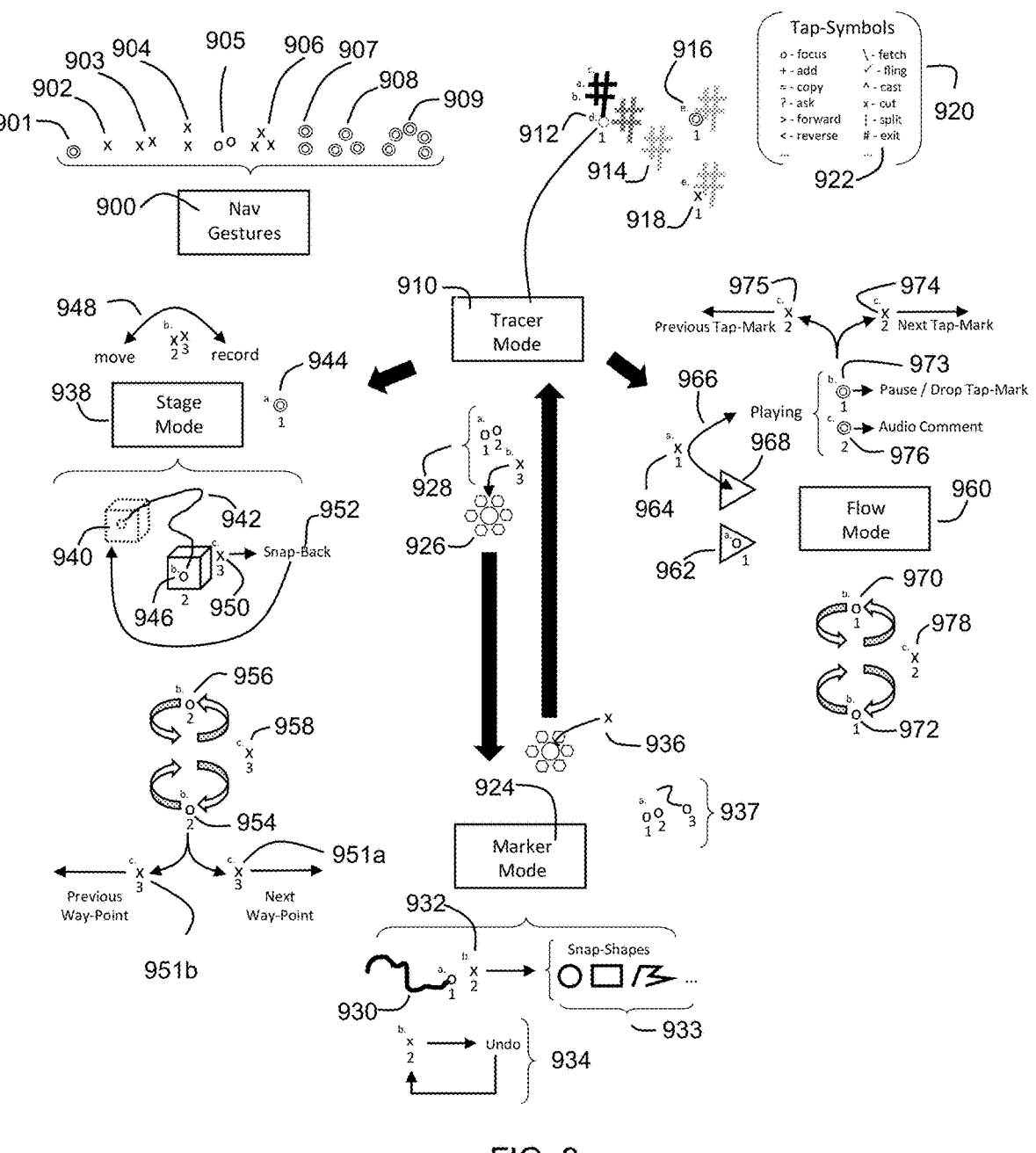
FIG. 9 is a comprehensive block diagram of the Tapistry Gesture Control System in some embodiments.

FIG. 9 is a comprehensive block diagram of the Tapistry Gesture Control System in some embodiments. This system delivers the ability to create a zero-footprint graphical user interface by combining the architectural structuring of the facility with the Tracer-Mechanism and several sets of Compound-Gestures that form functional Gesture-Modes.

FIG. 9 shows the division of the Gesture Control System into its 5 primary modes of operation: Nay-Gestures 900, Tracer-Mode 910, Marker-Mode 924, Stage-Mode 938, and Flow-Mode 960. Each of these Gesture-Modes is described briefly below, focusing on how each mode is invoked. At the center of the Gesture Control System is the Tracer-Mode 910 anchoring the system. The rest of the modes are integrated seamlessly off the Tracer-Mode with gestures that immediately access or invoke the other modes.

Taken together, this Gesture Control System delivers a complete user interface that delivers fluid navigation across the entire information space reducing interface friction that typically impedes cognitive flow. The result is an interface graphically lean enough to fit on any interactive display surface, no matter the size, from large wall-sized flat panels down to smartwatch-sized devices. Many of the particular details of each mode will be demonstrated in the Figures with a use case scenario (FIGS. 10 through 51).

Navigation Gestures

The Navigation Gestures capitalize on the underlying information space structuring to create rapid navigation across the Tapistry. The Vocal Gesture 901 activates a context specific Vocal command channel to the graphical element under the gesture, demonstrated in FIG. 11. Navigation is accomplished with the next three gestures: the Tap-In Gesture 902, the Tap-Out Gesture 903, and the Pop-Out Gesture 904. These are demonstrated in FIGS. 12, 14, and 15 respectively. Scrolling and Zooming of Tap-Board content is accomplished with the Scroll/Zoom-Gesture 905. The Toggle-Gesture 906 switches between Tap-Views in a multi-view layout and is illustrated in FIG. 15. The two-finger vertical hold is used to close a Tap-View 907. Multi-view layouts are recorded with the Capture-Gesture 908, illustrated in FIG. 17. In AR/VR environments, the Push/Pull-Gesture 909 is used to scale and move Tap-Displays and Tap-Forms as illustrated in FIG. 18. This same gesture 909 on touch surfaces triggers a Bail-Out navigation operation to the Nexus. This is shown as part of FIG. 12.

Tracer-Mode

The Tracer-Mode 910 is the default state of the platform and is used to both augment presentations, as well as draw Tap-Symbols 920 that are triggered as previously described in FIG. 8. Single-finger drags create Tracer strokes 912 that fade 914 if not interacted with. The Tracer strokes can be triggered with one or more methods to include, Hold or Pause-Trigger 916 and the Tap-Trigger 918 or Drip-Trigger (not shown). If one of many registered Tap-Symbols 920 is recognized 922 an appropriate platform action is taken. FIGS. 23 through 41 illustrate many Tap-Symbol operations as currently implemented. It will become apparent through these illustrations that the Tracer-Mechanism is an elegant method for delivering operational agility without cluttering the graphical environment. It is not at first clear whether committing the primary single-finger drag operation to creating strokes that fade and disappear, is a wise move. Much is lost with this initial commitment. The first finger cannot move elements, swipe content, scroll spaces, add permanent annotations etc. The Tracer however, more than compensates for this.

Marker-Mode

The Marker-Mode 924 provides the ability to create freehand annotations that are permanently added to underlying Glyphs which function as annotation platforms. The Marker-Mode is accessed by fetching a Drawing-Puck 926 onto the Tap-Board, with the Compound-Gesture 928. The Puck is placed where the tap occurs and can be repositioned throughout the Tap-Board space. Once the Puck is deployed, single-finger drags 930 are now interpreted as permanent annotations using one of the many drawing inks chosen from the Puck. During Marker-Strokes 930, advanced drawing capabilities can be triggered with a Drip-Gesture 932 mid-stroke to invoke a Snap-Shape sequence that generates clean geometric shapes 933. Snap-Shape examples are illustrated in FIGS. 47 through 51. The Drip-Gesture also serves to undo previous strokes using repeated Drips 934. The user returns to Tracer-Mode either by closing the Drawing-Puck with a tap 936, or using the Switch-Gesture 937 to temporarily create Tracer strokes that can be triggered to interpret Tap-Symbols. Releasing Gesture 937 resumes Marker-Mode annotations.

Stage-Mode

The Stage-Mode 938 is used to move Glyph materials 940 on the Tap-Board and to record these movements 942 as Vignettes. The Stage-Mode is accessed using a constant single-finger Hold-Gesture 944 that remains while a second gesture 946 performs Glyph movements. While in Stage-Mode (Gesture 944 still held), a 2-finger Tap-Gesture 948 toggles between Vignette recording and non-recording of movements. A Drip-Gesture 950 executed at the end of a drag event triggers a Snap-Back 952 event that returns the Glyph to its previous location 940 called a Way-Point. Way-Points 940, 946 are time marks defined as the beginning and end of drag operations. Recorded Vignette timelines can be traversed using Swirl-Gestures 954 and 956 begun with a Grab-Gesture not on any Glyph while still holding gesture 944. These Swirl-Gestures position the timeline forward and back fluidly in time. A Drip-Gesture 958 during the Swirl-Gestures jumps to either the next or previous Way-Point depending on the polarity of the swirl direction. If a swirl direction has not been established, a Drip-Right 951*a* moves to the next Way-Point and a Drip-Left 951*b* moves to the previous Way-Point. Vignette staging and navigation is demonstrated in FIGS. 42, 43, and 44. The Stage-Mode provides an expressive capability to create parallel path animations using simple gestures off the fingertips that can capture complex time/sequence dependent explanations.

Flow-Mode

Figure 43:
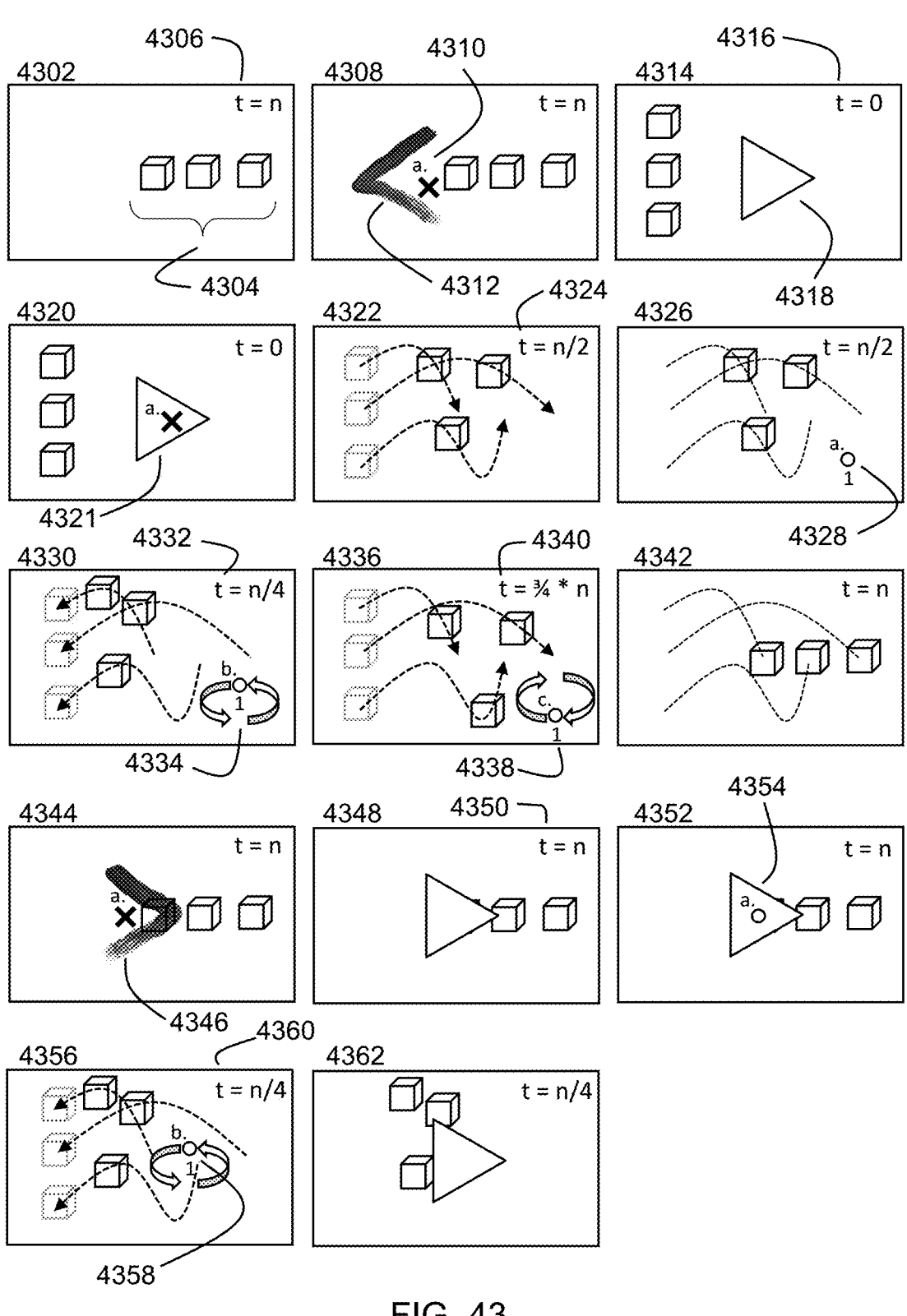
FIG. 43 illustrates a sequence of operations with the Flow-Mode Gestures to navigate playable media such as Vignettes, audio and video multimedia in some embodiments.
Figure 44:
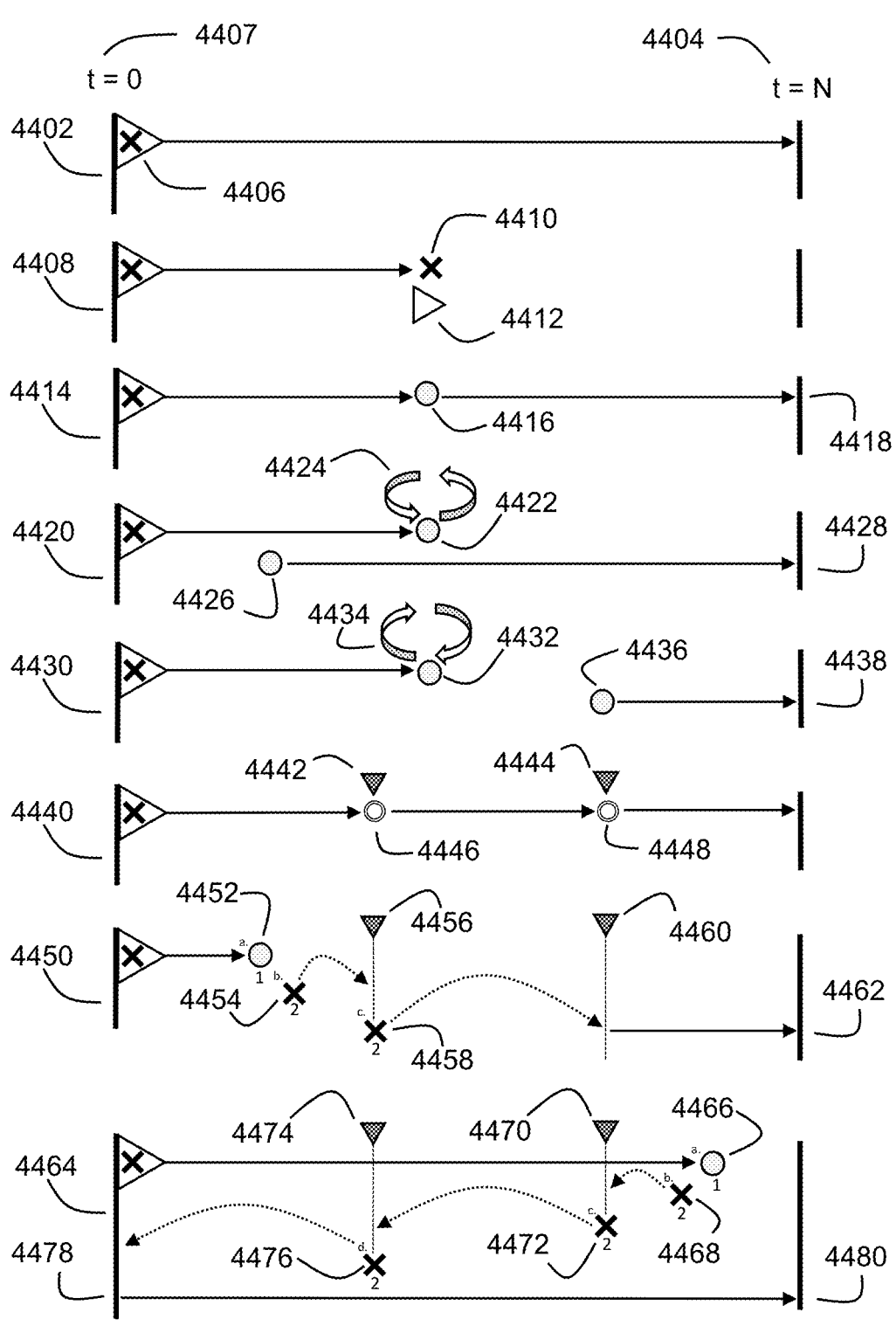
FIG. 44 illustrates navigation of playable media using the various Flow-Mode Gestures in some embodiments.

Flow-Mode 960 is used to play Vignette animations, as well as traditional multimedia content such as audio, music, videos, and so on. The Flow-Mode is accessed by either grabbing the Play-Triangle 962 or by tapping it 964 to start the material playing 966. Tapping already playing material returns it to a paused state 968. Flow-Mode is placed in a traversal state by either grabbing a playing Vignette 973 which temporally pauses it, or grabbing a paused Play-Triangle 962. While holding the paused Vignette, Swirl-Gestures 970 and 972 position the materials back and forth in time. If the Grab-Gesture becomes a Hold-Gesture 973 a Tap-Mark timer is started. If the timer expires before the finger is removed, a Tap-Mark is dropped at this point in the playable materials. Tap-Marks are traversed using the Hold-Gesture 973 with a Drip-Right Gesture 974 or a Drip-Left Gesture 975. These actions jump the user either forward or backward to the next Tap-Mark. A second Hold-Gesture 976 triggers an audio recorder to capture audio commentary tied to the playable content at this point in the timeline. Releasing this second Hold-Gesture 976 deactivates recording. Drip-Gesture 978 is used to jump back and forth between previously placed Tap-Marks while swirling the content depending on the polarity of the swirl operation. FIGS. 43 and 44 illustrate these Flow-Gestures. The Flow-Gestures create an eyes-free capability to navigate playable content without needing to land touch gestures on structured graphical sequencing elements that are typically included with traditional solutions.

Navigation Gesture Overview

Figure 10:
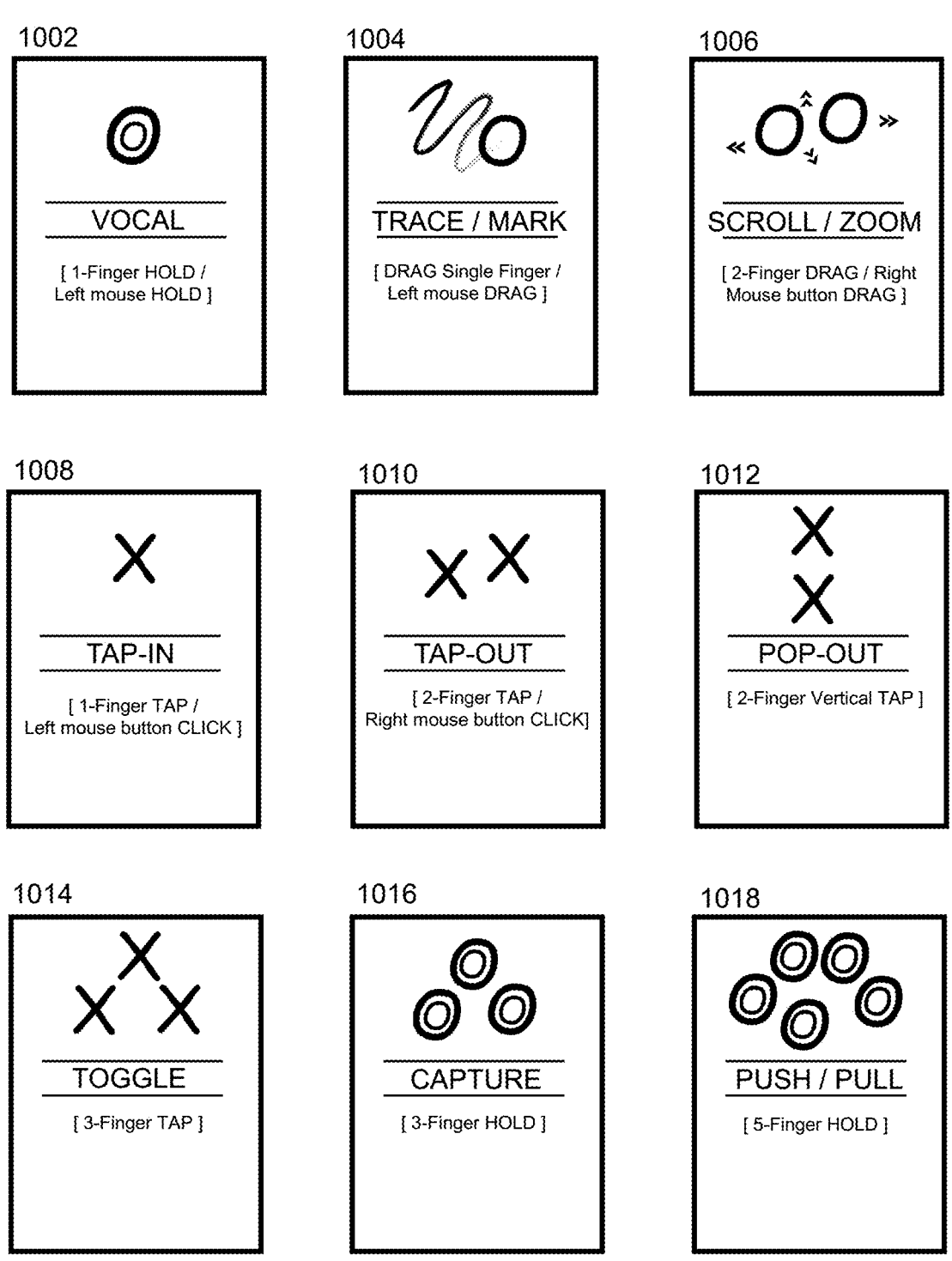
FIG. 10 serves as a guide to the Gestures used to navigate the platform and their associated meanings in some embodiments.
Figure 12A:
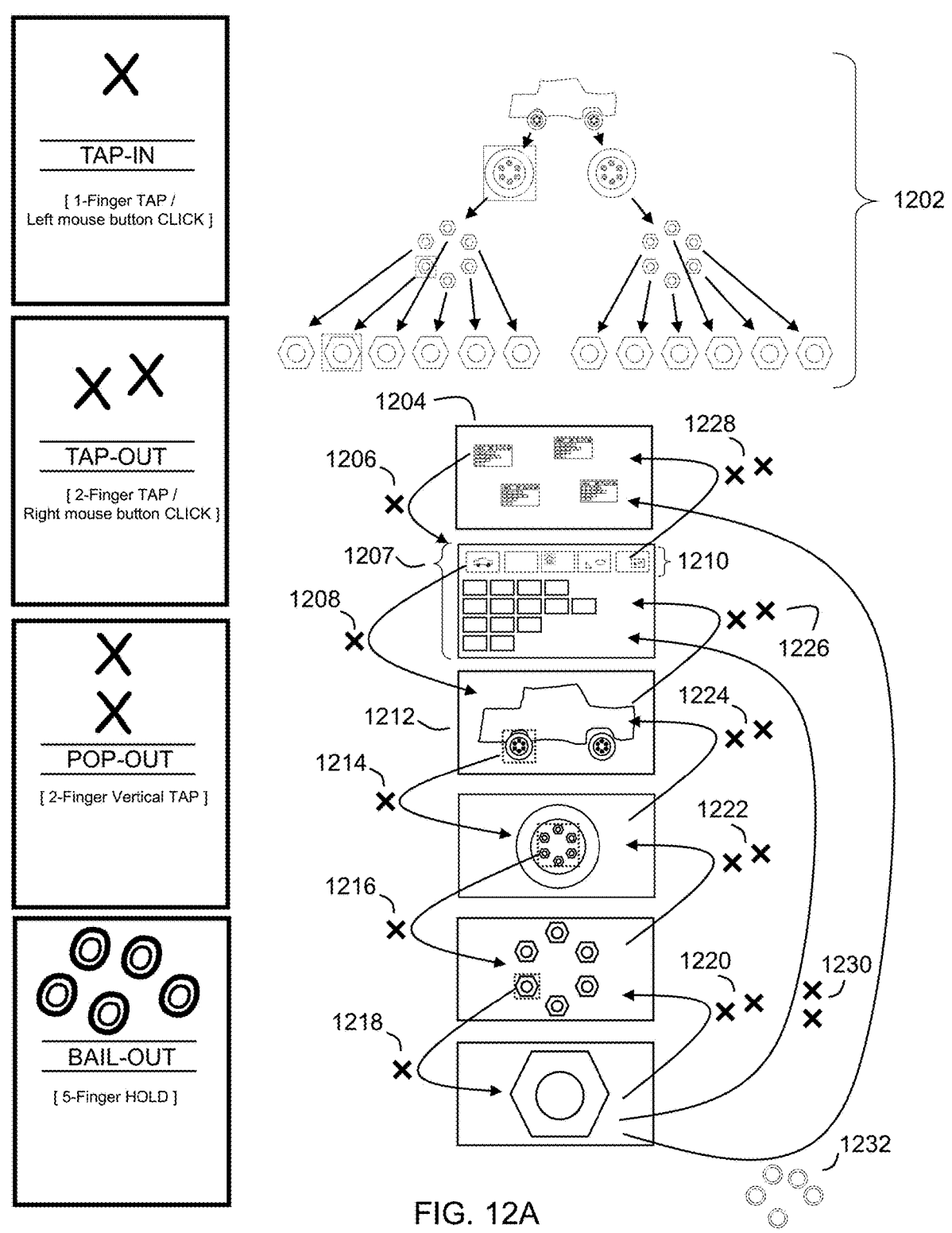
FIG. 12A demonstrates the traversal of an information space Tap-Tree in some embodiments.
Figure 12B:
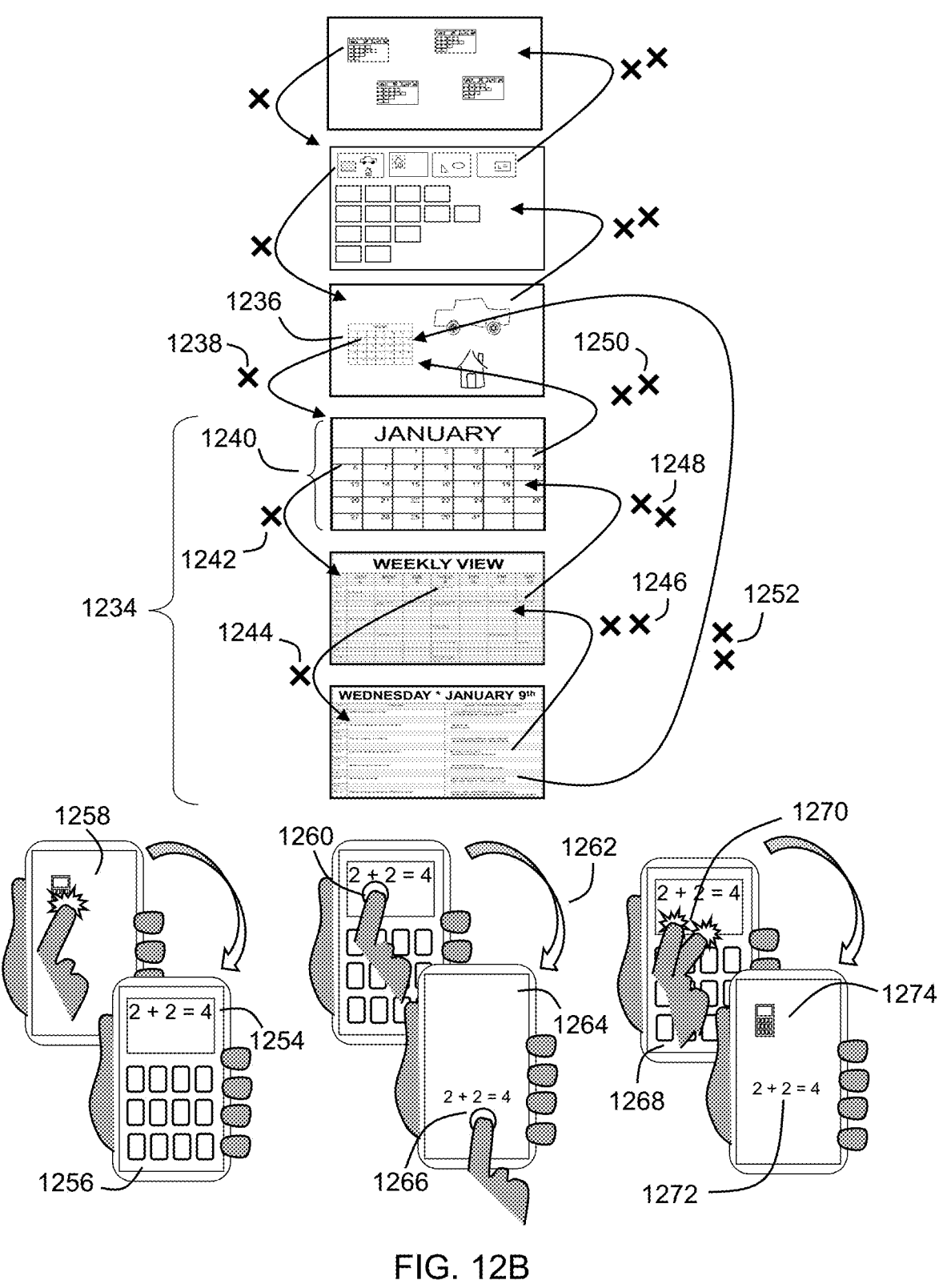
FIG. 12B illustrates Tap-Tool traversal and Drop-Through in some embodiments.
Figure 13:
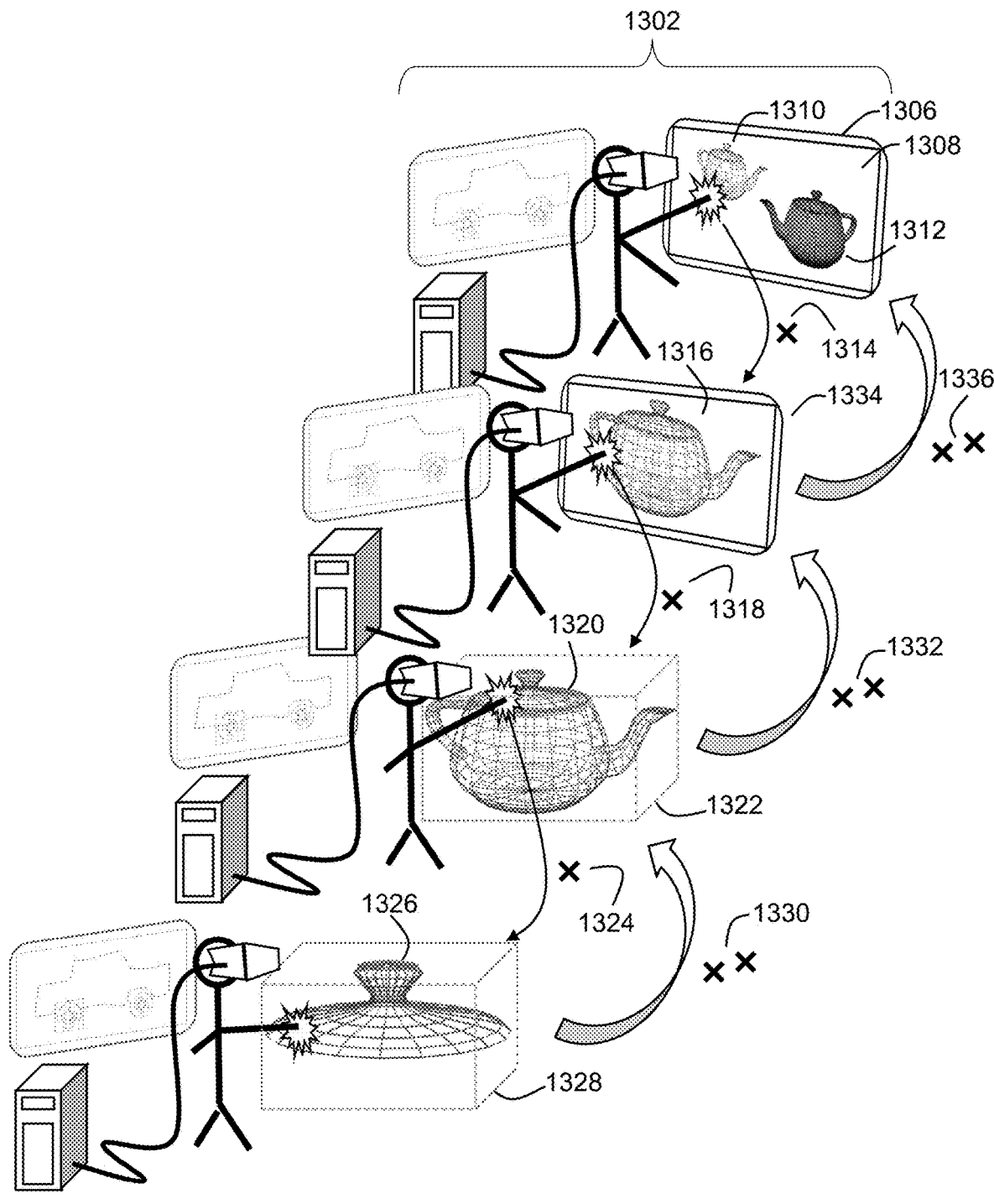
FIG. 13 illustrates traversal of a 3D Tap-Form hierarchy in an AR/VR Environment in some embodiments.

FIG. 10 serves as a guide to the Gestures used to navigate the platform and their associated meanings in some embodiments. The Vocal-Gesture 1002 is used for context-based Vocal Command cueing and is demonstrated in FIG. 11. The Trace and Mark Gestures 1004 are a single-finger drag. The Scroll/Zoom Gesture 1006 which is a 2-finger grab event is used to zoom and scroll the Tap-Board within a Tap-View. The 2-finger grab is necessary to differentiate it from annotations with one finger in both the Tracer and Marker modes of operation. Tap-In 1008, Tap-Out 1010, Pop-Out 1012 Gestures are used for rapid traversal of Glyph-Tree hierarchies and are illustrated in FIGS. 12A, 12B and 13. The Toggle-Gesture 1014 toggles the Tap-View of a multi-view layout between full screen and back again. The Toggle-Gesture is illustrated in FIG. 15. The Capture-Gesture 1016 is used to capture a multi-view layout into a Tap-Layout Glyph. This Gesture is demonstrated for a physical display in FIG. 16 and an AR/VR environment in FIG. 17. The Push/Pull Gesture 1018 is used in AR/VR environments to move and translate Tap-Displays/Tap-Forms and is demonstrated in FIG. 18.

Vocal-Gesture

Figure 11:
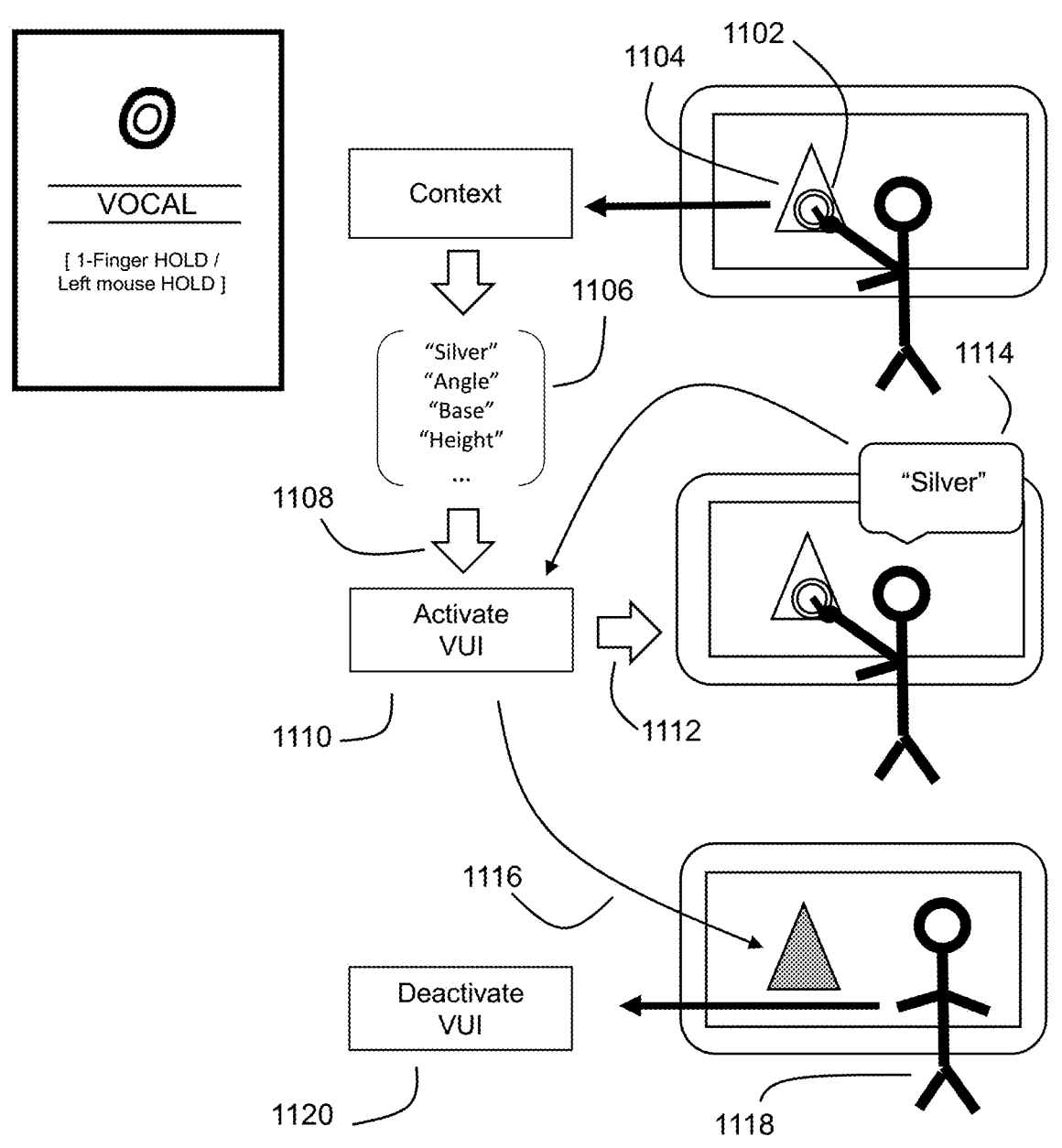
FIG. 11 illustrates the Vocal-Gesture for setting Glyph properties or triggering Glyph behaviors in some embodiments.

FIG. 11 illustrates the Vocal-Gesture for setting Glyph properties or triggering Glyph behaviors in some embodiments. A Vocal is a keyword associated with a resource, property, action, or command that is registered with a speech recognition system referred to as the VUI (Voice User Interface). A Hold-Gesture 1102 is established over a Glyph 1104. The Hold-Gesture event triggers the Glyph to register a list of Vocals 1106 with the VUI 1108. The VUI is activated 1110 and starts listening 1112 for one of the Vocals. If a Vocal from the list is spoken 1114 by the user, an action is taken by the Glyph 1116. Once the user releases 1118 the Hold-Gesture the VUI is deactivated 1120. This Touch-to-Talk interaction, only cues the VUI in response to explicit user intent, which minimizes spurious recognition events triggered by ambient conversations.

Scrolling the Tap-Board

The surface of a Tap-Board is translated using a two-finger grab to initiate a scrolling operation 2328, described later in FIG. 34. As long as one of the two initial fingers stay in touch with the display device, the surface tracks the centroid location of the fingers maintaining the original location under the fingers. At the moment of release, if finger velocity based on the time tracking of the touch events exceeds a certain threshold, the surface is placed into a thrown state and continues scrolling in the direction of the velocity vector established at the moment of release. The Tap-Board surface continues scrolling in this direction using a callback timer to incrementally shift the position of the surface. A friction value is used to decay the surface velocity overtime. The surface stops scrolling when either the velocity drops below a minimum threshold, or the user catches the surface by touching the display with one or more fingers which immediately places the surface again in the scroll mode without needing to reinitiate a two-finger hold. This allows the user to continue swiping with a single finger to keep the surface moving. New velocity vectors are calculated with each release. When the fingers are released without a significant translation velocity (delta distance per time below a threshold), the state of the surface returns to a neutral, non-thrown state.

Zooming the Tap-Board

While scrolling the Tap-Board with two fingers, the scale of the Tap-Board view can be adjusted by spreading the distance between the two fingers. A threshold is applied to this distance and compared against the initial grab distance, in order to avoid unnecessary scaling of the board content during simple translations. Once the threshold is exceeded however, the surface scale is adjusted as a percentage of the changed distance between the two fingers. The scale is applied around the centroid of the touch points as the origin.

Tap-Tree Traversal

FIG. 12A demonstrates the traversal of an information space Tap-Tree 1202 in some embodiments. Starting from the Nexus 1204 a Tap-In 1206 Gesture on the Tapistry thumbnail loads the selected Tapistry Gallery 1207. A Tap-In Gesture of a Tap-Board thumbnail 1208 on the Working-Deck 1210 loads the selected Tap-Board and fills the Tap-View with an overview scaling of the entire contents 1212. A Tap-In Gesture of a Sub-Glyph 1214 auto-zooms the Tap-Board extent to fit the Sub-Glyph into the Tap-View. This process is repeated for two more Sub-Glyph levels 1216, 1218. Repeated Tap-Out gestures 1220, 1222, 1224, 1226 and 1228 reverse the Tap-Ins moving back up eventually to the Nexus. An alternative to these repeated Tap-Out Gestures is the Pop-Out Gesture 1230 that jumps immediately back to the Tapistry Gallery 1207. A final alternative is the Bail-Out gesture 1232 which jumps all the way out to the Nexus level from any level. The above Tap-Out scenarios provide an alternative to using the mouse back-button, or back arrow graphical artifact on interfaces.

Tap-Tool Traversal and Drop-Through

FIG. 12B illustrates Tap-Tool traversal 1234 and Drop-Through in some embodiments. Starting with a Tap-Tool Glyph entry point 1236, a Tap-In Gesture 1238 launches the Tap-Tool 1240 turning over the view, as well as Gesture policies for the tool. Further Tap-Ins 1242 and 1244 move deeper into the Tap-Tool. Basic Tap-Outs at 1246, 1248, 1250 move up and out of the Tap-Tool levels. An alternative "escape" while deep in a Tap-Tool is the Vertical Tap-Out 1252 that jumps out of the Tap-Tool returning to the Glyph entry point 1236. The Vertical Tap-Out provides a Gesture alternative to the home button on many mobile phones for exiting phone applications.

Related to Tap-Tool operation is the Drop-Through Gesture. To place data 1254 produced by a Tap-Tool 1256, onto the underlying Tap-Board 1258, a Drop-Through Gesture can be used. In some instances a one or two-finger Grab-Gesture 1260 on the data drops through the Tap-Tool 1262 (Tap-Tool vanishes) exposing the underlying Tap-Board 1264. Still holding the data element 1266, the user drags and drops the Glyph onto the Tap-Board. On the drop event, the Tap-Tool returns 1268 (reappears). On Tap-Out 1270, the Tap-Tool data 1272 is a peer Glyph of the Tap-Tool Glyph 1274.

Tap-Form Traversal in AR/VR

FIG. 13 illustrates traversal of a Tap-Form hierarchy in an AR/VR Environment 1302 in some embodiments. The Tap-Display 1306 contains a Tap-Board 1308 with several 2D renderings of Tap-Models 1310, 1312. Tap-In 1314 of one of the Tap-Models causes the Tap-Board to zoom the Tap-Model to fit the View 1316. In an AR/VR environment, the next Tap-In 1318, converts the Tap-Display into a Tap-Form 1320 of the Tap-Model 1310. The Tap-Form is sized to fit the bounding box 1322 generated from the Tap-Display dimensions. Tap-In 1324 of an embedded Sub-Form zooms it 1326 to fit the same bounding box 1328 occupied by the parent Tap-Form. A Tap-Out on the Sub-Form 1330, zooms back out to the parent Tap-Form 1320. The next Tap-Out 1332 replaces the Tap-Form with the Tap-Display 1334 sized to fit the bounding box of the Tap-Form 1322. The Tap-Display again showing the Tap-Model 1310 scaled to fit the Tap-Display 1316. Navigation resumes using the recorded Tap-Stack levels tracked by the Tap-View as described in FIGS. 12A and 12B. The next Tap-Out 1336, zooms back to the original extent.

Tap-Synch of a Phone and Glyph

Figure 14:
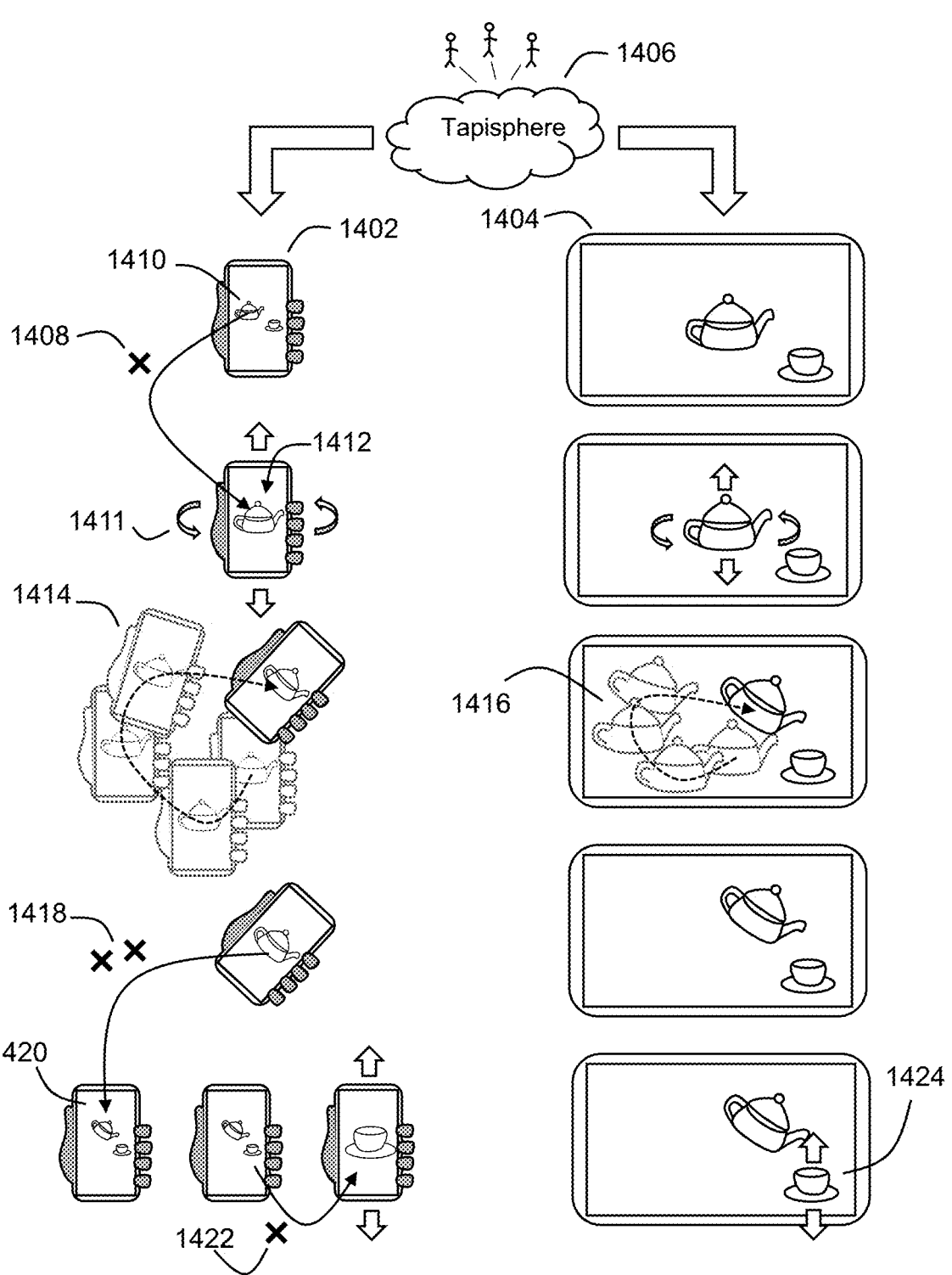
FIG. 14 illustrates the Tap-Synch of a phone with a Glyph to convert phone movements into Glyph movements in some embodiments.
Figure 15:
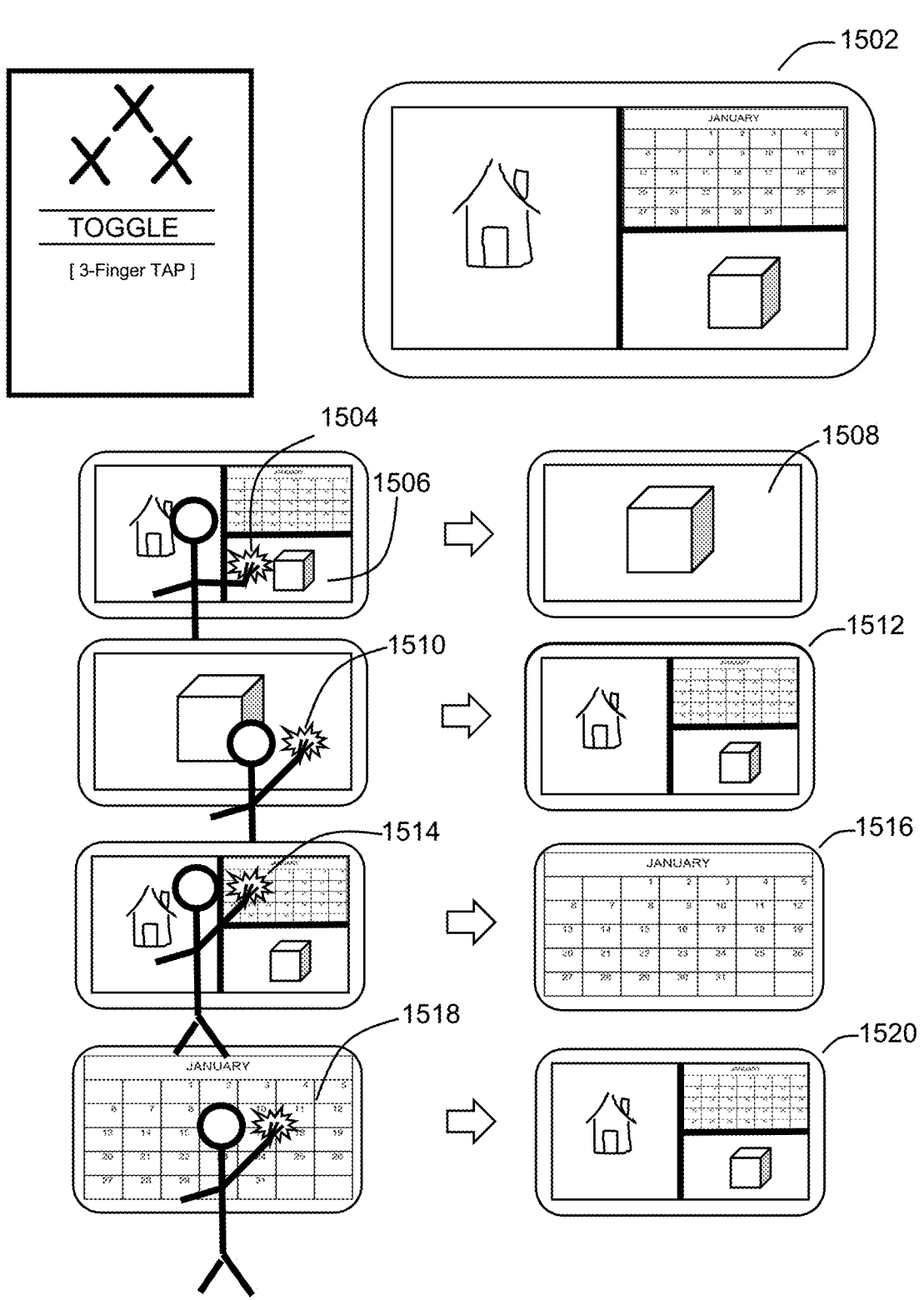
FIG. 15 illustrates the Toggle-Gesture operation for selecting a view from a multi-view layout to show full screen in some embodiments.

FIG. 14 illustrates the Tap-Synch of a phone with a Glyph to convert phone movements into Glyph movements in some embodiments. A phone 1402 is connected to a second device 1404 through a Tapisphere shared context 1406. A Tap-In Gesture 1408 of a Glyph 1410 on the phone causes it to be zoomed to fit the phone screen Tap-View. The Glyph detects that the Tap-In occurred using a mobile device equipped with accelerometer sensors 1411 and triggers a Tap-Synch with the phone 1412. Once synched, movements of the mobile phone 1414 cause translations of the Glyph within the Tap-Board space 1416 determined by a scale factor mapping to the second device. For large wall-sized flat panel displays, a 1:1 scale factor is effective where phone translations directly translate to Glyph motions on the display.

The Glyph can choose to link to only a subset of the mobile phone accelerometer values choosing to only synch to rotations and not translations. Thus, for Tap-Models which are renderings of 3D elements, the smartphone can be used to rotate the Tap-Model on screen, creating a natural interface for presenting different viewing angles of the Tap-Model. The phone can change to a different Glyph with a Tap-Out Gesture 1418 zooming back out to the overview 1420, and a Tap-In of a different Glyph 1422 setting up a new Tap-Synch 1424. Multiple phones tied into the same Tapisphere session can Tap-Synch with different Glyphs simultaneously creating multiple points of control.

Toggle-View Gesture

FIG. 15 illustrates the Toggle-Gesture operation for selecting a Tap-View from a multi-view layout to show full screen in some embodiments. Starting with a three view layout 1502, a Toggle-Gesture 1504 in one of the layout views 1506 causes that view to fill the available display real estate 1508. Executing the Toggle-Gesture again in this view 1510, switches back to the original layout 1512. The Toggle-Gesture in a Tap-Tool view 1514 causes the Tap-Tool to maximize 1516. The Toggle-Gesture within the Tap-Tool 1518 returns the display to the original layout 1520.

Capture-Layout Gesture

Figure 16:
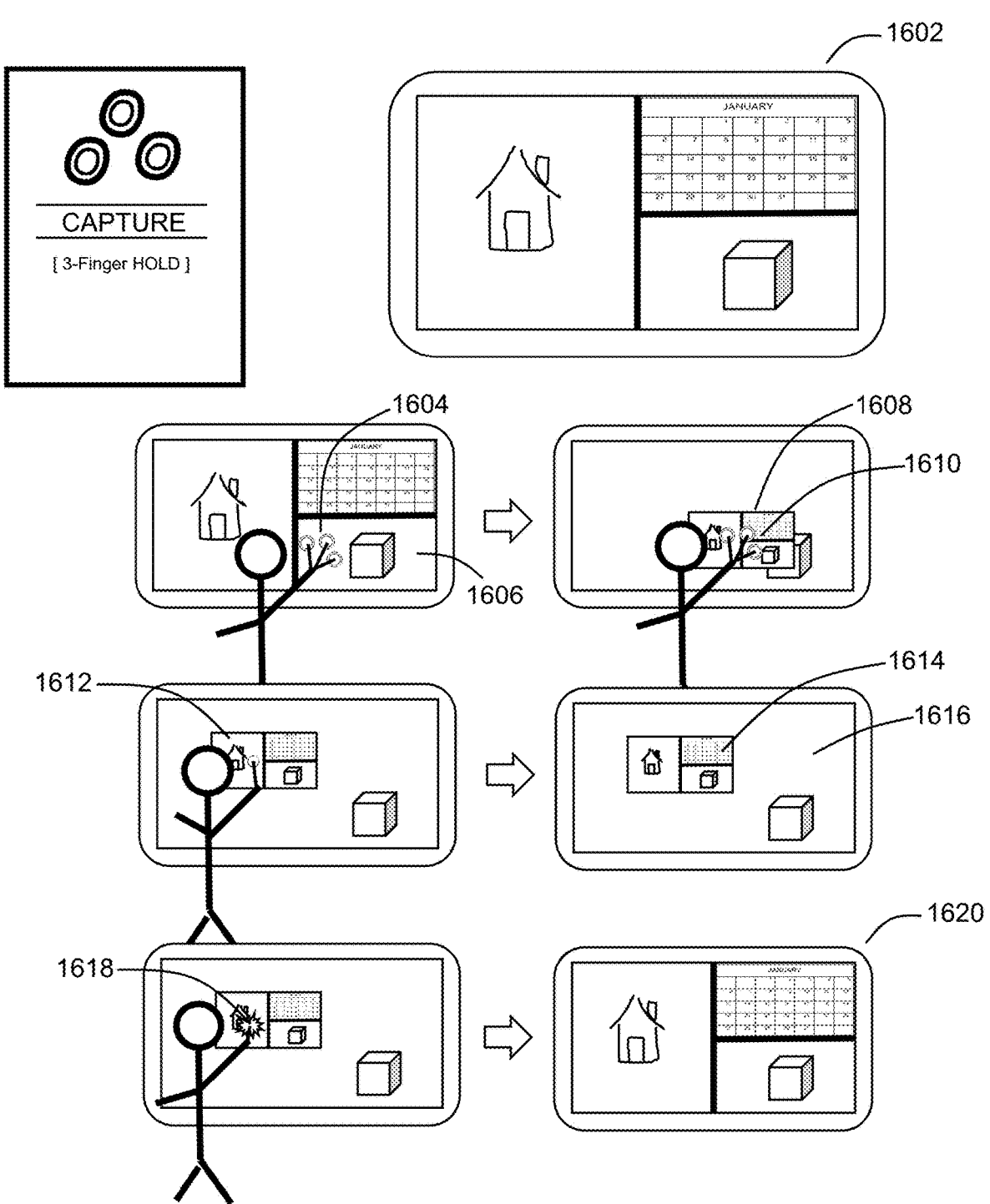
FIG. 16 illustrates the Capture-Gesture to record a multi-view layout as a Tap-Layout Glyph in some embodiments.

FIG. 16 illustrates the Capture-Gesture to record a multi-view layout as a Tap-Layout Glyph in some embodiments. This Glyph restores the layout to its original state on Tap-In. Beginning with a multi-view layout 1602, the Capture-Gesture 1604 is executed in one of the views 1606. The Capture-Gesture is a 3-finger Hold-Gesture. When the Hold-Gesture triggers, a screenshot is taken of the layout to create a thumbnail for the Tap-Layout Glyph 1608. The user is left holding this new Glyph 1610 and can drag 1612 and drop 1614 it anywhere in the Tap-Board 1616 where the Capture Gesture was executed. The views not held by the Capture-Gesture are closed. A Tap-In Gesture 1618 of the Tap-Layout Glyph causes the layout to be restored 1620. Creating multiple Tap-Layouts on a single Tap-Board provides the ability to rapidly jump back and forth between complex layout configurations effortlessly.

Capture-Space AR/VR Gesture

Figure 17:
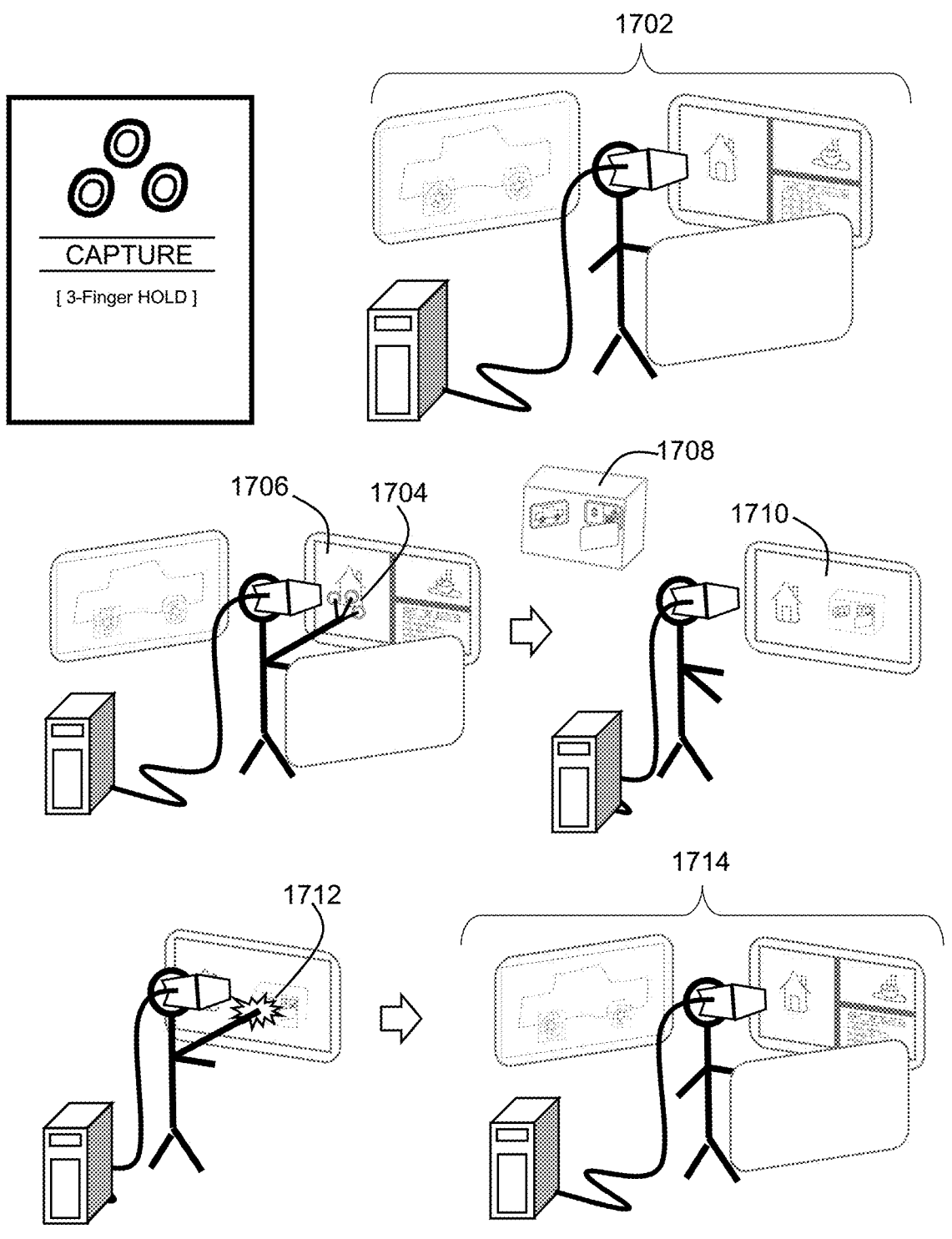
FIG. 17 illustrates the Capture-Gesture in an AR/VR simulation, to record all the Tap-Displays and Tap-Forms in an AR/VR simulation into a single Tap-Space Glyph in some embodiments.
Figure 18:
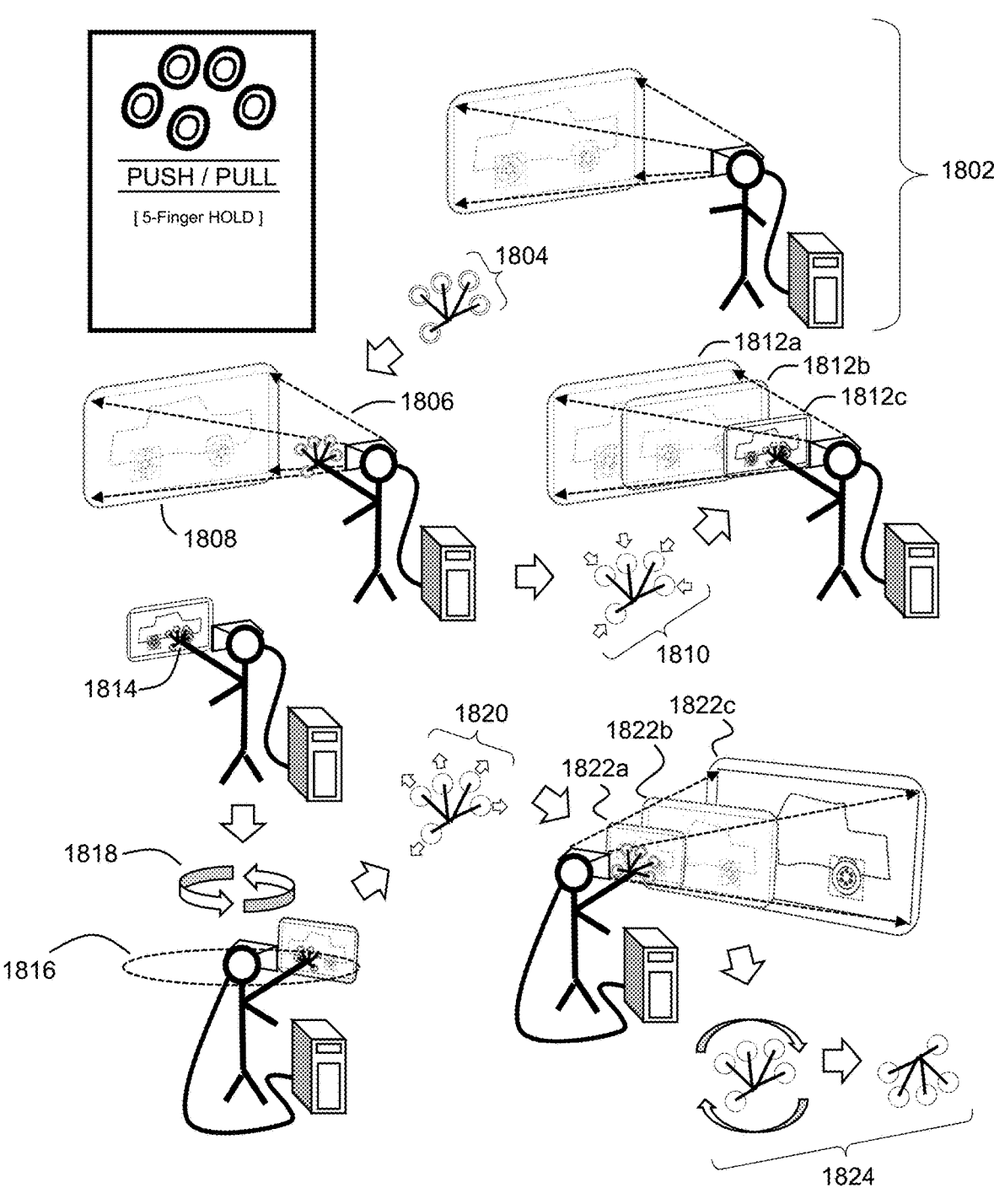
FIG. 18 illustrates the Push/Pull Gesture in an AR/VR environment to move and size virtual Tap-Displays and Tap-Forms in some embodiments.

FIG. 17 illustrates the Capture-Gesture in an AR/VR virtual simulation, to record all the Tap-Displays and Tap-Forms in an AR/VR simulation into a single Tap-Space Glyph in some embodiments. This Glyph restores all the virtual displays when tapped. Beginning with a multi-display virtual simulation 1702, the Capture-Gesture 1704 is executed in one of the Tap-Views 1706. The Capture-Gesture is a 3-finger Hold-Gesture executed on the Tap-Display virtual surface. When the Hold-Gesture triggers, screenshots are taken of each Tap-Display to create thumbnails that are used to construct a 3D Tap-Space Glyph 1708. The user is left holding this new Glyph and can drag and drop it anywhere in the Tap-Board 1710 where the Capture-Gesture was executed. The Tap-Views and Tap-Displays not held by the Capture-Gesture are closed. A Tap-In Gesture of the Tap-Space Glyph 1712 causes the virtual space to be restored 1714. Creating multiple Tap-Space Glyphs on a single Tap-Board provides the ability to rapidly jump back and forth between complex virtual configurations of the simulation space.

Push/Pull Tap-Display AR/VR Gesture

FIG. 18 illustrates the Push/Pull Gesture in an AR/VR environment 1802 to move and size virtual Tap-Displays and Tap-Forms in some embodiments. The Push/Pull Gesture is established with a 5-finger Hold-Gesture 1804 established in the field of view of the user 1806 in line with a Tap-Display/

Tap-Form 1808. Once established, squeezing the 5-finger Hold-Gesture 1810 causes the virtual display to be pulled toward the user 1812a, 1812b, 1812c along the sight line until it reaches the hand of the user. While the Hold-Gesture 1814 is established, translations 1816 of the outstretched hand rotates the Tap-Display/Tap-Form around the axis 1818 of the user. Spreading the fingers of the 5-finger Hold-Gesture 1820 pushes the Tap-Display/Tap-Form away from the user 1822a, 1822b, 1822c along the site line. Twisting the hand so the palm is up 1824 releases the Tap-Display/Tap-Form.

Compound-Gesture Overview

Figure 19:
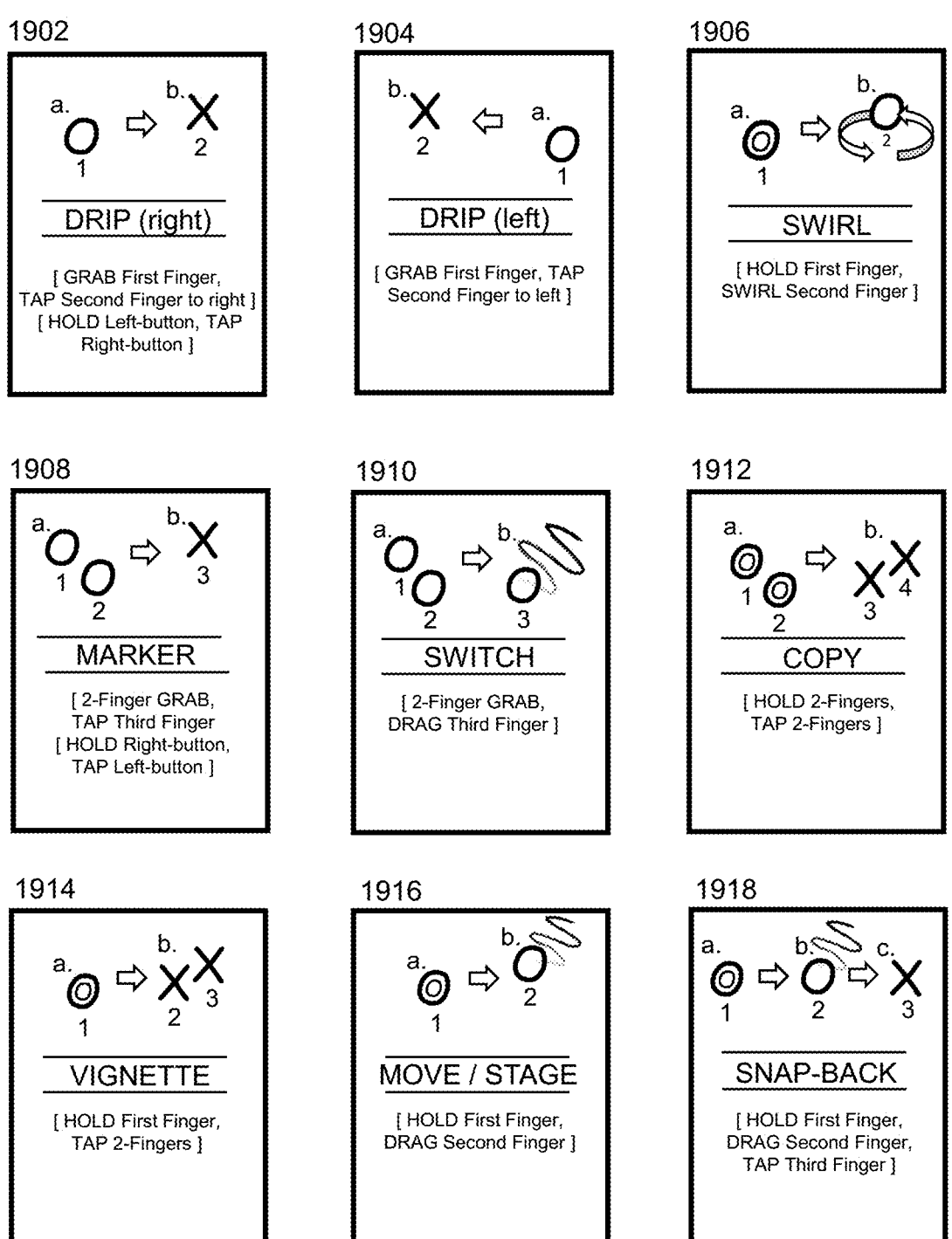
FIG. 19 illustrates the Compound-Gestures built into the platform and their associated name in some embodiments.

FIG. 19 serves as a guide to Compound-Gestures used on the platform and their associated name in some embodiments. The Drip-Left, Drip-Right Gestures 1902, 1904 are used for jumping among Tap-Marks and Way-Points. Drip-Left jumps back, Drip-Right jumps forward. The Swirl-Gesture 1906 is used in the Stage-Mode to fluidly advance or rewind the timeline positioning of Vignette materials, demonstrated in FIGS. 20 and 42. The Marker-Gesture 1908 is used to fetch the Drawing-Puck onto the Tap-Board switching the platform into the Marker-Mode. The Switch-Gesture 1910 is used to briefly create Tracer annotations when in Marker-Mode, or Marker annotations when in Tracer-Mode. The Copy-Gesture 1912 is used to make copies of Glyphs, demonstrated in FIG. 21. The next three Gestures: Vignette 1914, Move/Stage 1916, and Snap-Back 1918 are all related to the Stage-Mode and the creation of Vignette content, demonstrated in FIG. 48.

Swirl-Vignette Gesture

Figure 20:
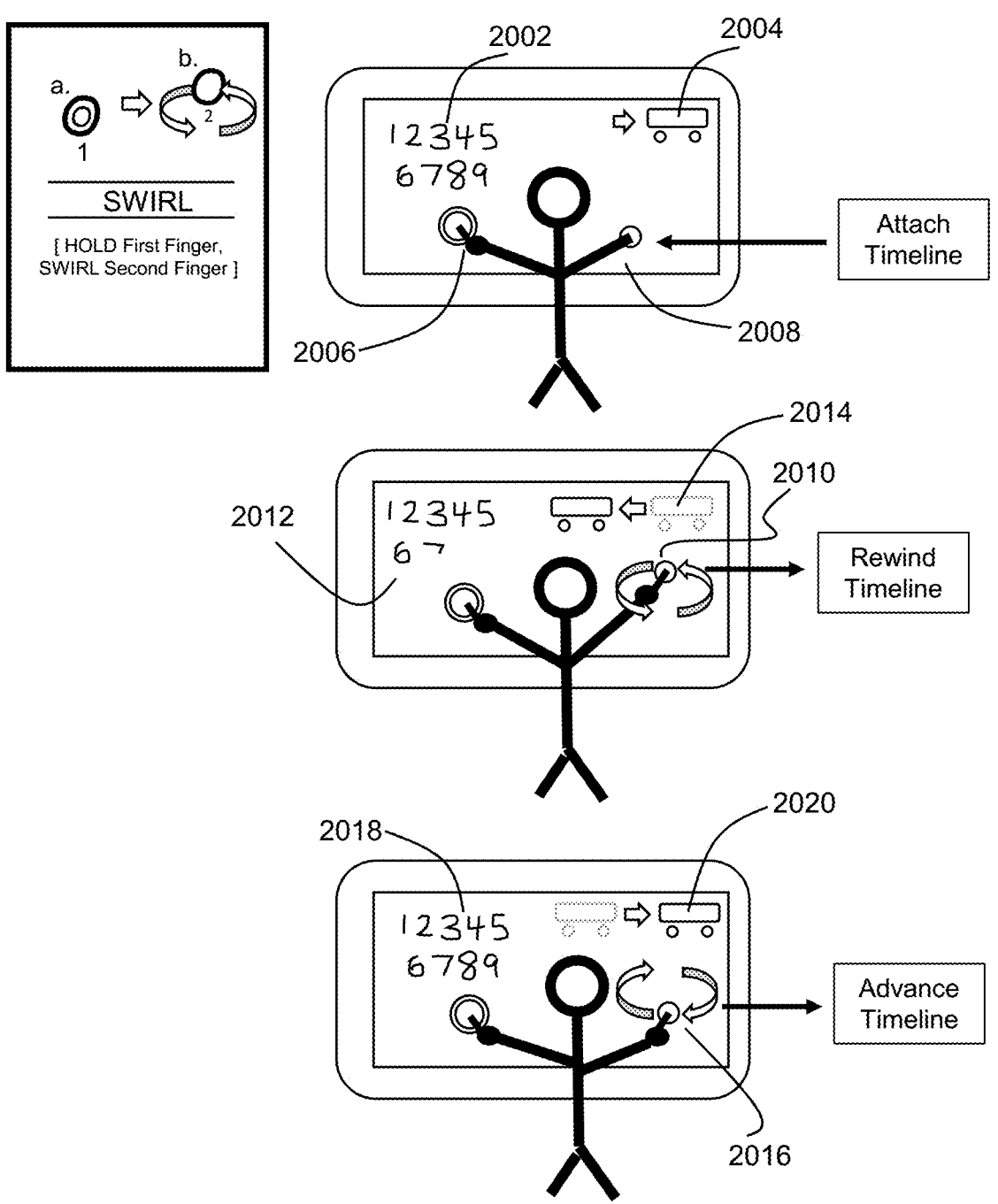
FIG. 20 illustrates the Swirl-Vignette Gesture used to sequence Vignette timelines in some embodiments.

FIG. 20 illustrates the Swirl-Vignette Gesture used to sequence Vignette timelines 2002, 2004 in some embodiments. The gesture is established with a single-finger Hold-Gesture 2006. This attaches the Vignette timelines to a second finger gesture 2008. Swirling counter-clockwise 2010 rewinds the Vignette timelines 2012, 2014. Swirling clockwise 2016 advances the Vignette timelines 2018, 2020. The Swirl-Gesture puts the user in touch with timeline materials, providing an opportunity to get a hands-on feel for the information represented by the Vignette.

Copy-Glyph Gesture

Figure 21:
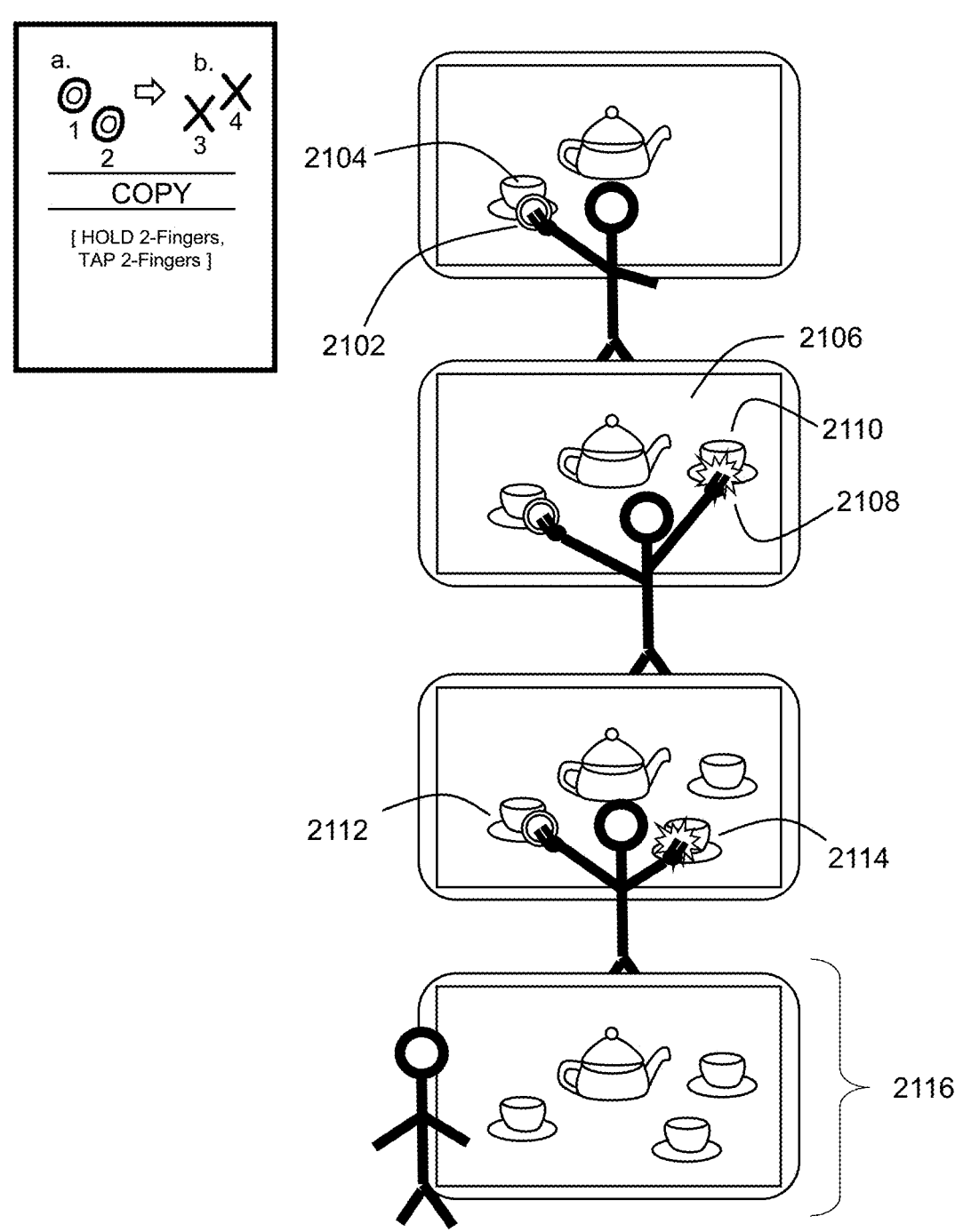
FIG. 21 illustrates the Copy-Glyph Gesture which creates Glyph copies on the Tap-Board surface in some embodiments.

FIG. 21 illustrates the Copy-Glyph Gesture which creates Glyph copies on the Tap-Board surface 2106 in some embodiments. The gesture is established with a two-finger Hold-Gesture 2102, on a target Glyph 2104. Copies are made with a second two-finger Tap-Gesture 2108 on an empty portion of the Tap-Board 2106, producing a copy of the Glyph 2110. The Tap-Gesture can be repeated while still holding the target Glyph 2112 producing as many copies as necessary 2114. Releasing the Gesture returns to Tracer mode 2116.

Recap of Navigation Gestures

In total, the Navigation Gestures provide a frictionless ability to rapidly navigate and traverse the Tapistry information space. This is accomplished in part through the structuring of user content into hierarchical structures built from the recursive Glyph container elements composed on discrete Tap-Boards. Similarly, in the 3D realm this is accomplished using the recursive Tap-Form elements used to fashion 3D shapes in a Tap-Space medium simulated by an AR/VR environment. This structuring empowers the Tap-in/Tap-Out Gestures, used to great effect for delivering traversal methods on all platforms regardless of size or 2D/3D nature.

Included with Navigation are the Compound Spanning Gestures that provide a novel form of information coordination across disparate contexts to include Glyphs, Views, Displays, and Devices. This pattern capitalizes on the two-handed gesture operations that turn the user into a spanning conduit. These gestures are unique to touch environments (ie. hard to do with a mouse).

Tracer-Mode as a Highlighter

Figure 22:
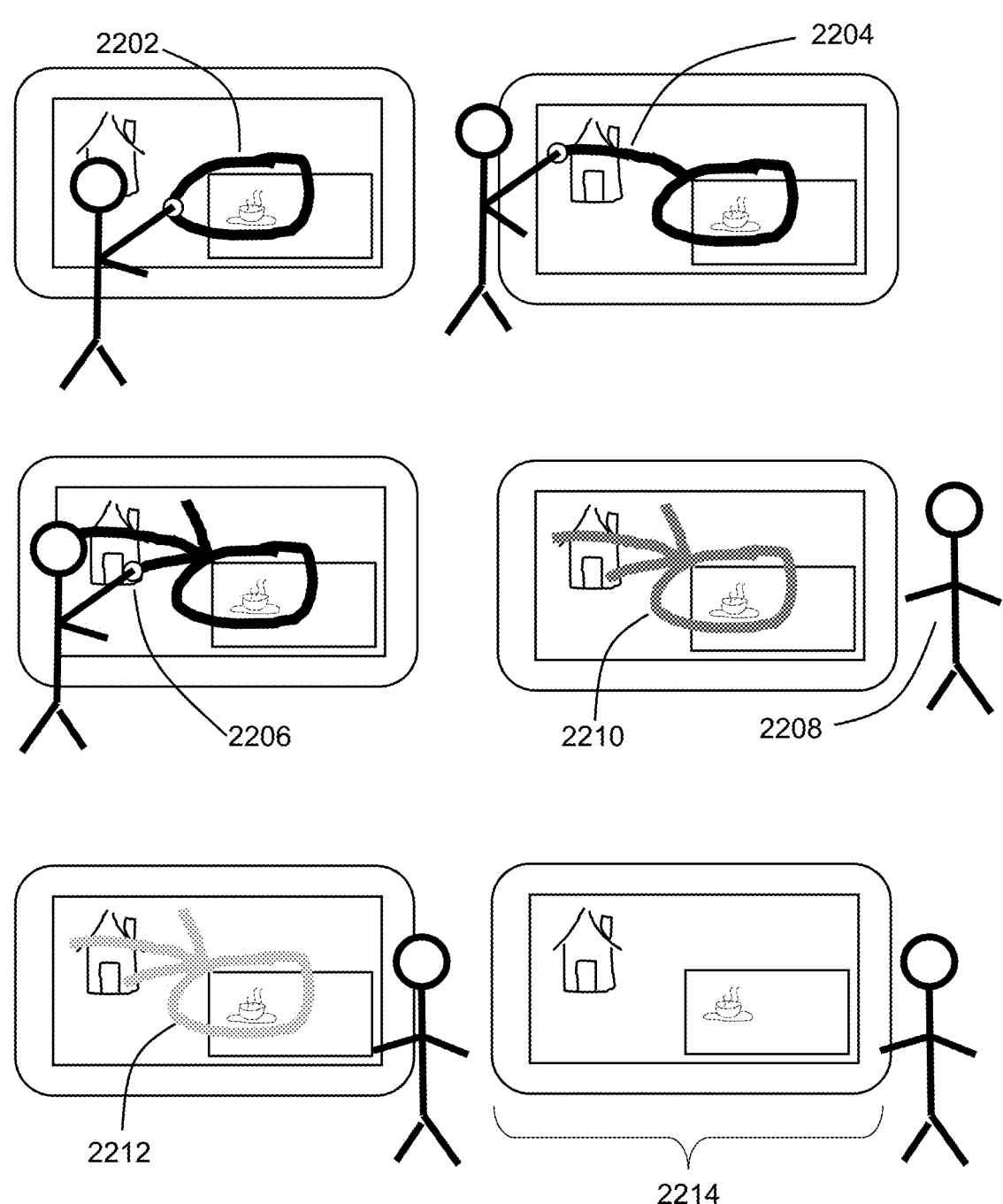
FIG. 22 illustrates the Tracer used to create spontaneous highlights during a presentation in some embodiments.
Figure 23A:
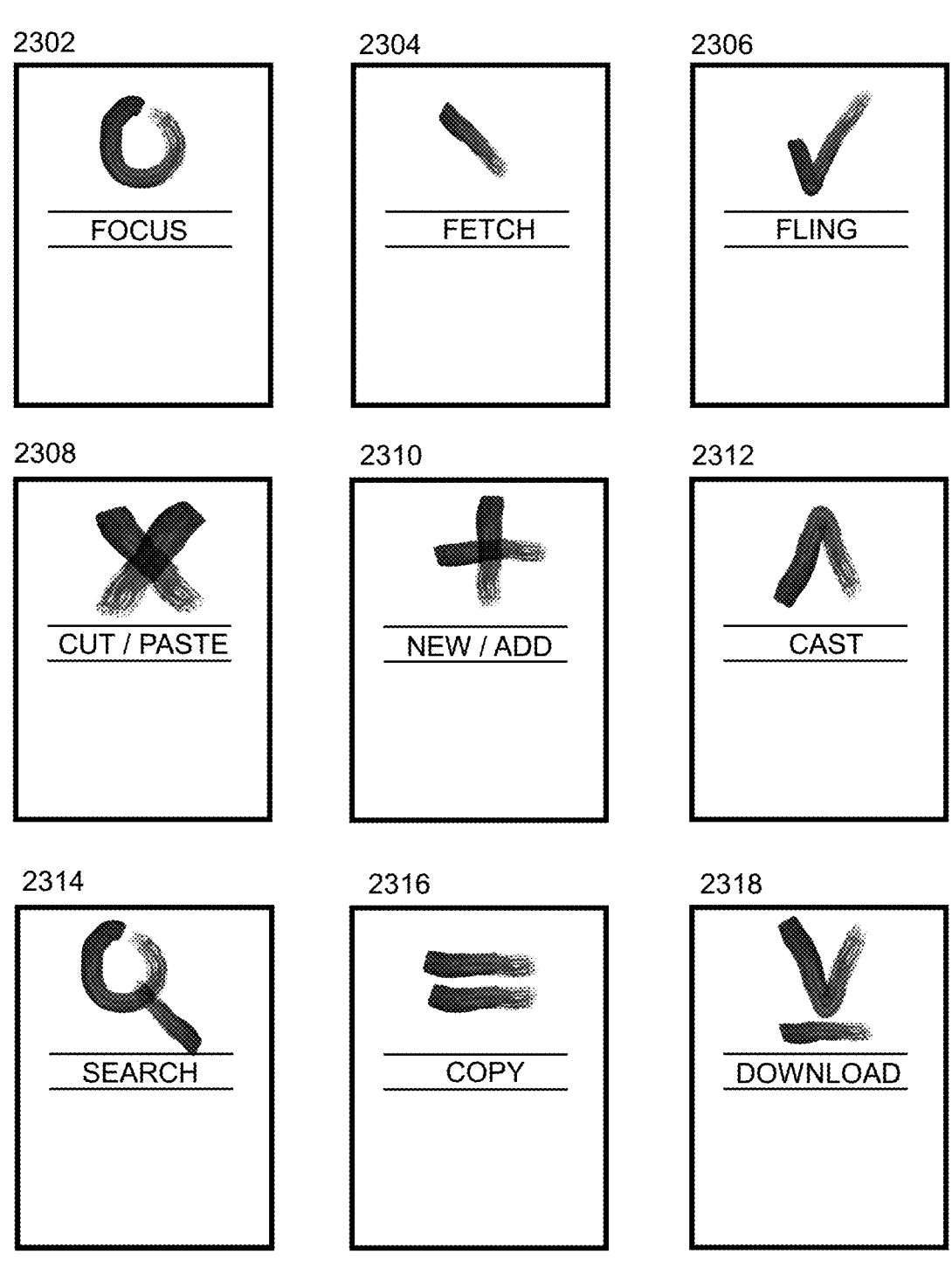
FIGS. 23A, 23B, 23C, and 23D serve as a guide to Tap-Symbols used on the platform with their associated names in some embodiments.
Figure 23B:
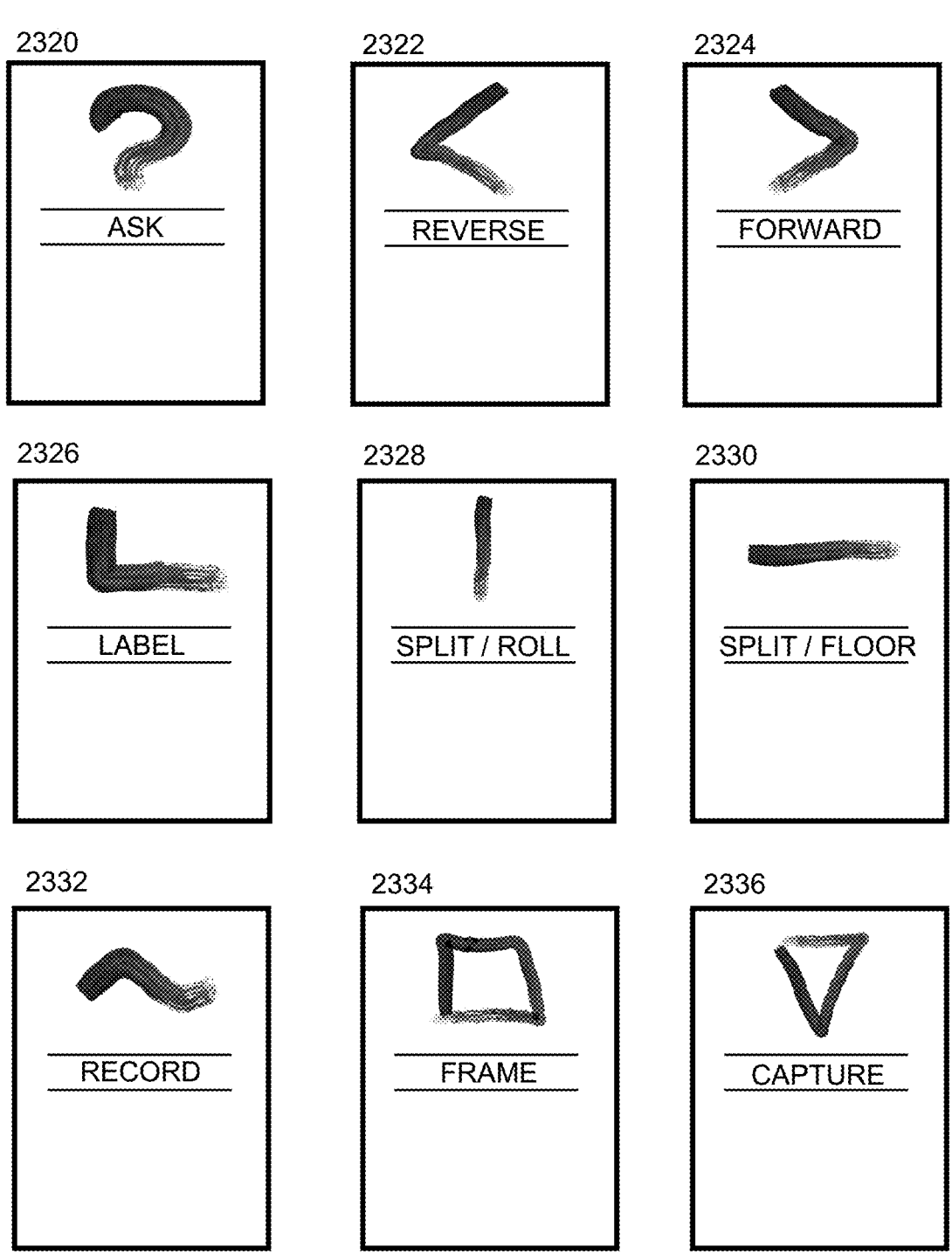
Figure 23C:
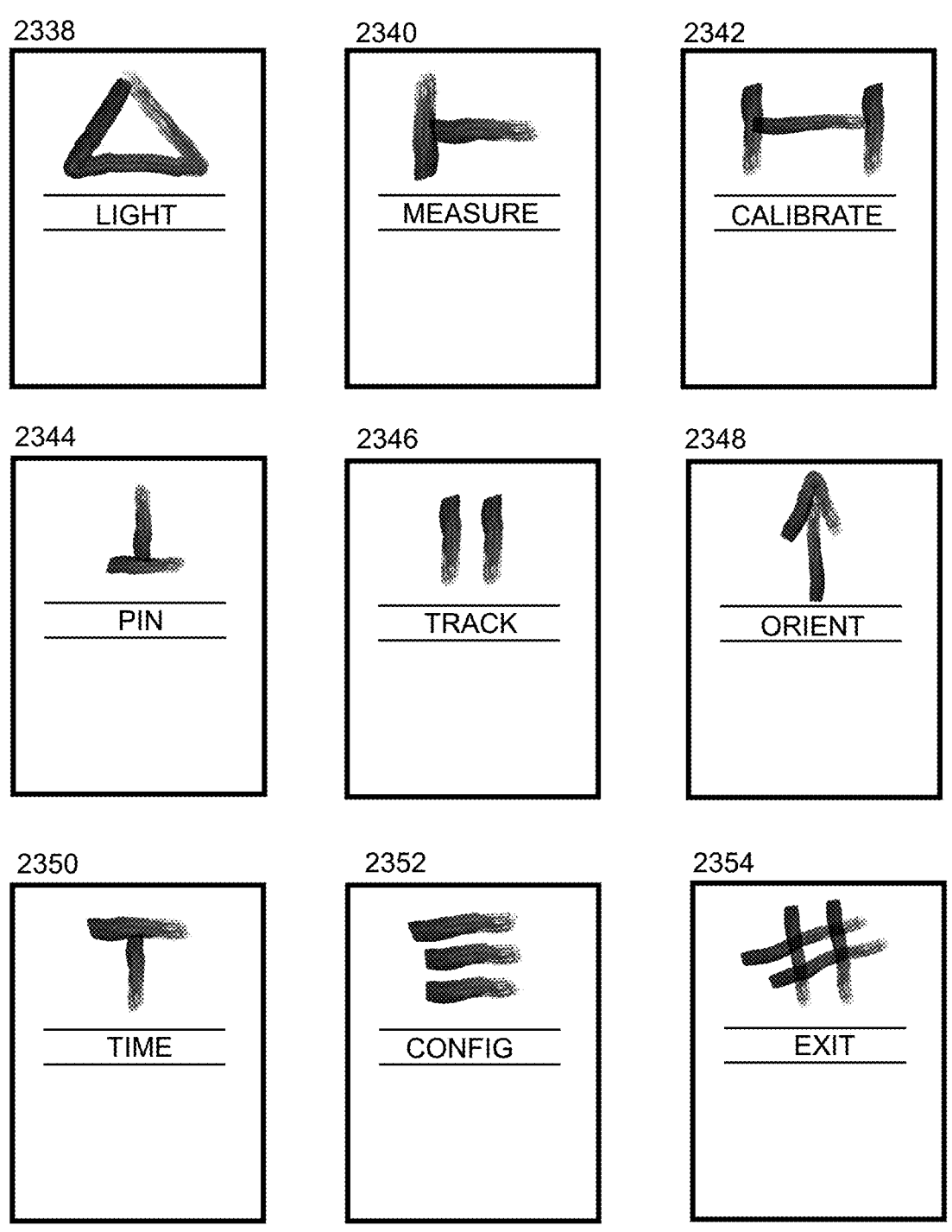
Figure 23D:
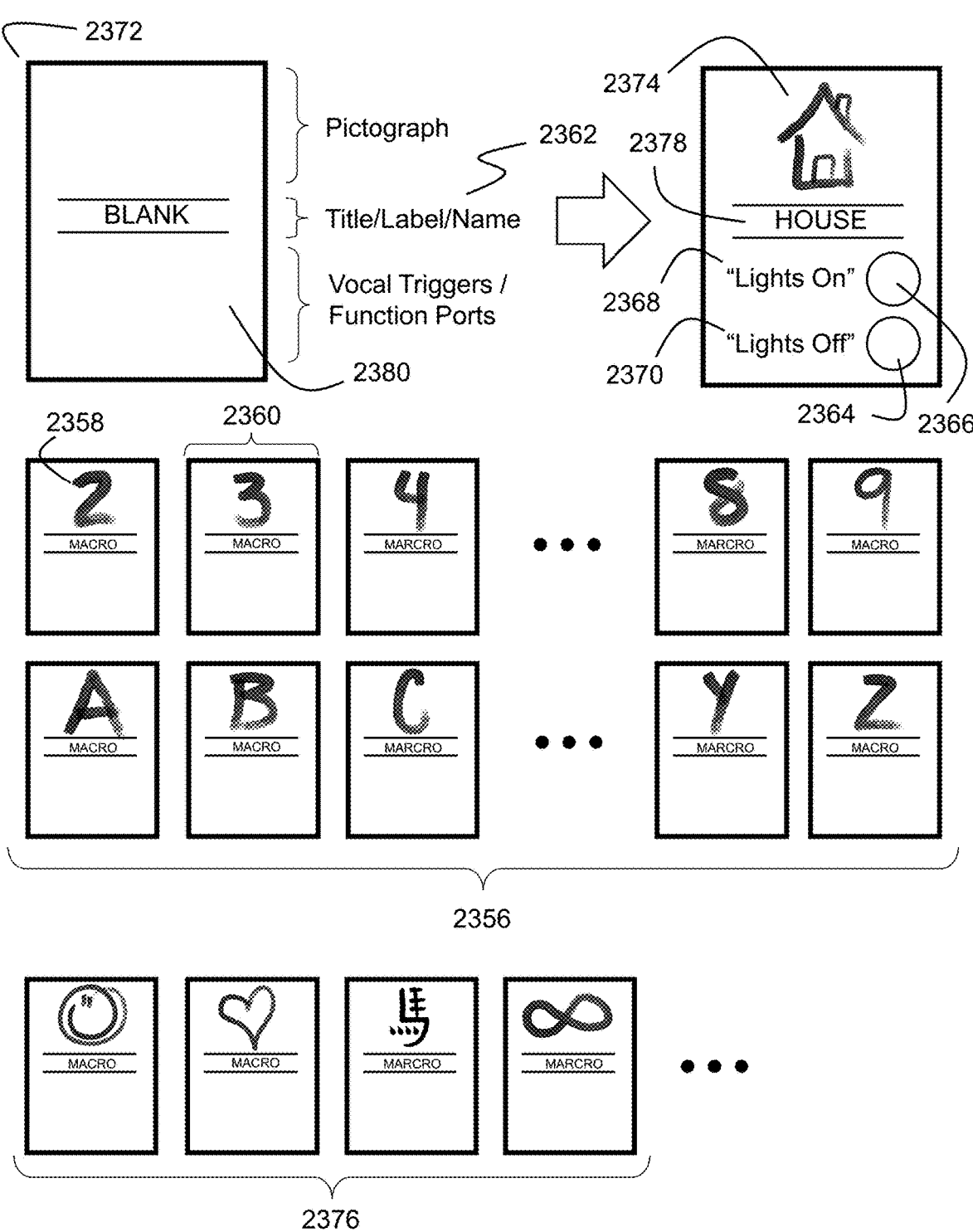

FIG. 22 illustrates the Tracer used to create spontaneous highlights during a presentation in some embodiments. A speaker/presenter/lecturer can use the Tracer to bring special emphasis to Tap-Board content without compromising the materials, or requiring delete/undo operations. In the default mode of operation, a single-finger drag, produces Tracer strokes 2202. At the end of each stroke a Fade-Timer is launched that begins to fade the opacity of Tracer strokes making them disappear over a short interval of time. Each successive Tracer stroke 2204, 2206 resuscitates the Tracer strokes still in the scene, making them completely opaque again. Holding the Tap-Board pauses the fade 2206. Once the board remains untouched 2208, the strokes begin growing fainter 2210, 2212. Once the stroke opacity reaches a minimum threshold they are removed from the Tap-Board scene 2214.

Tapistry Tap-Symbols

FIGS. 23A, 23B, 23C, and 23D serve as a guide to Tap-Symbols used on the platform with their associated names in some embodiments. Each Tap-Symbol can have one or more triggering actions related to Tap-Trigger, Drip-Trigger, Hold-Trigger, and/or Pause-Trigger. Some Tap-Symbols have a VUI nature associated with one or more of their Hold/Drip/Pause Triggers. While the Tap-Symbol is held, Vocals associated with the Tap-Symbol are registered with the VUI and remain active. When the Tap-Symbol is released the VUI is deactivated, yielding a Touch-to-Talk switch. Some Tap-Symbols are location dependent, using the position and size of the Tap-Symbol to influence the triggered action, such as the Fetch-Symbol. Some Gestures are location invariant and trigger the associated activity regardless of location and size, such as the New/Add-Symbol. Some Tap-Symbols employ Compound-Gestures to deliver additional capabilities onto the Tap-Board such as the Cut/Paste-Symbol. Some Tap-Symbols are used in conjunction with each other, across a network by two users on different devices. These are used to achieve multi-user coordination across Tapisphere topologies. These coordinated Tap-Symbols include: Fetch and Fling, Add and Cast, Ask, and Floor for requesting 3D-Forum leadership. These particular Tap-Symbols are not exhaustive and only show the potential to continue expanding on the Tracer-Mechanism to deliver platform capabilities without impacting the graphical interface. A quick overview of each Tap-Symbol in FIG. 23A-D is given below, followed by demonstrations in FIGS. 24 through 40.

Focus-Symbol

Figure 24:
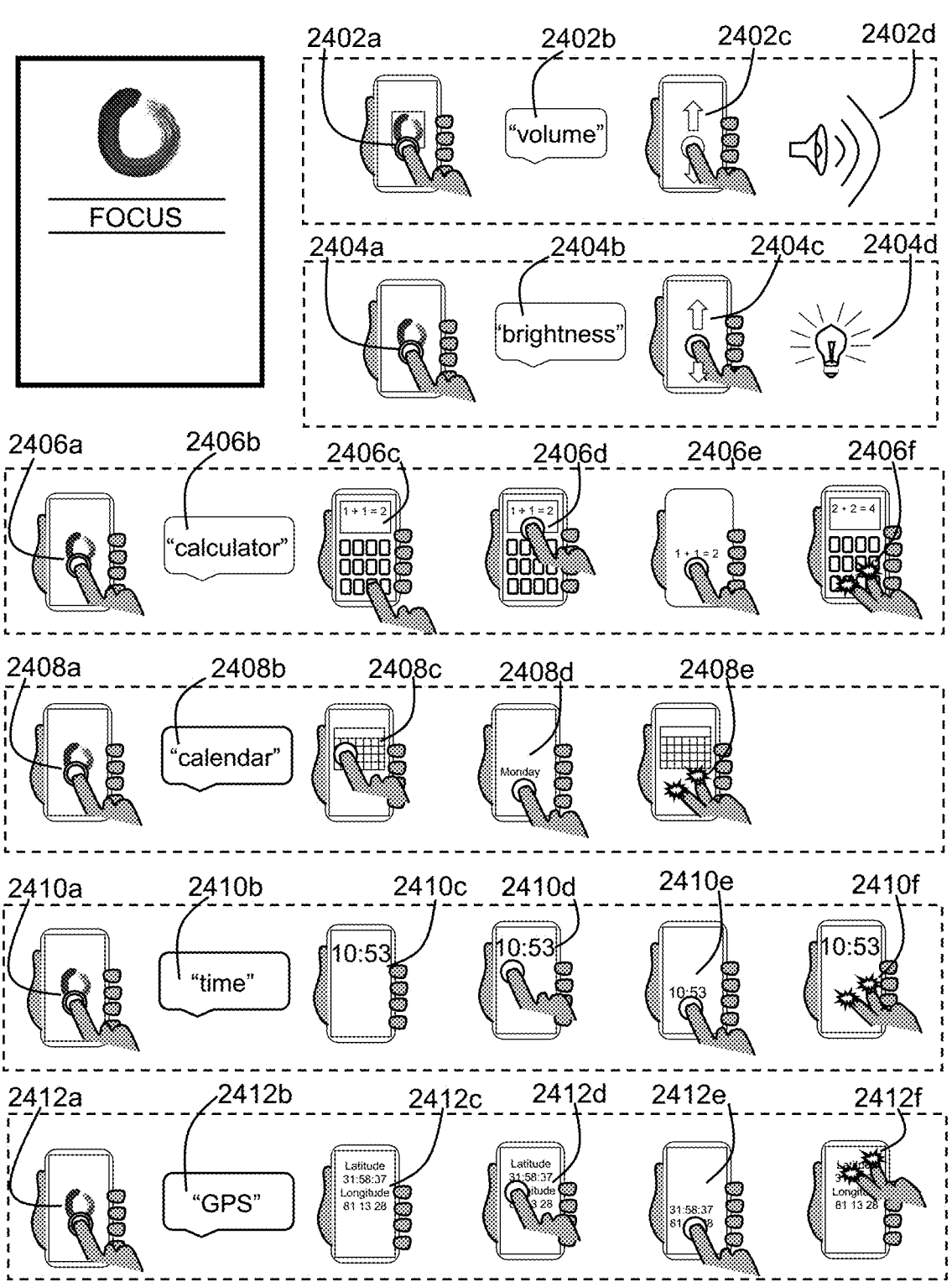
FIG. 24 illustrates the use of the Focus Tap-Symbol to call forth various Tap-Tools and abilities in some embodiments.

The Focus Tap-Symbol 2302 is an entry point for open-ended Vocal applications. The Focus Tap-Symbol delivers a polymorphic capability using the VUI to configure capabilities, deliver features, and launch applications. A Hold-Trigger of the symbol registers a list of Vocals with the VUI, priming the Tap-Tools for easy voice retrieval or converting the hold finger into a controlling gesture. FIG. 24 illustrates several examples. A Tap-Trigger of the Focus Tap-Symbol locks the VUI providing a hands free digital assistant mode where all activities are conducted using natural language interactions.

Fetch-Symbol

The Fetch Tap-Symbol 2304 is used to place Glyphs/Tap-Forms in a Tap-Board/Tap-Space. The size and location of the slash stroke scales and positions the Glyph/Tap-Form simultaneously. There are four directions the diagonal slash can take: Down and to the Right, Down and to the Left, Up and to the Right, Up and to the Left. These directions can be utilized to communicate user intent. As currently implemented, Tap-Triggering an Up-Left or Up-Right Fetch-Symbol creates a new Tap-Board/Tap-Space and embeds it in the current Tap-Board/Tap-Space as a Tap-Way Glyph/Tap-Form, sized to the rectangle defined by the diagonal.

Figure 26:
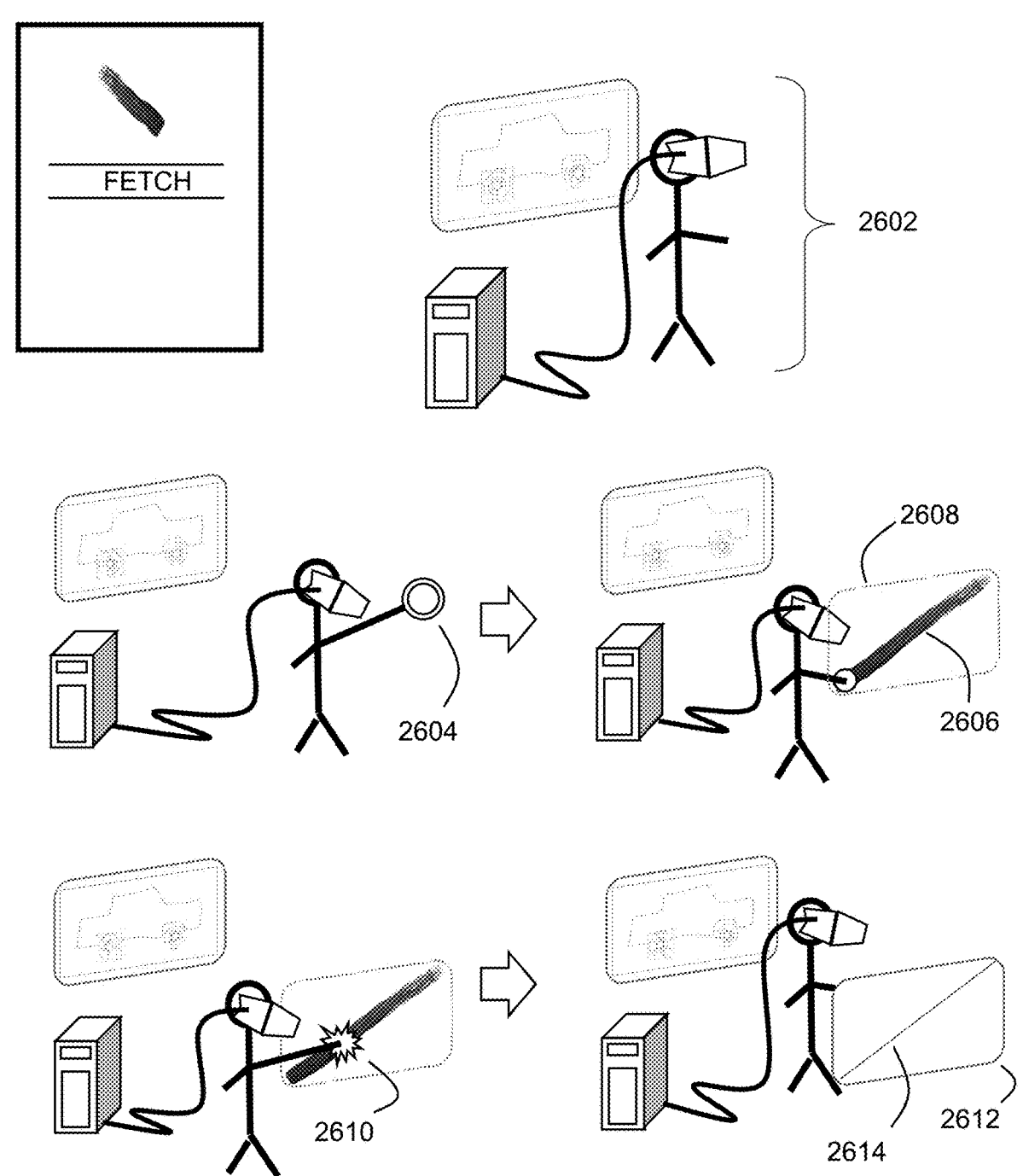
FIG. 26 illustrates carving out a new Virtual Display in an AR/VR session in some embodiments.

Tap-Triggering the Down-Right or Down-Left Fetch-Symbol, creates a Tap-Region/Tap-Display. The Tap-Region is a blank Glyph with a slight background coloring, serving as a container for annotations and Sub-Glyphs. The Tap-Region in combination with the Fetch-Gesture yields an agile structuring mechanism for annotation content down into the board (z-dimension) yielding a 3D-Whiteboarding like experience. Combined with Tap-In and Tap-Out, the ability to carve out Tap-Regions on-the-fly while lecturing delivers a frictionless content creation experience. In an AR/VR environment the Fetch Tap-Symbol, performed in 3D-space, triggers the creation of a Tap-Display (FIG. 26). This provides AR/VR users with an efficient means of carving up the virtual space simply by slashing the air.

Figure 25:
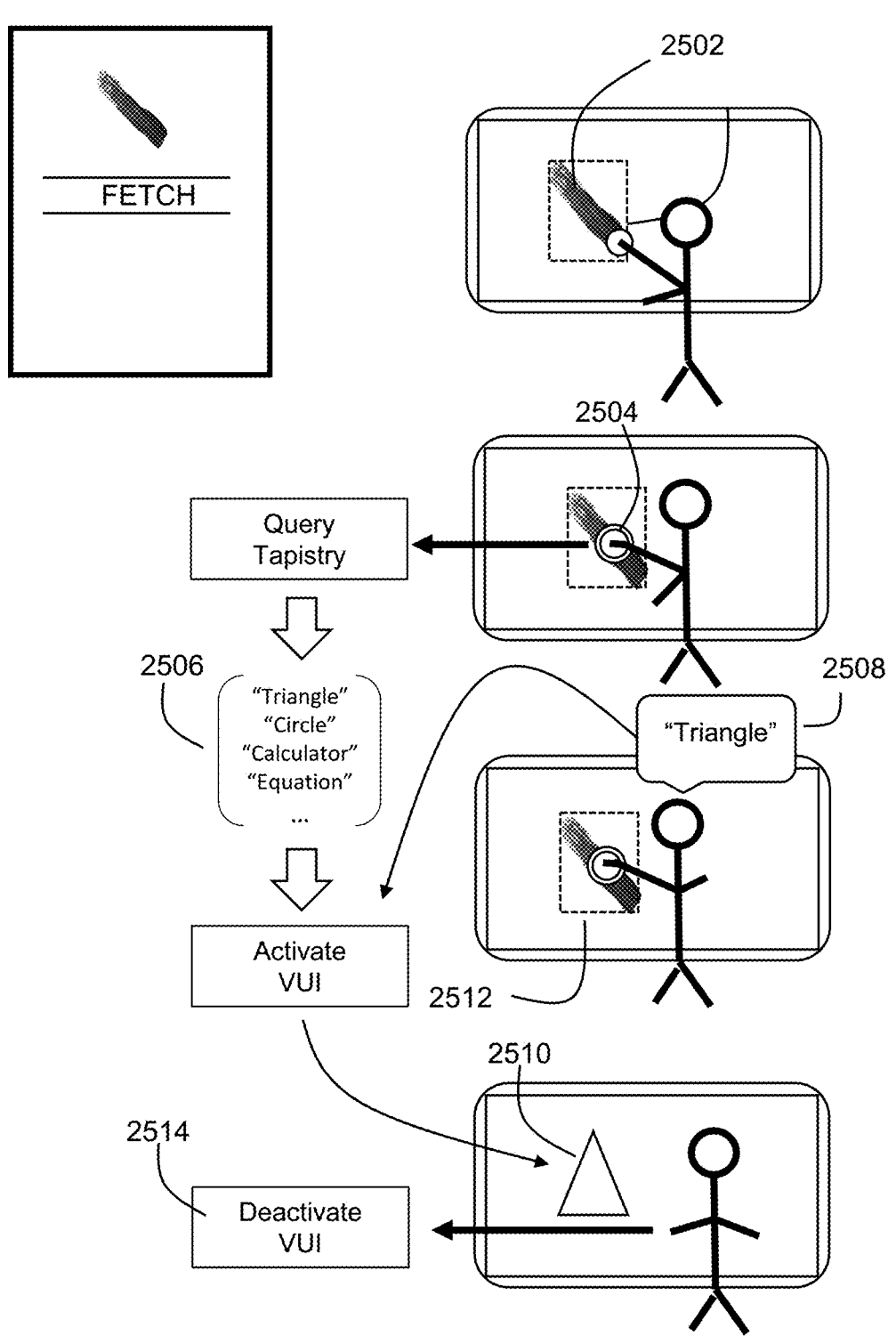
FIG. 25 illustrates the fetching of a Glyph type using the Fetch Tap-Symbol in some embodiments.
Figure 28:
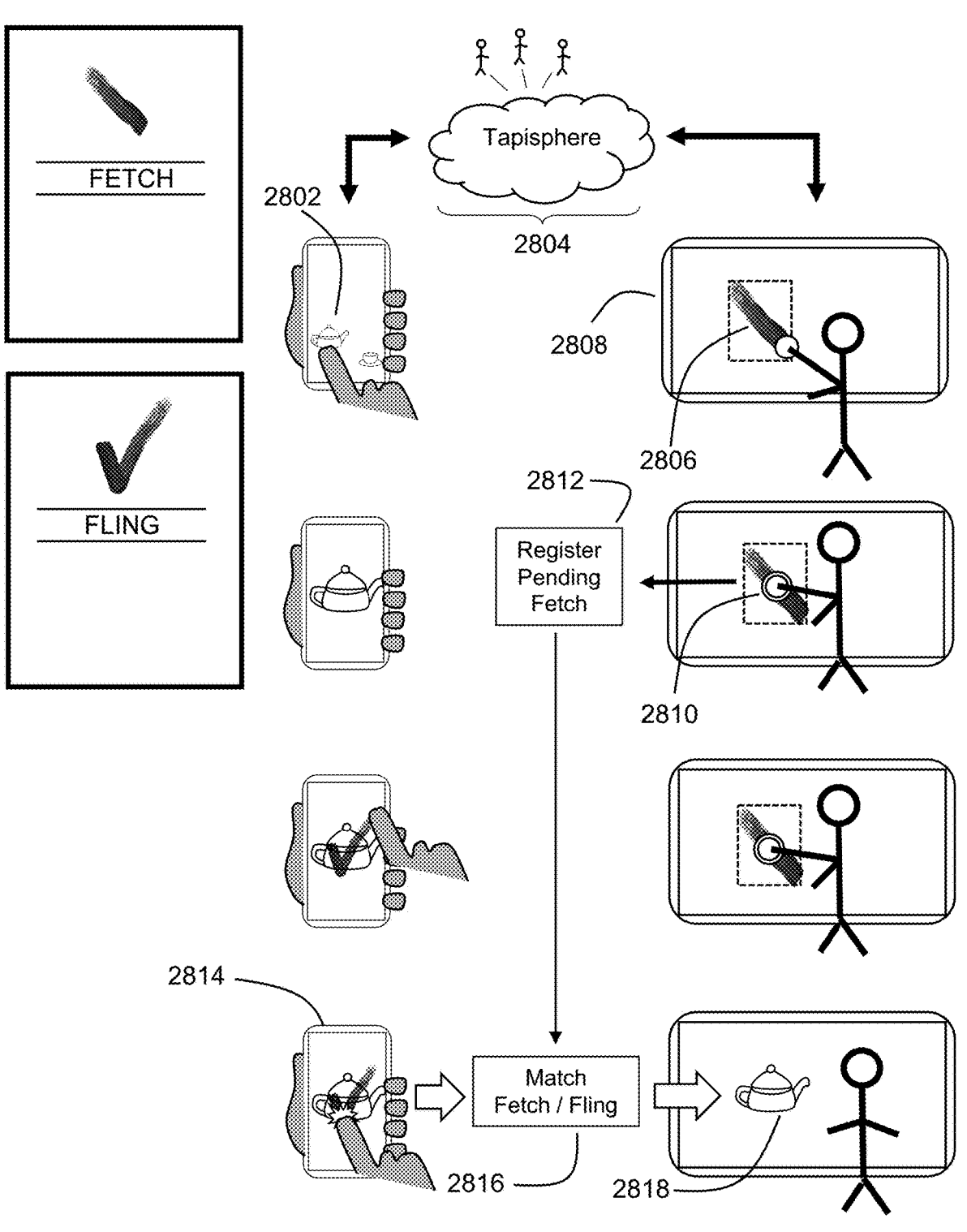
FIG. 28 illustrates flinging Glyph materials across a Tapisphere between two persons using the Fetch and Fling Tap-Symbols in some embodiments.

Hold-Triggering the Fetch-Symbol loads a list of Glyph/Tap-Form types and named Tap-Boards/Tap-Spaces into the VUI. When the user "speaks" the name of content on this list, the resource is fetched and inserted in the defined slash region (FIG. 25). The Fetch Tap-Symbol is used in conjunction with the Fling Tap-Symbol to move Glyph/Tap-Form content from one device context to another using the Tapisphere to coordinate the Compound-Gesture execution (FIG. 28).

Fling-Symbol

The Fling Tap-Symbol 2306 sends Glyph/Tap-Form content to other devices in a Tapisphere session or to locations in the user's information space. Tap-Triggering the Fling-Symbol sends content to any pending Fetch Tap-Symbols in the Tapisphere being held by other users (described in FIG. 28). Hold-Triggering the Fling Tap-Symbol over a Glyph/Tap-Form loads the VUI with a list of named Tap-Board/Tap-Space locations across the user's information space. If the user "speaks" one of these locations, the Tap-Board/Tap-Space is brought to the user to drop the Glyph/Tap-Form in (described in FIG. 27).

Cut/Paste-Symbol

The Cut/Paste Tap-Symbol 2308 is used to cut and paste Glyph/Tap-Form content within an information space. Tap-Triggering the Cut/Paste Tap-Symbol over a Glyph/Tap-Form removes the Glyph to a virtual clip buffer. Hold-Triggering the Cut/Paste Tap-Symbol allows a second Compound Drip-Gesture to be used to paste previously cut Glyph/Tap-Form material from the clip buffer back into the Tap-Board/Tap-Space, FIGS. 31A and 31B.

New/Add-Symbol

The New/Add Tap-Symbol 2310 is used to add Tap-Boards/Tap-Spaces to the current Working-Deck/Space-Deck. The Tap-Trigger version of the symbol adds a new Tap-Board/Tap-Space to the current Working-Deck/Space-Deck, FIG. 29. The Hold-Trigger version of the symbol loads the VUI with a list of named Tap-Board/Tap-Space locations across the user's information space. If the user "speaks" one of these locations, that Tap-Board/Tap-Space is fetched and added to the current Working-Deck/Space-Deck. Holding the New/Add Tap-Symbol can also be used in conjunction with a secondary Cast-Symbol executed on a second device to receive a Tap-Board/Tap-Space cast by a second user, FIG. 30.

Cast-Symbol

Figure 30:
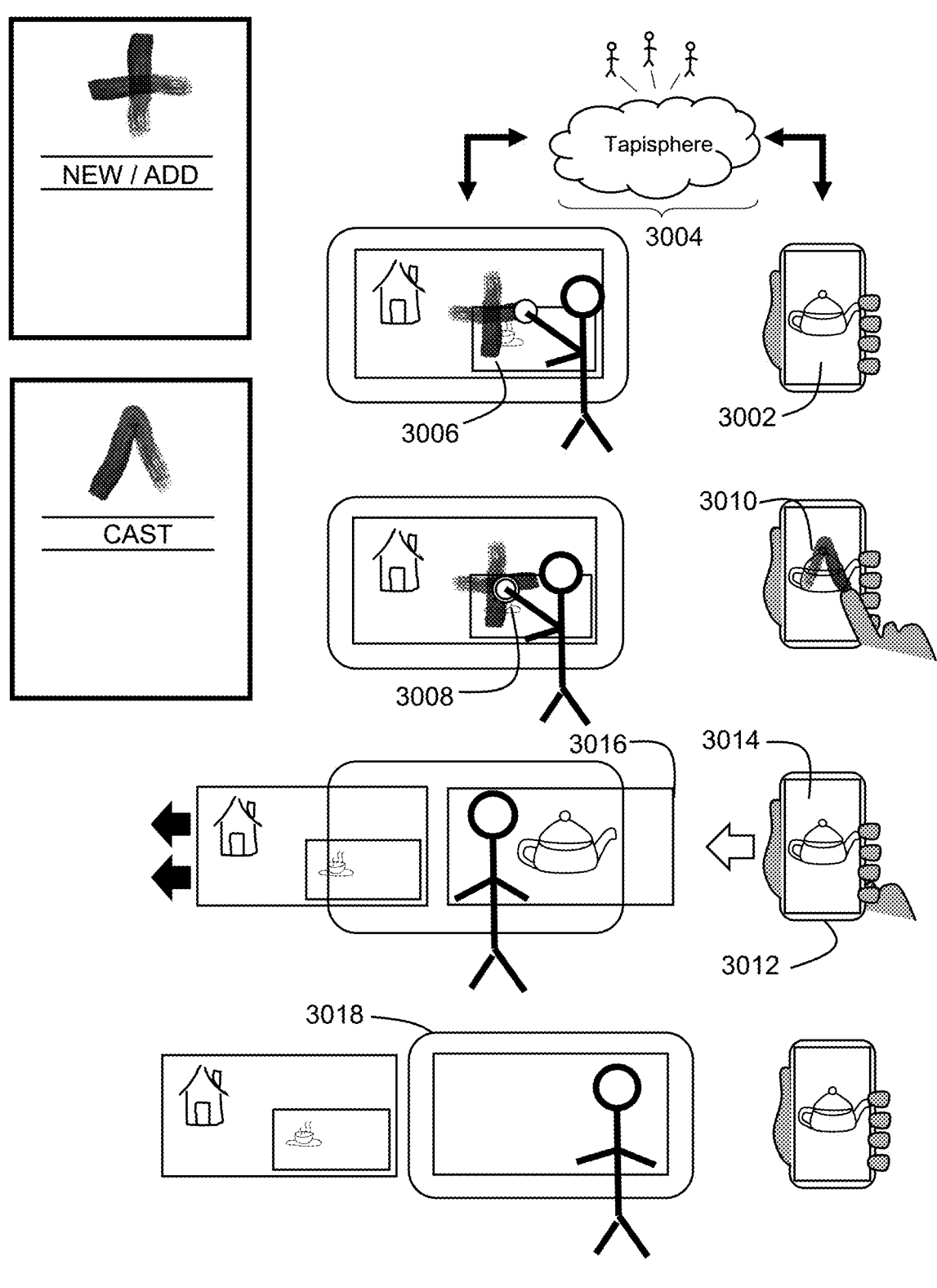
FIG. 30 illustrates casting a Tap-Board across a Tapisphere, between two persons using the Fetch and Cast Tap-Symbols in some embodiments.

The Cast Tap-Symbol 2312 is used to send a Tap-Board/Tap-Space to other places in the Tapisphere in combination with pending Add-Symbol Gestures being held by other users, FIG. 30.

Search-Symbol

The Search Tap-Symbol 2314 is used to search for content. The Tap-Trigger version brings up a search facility where the user can specify search terms to look for across the user's information space. The Hold-Trigger version allows the user to "speak" search terms and/or phrases to search for using the VUI while the Hold-Gesture is maintained.

Copy-Symbol

The Copy Tap-Symbol 2316 makes a copy of the current Tap-Board/Tap-Space and adds it to the current Working-Deck/Space-Deck in response to a Tap-Trigger.

Download-Symbol

The Download Tap-Symbol 2318 is used to download Glyph-Packs in response to the Hold-Trigger Gesture. The Tap-Trigger version brings up a Web-Browser Tap-Tool.

Ask-Symbol

The Ask Tap-Symbol 2320 when Hold-Triggered, is used to ask a question during a Tapisphere multi-device session (described in FIG. 32) or when Tap-Triggered, to fetch information about a Glyph/Tap-Form context under the Tap-Trigger.

Reverse/Forward-Symbols

Figure 49:
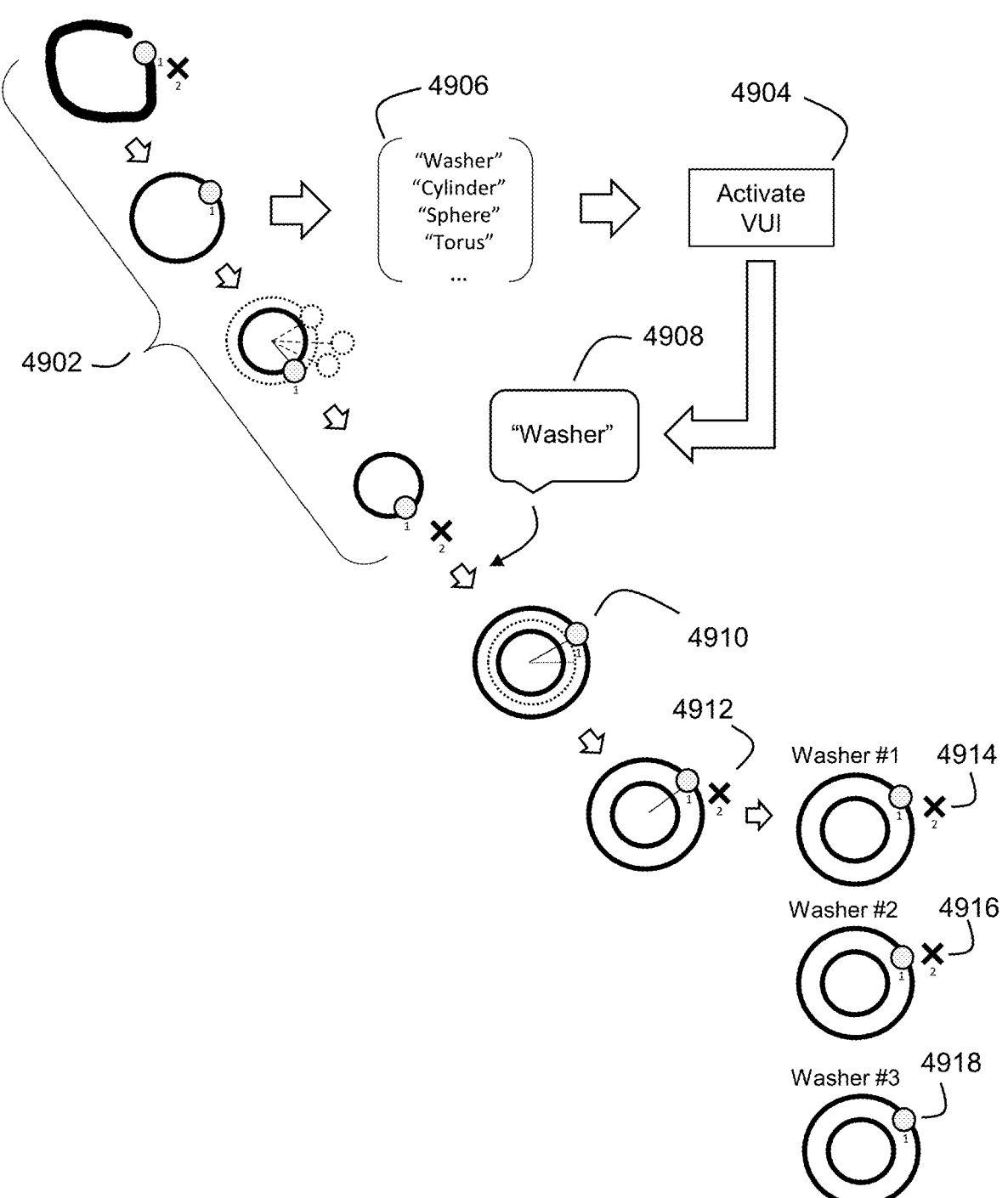
FIG. 49 shows a series of drawing steps that create several Washer Glyph-Shapes in one fluid motion in some embodiments.

The Reverse and Forward Tap-Symbols 2322, 2324 place Vignettes into a playable state showing a Play-Triangle over the Vignette. The Reverse-Symbol resets the Vignette to the start point and places the Play symbol over it. The Forward-Symbol forwards the Vignette to the end state. FIG. 49 illustrates both these gestures in the context of Vignette navigation.

Label-Symbol

The Label Tap-Symbols 2326 inserts clean font-based Labels into Tap-Board/Tap-Space content. The Tap-Trigger version creates a blank Label Glyph/Tap-Form that can be filled in with a keyboard or screen pad. The Hold-Trigger version invokes VUI dictation while it is held allowing the user to dictate into the defined space. The direction of the Label-Symbol pattern is used to dictate many aspects of the text format. The Label-Symbol is made as a right-angle that can be facing one of four directions: Right, Left, Up, and Down. These directions provide left-justified, right-justified, vertical-down and vertical-up text formatting and rotations. The height of the 'L' determines the Font size. These variations are demonstrated in FIG. 33.

Split/Roll-Symbol

The Split/Roll Tap-Symbol 2328 has two distinct modes. The Split-mode is Tap-Triggered to cause a single view to be split in two along the vertical made by the symbol. This is used along with the horizontal Split/Floor-Symbol to create multi-view layouts (described in FIG. 35). The Roll-mode is Hold-Triggered placing the Working-Deck/Space-Deck into a scroll mode that can be moved from side-to-side similar to a classroom of rolling chalk-boards (described in FIG. 34).

Split/Floor-Symbol

The Split/Floor Tap-Symbol 2330 has two distinct modes. The Split-mode is Tap-Triggered to cause a single view to be split in two along the horizontal made by the symbol. This is used along with the vertical Split/Roll-Symbol to create multi-view layouts (described in FIG. 35). The Floor-mode is Hold-Trigged to create a coordination protocol for 3D-Forums where a participant wishes to gain control of the speaker/leadership role (described in FIG. 36).

Record-Symbol

The Record Tap-Symbol 2332 creates a Recorder Glyph/Tap-Form to capture audio recordings. When Tap-Triggered, a Recorder Glyph/Tap-Form is created and placed in the Tap-Board/Tap-Space at the tap point. The Recorder immediately starts recording until a Tap-Gesture toggles it to a paused state. A Grab-Gesture temporarily pauses recording until the Gesture is released. When Hold-Triggered, a Recorder Glyph/Tap-Form is again created and launched with pause operations reversed. In this scenario, grabbing the Recorder activates recording whereas releasing the Recorder pauses it.

Frame-Symbol

The Frame Tap-Symbol 2334 selects Tap-Board/Tap-Space content. The Tap-Trigger version creates a screen shot of material within the rectangle of the frame shape in AR/VR this is from the point of view of the user through the Traced frame. The Hold-Trigger version registers a list of Vocal operations with the VUI that can be performed on the selected context of the frame shape. In the AR/VR version this means Tap-Forms that are in the field of view through the frame. Examples Vocals are "Print", "Align-Right . . . ", "Center", "Group" etc. Each Vocal can define custom Compound-Gestures to augment the operation.

Capture-Symbol

The Capture Tap-Symbol 2336 invokes the device camera to capture either video or still pictures. In VR the camera is a Camera Tap-Form placed and pointed within the Tap-Space to capture a point of view in the scene. The Tap-Trigger version creates a Video Glyph/Tap-Form that is Tap-Triggered to start recording. Another Tap-Gesture toggles it to a paused state. While playing, a Grab-Gesture temporarily pauses the video recording until the Gesture is released. The Hold-Trigger version primes the device camera for picture capture. While holding the symbol, each Drip-Gesture causes the camera to take another snapshot. When the gesture is released, these snapshots are dropped onto the underlying Tap-Board/Tap-Space creating a Picture Glyph/Tap-Form stack.

Light-Symbol

The Light Tap-Symbol 2338 turns on the LED light on a smartphone. In VR, this controls the background ambient lighting within the virtual space. The Tap-Trigger version turns on the light on the smartphone until the symbol is tapped again to turn the light off and exit the mode. In AR/VR the Tap-Trigger creates a light source Tap-Form that is Tap-Triggered to toggle the light source on and off. The light source can be aimed and adjusted to create lighting effects from spotlight to diffuse light. The Hold-Gesture on the phone turns the light on until the gesture is released with Drip-Gestures toggling between on and off.

Measure-Symbol

The Measure Tap-Symbol 2340 transforms the mobile device into a virtual tape measure or sextant. By integrating the accelerometer data to determine translation values and rotation angles. These measurements are easily dropped onto a Tap-Board/Tap-Space to augment content. This scenario is demonstrated in FIG. 37.

Calibrate-Symbol

The Calibrate Tap-Symbol 2342 calibrates picture/model content so that real world scaling information is carried with the picture/model. This allows arbitrary pictures/models to be combined (embedded one within the other as a Sub-Glyph/Sub-Form) such that the Sub-Glyph/Sub-Form is auto-scaled relative to the parent Glyph/Tap-Form scale information (demonstrated in FIG. 38).

Pin/Track-Symbols

The Pin and Track Tap-Symbols 2344, 2346 create Tap-Maps that can track the geo-location of the user's smartphone as a Glyph/Tap-Form in any picture/model. These symbols take advantage of the GPS sensors on a smartphone device. The Pin Tap-Symbol calibrates picture/model content with GPS pin points that orient the content with respect to the GPS coordinate system, creating a Tap-Map. Once created, a Sub-Glyph/Tap-Form of the Tap-Map can be Tap-Synched and Tracked on the Tap-Map using the current GPS position of the mobile phone (demonstrated in FIG. 39).

Orient-Symbol

The Orient Tap-Symbol 2348 creates a relative orientation between two or more devices in a Tapisphere session. In AR/VR this orientation is between the Tap-Space and one or more peripheral devices that are physically in the virtual simulation space. By orienting a smartphone with a large format flat panel display, a useful 3D-Mouse capability is produced, allowing a lecturer or presenter to use their smartphone to interact with Glyph/Tap-Form materials by pointing the smartphone at the Tap-Board/Tap-Space contents and issuing Gestures through the phone screen while executing them on the main presentation device or AR/VR environment (illustrated in FIG. 40).

Time-Symbol

The Time Tap-Symbol 2350 fetches time-based Tap-Tools that provide time, calendar, and schedule facilities. These tools can interact with the underlying information space Tap-Board/Tap-Spaces as well as creating Tap-Boards/Tap-Spaces tied to specific days, months, years and time slots.

Config-Symbol

The Config Tap-Symbol 2352 opens context-defined configuration facilities based on the Glyph/Tap-Form or Tap-Board/Tap-Space context. The Tap-Trigger version opens configuration facilities on the tapped entity. The Hold-Trigger version loads configuration Vocals into the VUI engine to provide the ability to set controls and options on a Glyph/Tap-Form, Tap-Tool or Tap-Board/Tap-Space verbally.

Exit-Symbol

The Exit Tap-Symbol 2354 provides an equivalent for the application close button. Tap-Triggering the Exit-Symbol closes the Tapistry and/or Tapisphere session.

Tap-Macro

The Tap-Macros 2356 are functionally configurable Tap-Symbols 2358, trigger-able with the Tracer or VUI. Tap-Macros are Glyphs/Tap-Forms 2360 that can be placed in a Tap-Board/Tap-Space to produce platform functionalities. The Tap-Macro can be placed on a Tap-Board/Tap-Space to create a fetchable resource that is added to the current Working-Deck/Space-Deck in response to Tracer triggering. The Tap-Macro can be given a custom Label/Name/Title 2362 that creates a Vocal for voice retrieval using the VUI. These Vocals are used in combination with other Tap-Symbols needing named Tap-Board/Tap-Space locations 2306, 2310. Tap-Macros can be configured with functionality ports 2364, 2366. Tap-Ports provide a connection point for Tap-Links to create Tap-Rigs of functionality. These Tap-Ports are associated with a Vocal 2368, 2370 or Tap-Trigger Gesture causing them to fire (trigger) in response to the "spoken" Vocal or assigned Tap-Trigger. The Tap-Macros 2356 are a property of each Tapistry and can be assigned in different ways for each different Tapistry. Global Tap-Macros can be created at the Nexus level that operate across the user's entire information space. Macros can be configured to trigger other functionality besides Tap-Board/Tap- Space fetching, by setting up behavioral relationships between the Tap-Macro Glyph/Tap-Form and the other Glyphs/Tap-Forms in the same Tap-Board/Tap-Space (demonstrated in FIG. 41).

Tap-Blank

The Tap-Blank 2372 is a Tap-Macro Glyph that can be filled out with a custom Pictograph drawing 2374 to extend the behavior of a Tapistry information space with custom Tap-Symbols 2376. The Tap-Blank can be filled out with a Title/Label/Name/Phrase 2378 that is used for VUI trigger of the Tap-Macro functionality. The Tap-Blank allows the user to extend a Tapistry with custom functionality 2380, trigger-able from the Tracer mechanism (illustrated in FIG. 41).

Focus Digital Assistant

FIG. 24 illustrates the use of the Focus Tap-Symbol to call forth various Tap-Tools and abilities in some embodiments. The Hold-Trigger version 2402a, 2404a, 2406a, 2408a, 2410a, 2412a loads a list of available Tap-Tools and operations that can be called forth. In some of the scenarios, the hold point is transformed into a control point. In response to the user saying "volume" 2402b, the finger becomes a slider 2402c that adjusts the volume of the device 2402d either up or down. Similarly, in response to "brightness" 2404b, the finger becomes a slider 2404c that adjusts the brightness 2404d of the device display. When the slider is released, the device goes back to the previous operation. In response to "calculator" 2406b, the device is transformed into a Calculator Tap-Tool 2406c. A Hold-Gesture over the calculation 2406d causes the calculator to vanish allowing the user to drag and drop the calculation 2406e on the Tap-Board that was behind the Calculator. Dropping the calculation snaps back to the Calculator where further operations can be conducted. A Tap-Out or Pop-Out Gesture 2406f is used to exit the Calculator. This same pattern of information Drop-Through is repeated for each of the Tap-Tools. The Calendar Tap-Tool 2408b, 2408c, 2408d, 2408e; Time Tap-Tool 2410b, 2410c, 2410d, 2410e, 2410f; and the GPS Tap-Tool 2412b, 2412c, 2412d, 2412e, 2412f.

Fetching a Glyph

FIG. 25 demonstrates fetching a Glyph type using the Fetch Tap-Symbol 2502 in some embodiments. The Hold-Trigger 2504 loads a list 2506 of available Glyph types as well as named Tap-Boards and activates listening. In response to "speaking" a word or phrase 2508 on the list, the VUI engine creates the Glyph type 2510, sizing it to fit within the Fetch bounding rectangle 2512. Releasing the Hold-Gesture deactivates the VUI 2514.

Fetching a Virtual Display in AR/VR

FIG. 26 demonstrates fetching a Tap-Display in an AR/VR session 2602 in some embodiments. The user initiates Tracer-Mode by Pause-Triggering 2604 an outstretched finger by keeping it motionless in the field of view, exceeding the pause timer. Once the Tracer-Mode is initiated, the finger is dragged diagonally to create a mid-air Tracer Stroke 2606 that also defines a virtual surface 2608. Tap-Triggering the stroke 2610 by tapping the virtual touch surface produced by the stroke, triggers the Tap-Stroke interpretation. In AR/VR environments the Fetch Tap-Symbol default behavior is to create a virtual Tap-Display 2612 fitting a vertical plane to the diagonal 2614 defined by the Fetch Tap-Symbol. In AR/VR the Hold-Triggered variation registers Tap-Form names and types such that the user can speak the name of a Tap-Form to bring it into existence, scaling it to fit the bounding region 2614 described by the Gesture.

Flinging a Glyph to a Tap-Board

Figure 27:
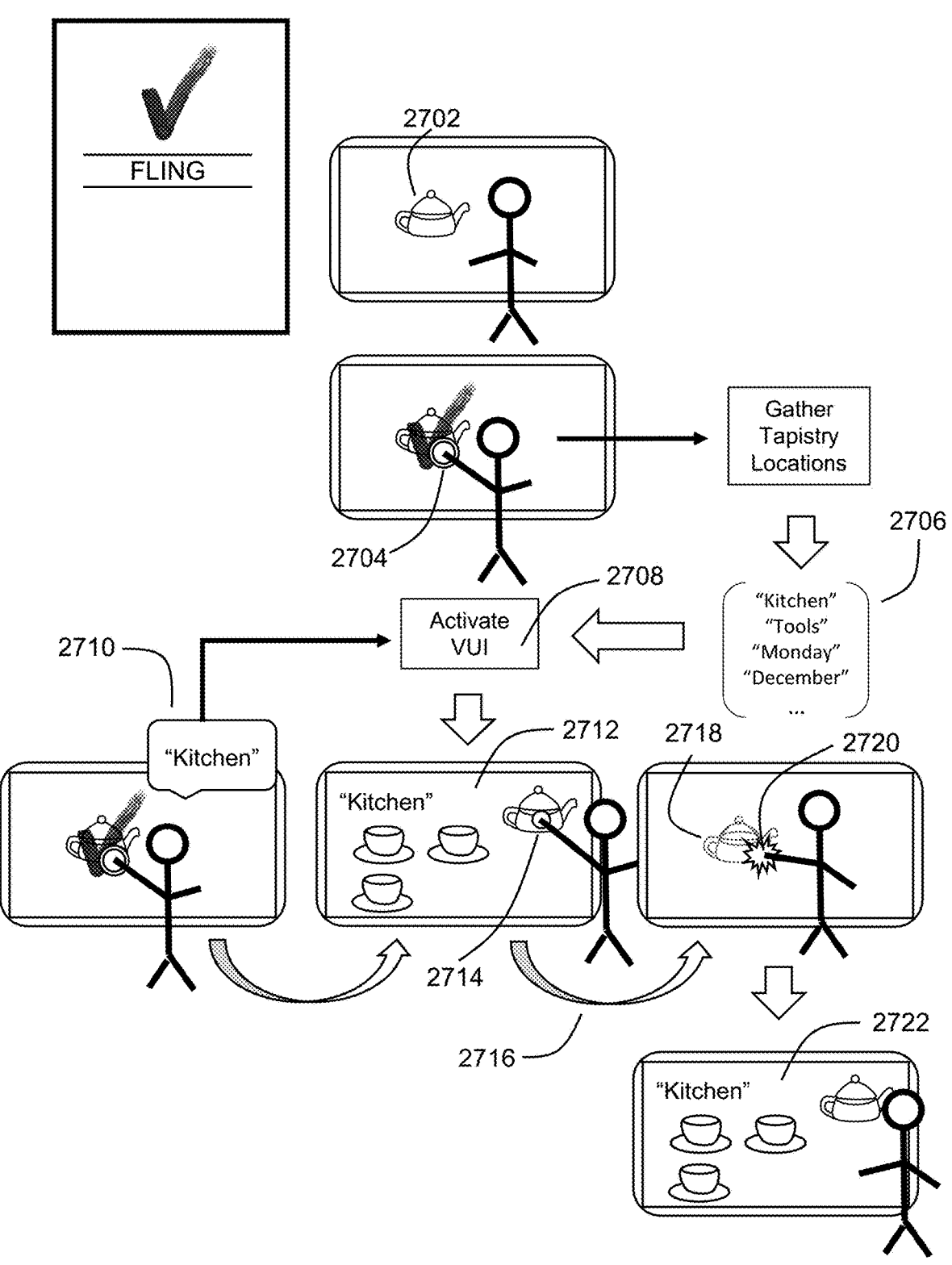
FIG. 27 illustrates the Fling of a Glyph to another location in the user's information space in some embodiments.

FIG. 27 illustrates the Fling of a Glyph 2702 to another location in the user's information space in some embodiments. In response to a Hold-Trigger 2704, the platform gathers a list 2706 of named Tap-Board locations across the user's information space. This list is loaded into the VUI engine and activated 2708. In response to hearing a Tap-Board name 2710 on the list, the VUI engine fetches the Tap-Board temporarily 2712 while the user holds the Glyph 2714 to be flung. The user can drag the Glyph to a location in the Tap-Board. On dropping the Glyph, the context is returned 2716 to the original Tap-Board, with a Tap-Way 2718 showing a thumbnail of the original Glyph. If this Tap-Way is tapped 2720, the Tap-Board that the Glyph was flung to is loaded 2722. The Tap-Way provides an audit trail recording of where a Glyph was sent.

Flinging a Glyph Across the Tapisphere

FIG. 28 illustrates flinging a Glyph 2802 across a Tapisphere 2804 between two persons using the Fetch and Fling Tap-Symbols in some embodiments. The operation begins by establishing a pending Fetch Tap-Symbol 2806 on device 2808. In response to the Hold-Trigger 2810 the pending Fetch is registered 2812 with the Tapisphere 2804. Next, a Fling is executed 2814 somewhere else in the Tapisphere over a Glyph. The Fling is matched against all pending Fetch Tap-Symbols 2816 and is sent 2818 to each location in the Tapisphere.

Adding a New Tap-Board

Figure 29:
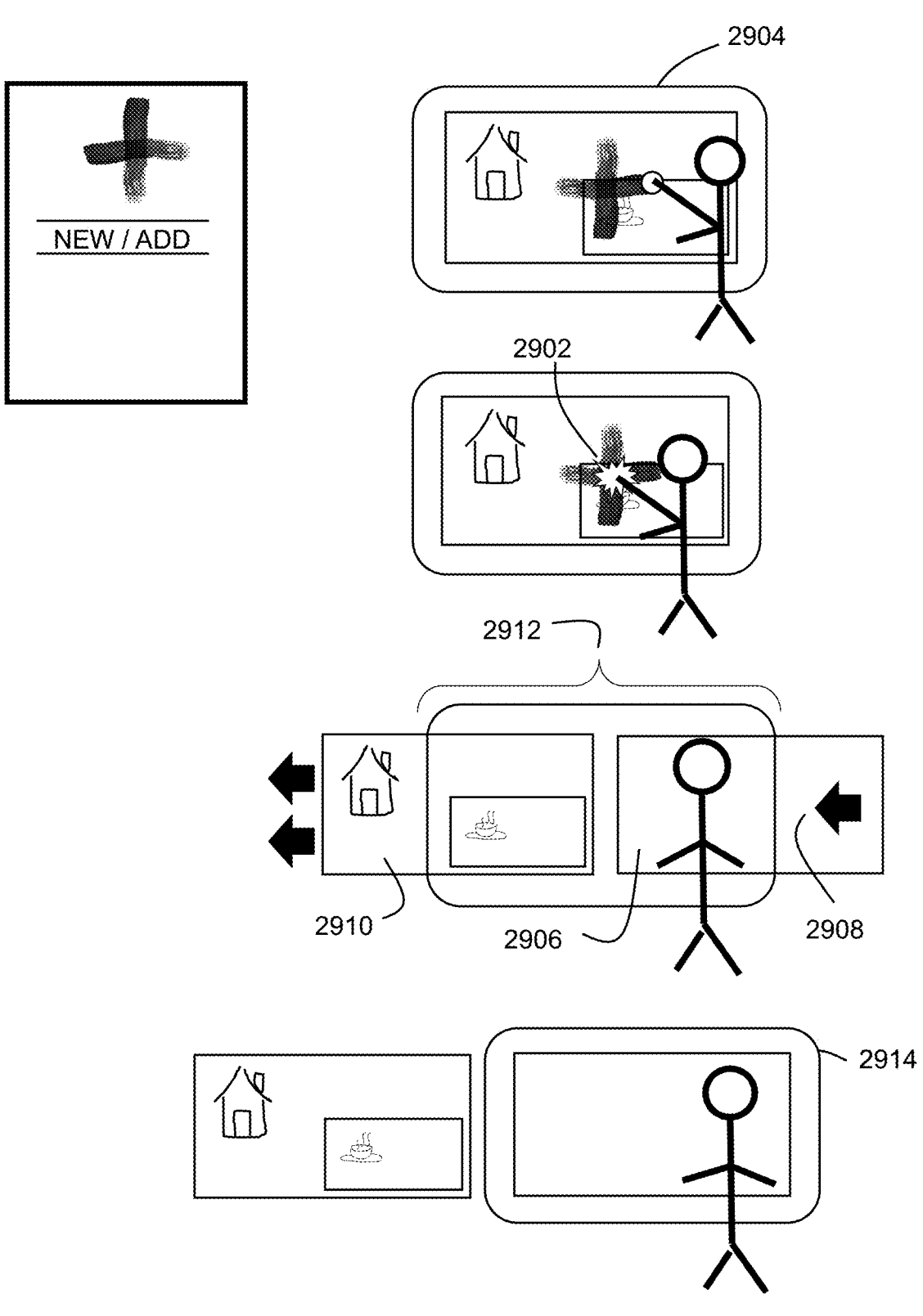
FIG. 29 illustrates adding a new Tap-Board to the Working Tap-Deck in some embodiments.

FIG. 29 demonstrates adding a new Tap-Board to the Working-Deck in some embodiments. A Tap-Trigger 2902 of the New/Add Tap-Symbol 2904, adds a clean Tap-Board 2906 that is inserted 2908 into the Working-Deck after the current Tap-Board 2910. This new Tap-Board is rolled in from the right 2912 selecting the new Tap-Board 2914.

Casting a Tap-Board Across the Tapisphere

FIG. 30 illustrates casting a Tap-Board 3002 across a Tapisphere 3004, between two persons using the Fetch and Cast Tap-Symbols in some embodiments. The operation begins by establishing a pending New/Add Tap-Symbol 3006. A Hold-Trigger 3008 of the pending Fetch is registered 3008 with the Tapisphere 3004. Next, a Cast Tap-Symbol 3010 is Tap-Triggered 3012 somewhere else in the Tapisphere over a Tap-Board 3014. This Cast is matched against all pending Add Tap-Symbols and is sent to each location in the Tapisphere to add the Tap-Board 3016, becoming the new selected Tap-Board 3018.

Cutting and Pasting Glyphs

Figure 31A:
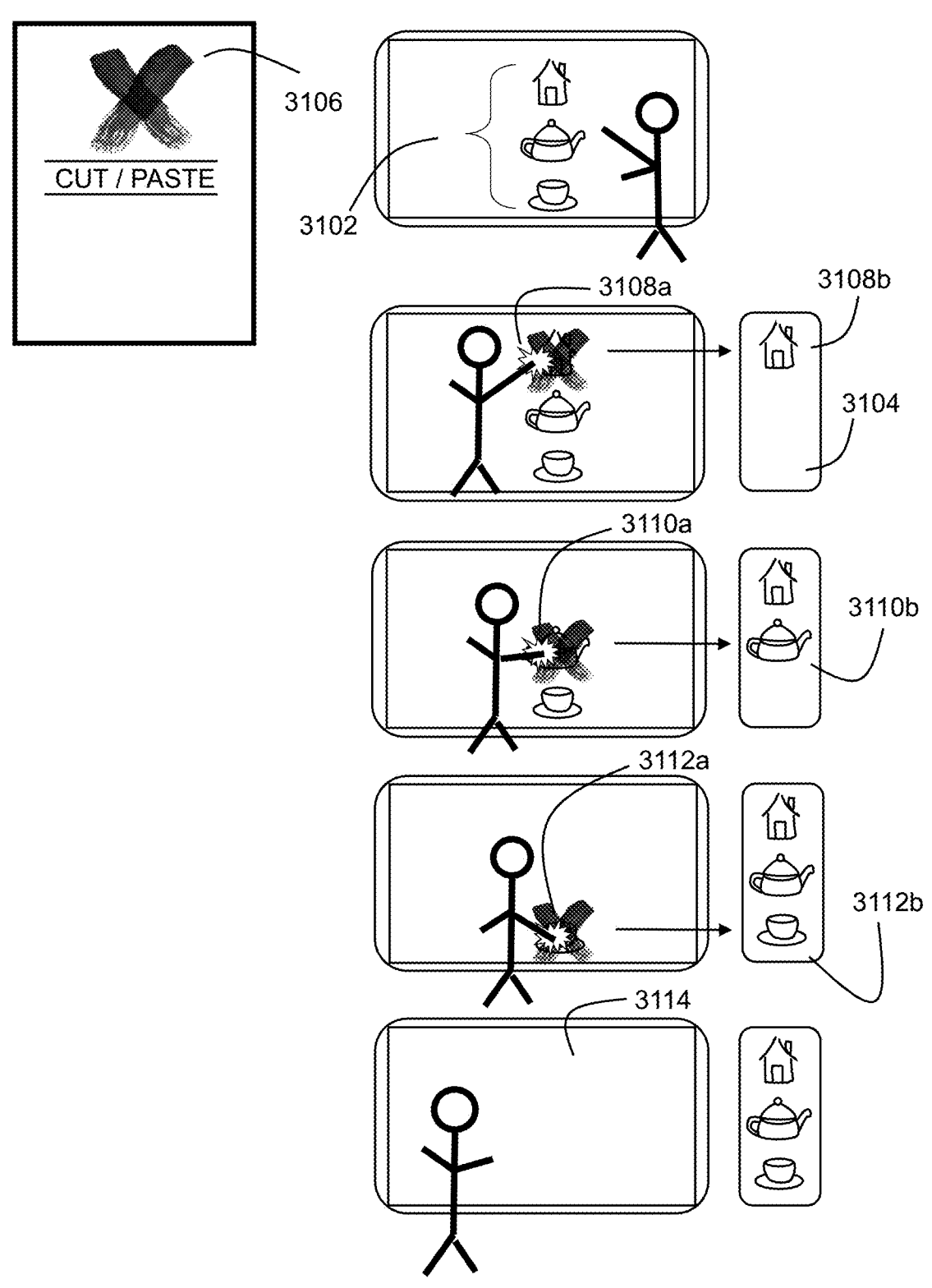
FIGS. 31A and 31B illustrate the ability to cut and paste Glyph content to and from a cut buffer using the Cut/Paste Tap-Symbol in some embodiments.
Figure 31B:
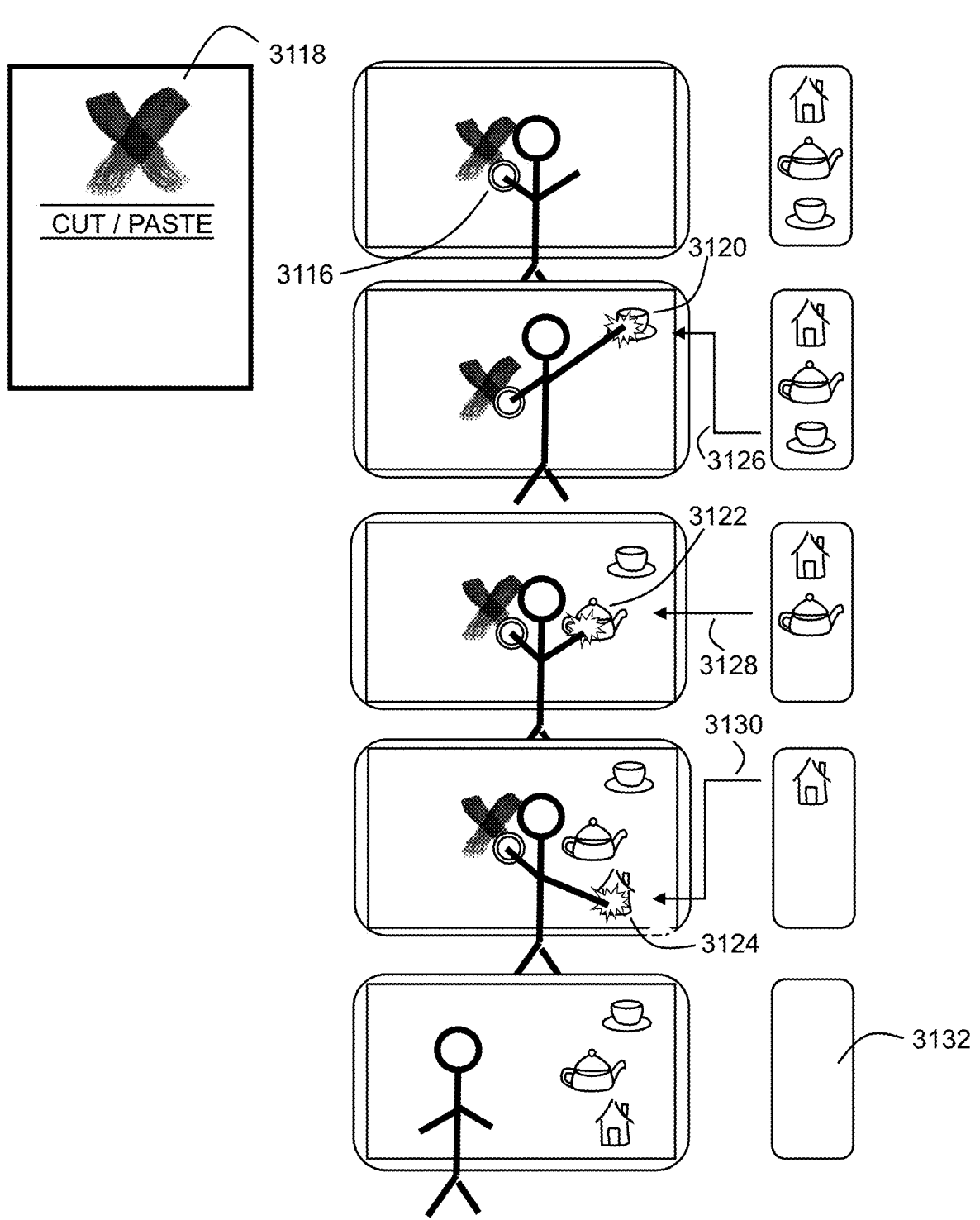

FIGS. 31A and 31B illustrate the ability to cut and paste Glyph content 3102 to and from a cut buffer 3104 using the Cut/Paste Tap-Symbol 3106 in some embodiments. A Tap-Trigger 3108a version is used to cut Glyph content under the Tap event to the cut buffer 3108b. With each repeat of the cut operations 3110a, 3112a the Glyphs are pushed onto the cut buffer 3110b, 3112b leaving the Tap-Board empty 3114. The reverse of the cut operation is the paste which is executed by Hold-Triggering 3116 the Cut/Paste Tap-Symbol 3118. Once established, each Drip-Gesture 3120, 3122, 3124 removes the last Glyph in the cut buffer, and pastes it 3126, 3128, 3130 onto the Tap-Board. Each Glyph is removed until the buffer is empty 3132. The Cut/Paste Tap-Symbol along with the cut buffer provide an alternative for moving Glyph content around the information space.

Asking Questions in a 3D-Lecture

Figure 32:
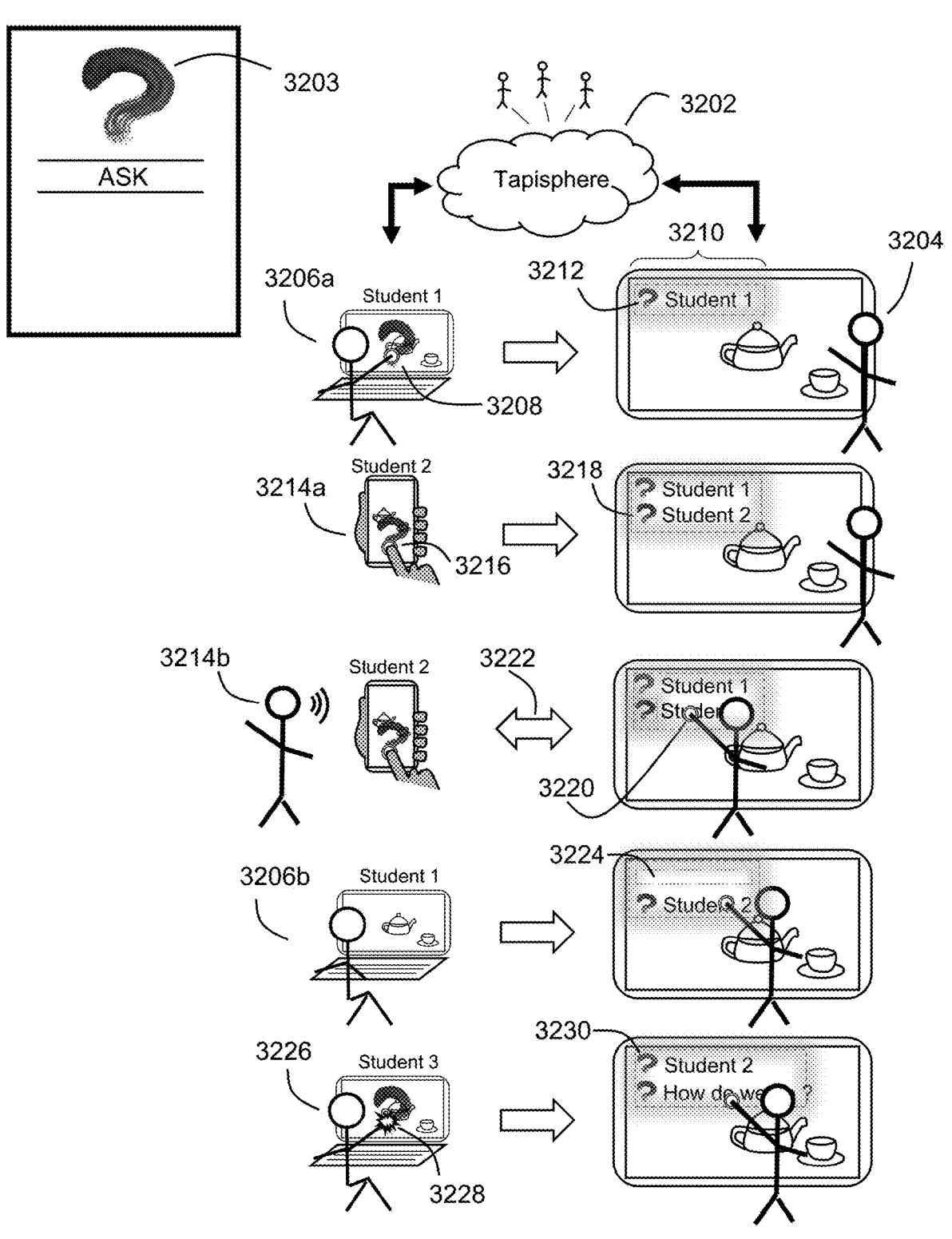
FIG. 32 illustrates students asking questions in a 3D-Lecture scenario across a Tapisphere session using the Ask Tap-Symbol in some embodiments.

FIG. 32 illustrates students asking questions in a 3D-Lecture scenario across a Tapisphere 3202 session using the Ask Tap-Symbol 3203 in some embodiments. The Lecturer 3204 is the designated lead device. The first student 3206a, Student 1, Hold-Triggers the Ask Tap-Symbol 3208. This is shown on the Lecture leader's Tap-Board Heads-Up-Display (HUD) 3210 that superimposes the notification that the student has a question (i.e their hand raised) 3212. The second student 3214a, Student 2, also Hold-Triggers the Ask Tap-Symbol 3216 adding their name to the Lecture HUD 3218. The leader Hold-Triggers Student 2's request 3220 to open up a two-way audio channel 3222 between the Student 3214b and the rest of the participants. Student 1 3206b releases the Ask-Symbol causing their request to be removed from the Lecture HUD 3224. The third student 3226, Student 3, Drip-Triggers the Ask Tap-Symbol 3228 causing a messaging interface to activate so that the student can enter a question that is sent to the Lecture HUD 3230.

Creating Labels On-the-Fly

Figure 33:
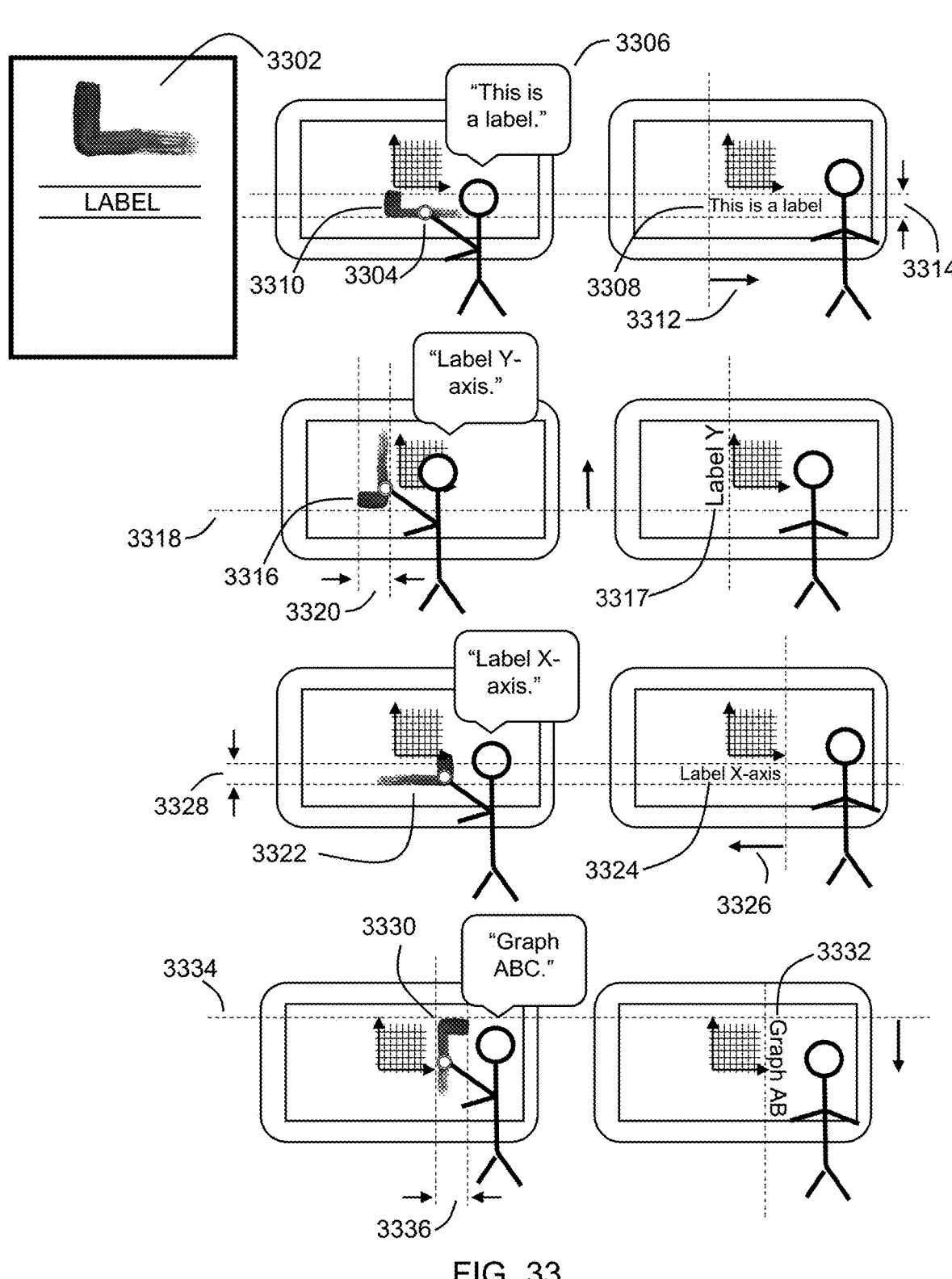
FIG. 33 shows the use of the Label Tap-Symbol to insert clean font-based text labels into content on the fly in some embodiments.

FIG. 33 shows the use of the Label Tap-Symbol 3302 to insert clean font-based text labels into content on the fly while up front lecturing in some embodiments. Hold-Triggering 3304 the Label-Symbol places the VUI in dictation mode. Any text recognized by the VUI engine 3306 while holding the Label-Symbol is typed into a region 3308 defined by the symbol. The right-facing Label-Symbol 3310 places the text left justified 3312 and the font size picked to approximate the height 3314 of the symbol. The up-facing Label-Symbol 3316 places the text sideways 3317 and justified with the bottom 3318 of the Label-Symbol. The font size is determined by the base width 3320 of the symbol. The left-facing Label-Symbol 3322 places text 3324 right justified 3326 with the symbol, with a font size determined by the height of the symbol 3328. The down-facing Label-Symbol 3330 produces text turned sideways 3332 justified with the top 3334 of the symbol, having a font size determined by the width 3336 of the symbol. The Label Tap-Symbol is an effective tool for rapidly creating content labels in a setting where there is not easy access to a keyboard.

Rolling the Working-Deck

Figure 34:
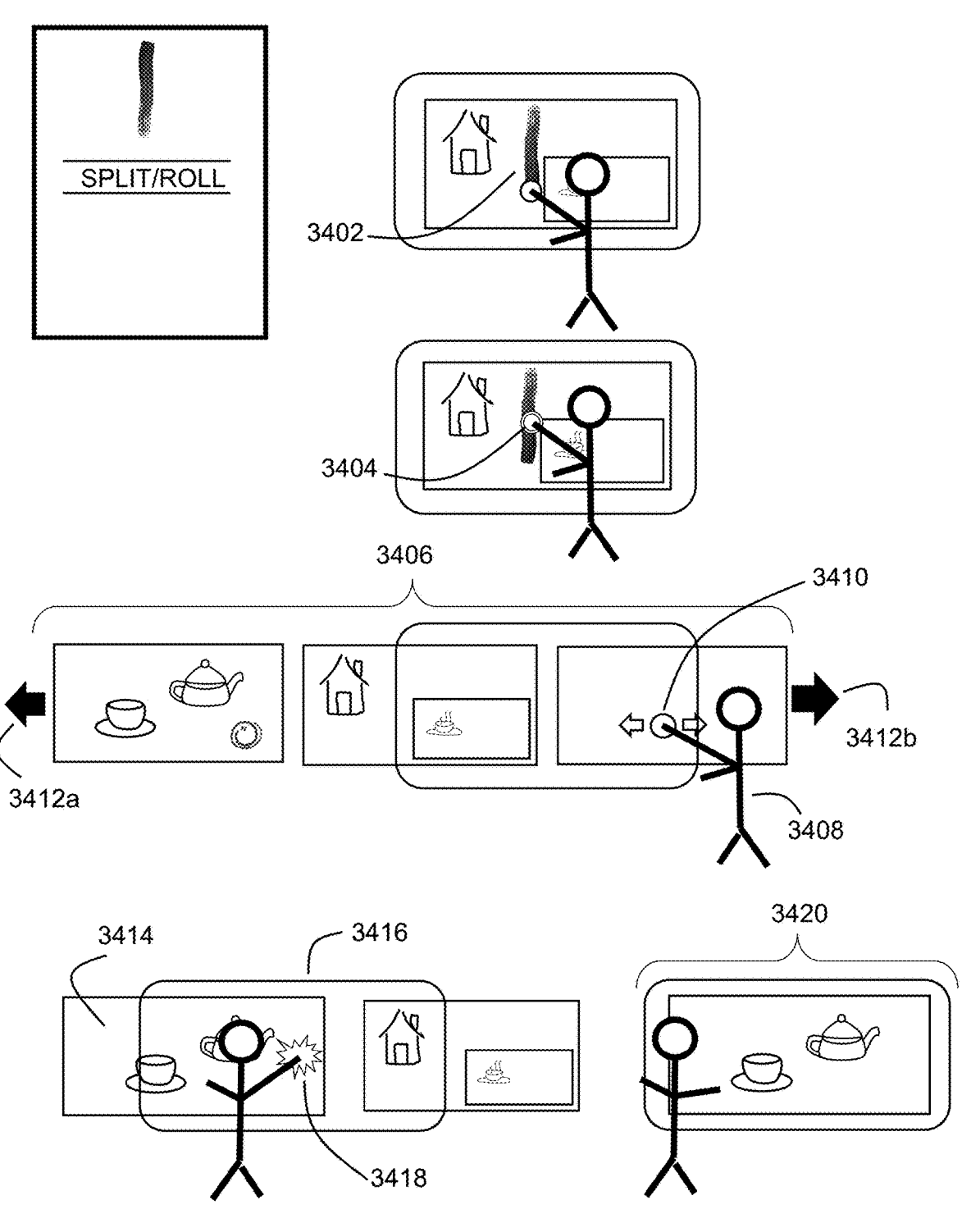
FIG. 34 illustrates rolling the Working-Deck side-to-side using the Split/Roll Tap-Symbol in some embodiments.

FIG. 34 illustrates rolling the Working-Deck side-to-side using the Split/Roll Tap-Symbol 3402 in some embodiments. The roll operation is accessed by Hold-Triggering 3404 the Split/Roll Tap-Symbol. This places the Working-Deck 3406 in a rolling mode that the presenter 3408 can repeatedly grab 3410 to translate from side-to-side 3412a, 3412b. The presenter selects a Tap-Board 3414 into the display 3416 by tapping 3418 the desired board which exits the roll mode 3420.

Splitting the Display into a Multi-View Layout

Figure 35:
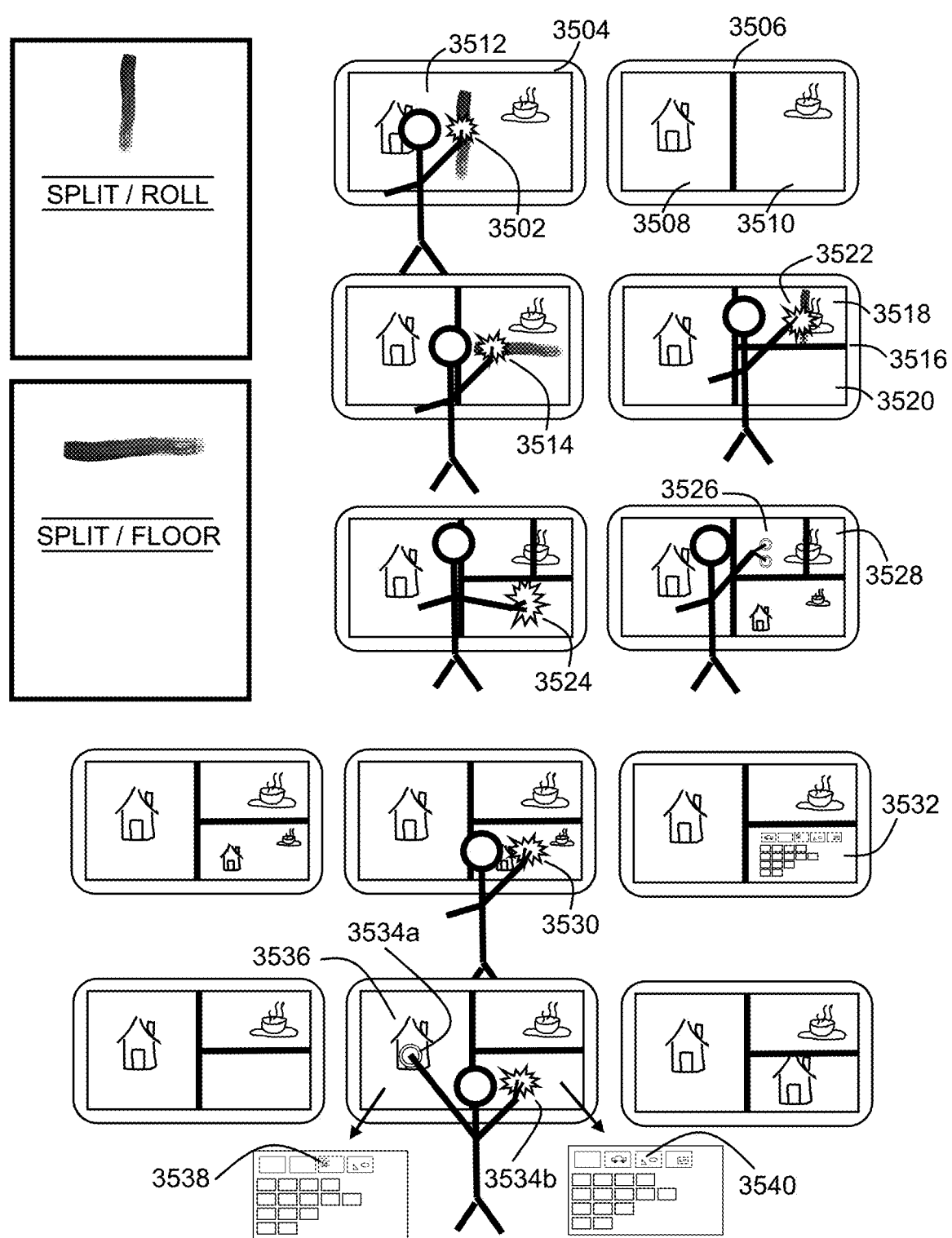
FIG. 35 illustrates dividing up the display interface into a multi-view layout using the Split/Roll and Split/Floor Tap-Symbols in some embodiments.

FIG. 35 illustrates splitting up the display interface into a multi-view layout using the Split/Roll and Split/Floor Tap-Symbols in some embodiments. Tap-Triggering the Split/Roll Symbol 3502 causes the underlying Tap-View 3504 to be split down the middle of the symbol 3506 creating two Tap-Views side-to-side 3508, 3510 of the same Tap-Board 3512. Tap-Triggering the Split/Floor Symbol 3514 causes the underlying view to be split across the middle of the symbol 3516 creating two Tap-Views 3518, 3520 stacked on top of each other pointed at the same Tap-Board. This operation can be repeated in either direction creating complex partitions. Each Tap-View can be navigated to other points in the Tap-Board independently with Tap-In, Tap-Out 3524, and Scroll/Zoom gestures. A Tap-View is removed with a Vertical-Hold Gesture 3526, causing the paired view 3528 to take up the vacated space. A Tap-View can be pointed to other Tap-Boards or Tapistries through the same Tap-In/Tap-Out gestures 3530. New Tap-Boards can be created or loaded 3532 from the Tapistry. The Copy Compound-Gesture 3534a, 3534b is effective in multi-view layouts for copying Glyphs 3536 from one Tap-Board 3538 in the Tapistry to another 3540.

Yielding the Floor in a 3D-Forum

Figure 36:
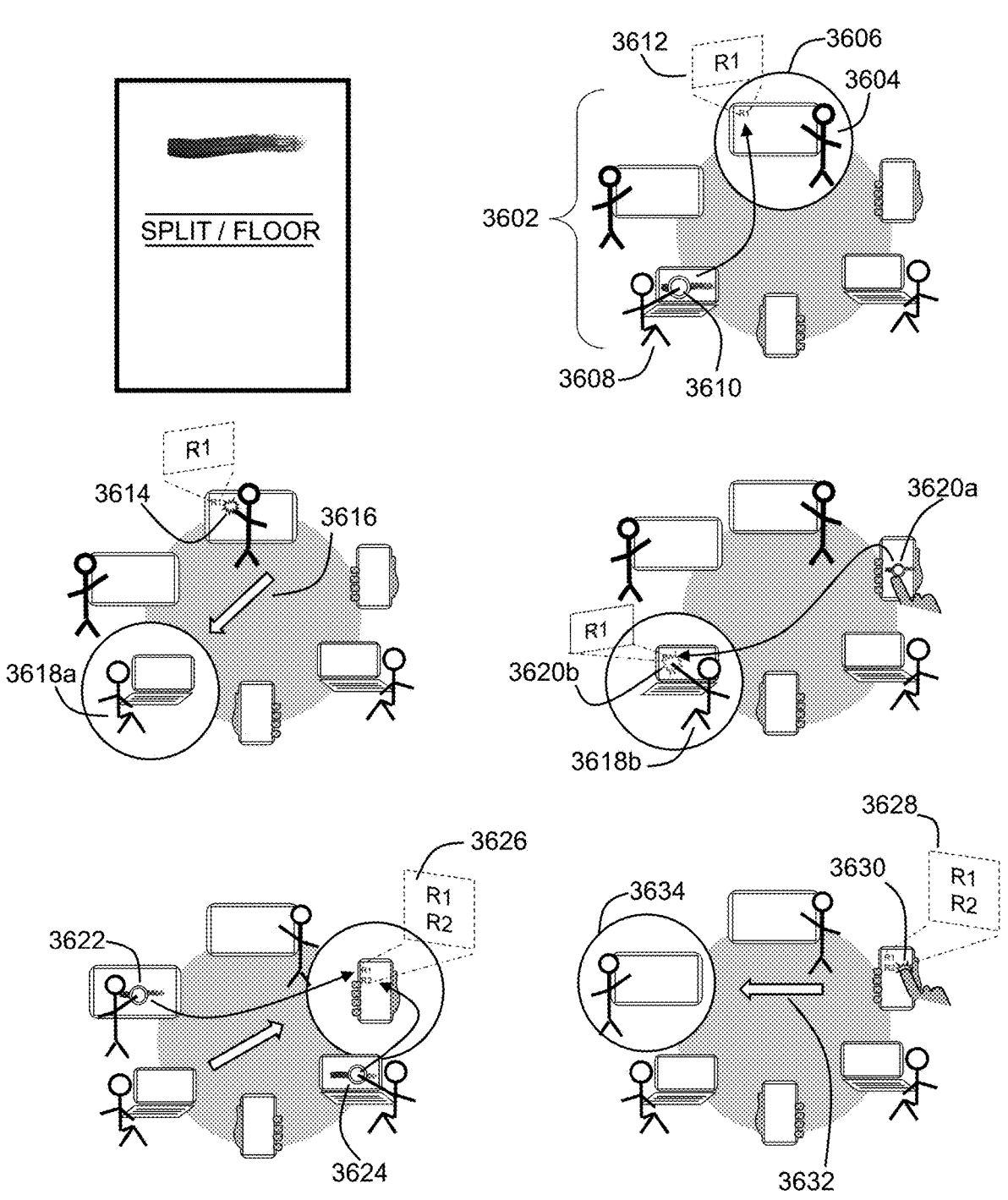
FIG. 36 illustrates requesting and yielding the leader/speaker position in a 3D-Forum Tapisphere scenario using the Split/Floor Tap-Symbol in some embodiments.

FIG. 36 illustrates requesting and yielding the leader/speaker position in a 3D-Forum Tapisphere scenario 3602 using the Split/Floor Tap-Symbol in some embodiments. In a 3D-Forum one designated speaker 3604 has the floor 3606 at any one time. A listener 3608 requests the floor by Hold-Triggering 3610 the Split/Floor Tap-Symbol. This sends a request to the speaker and is displayed on the Lecture HUD 3612. The current speaker taps on the HUD request 3614, to yield the floor 3616 to the new speaker 3618*a*. This new speaker 3618*b* is in charge until another listener requests 3620*a* and is granted 3620*b* the floor. Multiple requests 3622, 3624 are listed on the Lecture-HUD 3626. The speaker picks which request to grant by tapping an entry 3630 on the Lecture-HUD 3628, yielding the floor 3632 to the corresponding device 3634.

Taking Tap-Measurements

Figure 37:
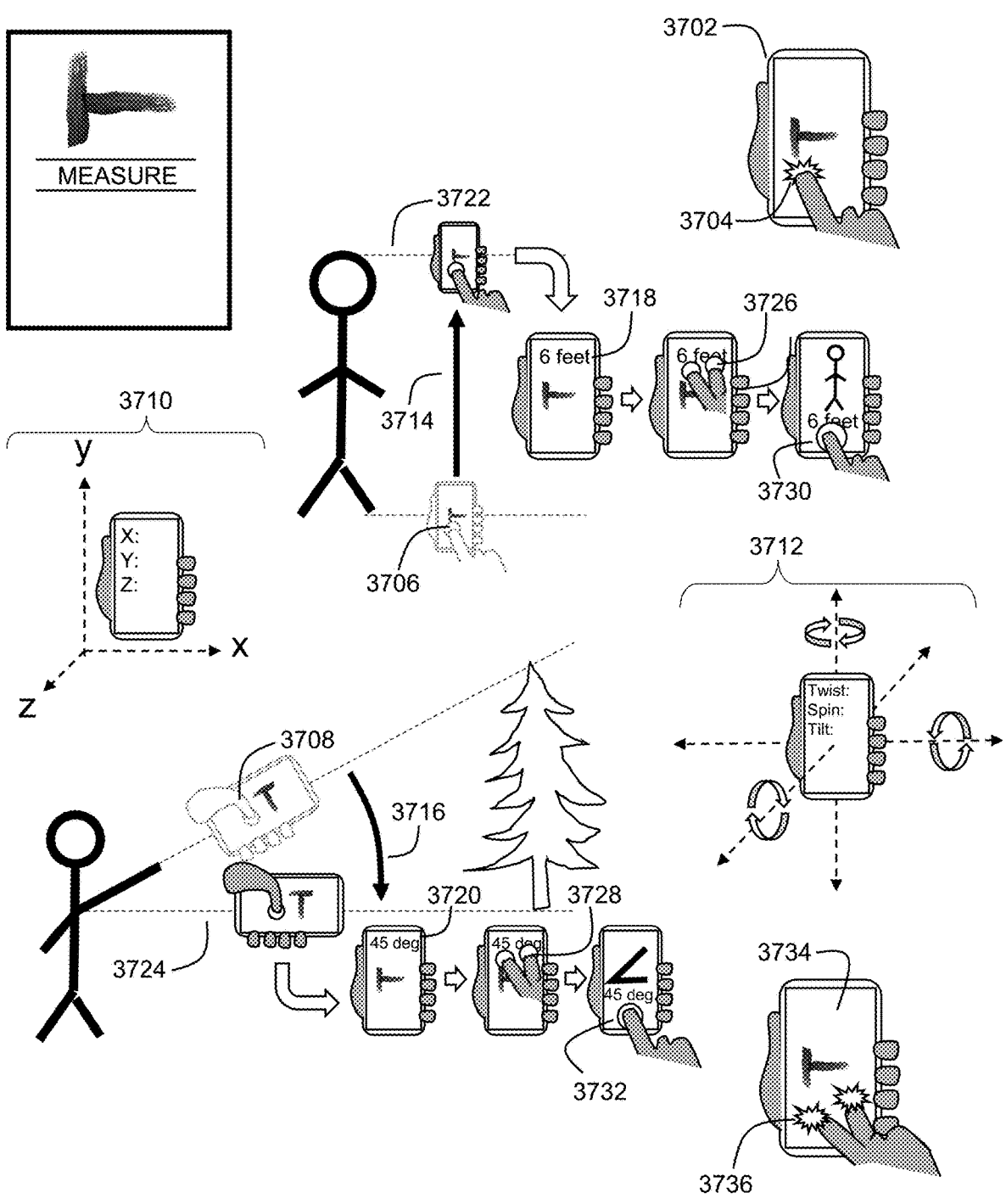
FIG. 37 illustrates using the Measure Tap-Symbol to turn a phone into a virtual tape-measure or sextant measuring device in some embodiments.

FIG. 37 illustrates using the Measure Tap-Symbol to turn a smartphone 3702 into a virtual tape measure or sextant measuring device in some embodiments. Tap-Triggering the Measure Tap-Symbol 3704, places the phone into a measure-tool mode. Placing a finger on the screen 3706, 3708 begins to gather accelerometer data. This data is accumulated and integrated to determine total translations in x, y, z space 3710, as well as twist, tilt, and rotation around the smartphone axis 3712. While the Grab-Gesture is maintained, all six dimensions of phone movement are accumulated and integrated 3714, 3716 producing relative changes for each value that are continuously updated to the screen 3718, 3720. These six results are organized with the greatest changes sorted to the top of the display. Thus, the major movement is sorted to the top of the display. Once the measurement is complete 3722, 3724 the Grab-Gesture is released, locking the values. A two-finger Grab-Gesture 3726, 3728 on the desired measurement, executes a Drop-Through operation where the Tap-Tool vanishes temporarily leaving the user dragging a Glyph Value 3730, 3732 on the exposed Tap-Board. Dropping the value returns the Tap-Measure tool to the screen 3734. A Tap-Out 3736 exits the Tap-Measure tool.

Cross-Calibration of Pictures

Figure 38:
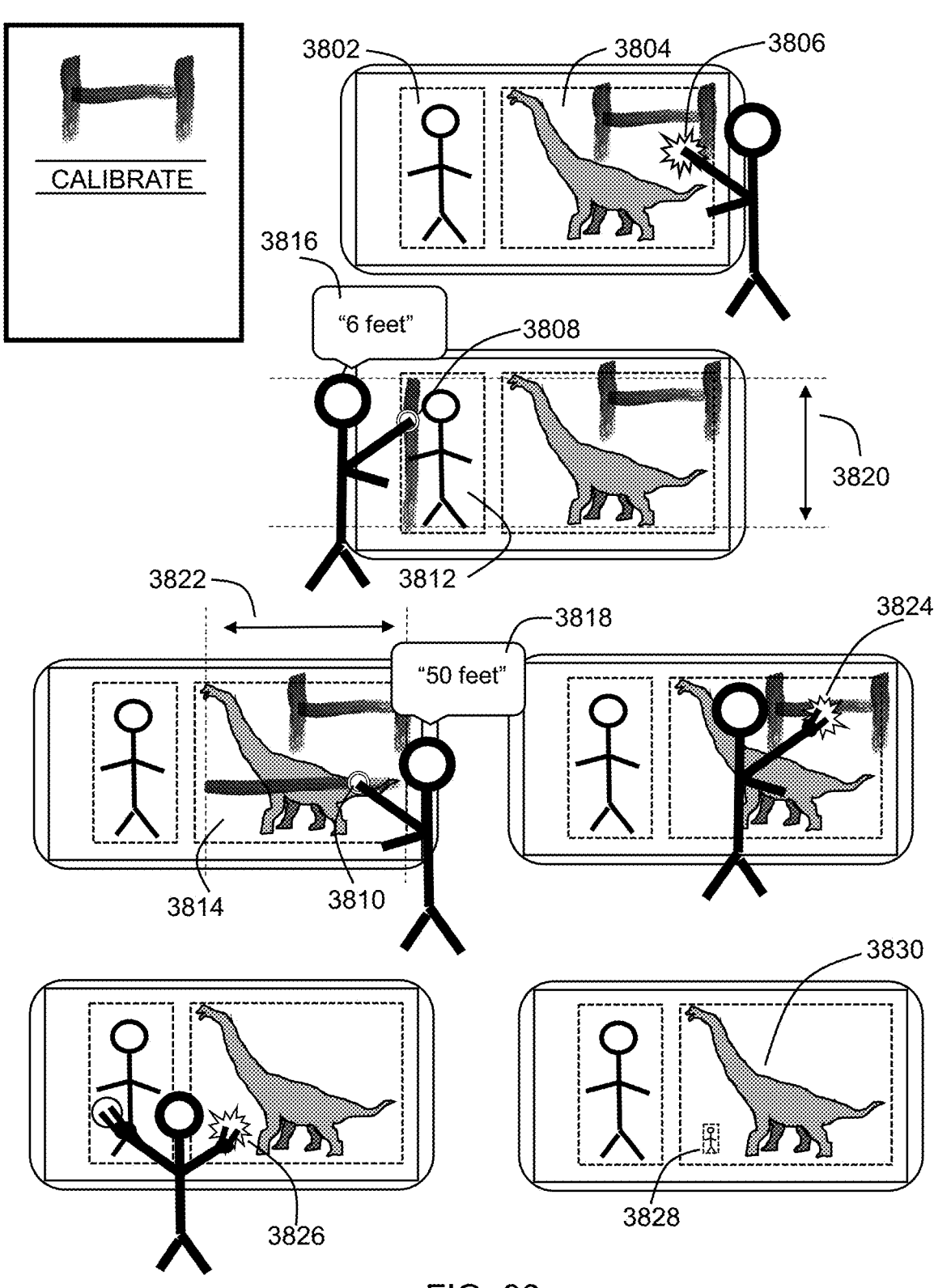
FIG. 38 illustrates using the Calibrate Tap-Symbol to assign real world scale information to arbitrary pictures and sketches in some embodiments.

FIG. 38 illustrates using the Calibrate Tap-Symbol to assign real world scale information to arbitrary pictures and sketches 3802, 3804 to cross calibrate them in some embodiments. Tap-Triggering the Calibrate Tap-Symbol 3806 places the Tap-Board into Calibrate mode. Hold-Triggering 3808, 3810 a single Tracer Stroke, over Glyph content 3812, 3814 activates the VUI to listen for standard measurement values. In response to a recognized measurement quantity 3816, 3818 the value is associated with the Glyph, using the length of the stroke 3820, 3822 within the Glyph content to generate a real world conversion factor for the figure. The Calibrate mode is canceled with a Tap-Out Gesture 3824. Once Glyphs have been calibrated, copying one Glyph into the other 3826 scales the Sub-Glyph 3828 proportionately to the parent Glyph 3830.

Creating a Tap-Map for GPS Tracking

Figure 39:
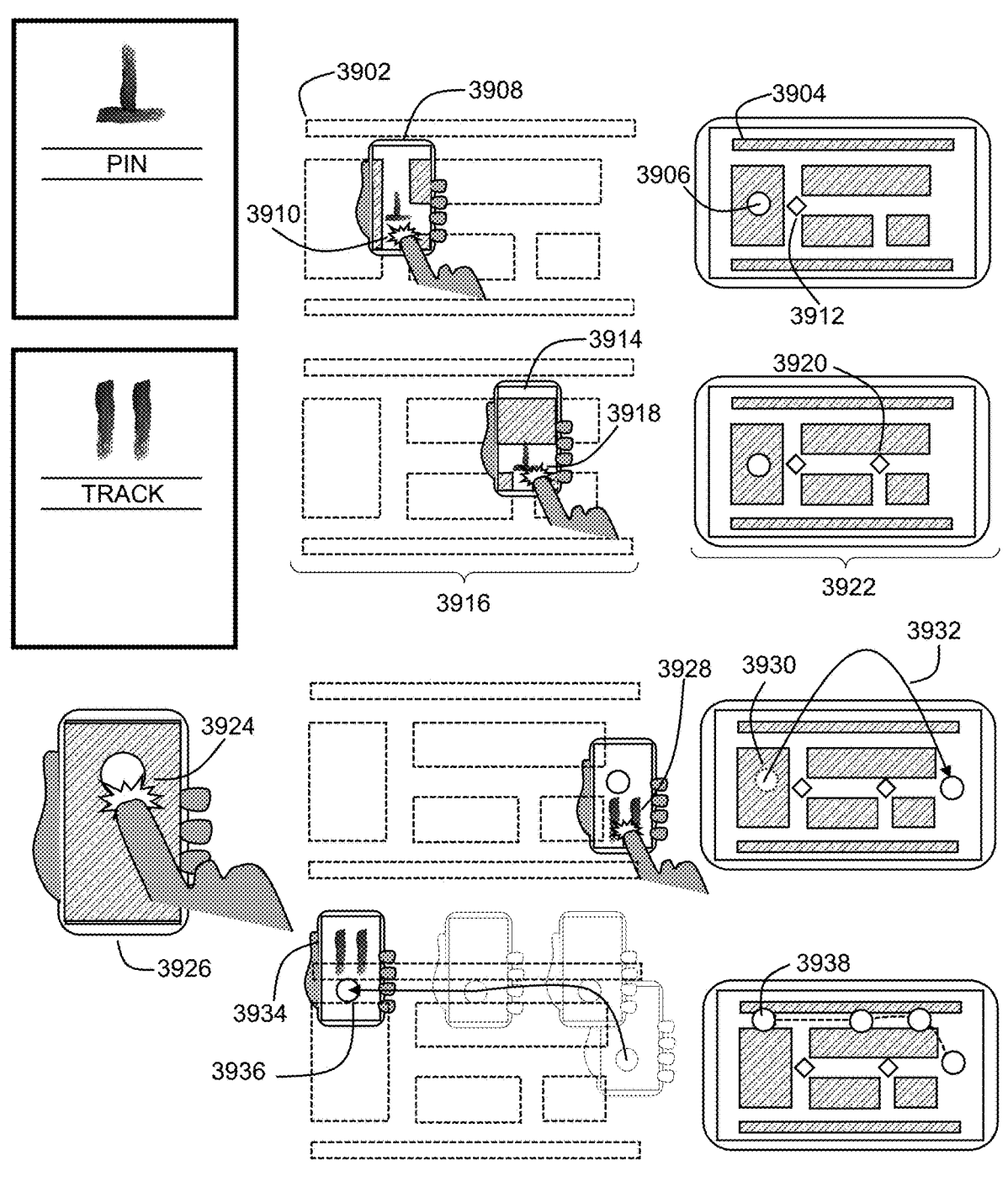
FIG. 39 illustrates using the Pin and Track Tap-Symbols to geo-locate arbitrary pictures, drawings, or maps to produce a Tap-Map capability that ties Glyph movements to a Tap-Synched GPS device in some embodiments.

FIG. 39 illustrates using the Pin and Track Tap-Symbols to geo-locate 3902 arbitrary pictures, or drawings 3904 to produce a Tap-Map capability that ties the movement of a Glyph 3906 to a Tap-Synched GPS device 3908 in some embodiments. Tap-Triggering the Pin Tap-Symbol 3910 drops a GPS Pin 3912 in the map picture 3904. Changing locations with the GPS device 3914 to another place in the real world 3916 and Tap-Triggering another Pin Tap-Symbol

3918 drops a second GPS Pin 3920 in the map picture 3904 creating a geo-located Tap-Map 3922.

To use the Tap-Map, a Tap-Map Sub-Glyph 3906 is Tap-Synched 3924 on a GPS equipped device 3926. Tap-Triggering the Track Tap-Symbol 3928 places the Tap-Map in tracker mode, causing the Tap-Synched Glyph 3930 to synchronize 3932 with the Tap-Map. While the Tracking mode is active 3934 on the device, the Tap-Synched Glyph 3936 follows the geo-location of the GPS device on the Tap-Map 3938. This technique can be used with one or more devices logged into the same Tapisphere session to synchronize multiple phones on the same shared Tap-Map.

Creating a 3D-Mouse

Figure 40:
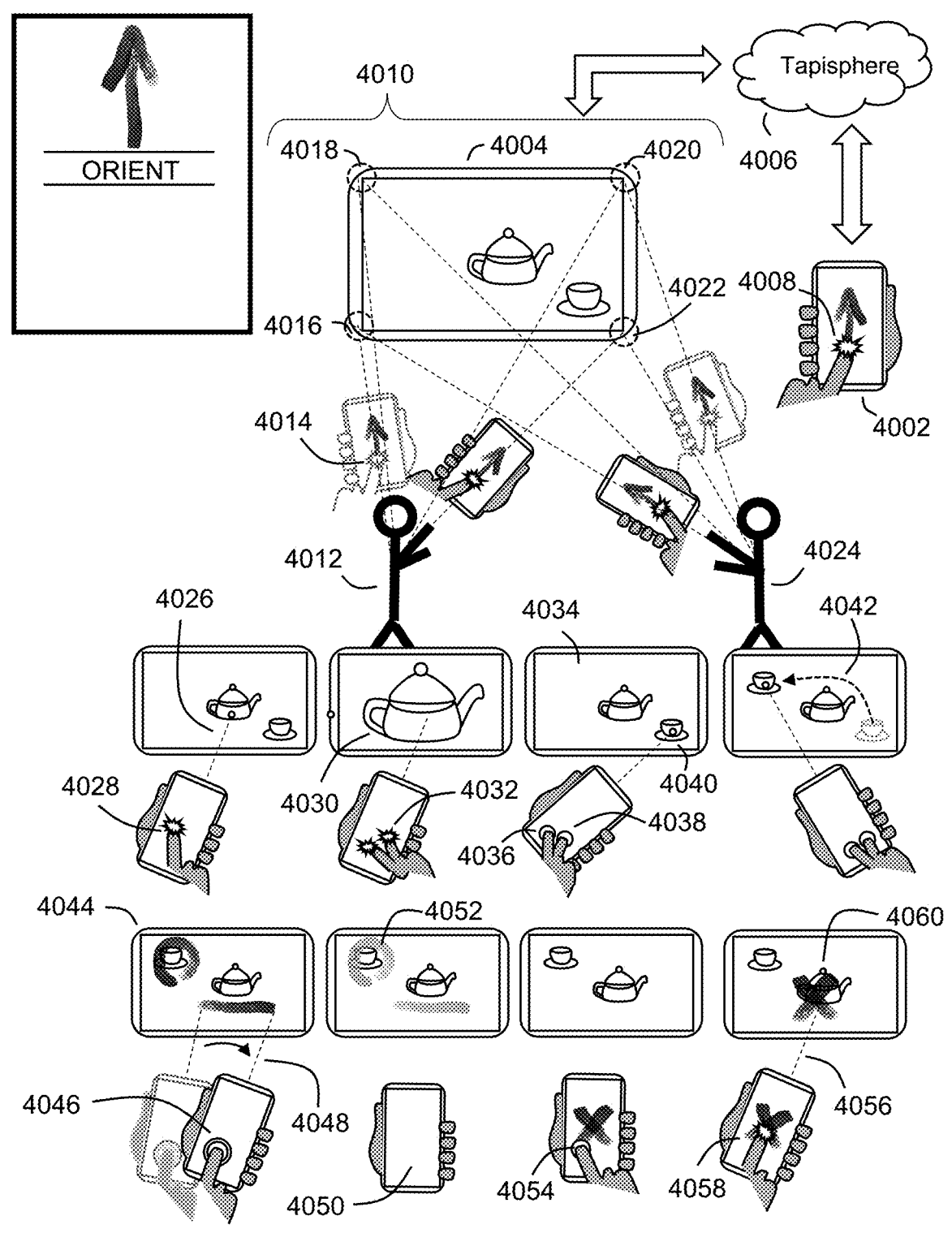
FIG. 40 illustrates using the Orient Tap-Symbol to spatially orient a mobile device with a second main display device sharing a Tapisphere context, to yield a hand-held peripheral that serves as an interactive pointing device that can deliver gestures onto the main display in some embodiments.

FIG. 40 illustrates using the Orient Tap-Symbol to spatially orient a smartphone 4002 with a second main display device 4004 sharing a Tapisphere context 4006, to yield a hand-held interactive pointer that can deliver gestures onto the main display in some embodiments. Tap-Triggering 4008 the Orient Tap-Symbol places the mobile device into an orientation mode. The phone begins tracking relative movements within the lecture hall/conference room/auditorium/theater 4010. Walking to a first location within the room 4012, the presenter Hold-Triggers 4014 to begin recording the first Calibration-Point. Next, the presenter Drip-Triggers the phone while pointing it at each of the four corners of the main display 4016, 4018, 4020, and 4022, then releasing the Hold-Gesture completes the Calibration-Point. Next, the presenter walks to a different location in the room 4024 and repeats the Drip-Trigger operation. Once these two Calibration-Points are completed the phone switches to a 3D-Mouse mode.

While in this mode the phone acts like a laser pointer placing an icon 4026 on the main display where pointing. Non-drag gestures made on the phone face are transferred to the point on the main display where the phone is pointed. Tapping the phone 4028 while pointing at a Glyph, Taps-In to the Glyph 4030. Tapping two fingers on the phone display 4032 while pointed anywhere on the main display Taps-Out of the Glyph 4034. Using a Hold-Gesture 4036, with a second Grab-Gesture 4038, Grabs the Glyph pointed at 4040 and drags it with the pointing motion 4042 of the phone.

There are two methods to trigger Tap-Symbols on the main display 4044 using the 3D-Mouse. The first involves making Tracer strokes directly onto the main display with a Hold-Gesture 4046 of the smartphone screen while stroking the phone 4048 across the main display. Strokes are completed when the Hold-Gesture is released 4050, at which point the strokes begin to decay 4052. If before strokes completely decay a Tap-Trigger is delivered onto the main display strokes an attempt to recognize a valid Tap-Symbol is made.

The second method Traces the strokes 4054 onto the 3D-Mouse screen. Next, the 3D-Mouse is pointed at the main display and target content 4056. A Tap-Trigger 4058 of the Tracer strokes 4054 on the 3D-Mouse display, injects the Tap-Symbol and action onto the main display and context 4060.

The 3D-Mouse capability provides a powerful presentation peripheral for delivering lectures and speeches while moving about the auditorium space, going beyond simple slide-flipping remotes or laser pointing.

Creating a Custom Tap-Symbol

Figure 41:
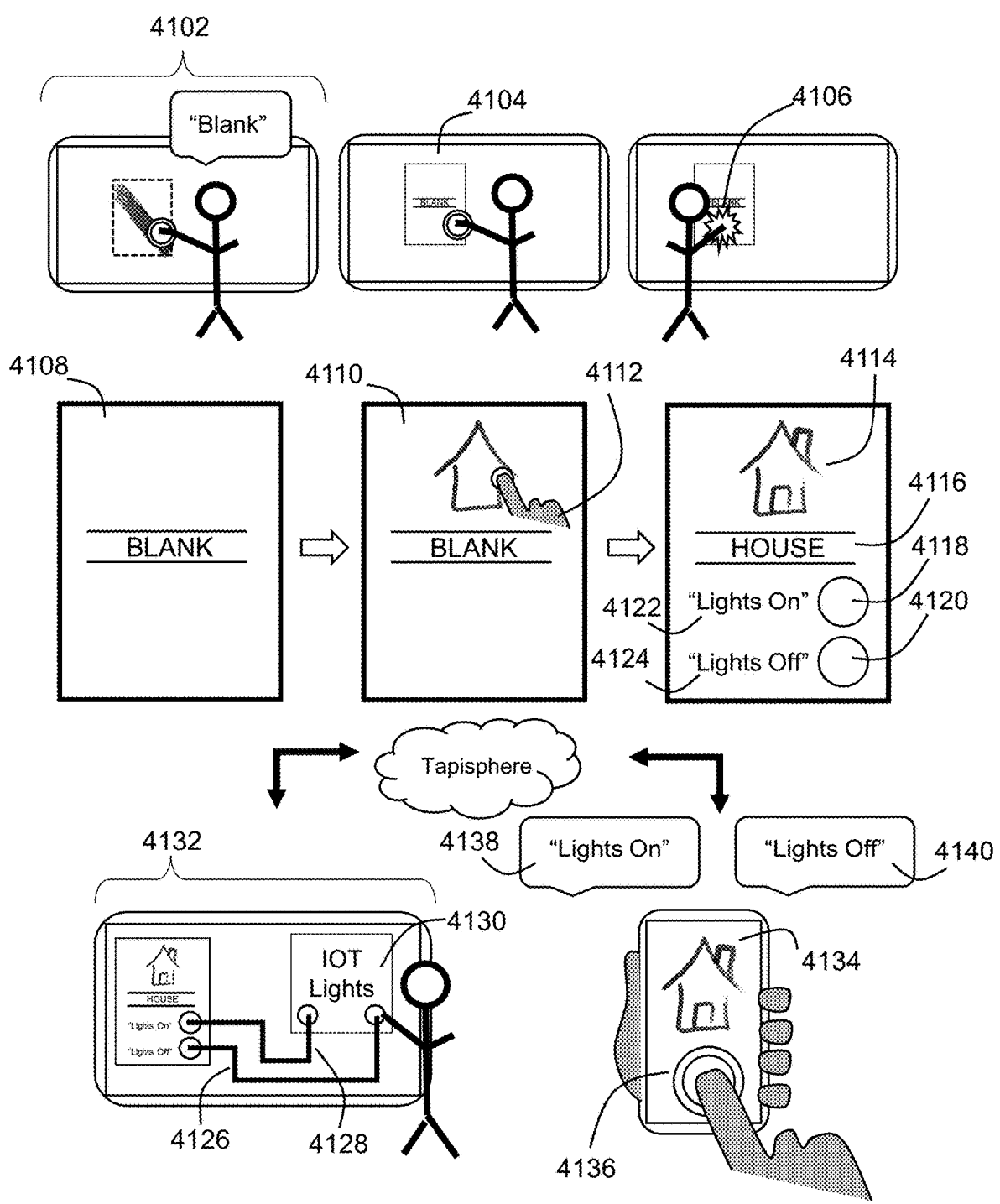
FIG. 41 illustrates creating a Tap-Macro using a Tap-Blank to extend the functionality of a Tapistry in some embodiments.

FIG. 41 illustrates creating a Tap-Macro using a Tap-Blank to extend the functionality of a Tapistry information space in some embodiments. A Tap-Blank Glyph is fetched 4102 onto a Tap-Board 4104. Tap-In 4106 of the Tap-Blank zooms it full scale 4108. The Tap-Blank has an active area 4110 for the user 4112 to create annotation strokes to define the Pictograph 4114. The Pictograph will be added to the Tap-Symbols for triggered recognition events to determine if the Pictograph is a match with Tracer strokes. The Tap-Blank defines a text field 4116 for Naming the Tap-Macro. This name will be used for Tap-Board retrieval using New/Add Tap-Symbol in a Hold-Triggered mode. The Tap-Blank defines an area for adding Tap-Ports 4118, 4120 to the Tap-Macro. These are tied to Vocal keywords or phrases 4122, 4124 entered by the user to create Trigger events that can be linked 4128, 4126 to other Glyphs with Tap-Ports 4130. Two or more Glyphs connected together using Tap-Links, forms a Tap-Rig 4132. Once completed, the Tap-Macro Pictograph 4134 can be used as a Tracer Tap-Symbol that will respond to a Hold-Trigger event 4136. The Hold-Trigger registers the Vocals 4122, 4124 with the VUI. While holding the Tap-Macro symbol, speaking the Vocals 4138, 4140 trigger actions connected to the respective Tap-Ports 4126, 4128.

Tracer-Mechanism Recap

In total, the Tracer-Mechanism and the resulting Tap-Symbols provide a rich out-of-band command channel to the platform for spanning a multitude of tasks without significantly interrupting mental flow. Legacy or traditional solutions disrupt the mental experience, forcing context switching to other screens that interrupt the user's focus away from their work, or require concentration to navigate to graphical control points such as menus, buttons, dialogs and toolbars.

A significant advantage of the Tracer-Mechanism is that it reduces to zero the graphical footprint of the user interface, yielding a medium rivaling that of paper and whiteboards in formlessness. This minimalist approach removes the impediments to wide-spread platform migration to a multitude of computing devices, and environments. The position/size independent capabilities of the Tap-Symbols serve a wide range of form-factors from extra-large wall-sized flat panels and interactive projectors, to ultra-small wearable smartwatch displays. In addition, the Tracer mechanism provides an elegant solution to solving the interface needs of AR/VR environments faced with the challenge of creating interface methods in a decidedly unstructured virtual space.

Tap-Symbols combined with the Tapisphere, provide Compound-Gesture solutions for seamlessly moving information from one place and device in the Tapisphere to another. Tap-Symbols also provide an out-of-band ability to coordinate multiple participants in collaborative scenarios such as distributed 3D-Brainstorming, 3D-Forums, and online 3D-Lectures.

Tap-Symbols enhance hand-held devices equipped with accelerometer sensors and GPS, transforming these devices into open-ended data gathering tools. These tools act closely with the information space, which serves as a project medium for curating data and information.

Stage-Mode Creation of Vignettes

Figure 42:
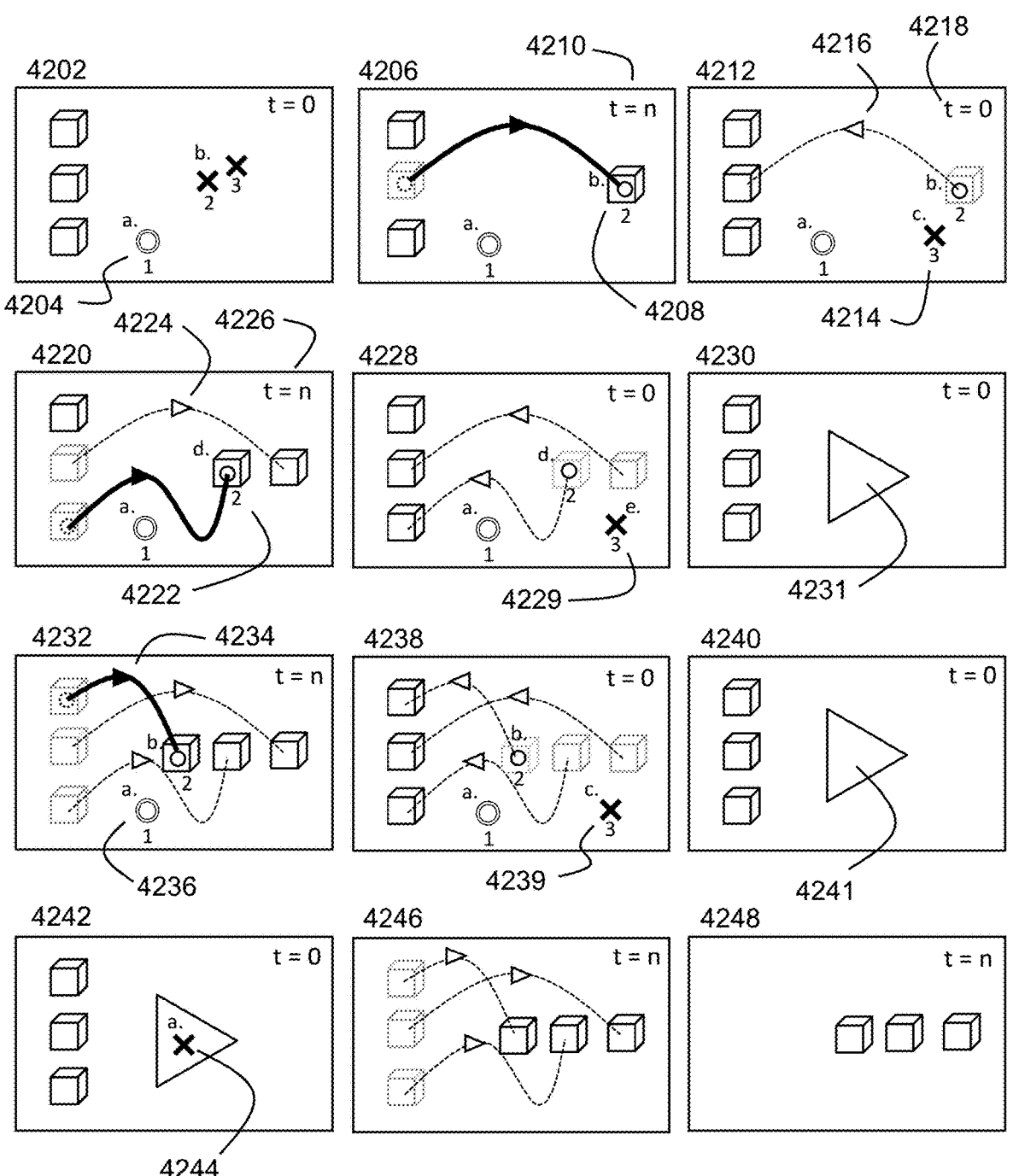
FIG. 42 illustrates the operation of the Stage-Mode mechanisms to capture parallel path Vignette movements for replay in some embodiments.

FIG. 42 illustrates the operation of the Stage-Mode mechanisms to capture parallel path Vignette movements for replay in some embodiments. Block 4202 shows using the Vignette-Gesture to place the parent Glyph in Vignette record-mode. The Hold-Gesture 4204 activates the Stage-Mode and can be held throughout the Vignette secondary movement gestures. Block 4206 shows grabbing a Glyph 4208 and capturing the translation to a new location. Recorded movements advance the Parent-Glyph's timeline 4210. Block 4212 shows the Snap-Back operation at the end of the drag event triggered by a third finger tap 4214, causing the held Glyph to snap back 4216 to the point in the timeline 4218 at the beginning of the drag operation. Block 4220 shows this operation repeated on a second Glyph 4222. While this Glyph is dragged, the first Glyph movement already captured previously 4224, is sequenced as the timeline advances 4226. Block 4228 shows another Snap-Back event 4229 that rewinds the timeline to the start of the drag operation, causing both Glyphs to translate back to their initial positions. Block 4230 shows the Play-Symbol 4231 that is superimposed on playable material when the Hold-Gesture 4204 is released. Block 4232 records the movement of a third Glyph 4234 by reestablishing the Hold-Gesture 4236, causing the Play-Symbol to vanish. Block 4238 shows a third Snap-Back 4239 returning the Vignette and all three Glyphs to their initial start points. Block 4240 releases the Hold-Gesture 4236, restoring the Play-Symbol 4241. Block 4242 triggers the playback of the Vignette by tapping 4244 the Play-Symbol, causing all three Glyphs to travel along their captured paths in parallel as the timeline advances 4246. When the Vignette has played out, the Play-Symbol is not displayed 4248. Each Glyph can record multiple serial movements, overwriting any paths that conflict in time.

The Stage-Mode gestures provide animation capabilities directly off the fingertips, capable of capturing sophisticated parallel path animations. This simple yet agile solution provides many forms of instruction with an enhanced ability to animate concepts without the need to resort to complex animation applications that depend on complex graphical timelines. The Stage-Mode produces all its capability off the fingertips through simple gesturing, leaving the graphical interface untouched and devoid of clutter. Such a solution is agile enough to function as a coaching tool in the halftime locker room, diagraming plays in front of the team to illustrate aspects of multi-player movements using Vignettes.

Flow-Mode Vignette Navigation

FIG. 43 illustrates a sequence of operations with the Flow-Mode Gestures to navigate playable media such as Vignettes, audio and video multimedia in some embodiments. Block 4302 shows a Vignette 4304 at the end of its timeline 4306. Block 4308 resets the Vignette to the beginning by Tap-Triggering 4310 the Reverse Tap-Symbol 4312. Block 4314 shows the Vignette reset to the beginning state 4316 in a paused state indicated by the Play-Symbol 4318. Block 4320 starts playing the Vignette by Tap-Triggering the Play-Symbol 4321. Block 4322 shows the Vignette animation advancing 4324. Block 4326 shows the playback being paused with a Grab-Gesture 4328. Block 4330 shows rewinding the timeline 4332 using a counter-clockwise swirl gesture 4334 with the same finger that paused the replay. Block 4336 shows reversing the swirl gesture 4338 to advance the timeline 4340. Block 4342 shows replay resuming when the Hold-Gesture 4338 is released. Block 4344 places the Vignette in paused state by Tap-Triggering the Forward Tap-Symbol 4346. Block 4348 shows the Vignette paused at the end of the simulation 4350. Block 4352 shows using a Grab-Gesture 4354 on the Play-Symbol to grab the Vignette timeline. Block 4356 shows rewinding 4358 the Vignette timeline to an earlier point 4360. Block 4362 shows releasing the Vignette into a paused state.

The above Flow-Mode Gestures provide an Eyes-Free interface for navigation of playable medium while driving or jogging with a smartphone. Once the media is playing, the entire surface of the device receives the above Gestures without requiring careful placement of the fingers on graphical elements. Without looking, the user can pause, rewind, fast-forward, and place/navigate Tap-Marks.

Flow-Mode Gestures

FIG. 44 illustrates navigation of playable media using the various Flow-Mode Gestures in some embodiments. Time-line 4402 shows playing the media through to the end 4404 by Tap-Triggering the Play-Symbol 4406 at (time=0) 4407. Timeline 4408 illustrates a play and pause. Tapping the playing media 4410, causes the Play-Symbol 4412 to over-lay the media. Timeline 4414 shows a play, pause and resume. A Grab-Gesture of the playing medium 4416, pauses the playing media. Releasing the gesture resumes play to the end 4418. Timeline 4420 shows a play, pause, rewind and resume. The Grab-Gesture 4422 pauses the play. Swirling the grab counter-clockwise 4424 rewinds the time position. Releasing the Grab-Gesture 4426 resumes play to the end 4428. Timeline 4430 shows a play, pause, fast-forward, and resume. The Grab-Gesture 4432 pauses the play. Swirling the Grab-Gesture clockwise 4434 fast-for-wards the time position. Releasing the Grab-Gesture 4436 resumes play to the end 4438. Timeline 4440 shows drop-ping Tap-Marks at positions 4442, 4444, with Hold-Gestures 4446, 4448 (held long enough to exceed pause timer). Timeline 4450 shows a play, pause, two forward jumps, and resume. The Grab-Gesture 4452, pauses the play. The Right-Drip Gesture 4454 jumps the timeline to the next Tap-Mark 4456. The next Right-Drip Gesture 4458 jumps the timeline to Tap-Mark 4460. Releasing the grab gesture 4452 resumes play from the new location to the end 4462. Timeline 4464 shows a play, pause, 3 backward jumps, and resume. Gesture 4466 pauses play. The Left-Drip Gesture 4468 jumps back to the previous Tap-Mark 4470. The next Left-Drip 4472 jumps back to the previous Tap-Mark 4474. The third Left-Drip 4476 jumps back to the beginning of the timeline. Releasing the Grab-Gesture 4466 resumes play to the end 4480.

Marker-Mode Gestures

Figure 45:
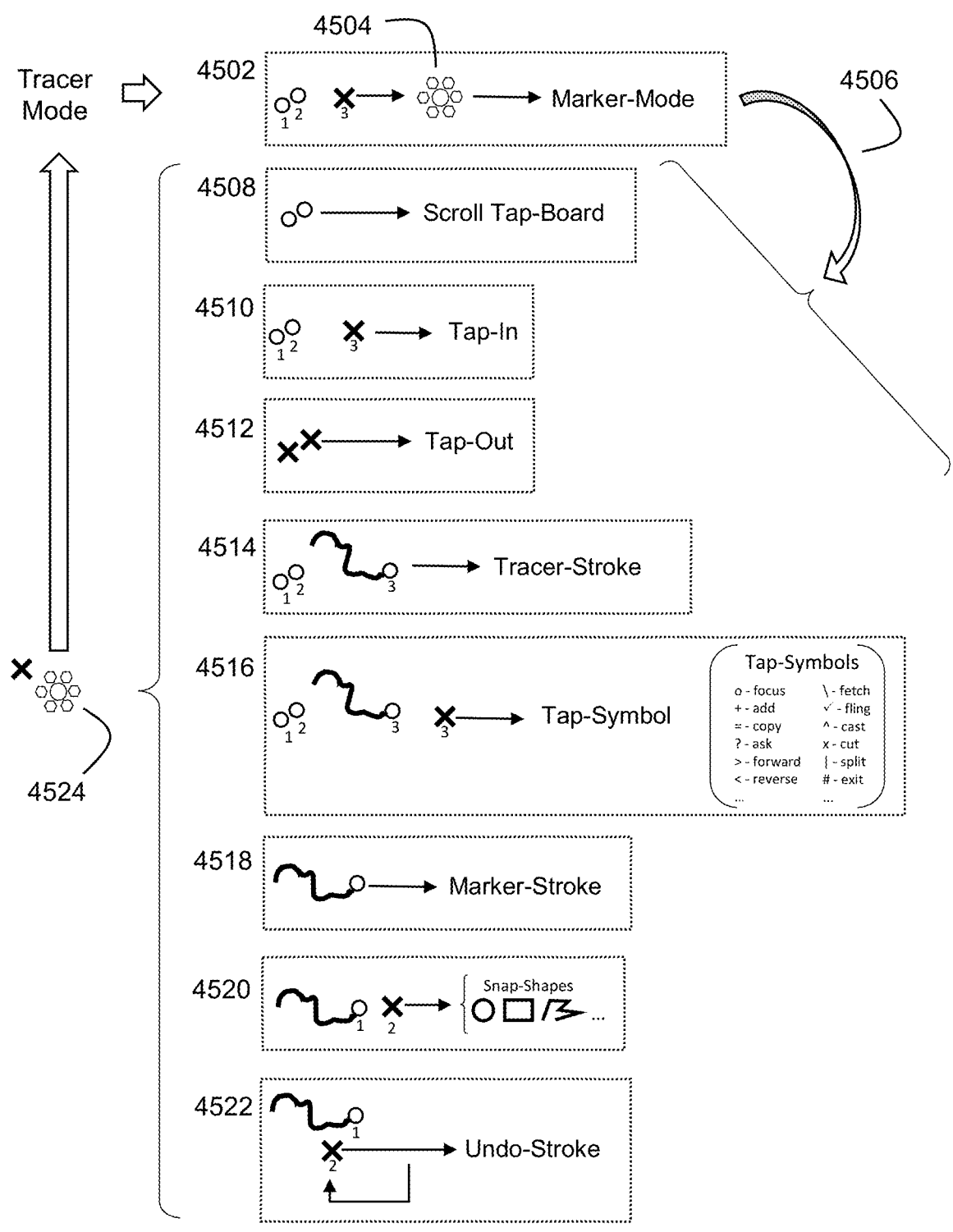
FIG. 45 is a block diagram showing the Marker-Mode Gestures for adding annotations to Glyph content in some embodiments.

FIG. 45 is a block diagram showing the Marker-Mode Gestures for adding annotations to Glyph content in some embodiments. Block 4502 shows the Gesture for fetching the drawing puck 4504 that activates the Marker-Mode 4506. Block 4508 shows the scroll gesture that is operable during Marker-Mode with a two-finger Grab-Gesture, reserving the one-finger Grab-Gesture for annotation strokes. Block 4510 shows the Gesture used to Tap-In to Glyphs while in Marker-Mode. This Gesture is needed so that the marker can make dots without inadvertently tapping into Glyph content. Block 4512 shows the Tap-Out Gesture which remains the same as Tracer-Mode. Block 4514 is the Switch-Gesture that provides the ability to create temporary Tracer strokes while in Marker-Mode providing the ability to quickly highlight materials for presentation purposes without creating permanent marks. Block 4516 shows a Tap-Trigger of Tracer Tap-Symbols created with the Tracer of 4514. This allows the user to access Tap-Symbol capa-bilities while in Marker-Mode. Block 4518 shows the pro-duction of Marker annotation strokes with a single-finger drag. Block 4520 shows the Snap-Shape mechanism for creating Tap-Shapes out of Marker strokes. Several Snap-Shape examples will be illustrated in FIGS. 47 through 51. Block 4522 shows the Gesture for removing Marker strokes. After the first Drip which will attempt a Snap-Shape recog-nition, each additional Drip-Gesture removes a stroke in reverse order of stroke creation. Closing the Drawing-Puck 4524 returns the Tap-Board to Tracer-Mode.

The Marker-Mode Gestures weave together on-the-fly capabilities off the fingertips that obviate the need for classic graphical structuring typically used to deliver annotation options and drawing package capabilities. This provides a more practical alternative, when in front of the class, to the careful navigation of menus and toolbars needed with tra-ditional solutions.

Vignette-Ink

Figure 46:
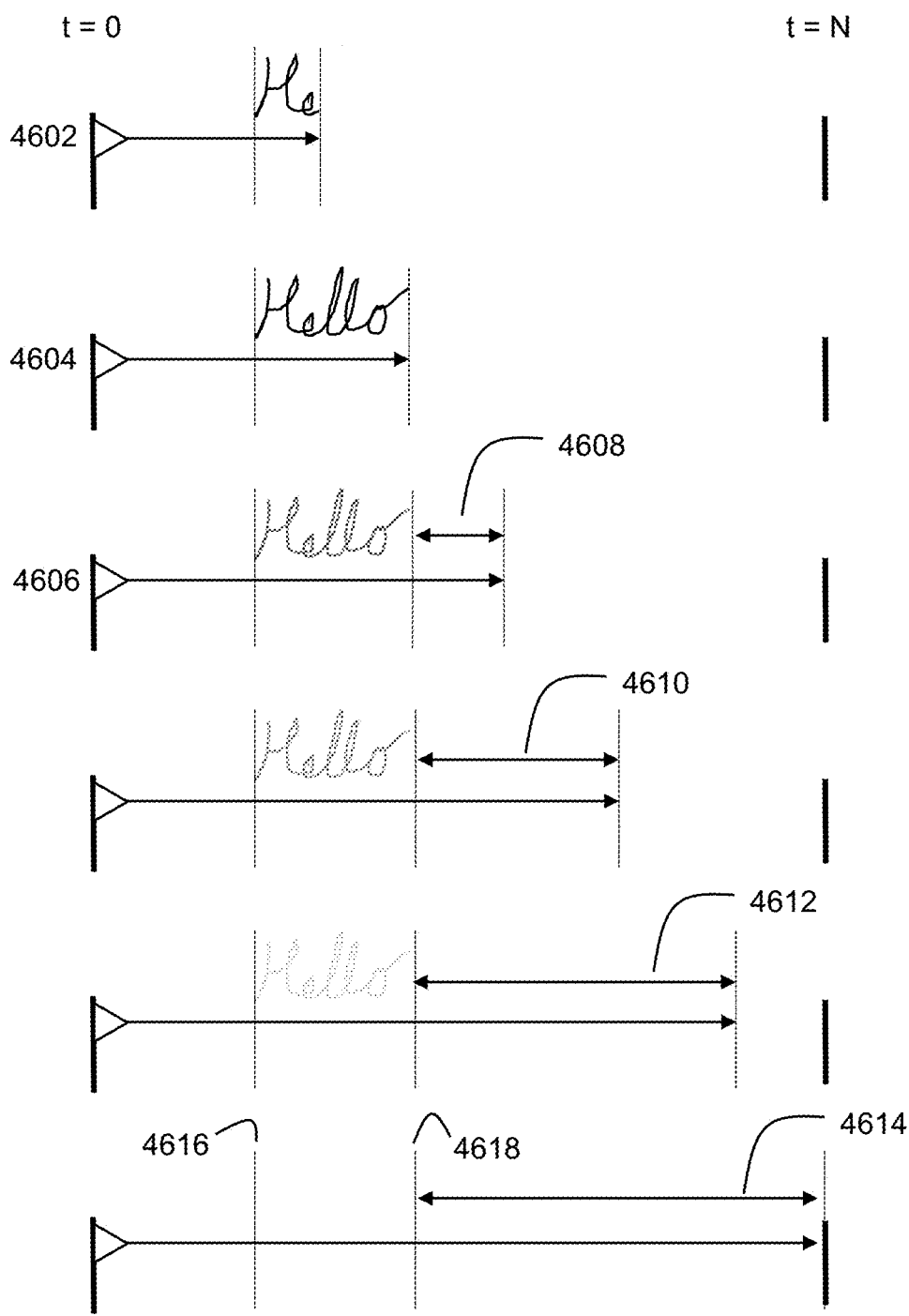
FIG. 46 illustrates a Marker-Mode ink property that facilitates the creation of temporary annotations that appear and then disappear during Vignette replay in some embodiments.

FIG. 46 illustrates a Marker-Mode ink property that facilitates the creation of temporary annotations that appear and then disappear during Vignette replay in some embodi-ments. When recording Vignettes, Marker-Mode annota-tions are captured as re-playable strokes that are sequenced along with the rest of the Vignette content. For some applications of Vignettes it is desirable to have annotations disappear during replay after a certain duration (for example, a sports play analysis). This is achieved using Vignette-Inks in Marker mode that have opacity properties that can be recorded with the Marker strokes. FIG. 46 shows a sequence of timelines demonstrating the temporal sequencing of strokes made with Vignette-Ink configured to fade after stroke creation. Timeline 4602 shows the Vignette playing the Marker strokes recorded during Vignette capture. Time-line 4604 shows the point that the stroke is completed. Timeline 4606 shows an elapsed time 4608 since the stroke was completed. This is used to calculate the opacity of the stroke overtime. As the Vignette continues to sequence, the elapsed time increases 4610, 4612, until the stroke has completely faded 4614. The Vignette-Ink opacity profile can be configured to produce, fade-in, fade-out, or other pulsing effects relative to both the start point 4616 and or end point 4618.

Marker-Mode Snap-Shapes

FIGS. 47 through 51 are example drawing sequences showing the operation of the Marker-Mode Snap-Shape mechanism to create Tap-Shape and Tap-Model geometric elements from freehand Marker strokes in some embodi-ments. Tap-Shapes are simple 2D graphical drawing ele-ments. Tap-Models are 3D geometric elements that can be rendered as 2D projections on a Tap-Board, or as a 3D Tap-Form in a Tap-Space. The Snap-Shape sequence deliv-ers an effortless method to create complex geometries all in one pass without ever lifting the annotation finger from the surface, obviating the need to select drawing tool modes from a toolbar or menu. The Snap-Shape process is applied to one or more annotation strokes made with a finger in Marker-Mode. At the end of the stroke while still holding the Grab-Gesture, a Drip-Gesture executes interpretation of the stroke to recognize standard geometric shapes (i.e. lines, circles, rectangles . . . ). If a Snap-Shape type is recognized, it replaces the freehand annotation with the Tap-Shape equivalent yielding a clean graphical element. Based on the recognized Snap-Shape, further dragging of the drawing finger, adjusts Shape specific properties. Further Drip-Ges-tures sequence through a set of Shape specific properties. Some Tap-Shapes can be converted into Tap-Models such as a Spheres, Cylinders, Prisms, etc. using Vocals to guide the conversion. Vocals can also be used to set Shape properties during the drag operation such as a line color, width, opacity etc. The following Figures demonstrate several Snap-Shape examples.

Polygon Snap-Shape

Figure 47:
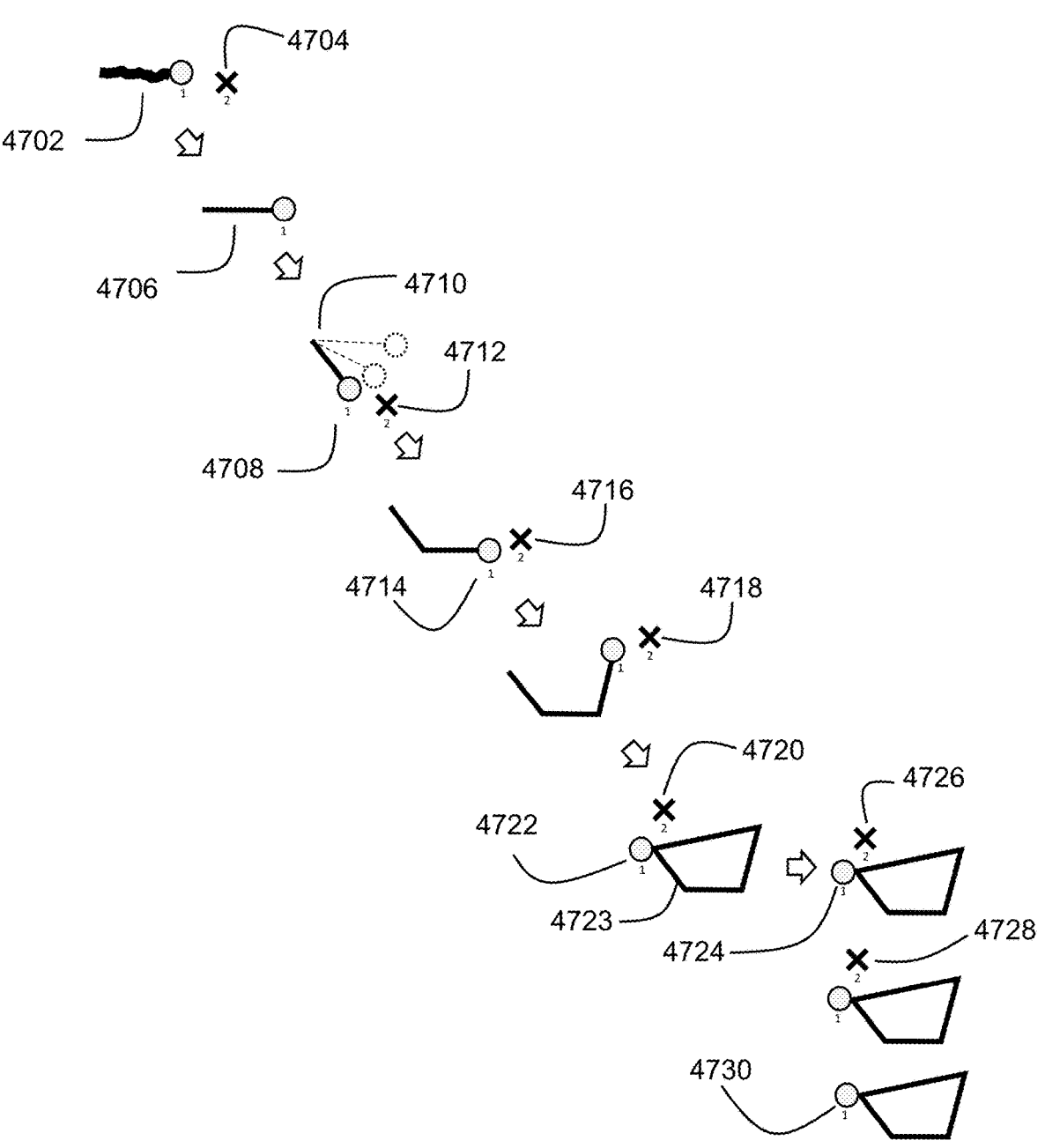
FIG. 47 shows a series of drawing steps that create multiple Polygon Glyph-Shape copies in one continuous flow without lifting the Marker-Mode drawing finger in some embodiments.

FIG. 47 shows a series of drawing steps that create multiple Polygon Tap-Shape copies in one continuous flow without lifting the Marker-Mode drawing finger in some embodiments. Step 4702 approximates a straight line with the Marker drawing finger. A Drip-Gesture 4704 causes the stroke to be analyzed for a recognized Snap-Shape type. Step 4706 replaces the freehand stroke with a Line Tap-Shape. The drawing finger now holds a line segment end-point 4708 with the start point fixed where the freehand stroke began 4710. A Drip-Gesture 4712 converts the Line-Shape to a Polyline-Shape and drops the end-point of the first line segment, starting the drag of a second segment 4714. Repeated Drag-Drips 4716, 4718 add segments to the Polyline-Shape. When a Drip-Gesture 4720 occurs when the drag finger is over the initial start point 4722, the Polyline-Shape is converted to a Polygon-Shape 4723. Further drags of the finger, drag the entire Polygon-Shape. While dragging the Polygon-Shape, Drips-Gestures 4726, 4728 create copies of the Polygon Tap-Shape. Releasing the drawing finger completes the Snap-Shape drawing sequence 4730.

Circle Snap-Shape

Figure 48:
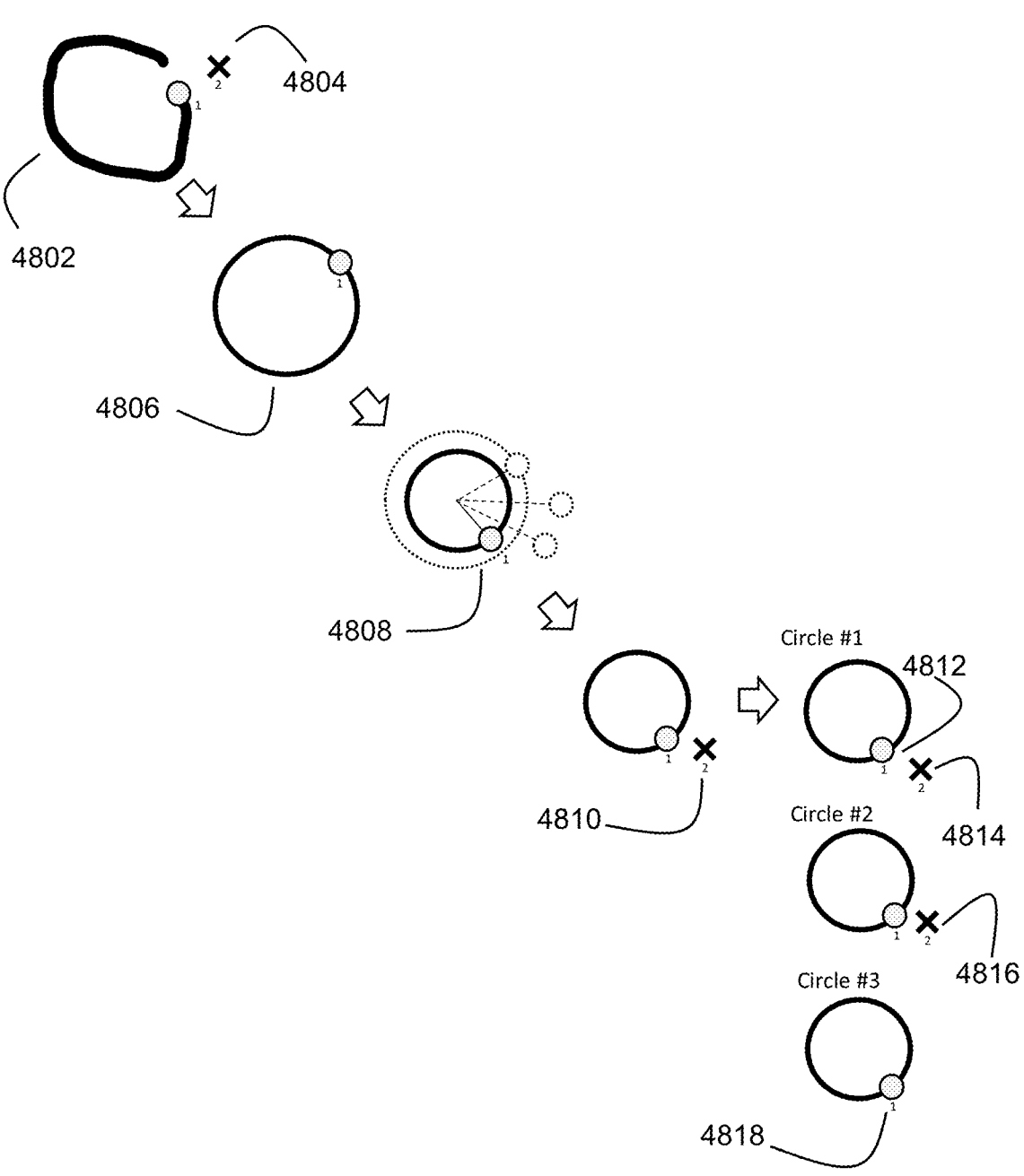
FIG. 48 shows a series of drawing steps that create multiple Circle Glyph-Shapes in one continuous flow in some embodiments.

FIG. 48 shows a series of drawing steps that create multiple Circle Tap-Shapes in one continuous motion in some embodiments. Step 4802 creates a semblance of a freehand circle with the Marker drawing finger. A Drip-Gesture 4804 causes the stroke to be analyzed for a recognized Snap-Shape type. Step 4806 recognizes a circle and replaces the freehand stroke with a Circle Tap-Shape. The drawing finger now holds the radius endpoint 4808 for the Circle-Shape. A Drip-Gesture 4810 locks the radius of the Circle-Shape. Further drags of the drawing finger 4812 drag the entire Circle-Shape. While dragging the Circle, Drip-Gestures 4814, 4816 create copies of the Circle-Shape leaving them behind as the user continues to drag the Circle-Shape. Releasing the drawing finger completes the Snap-Shape drawing sequence 4818.

Washer Snap-Shape

FIG. 49 shows a series of drawing steps that create several Washer Tap-Shapes in one fluid motion in some embodiments. The creation of the Washer begins with the creation of a Circle-Shape 4902 as described in FIG. 48. The Circle-Shape once recognized activates the VUI 4904 with a list of Circle-Specific modifiers 4906 to listen for. If Washer 4908 is spoken, the Circle-Shape is converted into a Washer-Shape, and the drag finger begins dragging a second radius 4910 that defines either the outer or inner ring of a Washer-Shape. A Drip-Gesture 4912 locks the second radius, causing the drag finger to translate the entire Washer-Shape. Drip-Gestures 4914, 4916 create copies of the Washer-Shape leaving them behind as the first finger continues to drag. Releasing the drag finger completes the Snap-Shape drawing sequence 4918.

Torus Snap-Shape

Figure 50:
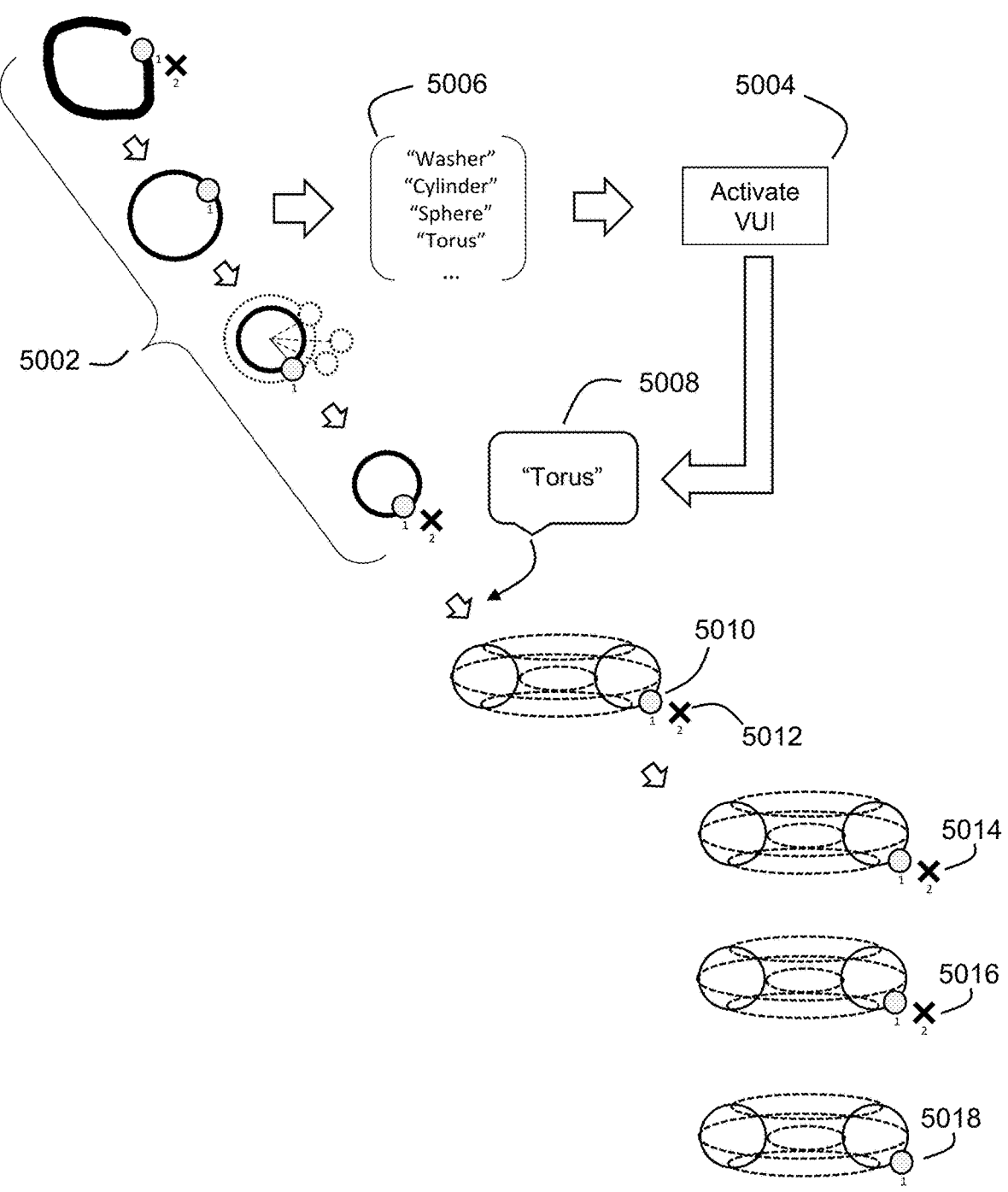
FIG. 50 shows a series of drawing steps that create several Torus Tap-Models in some embodiments.

FIG. 50 shows a series of drawing steps that create several Torus Tap-Models in some embodiments. The creation of the Torus Tap-Model begins with the creation of a Circle-Shape 5002 as in FIG. 48. The Circle-Shape once recognized activates the VUI 5004 with a list of Circle-Specific modifiers 5006 to listen for. If Torus 5008 is spoken, the Circle-Shape is replaced with a Torus Tap-Model, and the drag finger begins dragging a second circle 5010 that defines the second cross-section of a Torus Tap-Model. A Drip-Gesture 5012 locks the second cross-section, completing the definition of the Torus Tap-Model and causing the drag finger to begin dragging the Torus Tap-Model. Drip-Gestures 5014, 5016 create copies of the Torus Tap-Model. Releasing the first finger completes the Snap-Shape drawing sequence 5018.

Cylinder Snap-Shape

Figure 51:
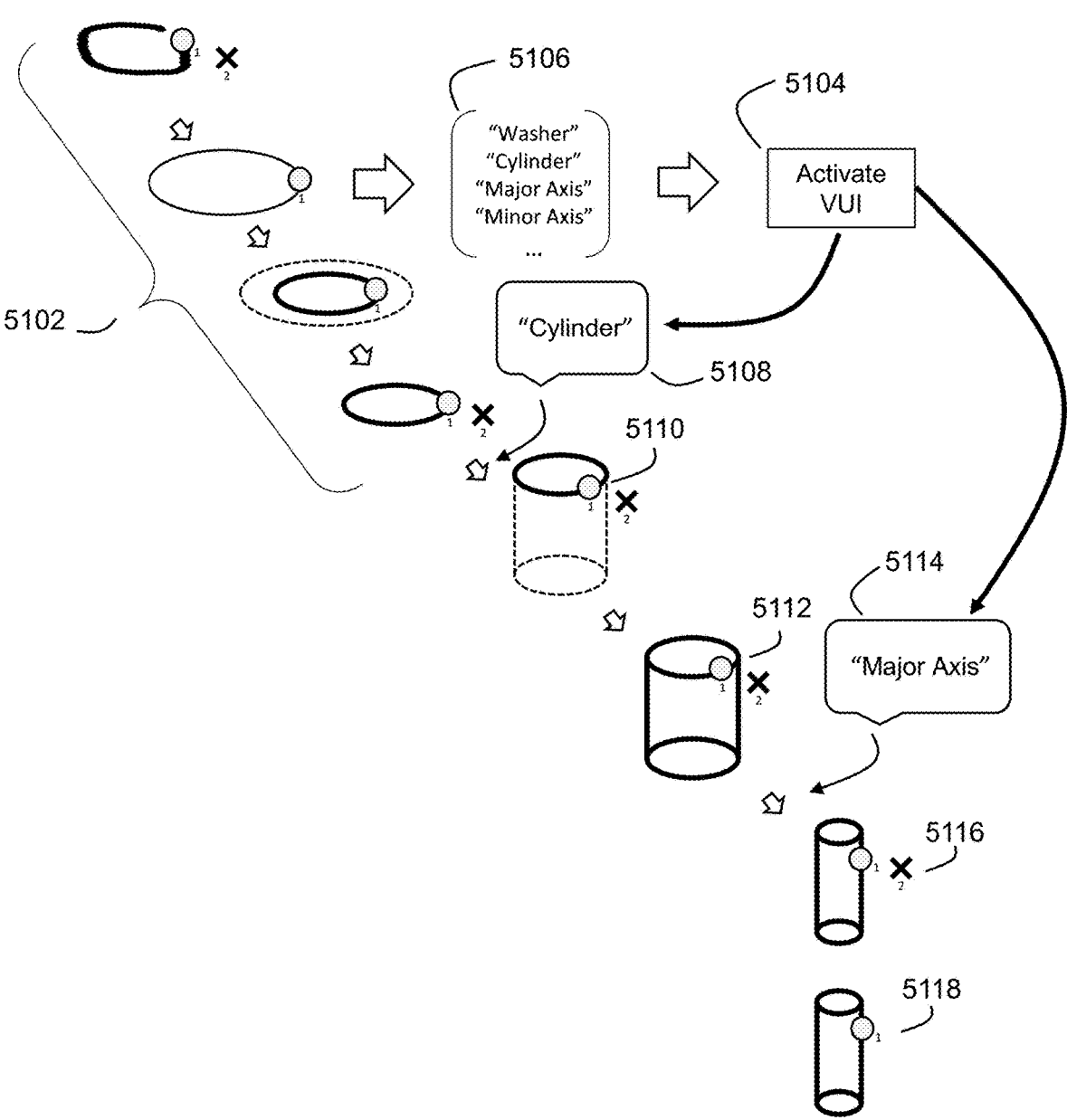
FIG. 51 shows a series of drawing steps that create a Cylinder Tap-Models in some embodiments.

FIG. 51 shows a series of drawing steps that create a Cylinder Tap-Model in some embodiments. The creation of the Cylinder Tap-Model begins with the creation of an Ellipse-Shape 5102. The Ellipse-Shape, once recognized, activates the VUI 5104 with a list of Ellipse-Specific modifiers 5106 to listen for. If Cylinder 5108 is spoken, the Ellipse-Shape is replaced with a Cylinder Tap-Model, and the drag finger begins dragging the height of the Cylinder Tap-Model 5110. A Drip-Gesture 5112 locks the height, completing the definition of the Cylinder Tap-Model and causing the drag finger to now translate the Cylinder Tap-Model. If "Major-Axis" is spoken 5114, the drag finger returns to dragging the major-axis of the Cylinder-Shape. Drip-Gestures 5116 locks the new major-axis size. Releasing the first finger completes the Snap-Shape drawing sequence 5118.

Recap of Snap-Shapes

Snap-Shapes provide a spontaneous frictionless way to achieve complex drawing operations in a manner suited to a spontaneous lecture in front of a class where careful navigation of menus, toolbars and drawing applications is not practical or even possible. The above Snap-Shape scenarios are applicable to a wide range of Tap-Shape types, Tap-Model types, and a whole host of Shape/Model parameter properties, options, and modifiers. All this capability is achieved effortlessly off the fingertips.

Grab Gesture Formulation

Figure 52:
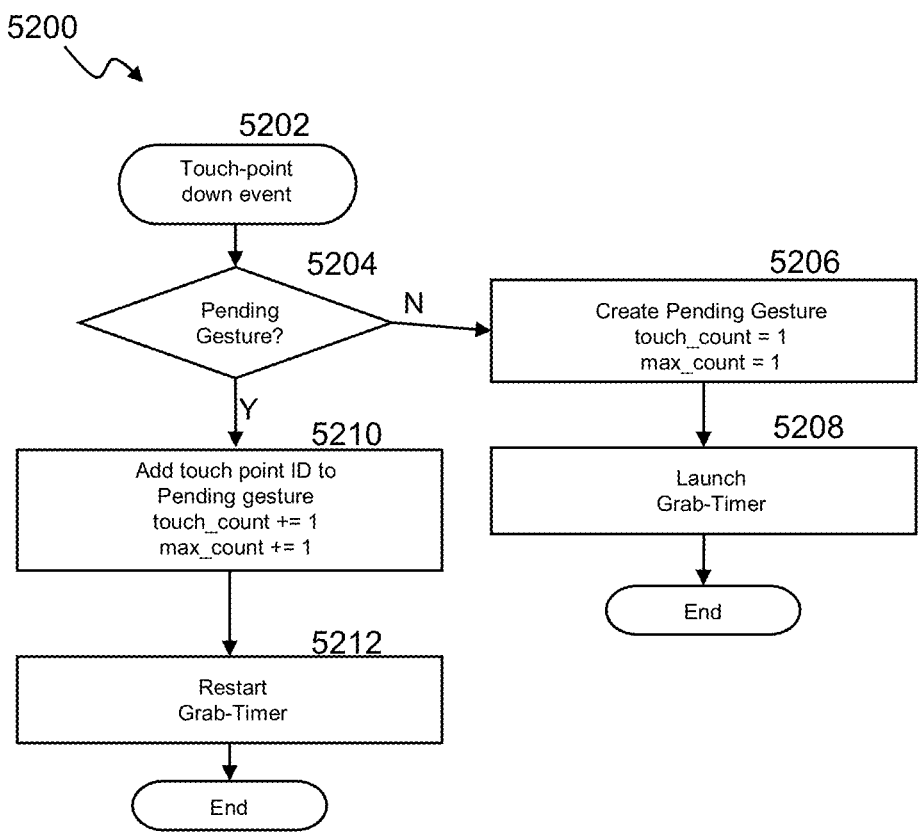
FIG. 52 is a flowchart describing the process of forming a Grab-Gesture from a set of disparate touch-point down events in some embodiments.

FIG. 52 shows the process 5200 of forming a Grab-Gesture from a set of disparate touch-point down events 5202 in some embodiments. A Pending-Gesture structure is created with the first touch-point down event 5206. It processes and records touch events, up and until the point that a gesture is established (Closed-Out). The Pending-Gesture is Closed-Out when either a Grab-Timer expires 5402 generating a Grab-Gesture, or all fingers are lifted before the Grab-Timer expires 5318 generating a Tap-Gesture. The Grab-Timer is restarted 5212 with each new touch-point down event to provide additional time for the user to complete the gesture. On the first touch-point down event, the Pending-Gesture Touch-Count is set to 1 and a Grab-Timer 5208 is launched. While the Pending-Gesture exists 5204, it receives all additional touch-point down events 5210 and touch-point release events 5302, incrementing and decrementing the Touch-Count accordingly. The touch-point IDs are recorded 5210 to match with future events such as release and drag events. The max-count 5210 records the maximum number of touch-point down events during the course of the Pending-Gesture in the event that all touch-points are released before the Grab-Timer expires, generating a Tap-Event 5318.

Touch-Point Release Event Processing

Figure 53A:
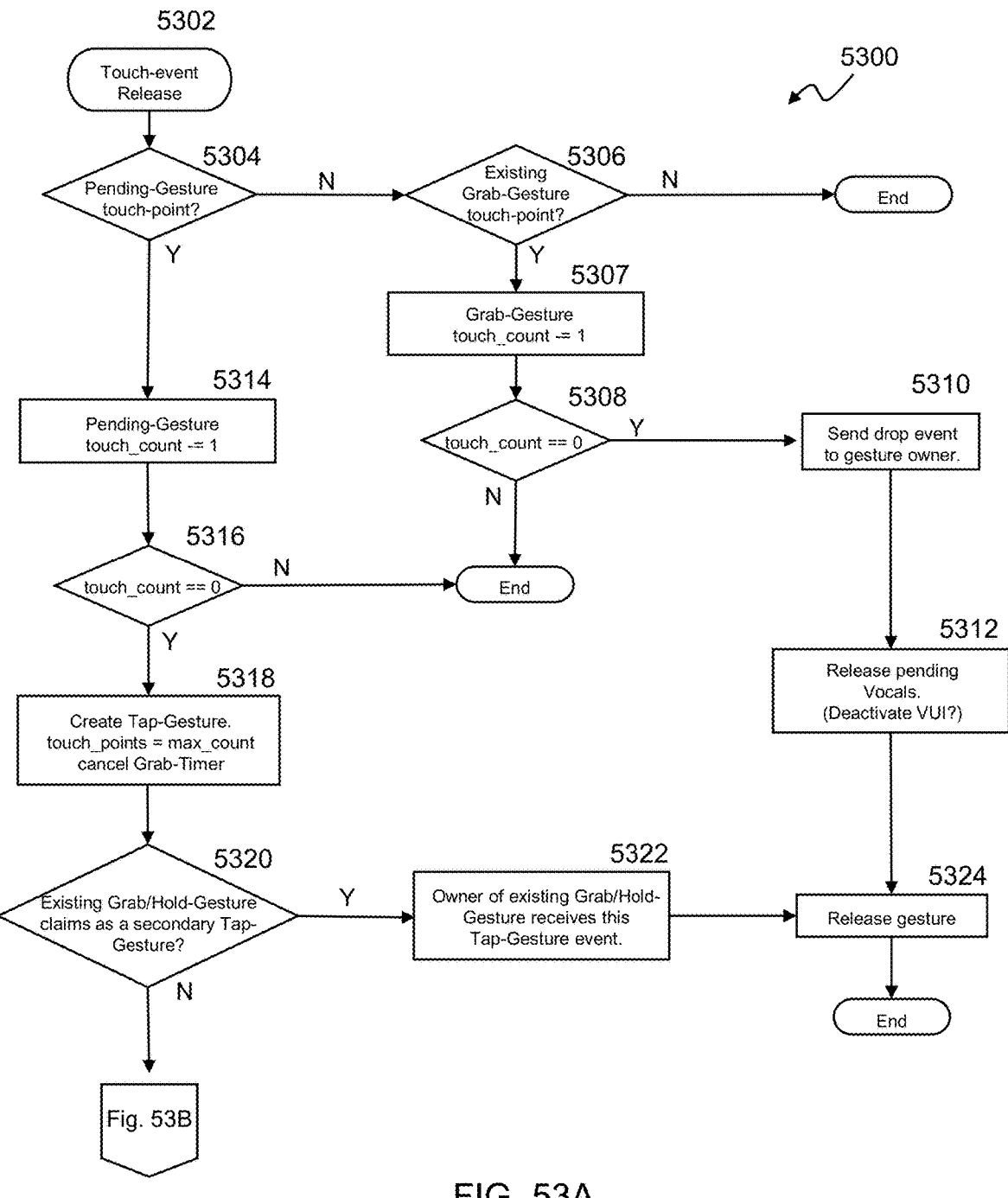
FIGS. 53A and 53B are flowcharts describing touch-point release event processing in some embodiments.
Figure 53B:
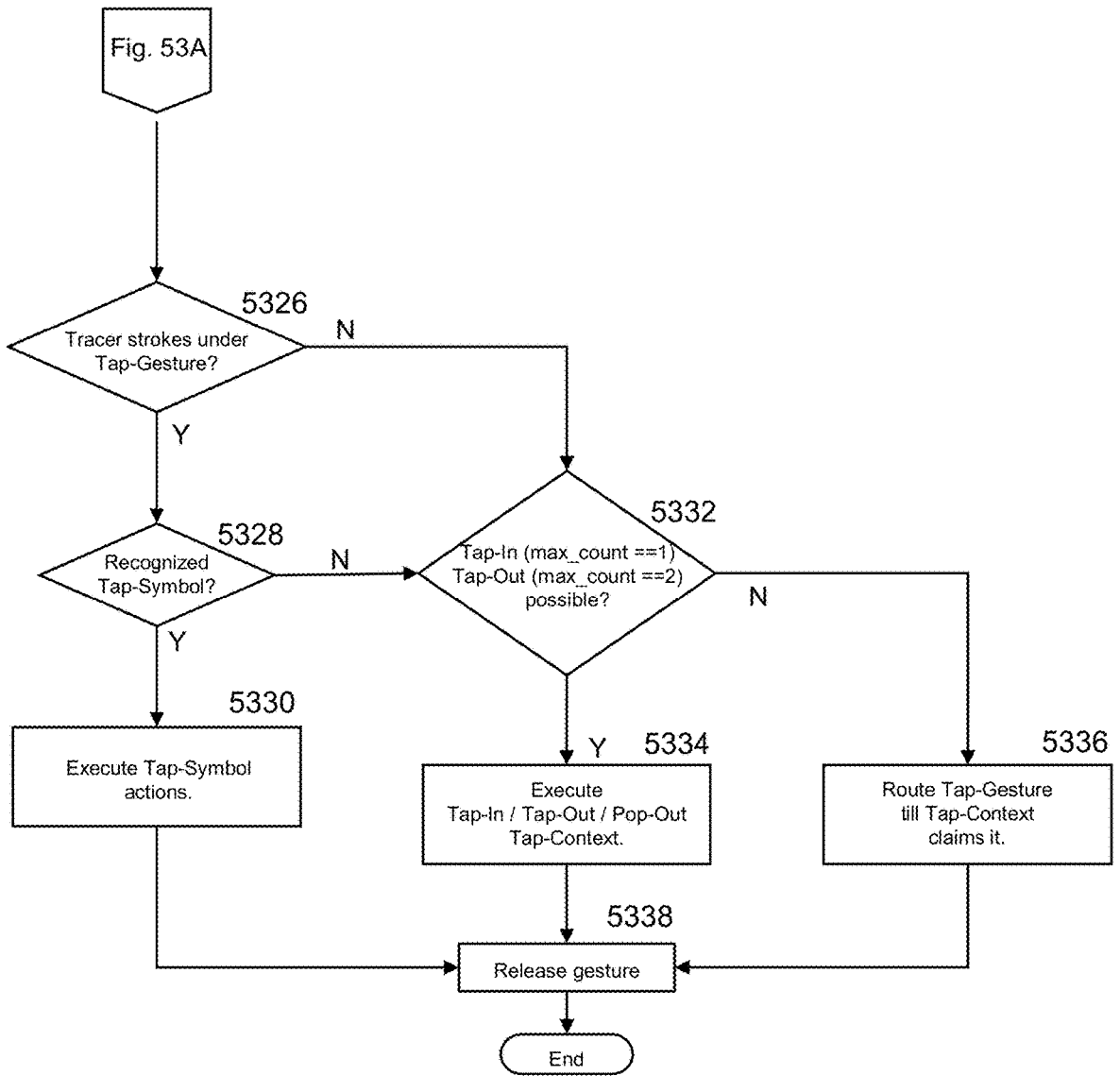

FIGS. 53A and 53B show the touch-point release event processing 5300 in some embodiments. This process identifies Tap-Gestures. On a touch-point release event 5302, the owner of the touch point is determined by comparing the touch point ID against the Pending-Gesture touch points 5304. If the touch-point release does not belong to the Pending-Gesture, it is compared with existing Grab-Gestures 5306. If an existing Grab-Gesture owns the touch-point ID, its Touch-Count is decremented 5307. If this Touch-Count goes to zero 5308, a Drop event 5310 is issued to the owner of the Grab-Gesture. If there are any pending Vocals associated with the Gesture, they are released 5312. If there are no longer any Vocals registered, deactivate the VUI. The gesture is then released 5324. If the touch-point belongs to the Pending-Gesture, its Touch-Count is decremented 5314. If this Touch-Count goes to zero 5316, a Tap-Gesture is generated and the Grab-Timer is canceled. The routing of the Tap-Gesture proceeds similar to the routing of a Grab-Gesture described above. First, currently existing Grab-Gestures are queried 5320 to determine if they claim the Tap-Gesture as a secondary gesture, forming a Compound-Gesture 5322 event. If no active Grab-Gestures claim the Tap-Gesture, the location of the gesture is tested to see if any Tracer strokes are beneath the gesture 5326. If there are Tracer strokes, analysis of the strokes is triggered to determine if a Tap-Symbol is recognized 5328. If a Tap-Symbol is found, the corresponding command action(s) are executed 5330. If Tracer strokes are not found beneath the gesture, or a Tap-Symbol is not recognized, the Tap-Gesture is analyzed for a one-finger Tap-In, a two-finger Tap-Out, or a two-finger Vertical Tap-Out 5334. The location of the gesture, as well as the state of the Tap-Stack, are used to determine navigation actions. The Tap-Gesture is released 5338. If a navigation context was not found, the Tap-Gesture is routed among the Tap-Contexts (Glyph/Tap-Form/Tap-Board/Tap-Display) until claimed 5336.

Grab-Timer Expiring Event Processing

FIG. 54 shows the Grab-Timer expiring 5402 event processing 5400 in some embodiments. If there is no Pending-Gesture 5404 then the process ends. This can happen if all fingers are lifted before expiration of the Grab-Timer Closing-Out the Pending-Gesture as a Tap-Gesture. If there still is a Pending-Gesture 5404, a Grab-Gesture is established 5406 and the current Touch-Count is used to label it (1, 2, 3, N-Finger Grab-Gesture). After establishing the Grab-Gesture, other active Grab/Hold-Gesture owners are queried 5408 to see if they want to claim this new Grab-Gesture as a secondary gesture, forming a Compound-Gesture 5410. If no previous gesture owner claims the Grab-Gesture, the gesture is routed among the Tap-Contexts (Glyph/Tap-Form/Tap-Board/Tap-View/Tap-Display) below the location of the Gesture until it is claimed 5412. If no entities claim the Gesture, it is released 5418 and no further processing of the gesture is conducted. If a Tap-Context claims the Grab-Gesture 5414, a Hold-Timer is launched and assigned to this gesture 5416. The Hold-Timer is used to generate a Hold event indicating that the user has not significantly moved the Grab-Gesture. This will be used to cue the Touch-To-Talk Vocal-Command feature, as well as a trigger for Tap-Symbols.

Touch-Point Drag Event Processing

Figure 55:
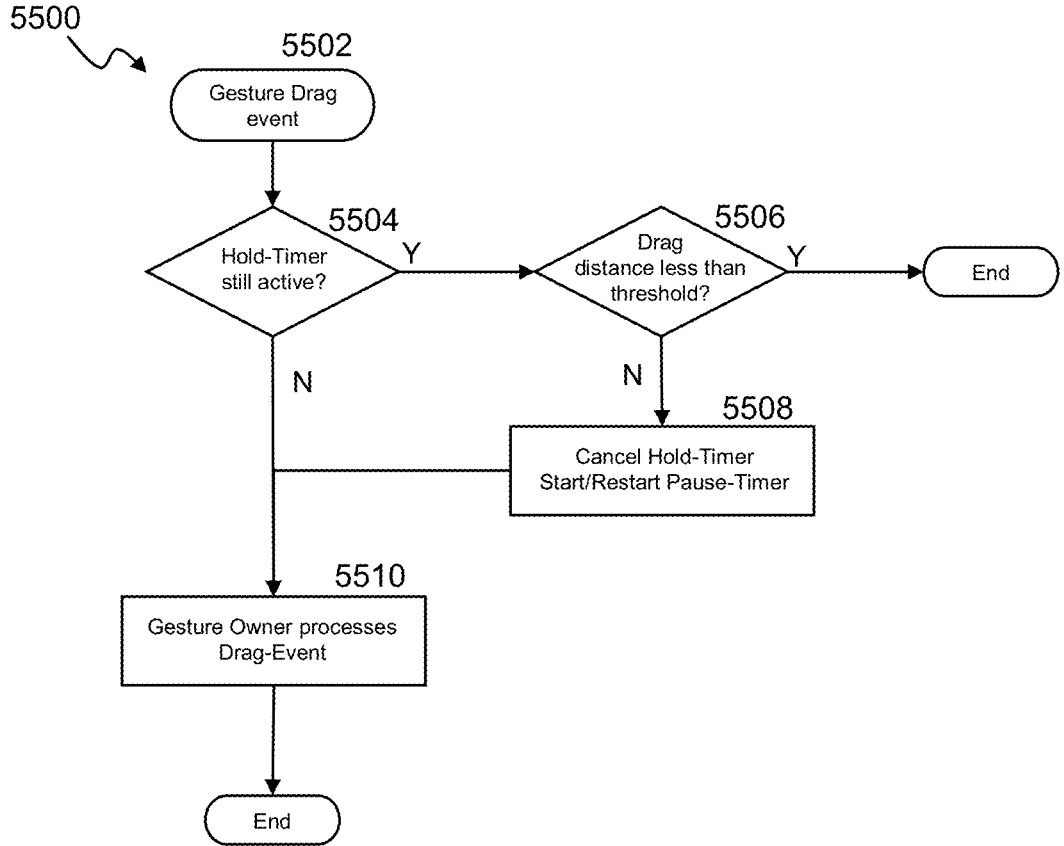
FIG. 55 is a flowchart describing the touch-point drag event processing in some embodiments.

FIG. 55 shows the touch-point drag event processing 5500 in some embodiments. In response to any of the touch points of a Grab-Gesture moving, a gesture drag event is issued 5502. If this Gesture still has a Hold-Timer associated with it (not expired or canceled) 5504, then the centroid of the Gesture is compared against the point at which the gesture was established 5506. If the difference between these locations exceeds a threshold, the Hold-Timer for this gesture is canceled 5508 and a Pause-Timer is Started/Relaunched. The Pause-Timer will be used to generate the Pause-Trigger for triggering Tap-Shapes made with the Tracer. The Gesture Owner handles any processing of the Drag-Event 5510.

Hold-Timer Expiration Event Processing

Figure 56:
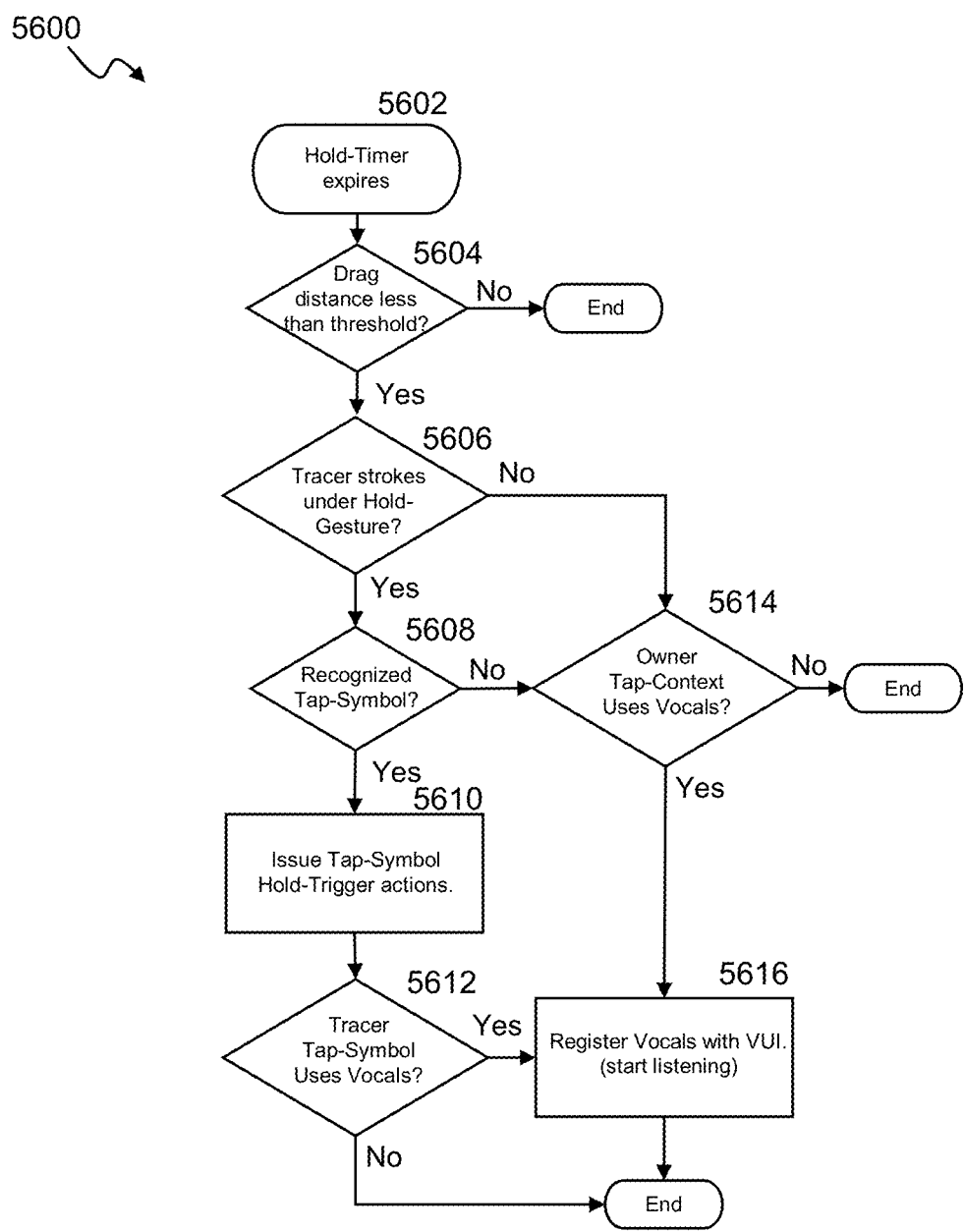
FIG. 56 is a flowchart describing the Hold-Timer expiration event processing in some embodiments.

FIG. 56 shows the Hold-Timer expiration event processing 5600 in some embodiments. When the timer expires 5602, the Grab-Gesture that this timer is assigned to is checked to see if its current location has moved beyond a threshold value 5604. If movement of the Grab-Gesture exceeds the threshold, a Hold event is not generated. If the Grab-Gesture location is within the threshold value, a Hold-Event is issued. The location of the Hold-Gesture is tested to see if any Tracer strokes are beneath the gesture 5606. If there are Tracer strokes, analysis of the strokes is triggered to determine if a recognizable Tap-Symbol is present 5608. If a Tap-Symbol is found, the corresponding Hold-Trigger action(s) 5610 are executed. If the Tap-Symbol implements Vocals 5612, these are registered with the VUI 5616 and activated. If Tracer strokes are not found beneath the gesture, or a Tap-Symbol is not recognized, the Hold-Event is handled by Tap-Context entities 5614 under the Hold-Gesture. The Tap-Context implements Vocals, these are registered with the VUI 5616 and activated. If the VUI is activated, it remains active until the user releases all fingers of the Hold-Gesture.

Pause-Timer Expiration Event Processing

Figure 57:
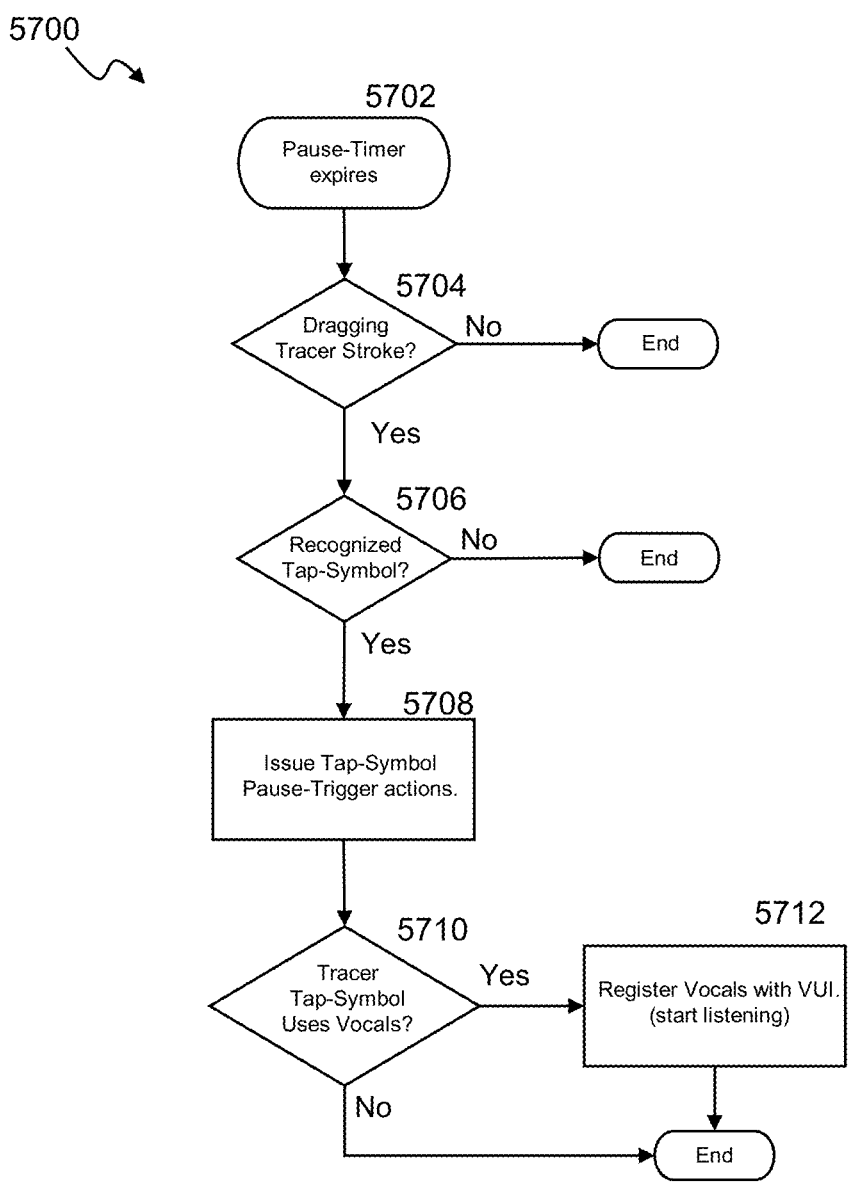
FIG. 57 is a flowchart describing the Pause-Timer expiration event processing in some embodiments.

FIG. 57 shows the Pause-Timer expiration event processing 5700 in some embodiments. When the timer expires 5702, if the Gesture is owned by the Tracer, and a Tracer Stroke 5704 is being held, analysis of all active Tracer strokes is triggered 5706. If a Tap-Symbol is recognized a Pause-Trigger 5708 is issued to the recognized Tap-Symbol to execute actions. If the Tap-Symbol uses Vocals 5710 these are registered with the VUI system 5712.

Fingertip-Gesture Drag Event Processing

Figure 58:
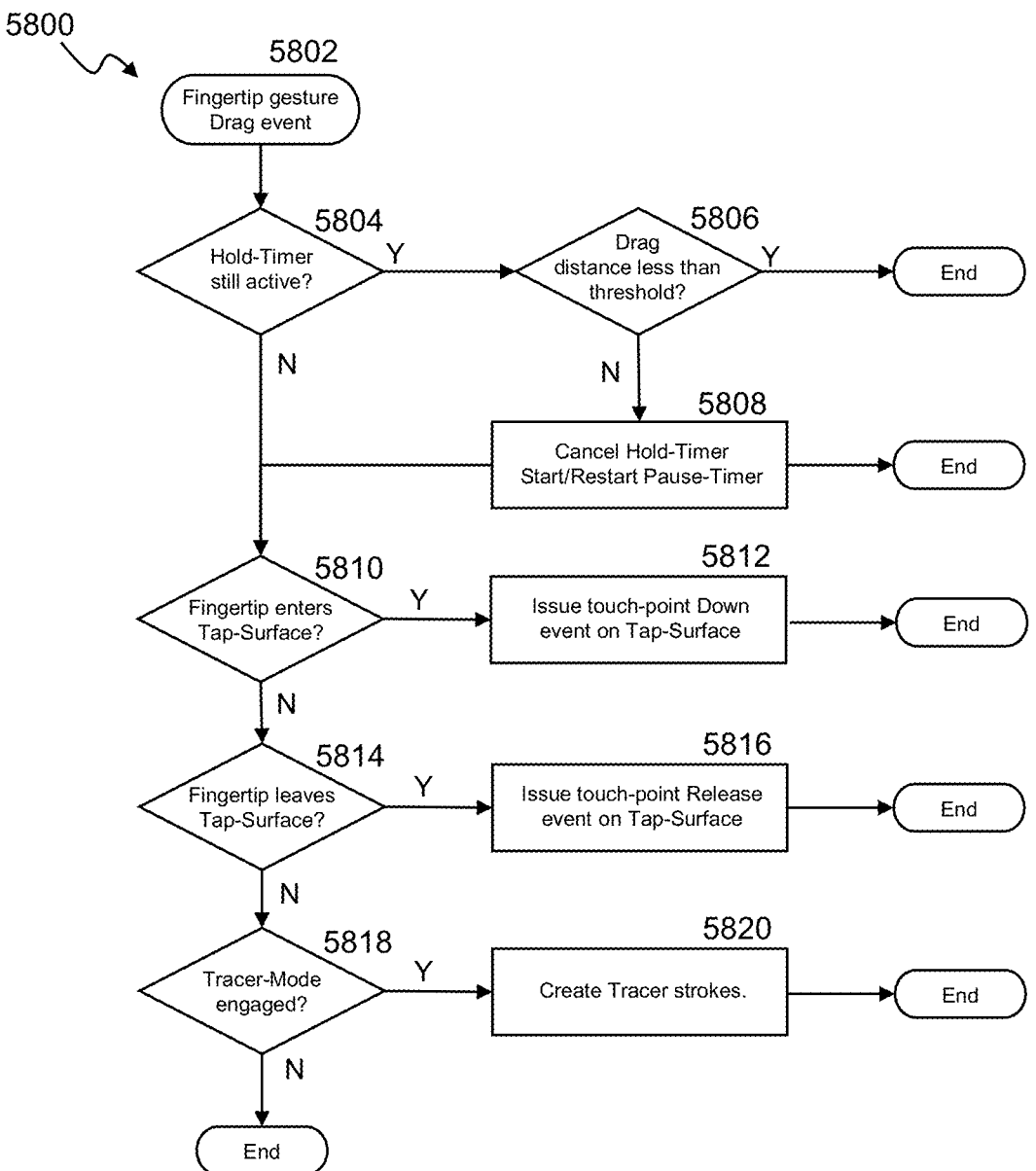
FIG. 58 is a flowchart describing the Fingertip-Gesture drag event processing in some embodiments.

FIG. 58 shows the Fingertip-Gesture drag event processing 5800 in some embodiments. The fingertip tracking technology associated with an AR or VR environment locates the user's fingers in 3D space using image processing, and issues a move event 5802 in response to motions of the fingertips. Motions of the fingertips are tracked through time creating Fingertip-Gestures that stay persistent as long as the fingertips remain visible. If the identified Fingertip-Gesture has a Hold-Timer associated with it (not expired or canceled) 5804, then the centroid of the Gesture is compared against the point at which the gesture was established 5806. If the difference between these locations exceeds a threshold, the Hold-Timer for this gesture is canceled 5808 and a Pause-Timer is Started/Relaunched. The Pause-Timer will be used to generate the Pause-Trigger for triggering Tap-Shapes made with the Tracer. The motion of the Fingertip-Gesture is compared with Tap-Surfaces in the virtual Tap-Space. If a Fingertip-Gesture that was not formally intersecting a Tap-Surface enters a surface 5810 (fingertip on opposite side of surface from the user), then a touch-point Down event is issued on the Tap-Surface 5812. If a Fingertip-Gesture that was formally intersecting a Tap-Surface no longer intersects (fingertips on same side of surface as the user) 5814. Then a touch-point Release event is issued on the Tap-Surface 5816. If the Tracer-Mode is engaged 5818, then Tracer strokes are made in the Tap-Space volume 5820.

Fade-Timer Event Processing

Figure 59:
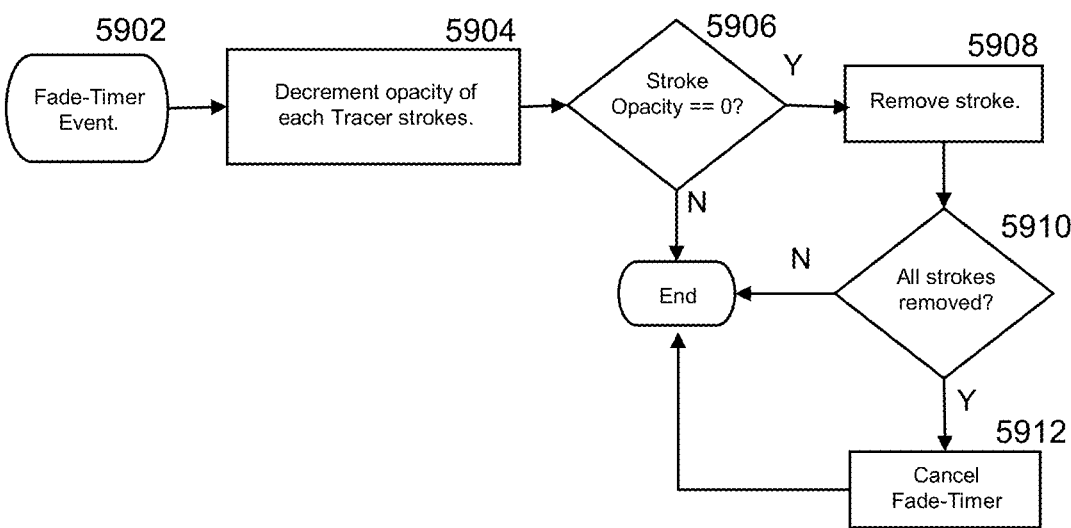
FIG. 59 is a flowchart describing the repeating Fade-Timer event processing in some embodiments.

FIG. 59 shows the repeating Fade-Timer event processing 5900 in some embodiments. When the timer expires 5902, the opacity of all currently active Tracer strokes is decremented 5904 and re-rendered. If any of the stroke opacities are zero 5906 the stroke(s) are removed 5908 from the Tracer. If after removing the strokes, there are no more strokes 5910, the Fade-Timer is canceled 5912.

Computer System

Figure 60:
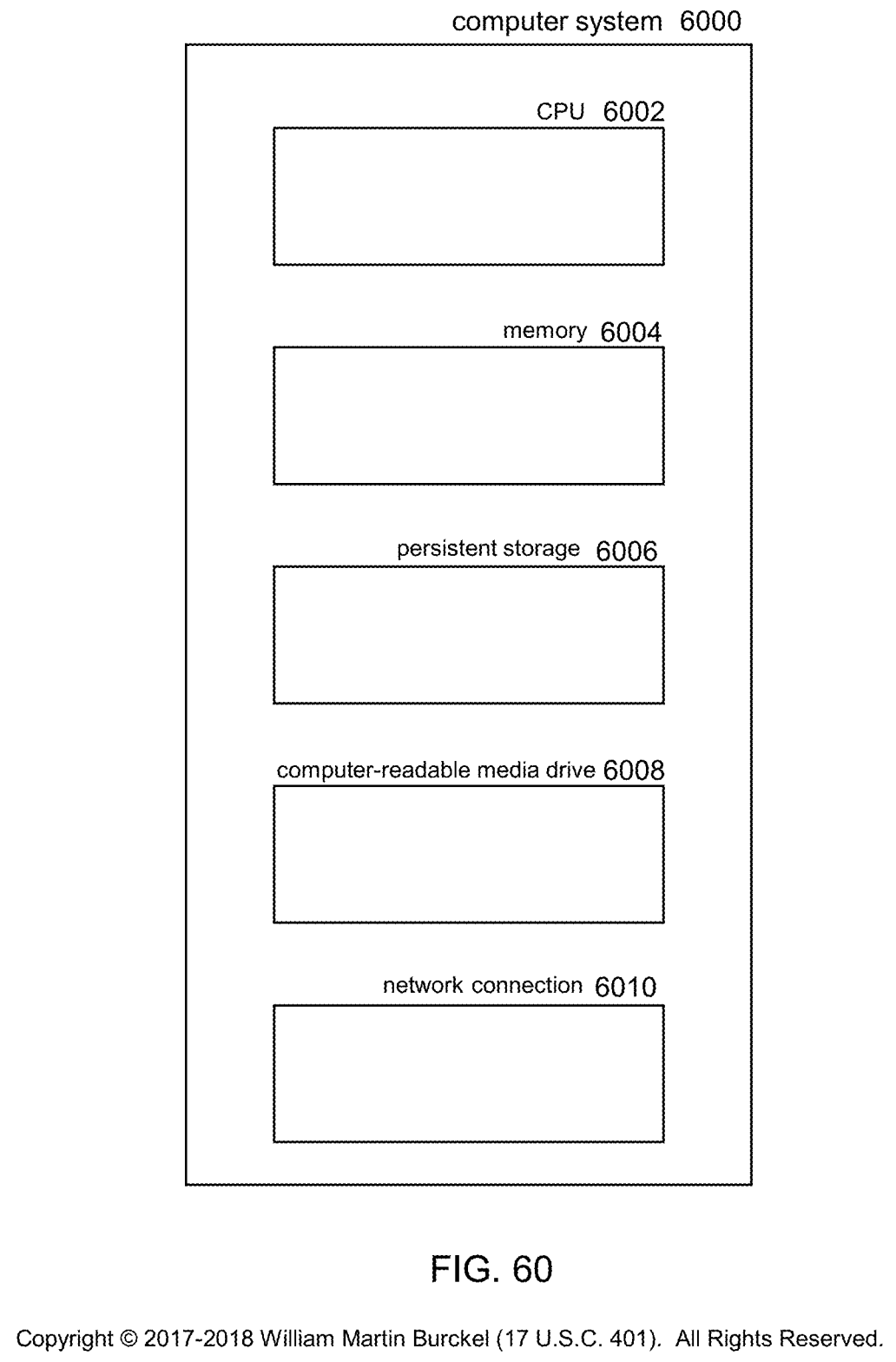

FIG. 60 is a block diagram showing some of the components typically incorporated in at least some of the computer systems and other devices on which the facility operates. In various embodiments, these computer systems and other devices 6000 can include server computer systems, desktop computer systems, laptop computer systems, netbooks, mobile phones, smartwatches, AR/VR computer systems and peripherals, personal digital assistants, televisions, cameras, automobile computers, electronic media players, etc. In various embodiments, the computer systems and devices include zero or more of each of the following: a central processing unit ("CPU") 6002 for executing computer programs; a computer memory 6004 for storing programs and data while they are being used, including the facility and associated data, an operating system including a kernel, and device drivers; a persistent storage device 6006, such as a hard drive or flash drive for persistently storing programs and data; a computer-readable media drive 6008, such as a floppy, CD-ROM, or DVD drive, for reading programs and data stored on a computer-readable medium; and a network connection 6010 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Environment

Figure 61:
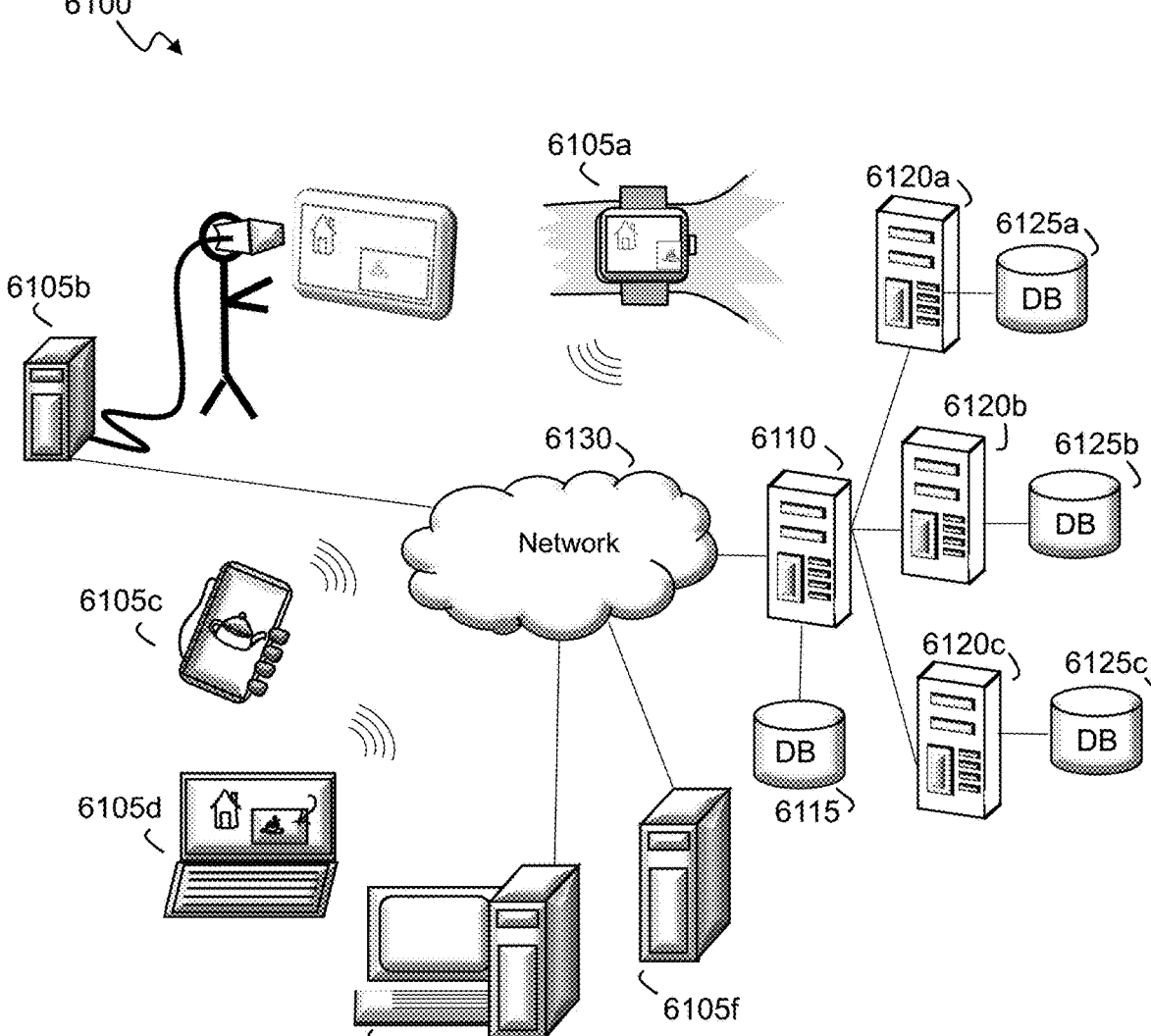
FIG. 61 is a block diagram illustrating an overview of an environment in which some implementations of the disclosed technology can operate in some embodiments.

FIG. 61 is a block diagram illustrating an overview of an environment 6100 in which some implementations of the disclosed technology can operate. Environment 6100 can include one or more client computing devices 6105a-f, examples of which can include device 6000. Client computing devices 6105a-f can operate in a networked environment using logical connections 6110 through network 6130 to one or more remote computers, such as a server computing device.

In some implementations, server 6110 can be an edge server which receives client requests and coordinates fulfillment of those requests through other servers, such as servers 6120a-c. Server computing devices 6110 and 6120a-c can comprise computing systems, such as device 6000. Though each server computing device 6110 and 6120a-c is displayed logically as a single server, server computing devices can each be a distributed computing environment encompassing multiple computing devices located at the same or at geographically disparate physical locations. In some implementations, each server 6120a-c corresponds to a group of servers.

Client computing devices 6105a-f and server computing devices 6110 and 6120a-c can each act as a server or client to other server/client devices. Server 6110 can connect to a database 6115. Servers 6120a-c can each connect to a corresponding database 6125a-c. As discussed above, each server 6120a-c can correspond to a group of servers, and each of these servers can share a database or can have their own database. Databases 6115 and 6125a-c can warehouse (e.g. store) information of Tap-Boards, Tap-Spaces, Working-Decks, Space-Decks, Glyphs, presentation user(s), recipient user(s), presentation device(s), recipient device(s), and so on. Though databases 6115 and 6125a-c are displayed logically as single units, databases 6115 and 6125a-c can each be a distributed computing environment encompassing multiple computing devices, can be located within their corresponding server, or can be located at the same or at geographically disparate physical locations.

Network 6130 can be a local area network (LAN) or a wide area network (WAN), but can also be other wired or wireless networks. Network 6130 may be the Internet or some other public or private network. Client computing devices 6105a-f can be connected to network 6130 through a network interface, such as by wired or wireless communication. While the connections between server 6110 and servers 6120a-c are shown as separate connections, these connections can be any kind of local, wide area, wired, or wireless network, including network 6130 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

Continuation-In-Part/Gesture-Based Menuless Command Interface

Ad Hoc Tracer-Mode

This material describes a variation to the Tracer-Mechanism in some embodiments. These adjustments place the Tracer-Mechanism in a form that makes it practical for wider adoption in user interface settings and computer program products.

The number of different functions most software packages possess typically exceeds the interface bandwidth of standard user input devices by a significant margin. The issue for the software designer is, how to expose the significant number of functions and modes of the program to the user so they can realize the power of the software. This must be accomplished with the small number of device input actions at their disposal. A mouse has one or two buttons. A stylus may not have any buttons at all. Even a modern multi-touch monitor has a finite number of finger combinations which can be reasonably recognized. The current practice is to employ menus and toolbars to multiplex simple user input by dedicating screen area to graphical buttons which can be activated using a low bandwidth input solution (mouse click, single finger touch, stylus tap) to switch software modes and engage the functionality.

When attempting to create a zero-graphical footprint solution which does not employ menus and toolbars, either due to necessity (lack of screen space on small devices or lack of access to designated menu areas on extremely large screens) or due to aesthetic rationale in pursuit of a completely uncluttered workspace as in whiteboard applications, a completely different solution is called for. The Tracer-Mechanism described earlier in the specification is a solution to that problem. The Tracer-Mechanism is an open-ended command interface that requires zero graphical space to implement. It can deliver an endless bandwidth of command functionality limited only by the ability to express unique symbols to indicate desired functionality.

The Tracer-Mechanism not only provides an alternative to menus and toolbars for command execution, but it also exceeds them in the ability to indicate the command context all-in-one motion. A two-step process is usually required that uses a selection mechanism to indicate the recipient of one or more menu/toolbar commands. First, the selection mechanism is used to select a subset of the graphical elements, then a function is chosen from a menu or toolbar. The Tracer serves as both the selection mechanism and the command trigger at the same time. Put another way the Tracer is more expressive and gives the user an enhanced ability to indicate location, target context, and orientation. An illustrative embodiment is issuing a print command, where the print Tap-Symbol triggers the print command but also simultaneously indicates a region of the content space to print.

The original treatment of the Tracer-Mechanism in this specification placed the Tracer-Mode at the center of the gesture map described in FIG. 9. This implies that platform interactions always start in Tracer-Mode, and other modes of operation: Staging, Marking and Flowing, are auxiliary to the Tracer, requiring explicit mode changes.

This new material describes a variation of the Tracer-Mechanism implementation that allows the Tracer to co-exist alongside more traditional gesture interface mechanisms such as scrolling, selecting, and annotating, without having to dominate the gesture map. This new material delivers the Tracer-Mode directly through a gesture combination providing an ad hoc, on-the-fly mechanism, where the user does not explicitly switch modes. This allows the user to get-in/get-out quickly without breaking workflow stride, and more directly matches the frequency needed for platform command invocations. The user only occasionally needs to save/print/or open content, etc. This improved Tracer command interface is available when needed, but not in the way. This enhancement of the Tracer-Mode makes it essentially modeless. This can be thought of similarly to the way two finger scrolling empowers navigation without explicit mode changing.

Ad Hoc Tracer-Mode Multi-Touch Display

Figure 62:
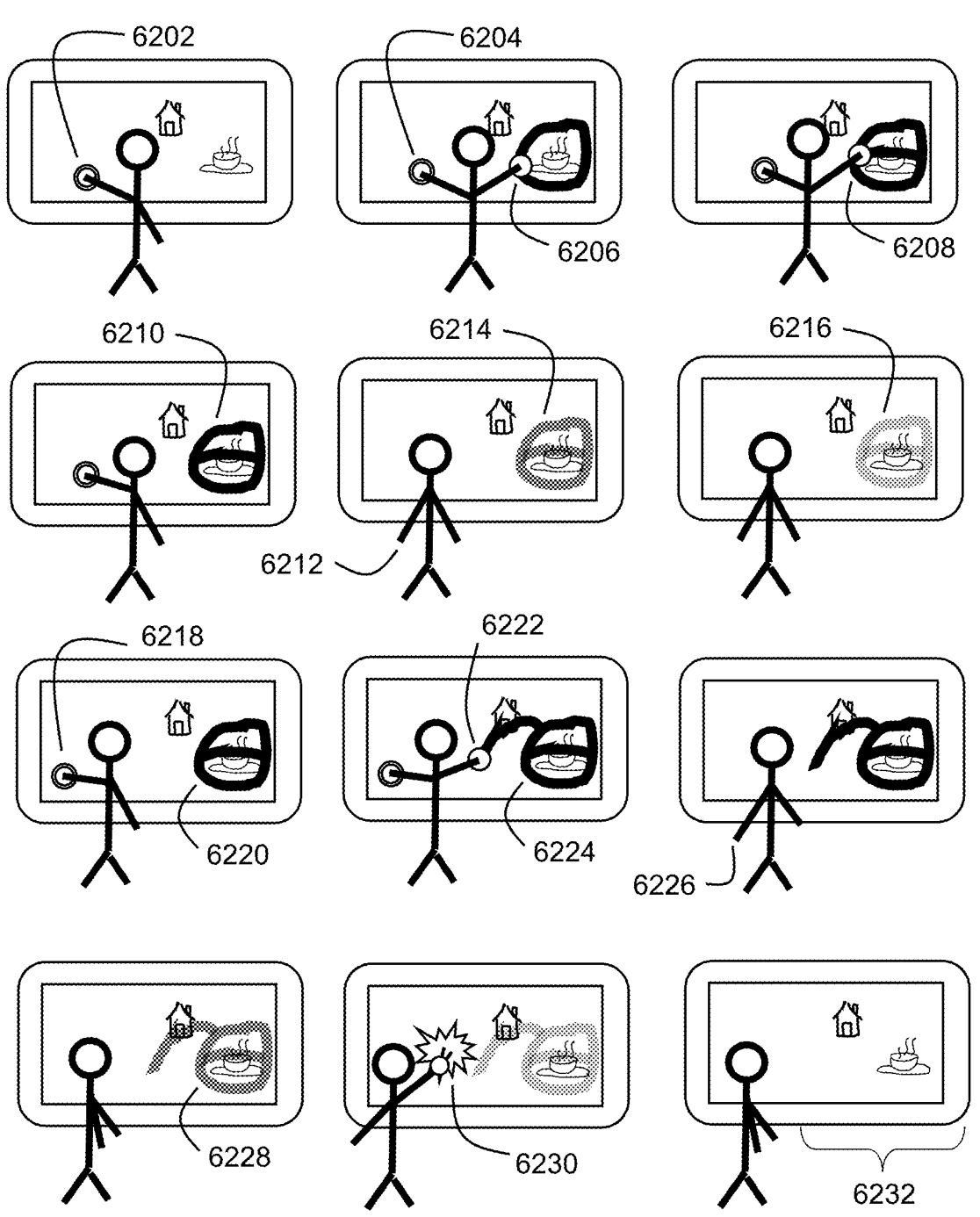
FIG. 62 illustrates an Ad Hoc Tracer-Mode activation gesture for a multi-touch display scenario in some embodiments.

The first aspect of the Tracer-Mechanism, as previously described, is the ability for the user to produce spontaneous highlights. FIG. 62 illustrates an Ad Hoc Tracer-Mode for a multi-touch display scenario. The Ad Hoc Tracer-Mode is implemented as a compound touch gesture in some embodiments. The first gesture, a single finger hold 6202, is used to activate the Tracer-Mode. The hold gesture requires that the gesture not move significantly from the initial position once it is established. This ensures it is unambiguous and not involved in another single gesture mode of operation. While the Tracer-Activation gesture is maintained 6204, one or more additional single finger drag gestures 6206, 6208, are interpreted as tracer strokes, that deposit graphical temporary strokes within the space 6210. These strokes remain while the Tracer-Activation gesture is maintained. Once the Tracer-Activation gesture is released 6212, a fade timer is launched and the one or more tracer strokes are faded 6214, 6216 by reducing the opacity of the graphical strokes. If the tracer activation hold gesture is again re-established before the captured tracer strokes fade completely 6218, the fade timer is canceled, and the strokes are immediately returned to full opacity 6220. With the Tracer-Activation gesture reestablished, additional Trace gestures 6222, add graphical strokes to the existing ones 6224. Releasing the single finger Tracer-Activation gesture again 6226, restarts the fade timer, and the strokes again begin to fade 6228.

A two-finger tap is used to clear any captured tracer strokes 6230, restoring the space to a clean unmarked state 6232. This provides the ability to rapidly scrape clean the temporary annotations without waiting for the fade operation to complete. This two-finger tap can be delivered with or without the Tracer-Activation gesture being active. Processing of a two finger tap simply checks to see if there are any currently active tracer strokes. If so, the gesture is consumed, and the strokes are cleared. If there are no strokes, the two finger tap gesture is passed on and allowed to be processed by other aspects of the gesture system.

The Tracer as described up to this point serves as a nimble telestration tool co-existing alongside other activities and modes of operation, easily invoked without a thought, on-the-fly amidst other activities. The Tracer compound gesture allows the user to get-in/get-out ensuring the passive utility of the Tracer as a rapid commentary tool perfect for telework or on-line collaborative scenarios.

The second aspect of the Tracer-Mechanism, as previously described, is as a command interface for issuing application commands. The four methods of triggering a Tap-Symbol are again: Tap-Trigger, Drip-Trigger, Hold-Trigger and Pause-Trigger. These four methods are only slightly modified to account for the Tracer-Activation gesture. Each of these trigger scenarios is described below.

The Non-Trigger Tracer Scenario 6302 illustrates the default Tracer-Mode. A single finger hold, Tracer-Activation gesture is established 6302a. One or more additional single finger drag gestures 6302b, capture one or more tracer strokes 6302c. Once the Trace gestures, and the Tracer-Activation gesture are released, a fade timer is launched that progressively fades the tracer strokes 6302d, 6302e, and 6302f. When the strokes have faded below a threshold, they are removed 6302g.

Tap-Trigger Tracer Tap-Symbol Scenario 6304. A single finger hold, Tracer-Activation gesture is established 6304a. One or more additional single finger drag gestures 6304b, capture one or more tracer strokes 6304c. Once the Trace gestures, and the Tracer-Activation gesture are released, a fade timer is launched that progressively fades the tracer strokes 6304d. A single finger tap 6304e, delivered within the extent of the tracer strokes 6304f, triggers the evaluation of the tracer strokes to determine if they are a recognized Tap-Symbol previously registered with the system. Upon recognition, a clean symbol is displayed 6304g, and the associated platform command is executed.

Drip-Trigger Tracer Tap-Symbol Scenario 6306. A single finger hold, Tracer-Activation gesture is established 6306a. One or more additional single finger drag gestures 6306b and 6306c, capture one or more tracer strokes 6306d. While still holding the last stroke, an additional single finger tap 6306e, is delivered, triggering the evaluation of all the captured tracer strokes to determine if they are a recognized Tap-Symbol previously registered with the system. Upon recognition, a clean symbol is displayed 6306f, and the associated platform command is executed. The user is left holding the Tap-Symbol 6306g. This hold can be further utilized to deliver voice commands specific to the Tap-Symbol while the Tap-Symbol hold is maintained.

Hold-Trigger Tracer Tap-Symbol Scenario 6308. A single finger hold, Tracer-Activation gesture is established 6308a. One or more additional single finger drag gestures 6308b, capture one or more tracer strokes 6308c. Once the Trace gestures, and the Tracer-Activation gesture are released, a fade timer is launched that progressively fades the tracer strokes 6308d. A single finger grab 6308e, is placed within the extent of the tracer strokes 6308f, launches a hold timer 6308g. When the hold exceeds a threshold, a Tap-Symbol recognition is triggered, evaluating all the captured tracer strokes to determine if they are a recognized Tap-Symbol previously registered with the system. Upon recognition, a clean symbol is displayed 6308h, and the associated platform command is executed. The user is left holding the Tap-Symbol 6308i. This hold can be further utilized to deliver voice commands specific to the Tap-Symbol while the Tap-Symbol hold is maintained.

Pause-Trigger Tracer Tap-Symbol Scenario 6310. A single finger hold, Tracer-Activation gesture is established 6310a. One or more additional single finger drag gestures 6310b, and 6310c, capture one or more tracer strokes 6310d. The Pause-Trigger is executed by pausing at the end of the last stroke 6310b. The user pauses at the end of the last stroke, while still holding the gesture. A pause-timer 6310e is constantly reset while tracer strokes are actively being made. Movements of the Tracer finger constantly reset (restart) the Pause-Timer or, if all touch points are released, the Pause-Timer is canceled. Only if the Pause-Timer is active and the Tracer finger is still, can it expire, thus triggering and attempting to recognize a Tap-Symbol from the accumulated Tracer strokes. Upon recognition, a clean symbol is displayed 6310f, and the associated platform command is executed. The user is left holding the Tap-Symbol 6310g. This hold can be further utilized to deliver voice commands specific to the Tap-Symbol while the Tap-Symbol hold is maintained.

Ad Hoc Tracer-Mode Augmented Reality (AR)/Virtual Reality (VR) Environments

Figure 64:
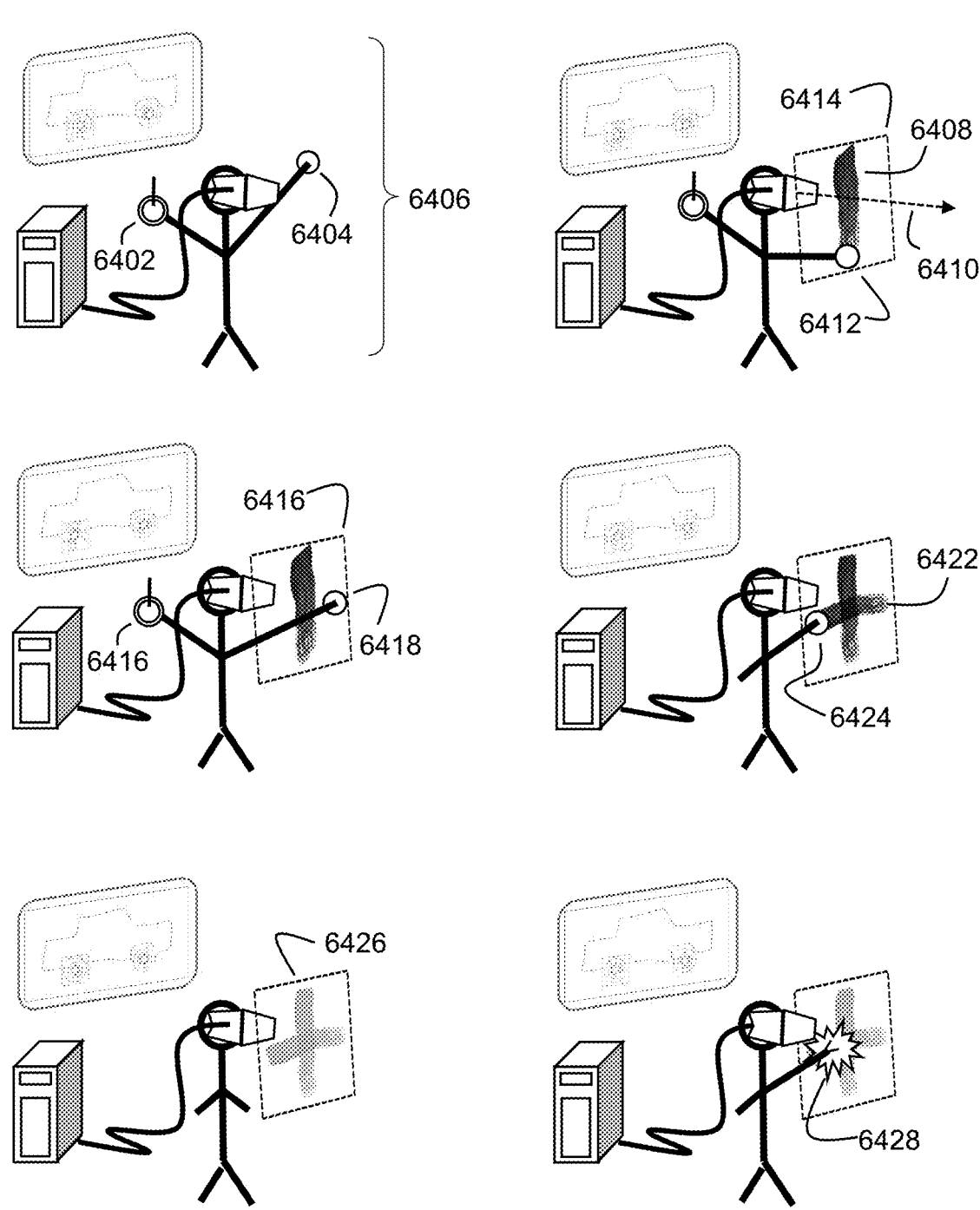
FIG. 64 illustrates the Ad Hoc Tracer-Mode activation gesture in Augmented Reality (AR)/Virtual Reality (VR) environments in some embodiments.

Likewise, the Tracer-Mechanism in an AR/VR environment benefits from the addition of a Tracer-Activation gesture that primes the Tracer-Mode and allows it to coexist alongside other platform gestures. FIG. 64 illustrates the additional Tracer-Activation gesture in the context of a Tap-Symbol trigger scenario. In some embodiments, a single finger held aloft without substantial motion 6402, serves as a Tracer-Activation gesture for recognizing Tracer activity. A second single finger hand gesture 6404, made in conjunction with the Tracer-Activation gesture indicates the user's intention to drag a Tracer stroke. Unlike Tracer operations on a physical touch surface, AR/VR lacks a physical surface to make and break contact with 6406, to start and stop each stroke creation. The Tracer-Activation gesture solves Tracer initiation. The first stroke 6408, is used to define a virtual surface that exists only for the lifetime of the first tracer stroke. The virtual surface is determined by fitting a plane to the first stroke so that it is centered and horizontally perpendicular to the site line between the user and the centroid of the first stroke 6410. This virtual surface once established serves to define the Tap-Gesture, Grab-Gesture, and Hold-Gestures described in FIG. 62 for a Tap-Display. By the end of the first stroke 6412 a virtual plane has been established 6414. At the end of the stroke 6412, pulling the finger back toward the user disengages from the surface, generating a touch release event, thus completing the Tracer stroke. While the Tracer-Activation gesture 6416 remains active, further strokes 6422 are deposited on this virtual surface 6416 using finger intersection to define the start 6418 and stop 6424 for each stroke. Release of both the Tracer-Activation gesture and the last stroke, launches the Fade-Timer to begin fading the Tracer strokes 6426. Triggering of Tap-Symbols can be performed as in FIG. 62, 6204 using the virtual surface. If no finger intersections occur for an extended period, the strokes will completely fade taking the virtual surface defined with it. A two finger tap delivered onto the virtual surface 6428 serves to clear the tracer strokes.

What is claimed is:

1. An interactive display device comprising:
    one or more processors;
    one or more input devices configured to detect one or more gestures from a user;
    a display configured to render one or more annotation strokes within one or more content spaces;
    at least one memory, storing non-transitory computer-executable instructions that, when executed by the one or more processors, cause the device to implement a tracer mode that:

(i) operates without graphical menus or toolbars;

(ii) uses one or more transitory annotation strokes overlaid on application content to:

(A) issue application commands when a user performs a secondary gesture that compares a drawn symbol with a predetermined set of symbols executing a corresponding command; or B) serve as passive, non-destructive content markup that automatically fades if no secondary gesture is performed, the operations comprising:

acquiring, at the one or more processors, input data from the interactive display device, interpreted as the one or more gestures executed by the user;

capturing, at the one or more processors, one or more tracer strokes, in response to one or more trace gestures, which generate ink trails recording the gesture trajectories of the one or more trace gestures, in the one or more content spaces, wherein the strokes are not required to occur in any particular area or graphical region and may be produced directly over top of other digital content;

fading, at the one or more processors, one or more previously captured active tracer strokes, in response to detecting the release of all gestures, comprising the steps:

starting, at the one or more processors, a repeating fade timer, in response to the release of all gestures;

fading, at the one or more processors, the one or more previously captured active tracer strokes, in response to the repeating fade timer, wherein an opacity attribute is adjusted for the one or more previously captured active tracer strokes, so that they become progressively transparent with each subsequent fade timer event;

removing, at the one or more processors, the one or more previously captured active tracer strokes when they fall below an opacity threshold, and canceling the repeating fade timer;

restoring, at the one or more processors, the one or more previously captured active tracer strokes to full opacity, in response to detecting one or more additional trace gestures, and canceling the repeating fade timer;

triggering, at the one or more processors, a tap-symbol matching process, of the one or more previously captured active tracer strokes, in response to a tap-symbol trigger gesture delivered in relation to the one or more previously captured active tracer strokes, wherein the user can selectively choose to not trigger the active tracer strokes, allowing them to fade and be removed;

matching, at the one or more processors, the one or more previously captured active tracer strokes, in response to the detected tap-symbol trigger gesture, with a tap-symbol stored in a set of single/multistroke tap-symbol exemplars;

replacing, the one or more previously captured active tracer strokes, in response to a tap-symbol match, with a tap-symbol that fades on release;

executing, at the one or more processors, in response to a tap-symbol match, an associated application command, to act on the user content in proximity of the tap-symbol.

2. The interactive display device of claim 1, further comprising, a multi-touch input display, a mouse input device, a touch pad input device, a stylus drawing tool, wherein the one or more trace gestures that produce the one or more tracer strokes, are one of the following: one or more single finger drag gestures, one or more left button drag gestures, one or more touch pad drag gestures, one or more stylus drag gestures, performed by the user, at the multitouch input display, wherein the tap-symbol trigger gesture delivered in relation to the one or more previously captured active tracer strokes, is one of the following: a touch tap gesture at the display, a touch pad tap gesture, a left mouse button tap, a right mouse button tap, performed by the user.

3. The interactive display device of claim 2, where the tap-symbol trigger gesture further comprises, one of the following: a single finger tap gesture, a left mouse button tap, a touch pad tap, delivered within the extent of the one or more previously captured active tracer strokes.

4. The interactive display device of claim 2, where the tap-symbol trigger gesture further comprises, a drip-gesture consisting of one of the following: a concurrent single finger tap, a concurrent right mouse button tap, a concurrent right touch pad button, while still holding a last trace gesture.

5. The interactive display device of claim 2, where the tap-symbol trigger gesture further comprises, a pause trigger detected as a pause in movement of the last trace gesture, where the gesture is not released and held till a pause time threshold is exceeded, comprising the steps:

starting, at the one or more processors, a pause timer, with a pause interval, when a trace gesture is detected;

recording, at the one or more processors, a current location of the trace gesture, as an anchor location, when the trace gesture is detected;

processing, at the one or more processors, a pause timer expiration event, comprising:

calculating, at the one or more processors, an absolute move distance, from the current location of the trace gesture to the anchor location previously recorded;

triggering, the tap-symbol match if the absolute move distance is less than a pause threshold;

restarting, at the one or more processors, the pause timer, with the pause interval and recording the current location of the trace gesture, as the anchor location;

canceling, the pause timer, on release of the trace gesture.

6. The interactive display device of claim 2 further comprising, a tracer stroke clear gesture, wherein the one or more previously captured active tracer strokes can be cleared with one of the following: a two finger tap gesture performed at the multi-touch input display, a right button mouse tap, a touch pad right button tap, performed by the user.

7. The interactive display device of claim 2, further comprising a first priming gesture co-existing with standard software manipulation gestures such as pinch to zoom, content selection, and content scrolling, that operates without graphical menus or toolbars, the operations comprising:

detecting, at the one or more processors, a first activation gesture that primes the menuless tracer mode, comprising a hold gesture, that does not exceed a movement threshold;

detecting, at the one or more processors, one or more secondary trace gestures that generate one or more tracer strokes, while the first activation gesture is active;

fading, at the one or more processors, one or more previously captured active tracer strokes, in response to detecting the release of the activation gesture and all stroke gestures;

triggering, at the one or more processors, a tap-symbol matching process, of the one or more previously captured active tracer strokes, in response to a tap-symbol trigger gesture delivered in relation to the one or more previously captured active tracer strokes, wherein the user can selectively choose to not trigger the active tracer strokes.

8. The interactive display device of claim 1, further comprising a voice user interface capable of performing speech recognition on user audio inputs, allowing voice commands to be issued in combination with a matched tap-symbol and targeting co-located user content, the operations comprising:

retrieving, a list of vocals, in response to a triggered tap-symbol, which are one or more related voice commands to the triggered tap-symbol;

querying, the user content under the tap-symbol for additional relevant voice commands, to include but not limited to, attribute names, layout options, parameter values;

activating, the voice user interface with the list of vocals and listening at the audio device;

executing, one or more application commands, in response to one or more detected recognition events by the voice user interface;

deactivating, the voice user interface when all gestures are released.

9. A computer implemented method comprising:

an interactive display device;

one or more processors;

one or more input devices configured to detect one or more gestures from a user;

a display configured to render one or more annotation strokes within one or more content spaces;

at least one memory, storing non-transitory computer-executable instructions that, when executed by the one or more processors, cause the device to implement a tracer mode in response to a first priming gesture that:

(i) operates without graphical menus or toolbars;

(ii) uses one or more transitory annotation strokes overlaid on application content to:

(A) issue application commands when a user performs a secondary gesture that compares a drawn symbol with a predetermined set of symbols executing a corresponding command; or B) serve as passive, non-destructive content markup that automatically fades if no secondary gesture is performed, the operations comprising:

detecting, at the one or more processors, a first activation gesture, occurring anywhere in the content space, that primes the menuless tracer mode, comprising a hold gesture, that does not exceed a movement threshold;

capturing, at the one or more processors, one or more secondary tracer strokes, in response to one or more trace gestures, which generate ink trails recording the gesture trajectories of the one or more trace gestures, in the one or more content spaces while the first activation gesture is active, wherein the strokes are not required to occur in any particular area or graphical region and may be produced directly over top of other digital content;

fading, at the one or more processors, one or more previously captured active tracer strokes, in response to detecting the release of all gestures, comprising the steps:

starting, at the one or more processors, a repeating fade timer, in response to the release of all gestures;

fading, at the one or more processors, the one or more previously captured active tracer strokes, in response to the repeating fade timer, wherein an opacity attribute is adjusted for the one or more previously captured active tracer strokes, so that they become progressively transparent with each subsequent fade timer event;

removing, at the one or more processors, the one or more previously captured active tracer strokes when they fall below an opacity threshold, and canceling the repeating fade timer;

restoring, at the one or more processors, the one or more previously captured active tracer strokes to full opacity, in response to detecting the first tracer activation gesture, and canceling the repeating fade timer.

10. The computer implemented method of claim 9, further comprising, a tap-symbol trigger gesture to issue application commands, the operations comprising:

detecting, a trigger gesture comprising one of the following:

a single tap gesture delivered within the bounds of the one or more previously captured active tracer strokes;

a drip-gesture comprising a concurrent single tap while still holding a last trace gesture;

a pause trigger detected as a pause in movement of the last trace gesture, where the gesture is not released and held until a pause time threshold is exceeded;

triggering, at the one or more processors, a tap-symbol matching process, of the one or more previously captured active tracer strokes, in response to the trigger gesture delivered in relation to the one or more previously captured active tracer strokes, wherein the user can selectively choose to not trigger the active tracer strokes;

matching, at the one or more processors, the one or more previously captured active tracer strokes, in response to the trigger gesture, with a tap-symbol stored in a set of single/multi-stroke tap-symbol exemplars;

replacing, the one or more previously captured active tracer strokes, in response to a tap-symbol match, with a tap-symbol that fades on release;

executing, at the one or more processors, in response to a tap-symbol match, an associated application command, to act on the user content in proximity of the tap-symbol.

11. The computer implemented method of claim 10, further comprising a voice user interface capable of performing speech recognition on user audio inputs, allowing voice commands to be issued in combination with a matched tap-symbol and targeting co-located user content, the operations comprising:

retrieving, a list of vocals, in response to a triggered tap-symbol, which are one or more related voice commands to the triggered tap-symbol;

querying, the user content under the tap-symbol for additional relevant voice commands, to include but not limited to, attribute names, layout options, parameter values;

activating, the voice user interface with the list of vocals and listening at the audio device;

executing, one or more application commands, in response to one or more detected recognition events by the voice user interface;

deactivating, the voice user interface when all gestures are released.

12. A computer implemented method comprising:

an interactive display device;

one or more processors;

one or more input devices configured to detect one or more gestures from a user;

a display configured to render one or more annotation strokes within one or more content spaces;

at least one memory, storing non-transitory computer-executable instructions that, when executed by the one or more processors, cause the device to implement a tracer mode in response to a priming gesture co-existing with standard software manipulation gestures such as pinch to zoom, content selection, and content scrolling, that:

(i) operates without graphical menus or toolbars;

(ii) overlays transitory annotation strokes on application content to non-destructively markup content, with strokes automatically fading when all gestures are released;

the operations comprising:

detecting, a hold gesture that activates the tracer mode occurring anywhere in the content space;

detecting, one or more secondary gestures that generate one or more tracer strokes over user content, wherein the strokes are not required to occur in any particular area or graphical region;

fading, the one or more tracer strokes, in response to the release of all gestures;

restoring, the one or more tracer strokes that are still visible in response to a hold gesture that reestablishes the tracer mode;

removing, the one or more tracer strokes that have faded below a threshold.

13. The computer implemented method of claim 12, further comprising, a tap-symbol trigger gesture to issue application commands, the operations comprising:

detecting, a trigger gesture comprising one of the following:

a single tap gesture delivered within the bounds of the one or more previously captured active tracer strokes;

a drip-gesture comprising a concurrent single tap while still holding a last trace gesture;

a pause trigger detected as a pause in movement of the last trace gesture, where the gesture is not released and held until a pause time threshold is exceeded;

matching, the one or more previously captured active tracer strokes, in response to the trigger gesture, with a tap-symbol and replacing the strokes with the tap-symbol;

executing, an application command associated with a matched tap-symbol in response to the tap-trigger, to act on the user content in proximity of the tap-symbol.

14. The computer implemented method of claim 13, further comprising a voice user interface capable of performing speech recognition on user audio inputs, allowing voice commands to be issued in combination with a matched tap-symbol and targeting co-located user content, the operations comprising:

activating, the voice user interface, in response to a triggered tap-symbol, with voice commands relevant to the triggered tap-symbol, or to the user content under the tap-symbol, or any combination thereof;

executing, one or more application commands, in response to one or more detected recognition events by the voice user interface;

deactivating, the voice user interface when all gestures are released.

15. The computer implemented method of claim 13, further comprising a tracer stroke clear gesture, wherein the one or more previously captured active tracer strokes can be cleared with one of the following: a two finger tap gesture, a right button mouse tap, a touch pad right button tap, performed by the user, at the multi-touch input display.

16. The computer implemented method of claim 10, further comprising a tracer stroke clear gesture, wherein the one or more previously captured active tracer strokes can be cleared with one of the following: a two finger tap gesture, a right button mouse tap, a touch pad right button tap, performed by the user, at the multi-touch input display.

* * * * *